United States Patent
Zambetti et al.

(10) Patent No.: US 10,126,930 B2
(45) Date of Patent: Nov. 13, 2018

(54) DEVICE, METHOD, AND GRAPHICAL USER INTERFACE FOR SCROLLING NESTED REGIONS

(71) Applicant: Apple Inc., Cupertino, CA (US)

(72) Inventors: Nicholas Zambetti, Largo, FL (US); Julian Missig, Redwood City, CA (US)

(73) Assignee: APPLE INC., Cupertino, CA (US)

( * ) Notice: Subject to any disclaimer, the term of this patent is extended or adjusted under 35 U.S.C. 154(b) by 465 days.

(21) Appl. No.: 14/536,367

(22) Filed: Nov. 7, 2014

(65) Prior Publication Data

US 2015/0067605 A1    Mar. 5, 2015

Related U.S. Application Data

(63) Continuation of application No. PCT/US2013/040056, filed on May 8, 2013.

(Continued)

(51) Int. Cl.
*G06F 3/0486*    (2013.01)
*G06F 3/0485*    (2013.01)
(Continued)

(52) U.S. Cl.
CPC .......... *G06F 3/0485* (2013.01); *G06F 3/0412* (2013.01); *G06F 3/0488* (2013.01); *G06F 3/04883* (2013.01)

(58) Field of Classification Search
CPC ...... G06F 3/016; G06F 3/0485; G06F 3/0488; G06F 3/0416; G06F 3/04855
See application file for complete search history.

(56) References Cited

U.S. PATENT DOCUMENTS 4,674,044 A    6/1987    Kalmus et al.
4,750,135 A    6/1988    Boilen
(Continued)

FOREIGN PATENT DOCUMENTS

AU    2016100649 A4    6/2016
CN    1658150    8/2005
(Continued)

OTHER PUBLICATIONS

Agarwal, "How to Copy and Paste Text on Windows Phone 8," Guiding Tech, http://web.archive.org/web20130709204246/http://www.guidingtech.com/20280/copy-paste-text-windows-phone-8/, Jul. 9, 2013, 10 pages.

(Continued)

*Primary Examiner* — Namitha Pillai
(74) *Attorney, Agent, or Firm* — Morgan, Lewis & Bockius LLP

(57) ABSTRACT

A method is performed at an electronic device with a display, touch-sensitive surface and one or more sensors to detect intensity of contacts with the touch-sensitive surface. The method includes displaying a user interface with a first region and a second region embedded in the first, the second region also being independently scrollable such that its content can be moved without moving other content in the first region. In response to detecting a contact and movement of the contact when a focus selection is over the second region, and when the contact has a maximum intensity that is above a respective intensity threshold, content in the second region is translated on the display without other content translating the first region. When the contact has a maximum intensity that is below a respective intensity threshold, content in the first region is translated on the display.

24 Claims, 84 Drawing Sheets

Related U.S. Application Data

(60) Provisional application No. 61/778,179, filed on Mar. 12, 2013, provisional application No. 61/747,278, filed on Dec. 29, 2012, provisional application No. 61/688,227, filed on May 9, 2012.

(51) Int. Cl.
  *G06F 3/0488* (2013.01)
  *G06F 3/041* (2006.01)

(56) References Cited

U.S. PATENT DOCUMENTS

| | | |
|---|---|---|
| 4,864,520 A | 9/1989 | Setoguchi et al. |
| 4,903,201 A | 2/1990 | Wagner |
| 5,038,284 A | 8/1991 | Kramer |
| 5,077,665 A | 12/1991 | Silverman et al. |
| 5,101,353 A | 3/1992 | Lupien et al. |
| 5,136,501 A | 8/1992 | Silverman et al. |
| 5,184,120 A | 2/1993 | Schultz |
| 5,270,922 A | 12/1993 | Higgins |
| 5,297,031 A | 3/1994 | Gutterman et al. |
| 5,297,032 A | 3/1994 | Trojan et al. |
| 5,374,787 A | 12/1994 | Miller et al. |
| 5,428,730 A | 6/1995 | Baker et al. |
| 5,455,965 A | 10/1995 | Shaughnessy et al. |
| 5,463,722 A | 10/1995 | Venolia |
| 5,510,813 A | 4/1996 | Makinwa et al. |
| 5,555,354 A | 9/1996 | Strasnick et al. |
| 5,559,301 A | 9/1996 | Bryan, Jr. et al. |
| 5,590,265 A | 12/1996 | Nakazawa |
| 5,627,914 A | 5/1997 | Pagallo |
| 5,689,651 A | 11/1997 | Lozman |
| 5,695,400 A | 12/1997 | Fenell, Jr. et al. |
| 5,710,896 A | 1/1998 | Seidl |
| 5,717,438 A | 2/1998 | Kim et al. |
| 5,717,725 A | 2/1998 | Campana, Jr. |
| 5,719,796 A | 2/1998 | Chen |
| 5,727,165 A | 3/1998 | Ordish et al. |
| 5,774,877 A | 6/1998 | Patterson, Jr. et al. |
| 5,775,996 A | 7/1998 | Othmer et al. |
| 5,793,301 A | 8/1998 | Patterson, Jr. et al. |
| 5,793,360 A | 8/1998 | Fleck et al. |
| 5,793,377 A | 8/1998 | Moore |
| 5,797,002 A | 8/1998 | Patterson, Jr. et al. |
| 5,801,692 A | 9/1998 | Muzio et al. |
| 5,805,144 A | 9/1998 | Scholder et al. |
| 5,805,167 A | 9/1998 | Van Cruyningen |
| 5,809,267 A | 9/1998 | Moran et al. |
| 5,819,293 A | 10/1998 | Comer et al. |
| 5,820,463 A | 10/1998 | O'Callaghan |
| 5,825,352 A | 10/1998 | Bisset et al. |
| 5,844,560 A | 12/1998 | Crutcher et al. |
| 5,845,266 A | 12/1998 | Lupien et al. |
| 5,872,922 A | 2/1999 | Hogan et al. |
| 5,880,733 A | 3/1999 | Horvitz et al. |
| 5,910,882 A | 6/1999 | Burrell |
| 5,915,245 A | 6/1999 | Patterson, Jr. et al. |
| 5,924,082 A | 7/1999 | Silverman et al. |
| 5,924,083 A | 7/1999 | Silverman et al. |
| 5,946,647 A | 8/1999 | Miller et al. |
| 5,946,667 A | 8/1999 | Tull, Jr. et al. |
| 5,953,708 A | 9/1999 | Midorikawa et al. |
| 5,963,923 A | 10/1999 | Garber |
| 6,002,397 A | 12/1999 | Jaaskelainen, Jr. |
| 6,012,046 A | 1/2000 | Lupien et al. |
| 6,014,643 A | 1/2000 | Minton |
| 6,031,989 A * | 2/2000 | Cordell ............... G06F 17/2229 707/E17.121 |
| 6,035,287 A | 3/2000 | Stallaert et al. |
| 6,072,488 A | 6/2000 | Mcfarland |
| 6,088,019 A | 7/2000 | Rosenberg |
| 6,088,027 A | 7/2000 | Konar et al. |
| 6,098,051 A | 8/2000 | Lupien et al. |
| 6,111,575 A | 8/2000 | Martinez et al. |
| 6,115,043 A | 9/2000 | Levine et al. |
| 6,121,960 A | 9/2000 | Carroll et al. |
| 6,131,087 A | 10/2000 | Luke et al. |
| 6,134,535 A | 10/2000 | Belzberg |
| 6,180,894 B1 | 1/2001 | Chao et al. |
| 6,195,647 B1 | 2/2001 | Martyn et al. |
| 6,208,329 B1 | 3/2001 | Ballare |
| 6,208,340 B1 | 3/2001 | Amin et al. |
| 6,219,034 B1 | 4/2001 | Elbing et al. |
| 6,227,743 B1 | 5/2001 | Robb |
| 6,229,542 B1 | 5/2001 | Miller |
| 6,243,080 B1 | 6/2001 | Molne |
| 6,247,000 B1 | 6/2001 | Hawkins et al. |
| 6,252,594 B1 | 6/2001 | Xia et al. |
| 6,266,684 B1 | 7/2001 | Kraus |
| 6,272,474 B1 | 8/2001 | Garcia |
| 6,278,982 B1 | 8/2001 | Korhammer et al. |
| 6,282,521 B1 | 8/2001 | Howorka |
| 6,323,846 B1 | 11/2001 | Westerman et al. |
| 6,347,997 B1 | 2/2002 | Armstrong |
| 6,377,940 B2 | 4/2002 | Tilfors et al. |
| 6,396,523 B1 | 5/2002 | Segal et al. |
| 6,396,962 B1 | 5/2002 | Haffey et al. |
| 6,400,303 B2 | 6/2002 | Armstrong |
| 6,405,180 B2 | 6/2002 | Tilfors et al. |
| 6,408,282 B1 | 6/2002 | Buist |
| 6,411,998 B1 | 6/2002 | Bryant et al. |
| 6,429,846 B2 | 8/2002 | Rosenberg et al. |
| 6,448,977 B1 | 9/2002 | Braun et al. |
| 6,456,778 B2 | 9/2002 | Armstrong |
| 6,459,424 B1 | 10/2002 | Resman |
| 6,459,442 B1 | 10/2002 | Edwards et al. |
| 6,469,691 B1 | 10/2002 | Armstrong |
| 6,470,078 B1 | 10/2002 | Armstrong |
| 6,489,975 B1 | 12/2002 | Patil et al. |
| 6,489,978 B1 | 12/2002 | Gong et al. |
| 6,504,527 B1 | 1/2003 | Armstrong |
| 6,512,530 B1 | 1/2003 | Rzepkowski et al. |
| 6,512,761 B1 | 1/2003 | Schuster et al. |
| 6,532,000 B2 | 3/2003 | Armstrong |
| 6,551,357 B1 | 4/2003 | Madduri |
| 6,559,831 B1 | 5/2003 | Armstrong |
| 6,563,487 B2 | 5/2003 | Martin et al. |
| 6,567,102 B2 | 5/2003 | Kung |
| 6,570,557 B1 | 5/2003 | Westerman et al. |
| 6,583,798 B1 | 6/2003 | Hoek et al. |
| 6,590,568 B1 | 7/2003 | Astala et al. |
| 6,659,861 B1 | 12/2003 | Faris et al. |
| 6,661,438 B1 | 12/2003 | Shiraishi et al. |
| 6,670,952 B2 | 12/2003 | Jaeger et al. |
| 6,677,932 B1 | 1/2004 | Westerman |
| 6,735,307 B1 | 5/2004 | Volckers |
| 6,750,890 B1 | 6/2004 | Sugimoto |
| 6,772,132 B1 | 8/2004 | Kemp, II et al. |
| 6,822,635 B2 | 11/2004 | Shahoian et al. |
| 6,831,666 B1 | 12/2004 | Kreis |
| 6,891,551 B2 | 5/2005 | Keely et al. |
| 6,904,405 B2 | 6/2005 | Suominen |
| 6,906,697 B2 | 6/2005 | Rosenberg |
| 6,919,927 B1 | 7/2005 | Hyodo |
| 6,954,899 B1 | 10/2005 | Anderson |
| 7,036,088 B2 | 4/2006 | Tunney |
| 7,058,146 B2 | 6/2006 | Paulraj et al. |
| 7,114,091 B2 | 9/2006 | Vrancic |
| 7,134,093 B2 | 11/2006 | Etgen et al. |
| 7,138,983 B2 | 11/2006 | Wakai et al. |
| 7,159,189 B2 | 1/2007 | Weingart et al. |
| 7,259,752 B1 | 8/2007 | Simmons |
| 7,312,791 B2 | 12/2007 | Hoshino et al. |
| 7,346,855 B2 | 3/2008 | Hellyar et al. |
| 7,380,218 B2 | 5/2008 | Rundell |
| 7,411,575 B2 | 8/2008 | Hill et al. |
| 7,441,204 B2 | 10/2008 | Thomson et al. |
| 7,461,026 B2 | 12/2008 | Schluetter |
| 7,479,949 B2 | 1/2009 | Jobs et al. |
| 7,492,720 B2 | 2/2009 | Pruthi et al. |
| 7,532,206 B2 | 5/2009 | Morrison et al. |
| 7,533,352 B2 | 5/2009 | Chew et al. |
| 7,552,397 B2 | 6/2009 | Holecek et al. |

(56) References Cited

U.S. PATENT DOCUMENTS

| | | |
|---|---|---|
| 7,577,167 B2 | 8/2009 | Kikuchi et al. |
| 7,577,530 B2 | 8/2009 | Vignalou-Marche |
| 7,581,186 B2 | 8/2009 | Dowdy et al. |
| 7,614,008 B2 | 11/2009 | Ording |
| 7,619,616 B2 | 11/2009 | Rimas Ribikauskas et al. |
| 7,629,966 B2 | 12/2009 | Anson |
| 7,633,076 B2 | 12/2009 | Huppi et al. |
| 7,653,883 B2 | 1/2010 | Hotelling et al. |
| 7,656,413 B2 | 2/2010 | Khan et al. |
| 7,657,849 B2 | 2/2010 | Chaudhri et al. |
| 7,663,607 B2 | 2/2010 | Hotelling et al. |
| 7,673,255 B2 | 3/2010 | Schechter et al. |
| 7,680,513 B2 | 3/2010 | Haitani et al. |
| 7,683,889 B2 | 3/2010 | Rimas-Ribikauskas et al. |
| 7,694,236 B2 | 4/2010 | Gusmorino et al. |
| 7,694,321 B1 | 4/2010 | Kocienda et al. |
| 7,739,604 B1 | 6/2010 | Lyons et al. |
| 7,743,348 B2 | 6/2010 | Robbins et al. |
| 7,752,115 B2 | 7/2010 | Schluetter |
| 7,757,185 B2 | 7/2010 | Paquette et al. |
| 7,760,187 B2 | 7/2010 | Kennedy |
| 7,787,026 B1 | 8/2010 | Flory et al. |
| 7,788,595 B2 | 8/2010 | Biwer et al. |
| 7,797,642 B1 | 9/2010 | Karam et al. |
| 7,801,796 B2 | 9/2010 | Friedman et al. |
| 7,801,950 B2 * | 9/2010 | Eisenstadt ............ G06F 17/3089 707/E17.11 |
| 7,812,826 B2 | 10/2010 | Ording et al. |
| 7,817,568 B2 | 10/2010 | Paik et al. |
| 7,844,914 B2 | 11/2010 | Andre et al. |
| 7,880,728 B2 | 2/2011 | de los Reyes et al. |
| 7,890,862 B2 | 2/2011 | Kompe et al. |
| 7,903,090 B2 | 3/2011 | Soss et al. |
| 7,921,373 B2 | 4/2011 | Yamashita et al. |
| 7,952,566 B2 | 5/2011 | Poupyrev et al. |
| 7,956,847 B2 | 6/2011 | Christie |
| 7,957,762 B2 | 6/2011 | Herz et al. |
| 7,966,352 B2 | 6/2011 | Madan et al. |
| 7,973,778 B2 | 7/2011 | Chen |
| 8,001,189 B2 | 8/2011 | Nielsen et al. |
| 8,006,002 B2 | 8/2011 | Kalayjian et al. |
| 8,010,900 B2 | 8/2011 | Hart et al. |
| 8,020,028 B1 | 9/2011 | Luttter |
| 8,024,670 B1 | 9/2011 | Rahmation et al. |
| 8,040,142 B1 | 10/2011 | Bokma et al. |
| 8,046,712 B2 | 10/2011 | Landman et al. |
| 8,059,104 B2 | 11/2011 | Shahoian et al. |
| 8,106,856 B2 | 1/2012 | Matas et al. |
| 8,125,440 B2 | 2/2012 | Guyot-Sionnest et al. |
| 8,125,492 B1 | 2/2012 | Wainwright et al. |
| RE43,448 E | 6/2012 | Kimoto et al. |
| 8,209,628 B1 | 6/2012 | Davidson |
| 8,214,768 B2 | 7/2012 | Boule et al. |
| 8,239,784 B2 | 8/2012 | Hotelling et al. |
| 8,271,900 B2 | 9/2012 | Walizaka et al. |
| 8,279,180 B2 | 10/2012 | Hotelling et al. |
| 8,363,020 B2 | 1/2013 | Li et al. |
| 8,381,135 B2 | 2/2013 | Hotelling et al. |
| 8,390,583 B2 | 3/2013 | Forutanpour et al. |
| 8,423,089 B2 | 4/2013 | Song et al. |
| 8,438,504 B2 | 5/2013 | Cranfill et al. |
| 8,446,376 B2 | 5/2013 | Levy et al. |
| 8,453,057 B2 | 5/2013 | Stallings et al. |
| 8,456,431 B2 | 6/2013 | Victor |
| 8,466,889 B2 | 6/2013 | Tong et al. |
| 8,479,122 B2 | 7/2013 | Hotelling et al. |
| 8,482,535 B2 | 7/2013 | Pryor |
| 8,508,494 B2 | 8/2013 | Moore |
| 8,542,205 B1 * | 9/2013 | Keller ................... G06F 3/0488 345/173 |
| 8,553,092 B2 | 10/2013 | Tezuka et al. |
| 8,581,870 B2 | 11/2013 | Bokma et al. |
| 8,587,542 B2 | 11/2013 | Moore |
| 8,593,415 B2 | 11/2013 | Han et al. |
| 8,593,420 B1 | 11/2013 | Buuck |
| 8,625,882 B2 | 1/2014 | Backlund et al. |
| 8,638,311 B2 | 1/2014 | Kang et al. |
| 8,665,227 B2 | 3/2014 | Gunawan |
| 8,669,945 B2 * | 3/2014 | Coddington .......... G06F 3/0485 345/173 |
| 8,674,932 B2 | 3/2014 | Armstrong |
| 8,698,765 B1 | 4/2014 | Keller |
| 8,698,845 B2 | 4/2014 | Lemay |
| 8,717,305 B2 | 5/2014 | Williamson et al. |
| 8,743,069 B2 | 6/2014 | Morton et al. |
| 8,769,431 B1 | 7/2014 | Prasad |
| 8,773,389 B1 | 7/2014 | Freed |
| 8,788,964 B2 | 7/2014 | Shin et al. |
| 8,793,577 B2 | 7/2014 | Schellingerhout et al. |
| 8,799,816 B2 | 8/2014 | Wells et al. |
| 8,806,369 B2 | 8/2014 | Khoe et al. |
| 8,816,989 B2 | 8/2014 | Nicholson et al. |
| 8,854,316 B2 | 10/2014 | Shenfield |
| 8,872,729 B2 | 10/2014 | Lyons et al. |
| 8,872,773 B2 | 10/2014 | Mak et al. |
| 8,875,044 B2 | 10/2014 | Ozawa et al. |
| 8,881,062 B2 | 11/2014 | Kim et al. |
| 8,914,732 B2 | 12/2014 | Jun et al. |
| 8,952,987 B2 | 2/2015 | Momeyer et al. |
| 8,959,430 B1 | 2/2015 | Spivak et al. |
| 8,976,128 B2 | 3/2015 | Moore |
| 9,026,932 B1 | 5/2015 | Dixon |
| 9,030,419 B1 | 5/2015 | Freed |
| 9,030,436 B2 | 5/2015 | Ikeda |
| 9,046,999 B1 | 6/2015 | Teller et al. |
| 9,058,186 B2 | 6/2015 | Chaudhri |
| 9,063,563 B1 | 6/2015 | Gray et al. |
| 9,069,460 B2 | 6/2015 | Moore |
| 9,086,755 B2 | 7/2015 | Cho et al. |
| 9,092,058 B2 | 7/2015 | Kasahara et al. |
| 9,098,188 B2 | 8/2015 | Kim |
| 9,116,571 B2 | 8/2015 | Zeliff et al. |
| 9,122,364 B2 | 9/2015 | Kuwabara et al. |
| 9,146,914 B1 | 9/2015 | Dhaundiyal |
| 9,148,618 B2 | 9/2015 | Matas et al. |
| 9,164,779 B2 | 10/2015 | Brakensiek et al. |
| 9,170,607 B2 | 10/2015 | Bose et al. |
| 9,170,649 B2 | 10/2015 | Ronkainen |
| 9,218,105 B2 | 12/2015 | Mansson et al. |
| 9,244,562 B1 | 1/2016 | Rosenberg et al. |
| 9,244,576 B1 | 1/2016 | Vadagave et al. |
| 9,244,601 B2 | 1/2016 | Kim et al. |
| 9,246,487 B2 | 1/2016 | Casparian et al. |
| 9,262,002 B2 | 2/2016 | Momeyer et al. |
| 9,304,668 B2 | 4/2016 | Rezende et al. |
| 9,307,112 B2 | 4/2016 | Molgaard et al. |
| 9,349,552 B2 | 5/2016 | Huska et al. |
| 9,361,018 B2 | 6/2016 | Defazio et al. |
| 9,389,718 B1 | 7/2016 | Letourneur |
| 9,389,722 B2 | 7/2016 | Matsuki et al. |
| 9,400,581 B2 | 7/2016 | Bokma et al. |
| 9,405,367 B2 | 8/2016 | Jung et al. |
| 9,417,754 B2 | 8/2016 | Smith |
| 9,423,938 B1 | 8/2016 | Morris |
| 9,436,344 B2 | 9/2016 | Kuwabara et al. |
| 9,448,694 B2 | 9/2016 | Sharma et al. |
| 9,451,230 B1 | 9/2016 | Henderson et al. |
| 9,471,145 B2 | 10/2016 | Langlois et al. |
| 9,477,393 B2 | 10/2016 | Zambetti et al. |
| 9,542,013 B2 | 1/2017 | Dearman et al. |
| 9,547,525 B1 | 1/2017 | Trainor et al. |
| 9,569,093 B2 | 2/2017 | Lipman et al. |
| 9,600,114 B2 | 3/2017 | Milam et al. |
| 9,600,116 B2 | 3/2017 | Tao et al. |
| 9,612,741 B2 | 4/2017 | Brown et al. |
| 9,671,943 B2 | 6/2017 | Van der Velden |
| 9,733,716 B2 | 8/2017 | Shaffer |
| 9,760,241 B1 | 9/2017 | Lewbel |
| 2001/0024195 A1 | 9/2001 | Hayakawa et al. |
| 2001/0045965 A1 | 11/2001 | Orbanes et al. |
| 2002/0008691 A1 | 1/2002 | Hanajima et al. |
| 2002/0015024 A1 | 2/2002 | Westerman et al. |
| 2002/0015064 A1 | 2/2002 | Robotham et al. |
| 2002/0023038 A1 | 2/2002 | Fritsch et al. |

(56) References Cited

U.S. PATENT DOCUMENTS

| | | |
|---|---|---|
| 2002/0026321 A1 | 2/2002 | Faris et al. |
| 2002/0027957 A1 | 3/2002 | Paulraj et al. |
| 2002/0035534 A1 | 3/2002 | Buist et al. |
| 2002/0055899 A1 | 5/2002 | Williams |
| 2002/0073016 A1 | 6/2002 | Furbush et al. |
| 2002/0075289 A1 | 6/2002 | Hatori et al. |
| 2002/0077117 A1 | 6/2002 | Cloutier et al. |
| 2002/0107748 A1 | 8/2002 | Boies et al. |
| 2002/0109678 A1 | 8/2002 | Marmolin et al. |
| 2002/0120837 A1 | 8/2002 | Maxemchuk et al. |
| 2002/0138401 A1 | 9/2002 | Allen et al. |
| 2002/0140680 A1 | 10/2002 | Lu |
| 2002/0140740 A1 | 10/2002 | Chen |
| 2002/0149609 A1 | 10/2002 | Suzuki et al. |
| 2002/0149630 A1 | 10/2002 | Kitainik et al. |
| 2002/0161687 A1 | 10/2002 | Serkin et al. |
| 2002/0161693 A1 | 10/2002 | Greenwalk |
| 2002/0178102 A1 | 11/2002 | Scheinberg et al. |
| 2002/0180763 A1 | 12/2002 | Kung |
| 2002/0186257 A1 | 12/2002 | Cadiz et al. |
| 2003/0001869 A1 | 1/2003 | Nissen |
| 2003/0074413 A1 | 4/2003 | Nielsen et al. |
| 2003/0086496 A1 | 5/2003 | Zhang et al. |
| 2003/0112269 A1 | 6/2003 | Lentz et al. |
| 2003/0117440 A1 | 6/2003 | Hellyar et al. |
| 2003/0119562 A1 | 6/2003 | Kokubo |
| 2003/0122779 A1 | 7/2003 | Martin et al. |
| 2003/0151589 A1 | 8/2003 | Bensen et al. |
| 2003/0177154 A1 | 9/2003 | Vrancic |
| 2003/0184574 A1 | 10/2003 | Phillips et al. |
| 2003/0189552 A1 | 10/2003 | Chuang et al. |
| 2003/0189647 A1 | 10/2003 | Kang |
| 2003/0206169 A1 | 11/2003 | Springer et al. |
| 2003/0222915 A1 | 12/2003 | Marion et al. |
| 2004/0021643 A1 | 2/2004 | Hoshino et al. |
| 2004/0025112 A1 | 2/2004 | Chasen et al. |
| 2004/0056849 A1 | 3/2004 | Lohbihler et al. |
| 2004/0085328 A1 | 5/2004 | Maruyama et al. |
| 2004/0108995 A1 | 6/2004 | Hoshino et al. |
| 2004/0138849 A1 | 7/2004 | Schmidt et al. |
| 2004/0150631 A1 | 8/2004 | Fleck et al. |
| 2004/0150644 A1 | 8/2004 | Kincaid et al. |
| 2004/0155908 A1 | 8/2004 | Wagner |
| 2004/0174398 A1 | 9/2004 | Luke et al. |
| 2004/0174399 A1 | 9/2004 | Wu et al. |
| 2004/0219969 A1 | 11/2004 | Casey et al. |
| 2004/0267877 A1 | 12/2004 | Shiparo et al. |
| 2005/0012723 A1 | 1/2005 | Pallakoff |
| 2005/0022138 A1 | 1/2005 | Tunney |
| 2005/0039141 A1 | 2/2005 | Burke et al. |
| 2005/0073961 A1 | 4/2005 | Paik et al. |
| 2005/0091604 A1 | 4/2005 | Davis |
| 2005/0110769 A1 | 5/2005 | DaCosta et al. |
| 2005/0114785 A1 | 5/2005 | Finnigan et al. |
| 2005/0125742 A1 | 6/2005 | Grotjohn et al. |
| 2005/0132297 A1 | 6/2005 | Milic-Frayling et al. |
| 2005/0134578 A1 | 6/2005 | Chambers et al. |
| 2005/0177798 A1 | 8/2005 | Thomson et al. |
| 2005/0183017 A1 | 8/2005 | Cain |
| 2005/0183035 A1 | 8/2005 | Ringel et al. |
| 2005/0184973 A1 | 8/2005 | Lum et al. |
| 2005/0190059 A1 | 9/2005 | Wehrenberg |
| 2005/0190280 A1 | 9/2005 | Haas et al. |
| 2005/0204295 A1 | 9/2005 | Voorhees et al. |
| 2005/0223338 A1 | 10/2005 | Partanen |
| 2005/0229112 A1 | 10/2005 | Clay et al. |
| 2005/0289476 A1 | 12/2005 | Tokkonen |
| 2006/0017692 A1 | 1/2006 | Wehrenberg et al. |
| 2006/0022955 A1 | 2/2006 | Kennedy |
| 2006/0022956 A1 | 2/2006 | Lengeling et al. |
| 2006/0026535 A1 | 2/2006 | Hotelling et al. |
| 2006/0026536 A1 | 2/2006 | Hotelling et al. |
| 2006/0031776 A1 | 2/2006 | Glein et al. |
| 2006/0033724 A1 | 2/2006 | Chaudhri et al. |
| 2006/0036971 A1 | 2/2006 | Mendel et al. |
| 2006/0041846 A1 | 2/2006 | Masselle et al. |
| 2006/0055662 A1 | 3/2006 | Rimas-Ribikauskas et al. |
| 2006/0059436 A1* | 3/2006 | Nurmi ............... G06F 3/04855 715/786 |
| 2006/0067677 A1 | 3/2006 | Tokiwa et al. |
| 2006/0101347 A1 | 5/2006 | Runov et al. |
| 2006/0107226 A1 | 5/2006 | Matthews et al. |
| 2006/0109252 A1 | 5/2006 | Kolmykov-Zotov et al. |
| 2006/0109256 A1 | 5/2006 | Grant et al. |
| 2006/0119586 A1 | 6/2006 | Grant et al. |
| 2006/0132455 A1 | 6/2006 | Rimas-Ribikauskas et al. |
| 2006/0132456 A1 | 6/2006 | Anson |
| 2006/0132457 A1 | 6/2006 | Rimas-Ribikauskas et al. |
| 2006/0136834 A1 | 6/2006 | Cao et al. |
| 2006/0136845 A1 | 6/2006 | Rimas-Ribikauskas et al. |
| 2006/0161861 A1 | 7/2006 | Holecek et al. |
| 2006/0161868 A1 | 7/2006 | Van et al. |
| 2006/0161870 A1 | 7/2006 | Hotelling et al. |
| 2006/0190834 A1 | 8/2006 | Marcjan |
| 2006/0195438 A1 | 8/2006 | Galuten |
| 2006/0197753 A1 | 9/2006 | Hotelling |
| 2006/0212812 A1 | 9/2006 | Simmons et al. |
| 2006/0213754 A1 | 9/2006 | Jarrett et al. |
| 2006/0224986 A1 | 10/2006 | Lindsay et al. |
| 2006/0224989 A1 | 10/2006 | Pettiross et al. |
| 2006/0233248 A1 | 10/2006 | Rynderman et al. |
| 2006/0242602 A1 | 10/2006 | Schechter et al. |
| 2006/0265653 A1 | 11/2006 | Paasonen et al. |
| 2006/0274042 A1 | 12/2006 | Krah et al. |
| 2006/0274086 A1 | 12/2006 | Forstall et al. |
| 2006/0277469 A1 | 12/2006 | Chaudhri et al. |
| 2006/0282778 A1 | 12/2006 | Barsness et al. |
| 2006/0284858 A1 | 12/2006 | Rekimoto |
| 2006/0290681 A1 | 12/2006 | Ho et al. |
| 2007/0004451 A1 | 1/2007 | Anderson |
| 2007/0004461 A1 | 1/2007 | Bathina et al. |
| 2007/0024595 A1 | 2/2007 | Baker et al. |
| 2007/0024646 A1 | 2/2007 | Saarinen et al. |
| 2007/0070066 A1 | 3/2007 | Bakhash |
| 2007/0080953 A1 | 4/2007 | Lii |
| 2007/0113681 A1 | 5/2007 | Nishimura et al. |
| 2007/0115264 A1 | 5/2007 | Yu et al. |
| 2007/0120835 A1 | 5/2007 | Sato |
| 2007/0124699 A1 | 5/2007 | Michaels |
| 2007/0128899 A1 | 6/2007 | Mayer |
| 2007/0152959 A1 | 7/2007 | Peters |
| 2007/0152980 A1 | 7/2007 | Kocienda et al. |
| 2007/0157089 A1 | 7/2007 | Van Os et al. |
| 2007/0157173 A1 | 7/2007 | Klein et al. |
| 2007/0168369 A1 | 7/2007 | Bruns |
| 2007/0168890 A1 | 7/2007 | Zhao et al. |
| 2007/0176904 A1 | 8/2007 | Russo |
| 2007/0182999 A1 | 8/2007 | Anthony et al. |
| 2007/0186178 A1 | 8/2007 | Schiller |
| 2007/0220445 A1 | 9/2007 | Yach et al. |
| 2007/0222768 A1 | 9/2007 | Geurts et al. |
| 2007/0226327 A1 | 9/2007 | Redpath |
| 2007/0229455 A1 | 10/2007 | Martin et al. |
| 2007/0229464 A1 | 10/2007 | Hotelling et al. |
| 2007/0236450 A1 | 10/2007 | Colgate et al. |
| 2007/0236477 A1 | 10/2007 | Ryu et al. |
| 2007/0245241 A1 | 10/2007 | Bertram et al. |
| 2007/0245249 A1 | 10/2007 | Weisberg |
| 2007/0257821 A1 | 11/2007 | Son et al. |
| 2007/0262964 A1 | 11/2007 | Zotov et al. |
| 2007/0270182 A1 | 11/2007 | Gulliksson et al. |
| 2007/0270186 A1 | 11/2007 | Gulliksson et al. |
| 2007/0294295 A1 | 12/2007 | Finkelstein et al. |
| 2007/0294639 A1 | 12/2007 | Van Berkel et al. |
| 2007/0296333 A1 | 12/2007 | Kim et al. |
| 2007/0299923 A1 | 12/2007 | Skelly et al. |
| 2008/0001924 A1 | 1/2008 | dos los Reyes et al. |
| 2008/0024459 A1 | 1/2008 | Poupyrev et al. |
| 2008/0034306 A1 | 2/2008 | Ording |
| 2008/0034331 A1 | 2/2008 | Josephsoon et al. |
| 2008/0036743 A1 | 2/2008 | Westerman et al. |
| 2008/0051989 A1 | 2/2008 | Welsh |
| 2008/0052945 A1 | 3/2008 | Matas et al. |
| 2008/0066010 A1 | 3/2008 | Brodersen et al. |

(56) References Cited

U.S. PATENT DOCUMENTS

| | | |
|---|---|---|
| 2008/0094367 A1 | 4/2008 | Van De Ven et al. |
| 2008/0094368 A1 | 4/2008 | Ording et al. |
| 2008/0094398 A1 | 4/2008 | Ng et al. |
| 2008/0106523 A1 | 5/2008 | Conrad |
| 2008/0109753 A1 | 5/2008 | Karstens |
| 2008/0136790 A1 | 6/2008 | Hio |
| 2008/0155415 A1 | 6/2008 | Yoon et al. |
| 2008/0163119 A1 | 7/2008 | Kim et al. |
| 2008/0165144 A1 | 7/2008 | Forstall et al. |
| 2008/0165152 A1 | 7/2008 | Forstall et al. |
| 2008/0168379 A1 | 7/2008 | Forstall et al. |
| 2008/0168395 A1 | 7/2008 | Ording et al. |
| 2008/0168401 A1 | 7/2008 | Boule et al. |
| 2008/0168403 A1 | 7/2008 | Westerman |
| 2008/0168404 A1 | 7/2008 | Ording |
| 2008/0202824 A1 | 8/2008 | Philipp et al. |
| 2008/0204424 A1 | 8/2008 | Jin et al. |
| 2008/0204427 A1 | 8/2008 | Heesemans et al. |
| 2008/0211959 A1 | 9/2008 | Balram et al. |
| 2008/0219493 A1 | 9/2008 | Tadmor |
| 2008/0222545 A1 | 9/2008 | Lemay et al. |
| 2008/0222569 A1 | 9/2008 | Champion et al. |
| 2008/0244448 A1 | 10/2008 | Goering et al. |
| 2008/0259046 A1 | 10/2008 | Carsanaro |
| 2008/0263452 A1 | 10/2008 | Tomkins |
| 2008/0270910 A1 | 10/2008 | Lukasik et al. |
| 2008/0284866 A1 | 11/2008 | Mizutani |
| 2008/0294984 A1 | 11/2008 | Ramsay et al. |
| 2008/0297475 A1 | 12/2008 | Woolf et al. |
| 2008/0303799 A1 | 12/2008 | Schwesig et al. |
| 2008/0307335 A1 | 12/2008 | Chaudhri et al. |
| 2008/0307351 A1 | 12/2008 | Louch et al. |
| 2008/0307359 A1 | 12/2008 | Louch et al. |
| 2008/0307360 A1 | 12/2008 | Chaudhri et al. |
| 2008/0316183 A1 | 12/2008 | Westerman et al. |
| 2008/0317378 A1 | 12/2008 | Steinberg et al. |
| 2008/0320391 A1 | 12/2008 | Lemay et al. |
| 2008/0320419 A1 | 12/2008 | Matas et al. |
| 2009/0002392 A1 | 1/2009 | Hou et al. |
| 2009/0007017 A1 | 1/2009 | Anzures et al. |
| 2009/0036108 A1 | 2/2009 | Chou |
| 2009/0037846 A1 | 2/2009 | Spalink et al. |
| 2009/0046110 A1 | 2/2009 | Sadler et al. |
| 2009/0051667 A1 | 2/2009 | Park et al. |
| 2009/0058828 A1 | 3/2009 | Jiang et al. |
| 2009/0061837 A1 | 3/2009 | Chaudhri et al. |
| 2009/0066668 A1 | 3/2009 | Kim et al. |
| 2009/0073118 A1 | 3/2009 | Yamaji et al. |
| 2009/0083665 A1 | 3/2009 | Anttila et al. |
| 2009/0085878 A1 | 4/2009 | Heubel et al. |
| 2009/0085881 A1 | 4/2009 | Keam |
| 2009/0085886 A1 | 4/2009 | Huang et al. |
| 2009/0089293 A1 | 4/2009 | Garritano et al. |
| 2009/0094562 A1 | 4/2009 | Jeong et al. |
| 2009/0100343 A1 | 4/2009 | Lee et al. |
| 2009/0102804 A1 | 4/2009 | Wong et al. |
| 2009/0102805 A1 | 4/2009 | Meijer et al. |
| 2009/0140985 A1 | 6/2009 | Liu |
| 2009/0158198 A1 | 6/2009 | Hayter et al. |
| 2009/0160793 A1 | 6/2009 | Rekimoto |
| 2009/0160814 A1 | 6/2009 | Li et al. |
| 2009/0167507 A1 | 7/2009 | Maenpaa |
| 2009/0167508 A1 | 7/2009 | Fadell et al. |
| 2009/0167509 A1 | 7/2009 | Fadell et al. |
| 2009/0167704 A1 | 7/2009 | Terlizzi et al. |
| 2009/0167728 A1 | 7/2009 | Geaghan et al. |
| 2009/0169061 A1 | 7/2009 | Anderson et al. |
| 2009/0187824 A1 | 7/2009 | Hinckley et al. |
| 2009/0197635 A1 | 8/2009 | Kim et al. |
| 2009/0198767 A1 | 8/2009 | Jakobson et al. |
| 2009/0219294 A1 | 9/2009 | Young et al. |
| 2009/0225037 A1 | 9/2009 | Williamson et al. |
| 2009/0228842 A1 | 9/2009 | Westerman et al. |
| 2009/0237374 A1 | 9/2009 | Li et al. |
| 2009/0247112 A1 | 10/2009 | Lundy et al. |
| 2009/0247230 A1 | 10/2009 | Lundy et al. |
| 2009/0256947 A1 | 10/2009 | Ciurea et al. |
| 2009/0259975 A1 | 10/2009 | Asai et al. |
| 2009/0267906 A1 | 10/2009 | Schroderus |
| 2009/0276730 A1 | 11/2009 | Aybes et al. |
| 2009/0280860 A1 | 11/2009 | Dahlke |
| 2009/0282360 A1 | 11/2009 | Park et al. |
| 2009/0288032 A1 | 11/2009 | Chang et al. |
| 2009/0293007 A1 | 11/2009 | Duarte et al. |
| 2009/0293009 A1 | 11/2009 | Meserth et al. |
| 2009/0303187 A1 | 12/2009 | Pallakoff |
| 2009/0307633 A1 | 12/2009 | Haughay, Jr. et al. |
| 2009/0322893 A1 | 12/2009 | Stallings et al. |
| 2010/0007926 A1 | 1/2010 | Imaizumi et al. |
| 2010/0011304 A1 | 1/2010 | Van Os |
| 2010/0013613 A1 | 1/2010 | Weston |
| 2010/0013777 A1 | 1/2010 | Baudisch et al. |
| 2010/0017710 A1 | 1/2010 | Kim et al. |
| 2010/0023858 A1 | 1/2010 | Ryu et al. |
| 2010/0026640 A1 | 2/2010 | Kim et al. |
| 2010/0026647 A1 | 2/2010 | Abe et al. |
| 2010/0039446 A1 | 2/2010 | Hillis et al. |
| 2010/0044121 A1 | 2/2010 | Simon et al. |
| 2010/0057235 A1 | 3/2010 | Wang et al. |
| 2010/0058231 A1 | 3/2010 | Duarte et al. |
| 2010/0070908 A1 | 3/2010 | Mori et al. |
| 2010/0073329 A1 | 3/2010 | Raman et al. |
| 2010/0083116 A1 | 4/2010 | Akifusa et al. |
| 2010/0085302 A1 | 4/2010 | Fairweather et al. |
| 2010/0085314 A1 | 4/2010 | Kwok |
| 2010/0085317 A1 | 4/2010 | Park et al. |
| 2010/0088596 A1 | 4/2010 | Griffin et al. |
| 2010/0088628 A1 | 4/2010 | Flygh et al. |
| 2010/0088639 A1 | 4/2010 | Yach et al. |
| 2010/0090988 A1 | 4/2010 | Park |
| 2010/0110082 A1 | 5/2010 | Myrick et al. |
| 2010/0111434 A1 | 5/2010 | Madden |
| 2010/0125816 A1 | 5/2010 | Bezos |
| 2010/0127983 A1 | 5/2010 | Irani et al. |
| 2010/0128002 A1 | 5/2010 | Stacy et al. |
| 2010/0138776 A1 | 6/2010 | Korhonen |
| 2010/0148999 A1 | 6/2010 | Casparian et al. |
| 2010/0149096 A1 | 6/2010 | Migos et al. |
| 2010/0153879 A1 | 6/2010 | Rimas-Ribikauskas et al. |
| 2010/0156812 A1 | 6/2010 | Stallings et al. |
| 2010/0156813 A1 | 6/2010 | Duarte et al. |
| 2010/0156818 A1 | 6/2010 | Burrough et al. |
| 2010/0156823 A1 | 6/2010 | Paleczny et al. |
| 2010/0156825 A1 | 6/2010 | Sohn et al. |
| 2010/0171713 A1 | 7/2010 | Kwok et al. |
| 2010/0175023 A1 | 7/2010 | Gatlin et al. |
| 2010/0180225 A1 | 7/2010 | Chiba et al. |
| 2010/0194693 A1 | 8/2010 | Selin et al. |
| 2010/0199227 A1 | 8/2010 | Xiao et al. |
| 2010/0211872 A1 | 8/2010 | Rolston et al. |
| 2010/0214239 A1 | 8/2010 | Wu |
| 2010/0214257 A1 | 8/2010 | Wussler et al. |
| 2010/0225604 A1 | 9/2010 | Homma et al. |
| 2010/0228644 A1 | 9/2010 | Schluetter |
| 2010/0231534 A1 | 9/2010 | Chaudhri et al. |
| 2010/0235726 A1 | 9/2010 | Ording et al. |
| 2010/0235735 A1 | 9/2010 | Ording et al. |
| 2010/0235746 A1 | 9/2010 | Anzures |
| 2010/0251168 A1 | 9/2010 | Fujita et al. |
| 2010/0269039 A1 | 10/2010 | Pahlavan et al. |
| 2010/0271312 A1 | 10/2010 | Alameh et al. |
| 2010/0271500 A1 | 10/2010 | Park et al. |
| 2010/0277419 A1 | 11/2010 | Ganey et al. |
| 2010/0277496 A1 | 11/2010 | Kawanishi et al. |
| 2010/0281379 A1 | 11/2010 | Meaney et al. |
| 2010/0281385 A1 | 11/2010 | Meaney et al. |
| 2010/0289807 A1 | 11/2010 | Yu et al. |
| 2010/0299597 A1 | 11/2010 | Shin et al. |
| 2010/0302177 A1 | 12/2010 | Kim et al. |
| 2010/0302179 A1 | 12/2010 | Ahn et al. |
| 2010/0306702 A1 | 12/2010 | Warner |
| 2010/0308983 A1 | 12/2010 | Conte et al. |
| 2010/0309147 A1 | 12/2010 | Fleizach et al. |
| 2010/0313124 A1 | 12/2010 | Privault et al. |

(56) References Cited

U.S. PATENT DOCUMENTS

| | | |
|---|---|---|
| 2010/0313156 A1 | 12/2010 | Louch et al. |
| 2010/0313158 A1 | 12/2010 | Lee et al. |
| 2010/0313166 A1 | 12/2010 | Nakayama et al. |
| 2010/0315417 A1 | 12/2010 | Cho et al. |
| 2010/0315438 A1 | 12/2010 | Horodezky et al. |
| 2010/0321301 A1 | 12/2010 | Casparian et al. |
| 2010/0325578 A1 | 12/2010 | Mital et al. |
| 2011/0010626 A1 | 1/2011 | Fino et al. |
| 2011/0018695 A1 | 1/2011 | Bells et al. |
| 2011/0035145 A1 | 2/2011 | Yamasaki |
| 2011/0035662 A1 | 2/2011 | King et al. |
| 2011/0043652 A1 | 2/2011 | King et al. |
| 2011/0050576 A1 | 3/2011 | Forutanpour et al. |
| 2011/0050588 A1 | 3/2011 | Li et al. |
| 2011/0050591 A1 | 3/2011 | Kim et al. |
| 2011/0050594 A1 | 3/2011 | Kim et al. |
| 2011/0050629 A1 | 3/2011 | Homma et al. |
| 2011/0050630 A1 | 3/2011 | Ikeda |
| 2011/0050653 A1 | 3/2011 | Miyazawa et al. |
| 2011/0054837 A1 | 3/2011 | Ikeda |
| 2011/0055135 A1 | 3/2011 | Dawson et al. |
| 2011/0055741 A1 | 3/2011 | Jeon et al. |
| 2011/0057886 A1 | 3/2011 | Ng et al. |
| 2011/0057903 A1 | 3/2011 | Yamano et al. |
| 2011/0061029 A1 | 3/2011 | Yeh et al. |
| 2011/0063248 A1 | 3/2011 | Yoon |
| 2011/0069012 A1 | 3/2011 | Martensson |
| 2011/0069016 A1 | 3/2011 | Victor |
| 2011/0074697 A1 | 3/2011 | Rapp et al. |
| 2011/0080350 A1 | 4/2011 | Almalki et al. |
| 2011/0084910 A1 | 4/2011 | Almalki et al. |
| 2011/0087982 A1 | 4/2011 | McCann et al. |
| 2011/0087983 A1 | 4/2011 | Shim |
| 2011/0093815 A1 | 4/2011 | Gobeil |
| 2011/0093817 A1 | 4/2011 | Song et al. |
| 2011/0096174 A1 | 4/2011 | King et al. |
| 2011/0107272 A1 | 5/2011 | Aquilar |
| 2011/0115721 A1 | 5/2011 | Li et al. |
| 2011/0116716 A1 | 5/2011 | Kwon et al. |
| 2011/0122087 A1 | 5/2011 | Jang et al. |
| 2011/0126139 A1 | 5/2011 | Jeong et al. |
| 2011/0138295 A1 | 6/2011 | Momchilov et al. |
| 2011/0141031 A1 | 6/2011 | McCullough et al. |
| 2011/0141052 A1 | 6/2011 | Bernstein et al. |
| 2011/0144777 A1 | 6/2011 | Firkins et al. |
| 2011/0145068 A1 | 6/2011 | King et al. |
| 2011/0145752 A1 | 6/2011 | Fagans |
| 2011/0145753 A1 | 6/2011 | Prakash |
| 2011/0145764 A1 | 6/2011 | Higuchi et al. |
| 2011/0149138 A1 | 6/2011 | Watkins |
| 2011/0163971 A1 | 7/2011 | Wagner et al. |
| 2011/0164042 A1 | 7/2011 | Chaudhri |
| 2011/0167058 A1 | 7/2011 | Van Os |
| 2011/0167339 A1 | 7/2011 | Lemay |
| 2011/0167369 A1 | 7/2011 | van Os |
| 2011/0167382 A1 | 7/2011 | Van Os |
| 2011/0169765 A1 | 7/2011 | Aono |
| 2011/0175830 A1 | 7/2011 | Miyazawa et al. |
| 2011/0179368 A1 | 7/2011 | King et al. |
| 2011/0179381 A1 | 7/2011 | King |
| 2011/0181538 A1 | 7/2011 | Aono |
| 2011/0185299 A1 | 7/2011 | Hinckley et al. |
| 2011/0185300 A1 | 7/2011 | Hinckley et al. |
| 2011/0185316 A1 | 7/2011 | Reid et al. |
| 2011/0193788 A1 | 8/2011 | King et al. |
| 2011/0193809 A1 | 8/2011 | Walley et al. |
| 2011/0193881 A1 | 8/2011 | Rydenhag |
| 2011/0197160 A1 | 8/2011 | Kim et al. |
| 2011/0201387 A1 | 8/2011 | Paek et al. |
| 2011/0202834 A1 | 8/2011 | Mandryk et al. |
| 2011/0202853 A1 | 8/2011 | Mujkic |
| 2011/0202872 A1 | 8/2011 | Park |
| 2011/0202879 A1 | 8/2011 | Stovicek et al. |
| 2011/0205163 A1 | 8/2011 | Hinckley et al. |
| 2011/0209088 A1 | 8/2011 | Hinckley et al. |
| 2011/0209093 A1 | 8/2011 | Hinckley et al. |
| 2011/0209097 A1 | 8/2011 | Hinckley et al. |
| 2011/0209099 A1 | 8/2011 | Hinckley et al. |
| 2011/0209104 A1 | 8/2011 | Hinckley et al. |
| 2011/0210931 A1 | 9/2011 | Shai |
| 2011/0215914 A1 | 9/2011 | Edwards |
| 2011/0221684 A1 | 9/2011 | Rydenhag |
| 2011/0221776 A1 | 9/2011 | Shimotani et al. |
| 2011/0231789 A1 | 9/2011 | Bukurak et al. |
| 2011/0238690 A1 | 9/2011 | Arrasvouri et al. |
| 2011/0239110 A1 | 9/2011 | Garrett et al. |
| 2011/0242029 A1 | 10/2011 | Kasahara et al. |
| 2011/0246877 A1 | 10/2011 | Kwak et al. |
| 2011/0248916 A1 | 10/2011 | Griffin et al. |
| 2011/0248948 A1 | 10/2011 | Griffin et al. |
| 2011/0252346 A1 | 10/2011 | Chaudhri |
| 2011/0252357 A1 | 10/2011 | Chaudhri |
| 2011/0252362 A1 | 10/2011 | Cho et al. |
| 2011/0252376 A1 | 10/2011 | Chaudhri et al. |
| 2011/0258537 A1 | 10/2011 | Rives et al. |
| 2011/0258582 A1 | 10/2011 | Bang |
| 2011/0263298 A1 | 10/2011 | Park |
| 2011/0267530 A1 | 11/2011 | Chun |
| 2011/0279380 A1 | 11/2011 | Weber et al. |
| 2011/0279381 A1 | 11/2011 | Tong et al. |
| 2011/0279395 A1 | 11/2011 | Kuwabara et al. |
| 2011/0279852 A1 | 11/2011 | Oda et al. |
| 2011/0285656 A1 | 11/2011 | Yaksick et al. |
| 2011/0285659 A1 | 11/2011 | Kuwabara et al. |
| 2011/0291945 A1 | 12/2011 | Ewing, Jr. et al. |
| 2011/0291951 A1 | 12/2011 | Tong |
| 2011/0296333 A1 | 12/2011 | Bateman et al. |
| 2011/0296334 A1 | 12/2011 | Ryu et al. |
| 2011/0296351 A1 | 12/2011 | Ewing, Jr. et al. |
| 2011/0304559 A1 | 12/2011 | Pasquero |
| 2011/0304577 A1 | 12/2011 | Brown et al. |
| 2011/0307778 A1 | 12/2011 | Tsai et al. |
| 2011/0310049 A1 | 12/2011 | Homma et al. |
| 2012/0005622 A1 | 1/2012 | Park et al. |
| 2012/0011437 A1 | 1/2012 | James et al. |
| 2012/0013541 A1 | 1/2012 | Boka et al. |
| 2012/0013542 A1 | 1/2012 | Shenfield |
| 2012/0019448 A1 | 1/2012 | Pitkanen et al. |
| 2012/0026110 A1 | 2/2012 | Yamano |
| 2012/0036441 A1 | 2/2012 | Basir et al. |
| 2012/0036556 A1 | 2/2012 | LeBeau et al. |
| 2012/0038580 A1 | 2/2012 | Sasaki |
| 2012/0044153 A1 | 2/2012 | Arrasvouri et al. |
| 2012/0056837 A1 | 3/2012 | Park et al. |
| 2012/0056848 A1 | 3/2012 | Yamano et al. |
| 2012/0062564 A1 | 3/2012 | Miyashita et al. |
| 2012/0062604 A1 | 3/2012 | Lobo |
| 2012/0062732 A1 | 3/2012 | Marman et al. |
| 2012/0066630 A1 | 3/2012 | Kim et al. |
| 2012/0066648 A1 | 3/2012 | Rolleston et al. |
| 2012/0081375 A1 | 4/2012 | Robert et al. |
| 2012/0084689 A1 | 4/2012 | Ledet et al. |
| 2012/0084713 A1 | 4/2012 | Desai et al. |
| 2012/0089932 A1 | 4/2012 | Kano et al. |
| 2012/0089942 A1 | 4/2012 | Gammon |
| 2012/0089951 A1 | 4/2012 | Cassidy |
| 2012/0092355 A1 | 4/2012 | Yamamoto et al. |
| 2012/0096393 A1 | 4/2012 | Shim et al. |
| 2012/0096400 A1 | 4/2012 | Cho |
| 2012/0098780 A1 | 4/2012 | Fujisawa et al. |
| 2012/0102437 A1 | 4/2012 | Worley et al. |
| 2012/0105358 A1 | 5/2012 | Momeyer et al. |
| 2012/0105367 A1 | 5/2012 | Son et al. |
| 2012/0106852 A1 | 5/2012 | Khawand et al. |
| 2012/0113007 A1 | 5/2012 | Koch et al. |
| 2012/0113023 A1 | 5/2012 | Koch et al. |
| 2012/0126962 A1 | 5/2012 | Ujii et al. |
| 2012/0131495 A1 | 5/2012 | Goossens et al. |
| 2012/0139864 A1 | 6/2012 | Sleeman et al. |
| 2012/0146945 A1 | 6/2012 | Miyazawa et al. |
| 2012/0147052 A1 | 6/2012 | Homma et al. |
| 2012/0154328 A1 | 6/2012 | Kono |
| 2012/0154329 A1 | 6/2012 | Shinozaki |
| 2012/0159380 A1 | 6/2012 | Kocienda et al. |

(56) References Cited

U.S. PATENT DOCUMENTS

| | | |
|---|---|---|
| 2012/0169646 A1 | 7/2012 | Berkes et al. |
| 2012/0169716 A1 | 7/2012 | Mihara |
| 2012/0176403 A1 | 7/2012 | Cha et al. |
| 2012/0179967 A1 | 7/2012 | Hayes |
| 2012/0182226 A1 | 7/2012 | Tuli |
| 2012/0183271 A1 | 7/2012 | Forutanpour et al. |
| 2012/0206393 A1 | 8/2012 | Hillis et al. |
| 2012/0216114 A1 | 8/2012 | Privault et al. |
| 2012/0216139 A1 | 8/2012 | Ording et al. |
| 2012/0216143 A1 | 8/2012 | Shiplacoff et al. |
| 2012/0218203 A1 | 8/2012 | Kanki |
| 2012/0218304 A1 | 8/2012 | Anzures et al. |
| 2012/0235912 A1 | 9/2012 | Laubach |
| 2012/0240044 A1 | 9/2012 | Johnson et al. |
| 2012/0249575 A1 | 10/2012 | Krolczyk et al. |
| 2012/0249853 A1 | 10/2012 | Krolczyk et al. |
| 2012/0256846 A1 | 10/2012 | Mak |
| 2012/0256847 A1 | 10/2012 | Mak et al. |
| 2012/0256857 A1 | 10/2012 | Mak |
| 2012/0257071 A1 | 10/2012 | Prentice |
| 2012/0260220 A1 | 10/2012 | Griffin |
| 2012/0274591 A1 | 11/2012 | Rimas-Ribikauskas et al. |
| 2012/0274662 A1 | 11/2012 | Kim et al. |
| 2012/0284673 A1 | 11/2012 | Lamb et al. |
| 2012/0293449 A1 | 11/2012 | Dietz |
| 2012/0293551 A1 | 11/2012 | Momeyer et al. |
| 2012/0297041 A1 | 11/2012 | Momchilov |
| 2012/0299859 A1 | 11/2012 | Kinoshita |
| 2012/0304108 A1 | 11/2012 | Jarrett et al. |
| 2012/0304132 A1 | 11/2012 | Sareen et al. |
| 2012/0304133 A1 | 11/2012 | Nan et al. |
| 2012/0306748 A1 | 12/2012 | Fleizach et al. |
| 2012/0306764 A1 | 12/2012 | Kamibeppu |
| 2012/0306765 A1 | 12/2012 | Moore |
| 2012/0306766 A1 | 12/2012 | Moore |
| 2012/0306772 A1 | 12/2012 | Tan et al. |
| 2012/0306778 A1 | 12/2012 | Wheeldreyer et al. |
| 2012/0306927 A1 | 12/2012 | Lee et al. |
| 2012/0311429 A1 | 12/2012 | Decker et al. |
| 2012/0311437 A1 | 12/2012 | Weeldreyer et al. |
| 2012/0311498 A1 | 12/2012 | Kluttz et al. |
| 2013/0002561 A1 | 1/2013 | Wakasa |
| 2013/0016042 A1 | 1/2013 | Makinen et al. |
| 2013/0016122 A1 | 1/2013 | Bhatt et al. |
| 2013/0019158 A1 | 1/2013 | Watanabe |
| 2013/0019174 A1 | 1/2013 | Gil et al. |
| 2013/0031514 A1 | 1/2013 | Gabbert |
| 2013/0036386 A1 | 2/2013 | Park et al. |
| 2013/0044062 A1 | 2/2013 | Bose et al. |
| 2013/0047100 A1 | 2/2013 | Kroeger et al. |
| 2013/0050131 A1 | 2/2013 | Lee et al. |
| 2013/0050143 A1 | 2/2013 | Kim et al. |
| 2013/0061172 A1 | 3/2013 | Huang et al. |
| 2013/0063389 A1 | 3/2013 | Moore |
| 2013/0067383 A1 | 3/2013 | Kataoka et al. |
| 2013/0067513 A1 | 3/2013 | Takami |
| 2013/0067527 A1 | 3/2013 | Ashbook et al. |
| 2013/0074003 A1 | 3/2013 | Dolenc |
| 2013/0077804 A1 | 3/2013 | Glebe et al. |
| 2013/0080923 A1 | 3/2013 | Anzures et al. |
| 2013/0082824 A1 | 4/2013 | Colley |
| 2013/0086056 A1 | 4/2013 | Dyor et al. |
| 2013/0093691 A1 | 4/2013 | Moosavi |
| 2013/0093764 A1 | 4/2013 | Andersson et al. |
| 2013/0097520 A1 | 4/2013 | Lewin et al. |
| 2013/0097521 A1 | 4/2013 | Lewin et al. |
| 2013/0097534 A1 | 4/2013 | Lewin et al. |
| 2013/0097539 A1 | 4/2013 | Mansson et al. |
| 2013/0097556 A1 | 4/2013 | Louch |
| 2013/0097564 A1 | 4/2013 | Kermoian et al. |
| 2013/0106766 A1 | 5/2013 | Yilmaz et al. |
| 2013/0111398 A1 | 5/2013 | Lu et al. |
| 2013/0113715 A1 | 5/2013 | Grant et al. |
| 2013/0113720 A1 | 5/2013 | Van Eerd et al. |
| 2013/0120278 A1 | 5/2013 | Cantrell |
| 2013/0120295 A1 | 5/2013 | Kim et al. |
| 2013/0120306 A1 | 5/2013 | Furukawa |
| 2013/0135243 A1 | 5/2013 | Hirsch et al. |
| 2013/0135499 A1 | 5/2013 | Song |
| 2013/0141364 A1 | 6/2013 | Lynn et al. |
| 2013/0141396 A1 | 6/2013 | Lynn et al. |
| 2013/0145313 A1 | 6/2013 | Roh et al. |
| 2013/0154948 A1 | 6/2013 | Schediwy et al. |
| 2013/0154959 A1 | 6/2013 | Lindsay et al. |
| 2013/0155018 A1 | 6/2013 | Dagdeviren |
| 2013/0159893 A1 | 6/2013 | Lewis et al. |
| 2013/0162603 A1 | 6/2013 | Peng et al. |
| 2013/0162667 A1 | 6/2013 | Eskolin et al. |
| 2013/0169549 A1 | 7/2013 | Seymour et al. |
| 2013/0174049 A1 | 7/2013 | Townsend et al. |
| 2013/0174089 A1 | 7/2013 | Ki |
| 2013/0174094 A1 | 7/2013 | Heo et al. |
| 2013/0174179 A1 | 7/2013 | Park et al. |
| 2013/0179840 A1 | 7/2013 | Fisher et al. |
| 2013/0191791 A1 | 7/2013 | Rydenhag et al. |
| 2013/0194217 A1 | 8/2013 | Lee et al. |
| 2013/0198690 A1 | 8/2013 | Barsoum et al. |
| 2013/0212515 A1 | 8/2013 | Eleftheriou |
| 2013/0212541 A1 | 8/2013 | Dolenc et al. |
| 2013/0215079 A1 | 8/2013 | Johnson et al. |
| 2013/0222274 A1 | 8/2013 | Mori et al. |
| 2013/0222671 A1 | 8/2013 | Tseng et al. |
| 2013/0227419 A1 | 8/2013 | Lee et al. |
| 2013/0227450 A1 | 8/2013 | Na et al. |
| 2013/0232402 A1 | 9/2013 | Lu et al. |
| 2013/0232445 A1 | 9/2013 | Ording et al. |
| 2013/0234929 A1 | 9/2013 | Libin |
| 2013/0239057 A1 | 9/2013 | Ubillos et al. |
| 2013/0249814 A1 | 9/2013 | Zeng |
| 2013/0257793 A1 | 10/2013 | Zeliff et al. |
| 2013/0257817 A1 | 10/2013 | Yliaho |
| 2013/0265246 A1 | 10/2013 | Tae |
| 2013/0268875 A1 | 10/2013 | Han et al. |
| 2013/0278520 A1 | 10/2013 | Weng et al. |
| 2013/0305184 A1 | 11/2013 | Kim et al. |
| 2013/0307792 A1 | 11/2013 | Andres et al. |
| 2013/0321340 A1 | 12/2013 | Seo et al. |
| 2013/0321457 A1 | 12/2013 | Bauermeister et al. |
| 2013/0325342 A1 | 12/2013 | Pylappan et al. |
| 2013/0326420 A1 | 12/2013 | Liu et al. |
| 2013/0326421 A1 | 12/2013 | Jo |
| 2013/0328770 A1 | 12/2013 | Parham |
| 2013/0332836 A1 | 12/2013 | Cho |
| 2013/0332892 A1 | 12/2013 | Matsuki |
| 2013/0339909 A1 | 12/2013 | Ha |
| 2014/0002355 A1 | 1/2014 | Lee et al. |
| 2014/0002374 A1 | 1/2014 | Hunt et al. |
| 2014/0002386 A1 | 1/2014 | Rosenberg et al. |
| 2014/0026098 A1 | 1/2014 | Gilman |
| 2014/0028571 A1 | 1/2014 | St. Clair |
| 2014/0028601 A1 | 1/2014 | Moore |
| 2014/0049491 A1 | 2/2014 | Nagar et al. |
| 2014/0055367 A1 | 2/2014 | Dearman et al. |
| 2014/0055377 A1 | 2/2014 | Kim |
| 2014/0059460 A1 | 2/2014 | Ho |
| 2014/0059485 A1 | 2/2014 | Lehrian et al. |
| 2014/0063316 A1 | 3/2014 | Lee et al. |
| 2014/0063541 A1 | 3/2014 | Yamazaki |
| 2014/0072281 A1 | 3/2014 | Cho et al. |
| 2014/0072283 A1 | 3/2014 | Cho et al. |
| 2014/0078318 A1 | 3/2014 | Alameh |
| 2014/0078343 A1 | 3/2014 | Dai et al. |
| 2014/0082536 A1 | 3/2014 | Costa et al. |
| 2014/0092025 A1 | 4/2014 | Pala et al. |
| 2014/0092030 A1 | 4/2014 | Van der Velden |
| 2014/0108936 A1 | 4/2014 | Khosropour et al. |
| 2014/0109016 A1 | 4/2014 | Ouyang et al. |
| 2014/0111456 A1 | 4/2014 | Kashiwa et al. |
| 2014/0111670 A1 | 4/2014 | Lord et al. |
| 2014/0118268 A1 | 5/2014 | Kuscher |
| 2014/0139471 A1 | 5/2014 | Matsuki |
| 2014/0152581 A1 | 6/2014 | Case et al. |
| 2014/0157203 A1 | 6/2014 | Jeon et al. |
| 2014/0160063 A1 | 6/2014 | Yairi et al. |

(56) References Cited

U.S. PATENT DOCUMENTS

| | | |
|---|---|---|
| 2014/0160073 A1 | 6/2014 | Matsuki |
| 2014/0164955 A1 | 6/2014 | Thiruvidam et al. |
| 2014/0164966 A1 | 6/2014 | Kim et al. |
| 2014/0165006 A1 | 6/2014 | Chaudhri et al. |
| 2014/0168093 A1 | 6/2014 | Lawrence |
| 2014/0168153 A1 | 6/2014 | Deichmann et al. |
| 2014/0173517 A1 | 6/2014 | Chaudhri |
| 2014/0184526 A1 | 7/2014 | Cho |
| 2014/0201660 A1 | 7/2014 | Clausen et al. |
| 2014/0208271 A1 | 7/2014 | Bell et al. |
| 2014/0210753 A1 | 7/2014 | Lee et al. |
| 2014/0210758 A1 | 7/2014 | Park et al. |
| 2014/0210760 A1 | 7/2014 | Aberg et al. |
| 2014/0210798 A1* | 7/2014 | Wilson .................. G06F 3/0414 345/179 |
| 2014/0229888 A1 | 8/2014 | Ko et al. |
| 2014/0237408 A1 | 8/2014 | Ohlsson et al. |
| 2014/0245202 A1 | 8/2014 | Yoon et al. |
| 2014/0245367 A1 | 8/2014 | Sasaki et al. |
| 2014/0267114 A1 | 9/2014 | Lisseman et al. |
| 2014/0267135 A1 | 9/2014 | Chhabra |
| 2014/0267362 A1 | 9/2014 | Kocienda et al. |
| 2014/0282084 A1 | 9/2014 | Murarka et al. |
| 2014/0282214 A1 | 9/2014 | Shirzadi et al. |
| 2014/0300569 A1 | 10/2014 | Matsuki et al. |
| 2014/0304651 A1 | 10/2014 | Johansson et al. |
| 2014/0306897 A1 | 10/2014 | Cueto |
| 2014/0306899 A1 | 10/2014 | Hicks |
| 2014/0310638 A1 | 10/2014 | Lee et al. |
| 2014/0313130 A1 | 10/2014 | Yamano et al. |
| 2014/0333551 A1 | 11/2014 | Kim et al. |
| 2014/0333561 A1 | 11/2014 | Bull et al. |
| 2014/0344765 A1 | 11/2014 | Hicks et al. |
| 2014/0354845 A1 | 12/2014 | Molgaard et al. |
| 2014/0354850 A1 | 12/2014 | Kosaka et al. |
| 2014/0359438 A1 | 12/2014 | Matsuki |
| 2014/0359528 A1 | 12/2014 | Murata |
| 2014/0380247 A1 | 12/2014 | Tecarro et al. |
| 2015/0015763 A1 | 1/2015 | Lee et al. |
| 2015/0020036 A1 | 1/2015 | Kim et al. |
| 2015/0026584 A1 | 1/2015 | Kobayakov et al. |
| 2015/0026592 A1 | 1/2015 | Mohammed et al. |
| 2015/0029149 A1 | 1/2015 | Andersson et al. |
| 2015/0033184 A1 | 1/2015 | Kim et al. |
| 2015/0042588 A1 | 2/2015 | Park |
| 2015/0046876 A1 | 2/2015 | Goldenberg |
| 2015/0049033 A1 | 2/2015 | Kim et al. |
| 2015/0058723 A1 | 2/2015 | Cieplinski et al. |
| 2015/0062046 A1 | 3/2015 | Cho et al. |
| 2015/0062052 A1 | 3/2015 | Bernstein et al. |
| 2015/0062068 A1 | 3/2015 | Shih et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067513 A1 | 3/2015 | Zambetti et al. |
| 2015/0067519 A1 | 3/2015 | Missig et al. |
| 2015/0067534 A1 | 3/2015 | Choi et al. |
| 2015/0067559 A1 | 3/2015 | Missig et al. |
| 2015/0067560 A1 | 3/2015 | Cieplinski et al. |
| 2015/0067596 A1 | 3/2015 | Brown et al. |
| 2015/0067601 A1 | 3/2015 | Bernstein et al. |
| 2015/0067602 A1 | 3/2015 | Bernstein et al. |
| 2015/0067605 A1 | 3/2015 | Zambetti et al. |
| 2015/0071547 A1 | 3/2015 | Keating et al. |
| 2015/0116205 A1 | 4/2015 | Westerman et al. |
| 2015/0121218 A1 | 4/2015 | Kim et al. |
| 2015/0121225 A1 | 4/2015 | Somasundaram et al. |
| 2015/0067563 A1 | 5/2015 | Bernstein et al. |
| 2015/0128092 A1 | 5/2015 | Lee et al. |
| 2015/0135109 A1 | 5/2015 | Zambetti et al. |
| 2015/0138126 A1 | 5/2015 | Westerman |
| 2015/0138155 A1 | 5/2015 | Bernstein et al. |
| 2015/0139605 A1 | 5/2015 | Wiklof |
| 2015/0143273 A1 | 5/2015 | Bernstein et al. |
| 2015/0143284 A1 | 5/2015 | Bennett et al. |
| 2015/0149899 A1 | 5/2015 | Bernstein et al. |
| 2015/0149964 A1 | 5/2015 | Bernstein et al. |
| 2015/0149967 A1 | 5/2015 | Bernstein et al. |
| 2015/0153897 A1 | 6/2015 | Huang et al. |
| 2015/0153929 A1 | 6/2015 | Bernstein et al. |
| 2015/0160729 A1 | 6/2015 | Nakagawa |
| 2015/0185840 A1 | 7/2015 | Golyshko et al. |
| 2015/0193099 A1 | 7/2015 | Murphy |
| 2015/0193951 A1 | 7/2015 | Lee et al. |
| 2015/0205495 A1 | 7/2015 | Koide et al. |
| 2015/0234446 A1 | 8/2015 | Nathan et al. |
| 2015/0234493 A1 | 8/2015 | Parivar et al. |
| 2015/0253866 A1 | 9/2015 | Amm et al. |
| 2015/0268786 A1 | 9/2015 | Kitada |
| 2015/0268813 A1 | 9/2015 | Bos |
| 2015/0321607 A1 | 11/2015 | Cho et al. |
| 2015/0332107 A1 | 11/2015 | Paniaras |
| 2015/0378519 A1 | 11/2015 | Brown et al. |
| 2015/0378982 A1 | 12/2015 | McKenzie et al. |
| 2015/0381931 A1 | 12/2015 | Uhma et al. |
| 2016/0004393 A1 | 1/2016 | Faaborg et al. |
| 2016/0004427 A1 | 1/2016 | Zambetti et al. |
| 2016/0004428 A1 | 1/2016 | Bernstein et al. |
| 2016/0004429 A1 | 1/2016 | Bernstein et al. |
| 2016/0004430 A1 | 1/2016 | Missig et al. |
| 2016/0004431 A1 | 1/2016 | Bernstein et al. |
| 2016/0004432 A1 | 1/2016 | Bernstein et al. |
| 2016/0011771 A1 | 1/2016 | Cieplinski |
| 2016/0019718 A1 | 1/2016 | Mukkamala et al. |
| 2016/0021511 A1 | 1/2016 | Jin et al. |
| 2016/0041750 A1 | 2/2016 | Cieplinski et al. |
| 2016/0048326 A1 | 2/2016 | Kim et al. |
| 2016/0062466 A1 | 3/2016 | Moussette et al. |
| 2016/0062619 A1 | 3/2016 | Reeve et al. |
| 2016/0070401 A1 | 3/2016 | Kim et al. |
| 2016/0132139 A1 | 5/2016 | Du et al. |
| 2016/0188181 A1 | 6/2016 | Smith |
| 2016/0196028 A1 | 7/2016 | Kenney et al. |
| 2016/0210025 A1 | 7/2016 | Bernstein et al. |
| 2016/0224220 A1 | 8/2016 | Ganguly |
| 2016/0259412 A1 | 9/2016 | Flint et al. |
| 2016/0259413 A1 | 9/2016 | Anzures et al. |
| 2016/0259495 A1 | 9/2016 | Butcher et al. |
| 2016/0259496 A1 | 9/2016 | Butcher et al. |
| 2016/0259497 A1 | 9/2016 | Foss et al. |
| 2016/0259498 A1 | 9/2016 | Foss et al. |
| 2016/0259499 A1 | 9/2016 | Kocienda et al. |
| 2016/0259516 A1 | 9/2016 | Kudurshian et al. |
| 2016/0259517 A1 | 9/2016 | Butcher et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0259536 A1 | 9/2016 | Kudurshian et al. |
| 2016/0259548 A1 | 9/2016 | Ma |
| 2016/0274686 A1 | 9/2016 | Ruiz et al. |
| 2016/0274728 A1 | 9/2016 | Luo et al. |
| 2016/0274761 A1 | 9/2016 | Ruiz et al. |
| 2016/0283054 A1 | 9/2016 | Suzuki |
| 2016/0320906 A1 | 11/2016 | Bokma et al. |
| 2016/0334960 A1 | 11/2016 | Brown et al. |
| 2016/0357305 A1 | 12/2016 | Wells et al. |
| 2016/0357368 A1 | 12/2016 | Federighi et al. |
| 2016/0357389 A1 | 12/2016 | Dakin et al. |
| 2016/0357390 A1 | 12/2016 | Federighi et al. |
| 2016/0357404 A1 | 12/2016 | Alonso Ruiz et al. |
| 2016/0360116 A1 | 12/2016 | Penha et al. |
| 2017/0046059 A1 | 2/2017 | Karunamuni et al. |
| 2017/0075520 A1 | 3/2017 | Bauer et al. |
| 2017/0075562 A1 | 3/2017 | Bauer et al. |
| 2017/0075563 A1 | 3/2017 | Bauer et al. |
| 2017/0109011 A1 | 4/2017 | Jiang |
| 2017/0139565 A1 | 5/2017 | Choi |

FOREIGN PATENT DOCUMENTS

| | | |
|---|---|---|
| CN | 1661556 | 8/2005 |
| CN | 1808362 A | 7/2006 |
| CN | 1955906 | 5/2007 |

(56) References Cited

FOREIGN PATENT DOCUMENTS

| | | |
|---|---|---|
| CN | 101102573 | 1/2008 |
| CN | 101118469 A | 2/2008 |
| CN | 101202866 A | 6/2008 |
| CN | 101222704 A | 7/2008 |
| CN | 201107762 | 8/2008 |
| CN | 101320303 A | 12/2008 |
| CN | 100524183 | 8/2009 |
| CN | 101593077 A | 12/2009 |
| CN | 101727268 | 6/2010 |
| CN | 101809526 A | 8/2010 |
| CN | 102004593 A | 4/2011 |
| CN | 102037435 | 4/2011 |
| CN | 102099776 | 6/2011 |
| CN | 102112946 A | 6/2011 |
| CN | 102160021 A | 8/2011 |
| CN | 102349038 A | 2/2012 |
| CN | 102385478 A | 3/2012 |
| CN | 102438092 A | 5/2012 |
| CN | 102483677 A | 5/2012 |
| CN | 102646013 A | 8/2012 |
| CN | 102662573 A | 9/2012 |
| CN | 102841677 A | 12/2012 |
| CN | 103097992 A | 5/2013 |
| DE | 100 59 906 A1 | 6/2002 |
| DE | 21 2009 000 073 | 2/2011 |
| DE | 20 2009 018 283 | 8/2011 |
| DE | 11 2009 001 276 | 1/2012 |
| DE | 11 2009 001 281 | 1/2012 |
| EP | 0 388 162 A2 | 3/1990 |
| EP | 0 859 307 A1 | 3/1998 |
| EP | 0 880 090 A2 | 11/1998 |
| EP | 1 028 583 A1 | 8/2000 |
| EP | 1 067 471 A1 | 1/2001 |
| EP | 1406150 A1 | 4/2004 |
| EP | 1 571 549 A2 | 2/2005 |
| EP | 1 562 105 A2 | 8/2005 |
| EP | 1 568 966 A2 | 8/2005 |
| EP | 1 640 855 A2 | 3/2006 |
| EP | 1 674 977 A2 | 6/2006 |
| EP | 1 882 902 A1 | 1/2008 |
| EP | 2 000 896 A2 | 12/2008 |
| EP | 2 017 701 A1 | 1/2009 |
| EP | 2 028 583 A2 | 2/2009 |
| EP | 2 141 574 A2 | 1/2010 |
| EP | 2 175 357 A1 | 4/2010 |
| EP | 2 196 893 A2 | 6/2010 |
| EP | 2 214 087 A1 | 8/2010 |
| EP | 2 226 715 A2 | 9/2010 |
| EP | 2 286 324 | 2/2011 |
| EP | 2 286 325 | 2/2011 |
| EP | 2 299 351 A2 | 3/2011 |
| EP | 2 302 496 A1 | 3/2011 |
| EP | 2 375 309 A1 | 10/2011 |
| EP | 2 375 314 A1 | 10/2011 |
| EP | 2 386 935 A1 | 11/2011 |
| EP | 2 407 868 A1 | 1/2012 |
| EP | 2 420 924 A2 | 2/2012 |
| EP | 2 426 580 A2 | 3/2012 |
| EP | 2 447 818 A1 | 5/2012 |
| EP | 2 527 966 A2 | 11/2012 |
| EP | 2 530 677 A2 | 12/2012 |
| EP | 2 541 376 A1 | 1/2013 |
| EP | 2 555 500 A1 | 2/2013 |
| EP | 2 568 359 A2 | 3/2013 |
| EP | 2 615 535 A1 | 7/2013 |
| EP | 2 631 737 A1 | 8/2013 |
| EP | 2 674 846 A2 | 12/2013 |
| EP | 2 733 578 A2 | 5/2014 |
| EP | 2 808 764 A1 | 12/2014 |
| EP | 2 809 058 A1 | 12/2014 |
| EP | 2 813 938 A1 | 12/2014 |
| GB | H09-330175 A | 12/1997 |
| GB | 2 350 991 | 12/2000 |
| GB | 2 366 630 A | 3/2002 |
| GB | 2 402 105 A | 12/2004 |
| GB | 2 492 709 A | 11/2009 |
| GB | 2 473 389 | 3/2011 |
| GB | 2 474 153 A | 4/2011 |
| JP | 58-182746 | 10/1983 |
| JP | H06-161647 A | 6/1994 |
| JP | H07-98769 A | 4/1995 |
| JP | H07-151512 A | 6/1995 |
| JP | H08-227341 A | 9/1996 |
| JP | H09-269883 A | 10/1997 |
| JP | H11-203044 A | 7/1999 |
| JP | 2000-148348 A | 5/2000 |
| JP | 2001-202192 A | 7/2001 |
| JP | 2002-041023 A | 2/2002 |
| JP | 2002-149312 A | 5/2002 |
| JP | 2002-268867 A | 9/2002 |
| JP | 2002-286489 | 10/2002 |
| JP | 2003-084744 A | 3/2003 |
| JP | 2003-157131 A | 5/2003 |
| JP | 2003-186597 A | 7/2003 |
| JP | 2004-054861 A | 2/2004 |
| JP | 2004-062648 A | 2/2004 |
| JP | 2004-070492 A | 3/2004 |
| JP | 2004-086733 A | 3/2004 |
| JP | 2004-152169 A | 5/2004 |
| JP | 2005-031786 A | 2/2005 |
| JP | 2005-070777 A | 3/2005 |
| JP | 2005-092386 A | 4/2005 |
| JP | 2005-135106 A | 5/2005 |
| JP | 2005-157842 A | 6/2005 |
| JP | 2005-196810 A | 7/2005 |
| JP | 2005-222553 A | 8/2005 |
| JP | 2005-309933 A | 11/2005 |
| JP | 2006-185443 A | 7/2006 |
| JP | 2007-116384 A | 5/2007 |
| JP | 2007-517462 A | 6/2007 |
| JP | 2007-264808 A | 10/2007 |
| JP | 2008-009759 A | 1/2008 |
| JP | 2008-015890 A | 1/2008 |
| JP | 2008-017373 A | 1/2008 |
| JP | 2008-033739 A | 2/2008 |
| JP | 2008-076818 A | 4/2008 |
| JP | 2008-076853 A | 4/2008 |
| JP | 2008-516348 A | 5/2008 |
| JP | 2008-146453 A | 6/2008 |
| JP | 2008-537615 | 9/2008 |
| JP | 2008 305174 A | 12/2008 |
| JP | 2009-500761 | 1/2009 |
| JP | 2009-211704 A | 9/2009 |
| JP | 2009-217543 A | 9/2009 |
| JP | 2009-217815 A | 9/2009 |
| JP | 2010-009321 A | 1/2010 |
| JP | 2010-503130 A | 1/2010 |
| JP | 2010-055274 A | 3/2010 |
| JP | 2010-097353 A | 4/2010 |
| JP | 2010-146507 A | 7/2010 |
| JP | 2010-152716 A | 7/2010 |
| JP | 2010-176174 A | 8/2010 |
| JP | 2010-176337 A | 8/2010 |
| JP | 2010-181934 A | 8/2010 |
| JP | 2010-541071 A | 12/2010 |
| JP | 2011-501307 A | 1/2011 |
| JP | 2011-048666 A | 3/2011 |
| JP | 2011-048686 A | 3/2011 |
| JP | 2011-048762 A | 3/2011 |
| JP | 2011-048832 A | 3/2011 |
| JP | 2011-053831 A | 3/2011 |
| JP | 2011-053972 A | 3/2011 |
| JP | 2011-053973 A | 3/2011 |
| JP | 2011-053974 A | 3/2011 |
| JP | 2011-059821 A | 3/2011 |
| JP | 2011-070342 A | 4/2011 |
| JP | 2011-100290 A | 5/2011 |
| JP | 2011-107823 A | 6/2011 |
| JP | 2011-123773 A | 6/2011 |
| JP | 2011-141868 A | 7/2011 |
| JP | 2011 192179 A | 9/2011 |
| JP | 2011-192215 A | 9/2011 |
| JP | 2011-242386 A | 12/2011 |
| JP | 2011-253556 A | 12/2011 |

(56) References Cited

FOREIGN PATENT DOCUMENTS

| | | |
|---|---|---|
| JP | 2011-257941 A | 12/2011 |
| JP | 2011-530101 A | 12/2011 |
| JP | 2012-027940 A | 2/2012 |
| JP | 2012-043266 A | 3/2012 |
| JP | 2012-043267 A | 3/2012 |
| JP | 2012-053754 | 3/2012 |
| JP | 2012-053926 A | 3/2012 |
| JP | 2012-073873 A | 4/2012 |
| JP | 2012-509605 A | 4/2012 |
| JP | 2012-093820 A | 5/2012 |
| JP | 2012-123564 A | 6/2012 |
| JP | 2012-128825 A | 7/2012 |
| JP | 2013-030050 A | 2/2013 |
| JP | 2013-058149 A | 3/2013 |
| JP | 2013-080521 A | 5/2013 |
| JP | 2013-529339 A | 7/2013 |
| JP | 2013-542488 A | 11/2013 |
| JP | 2014-130567 A | 7/2014 |
| JP | 2014-140112 A | 7/2014 |
| JP | 2014-519109 A | 8/2014 |
| JP | 2015-153420 A | 8/2015 |
| KR | 2006-0071353 A | 6/2006 |
| KR | 2008-0045143 A | 4/2008 |
| KR | 2008-0054346 A | 6/2008 |
| KR | 2008-0078108 A | 8/2008 |
| KR | 2010-0010302 | 2/2010 |
| KR | 2010-0023637 | 3/2010 |
| KR | 2010-0034608 | 4/2010 |
| KR | 2010 0046087 | 6/2010 |
| KR | 2010 0133246 A | 12/2010 |
| KR | 2011 0086501 A | 7/2011 |
| KR | 2013 0099647 A | 9/2013 |
| KR | 2014 0016495 A | 2/2014 |
| KR | 2014 0043760 A | 4/2014 |
| KR | 2014 0079110 A | 6/2014 |
| KR | 20150021977 A | 3/2015 |
| WO | WO 90/10910 A1 | 9/1990 |
| WO | WO 90/11571 A1 | 10/1990 |
| WO | WO 91/14231 A1 | 9/1991 |
| WO | WO 95/26005 A1 | 9/1995 |
| WO | WO 98/49639 A1 | 11/1998 |
| WO | WO 99/19821 A1 | 4/1999 |
| WO | WO 99/30259 A1 | 6/1999 |
| WO | WO 99/53424 A1 | 10/1999 |
| WO | WO 00/11587 A1 | 3/2000 |
| WO | WO 00/50974 A2 | 8/2000 |
| WO | WO 00/52619 A1 | 9/2000 |
| WO | WO 00/62187 A2 | 10/2000 |
| WO | WO 00/65510 A1 | 11/2000 |
| WO | WO 01/16830 A1 | 3/2001 |
| WO | WO 01/16852 A2 | 3/2001 |
| WO | WO 01/22263 A2 | 3/2001 |
| WO | WO 01/22315 A2 | 3/2001 |
| WO | WO 01/88808 A1 | 11/2001 |
| WO | WO 00/62187 A3 | 12/2001 |
| WO | WO 01/22263 A3 | 1/2002 |
| WO | WO 01/22315 A3 | 1/2002 |
| WO | WO 02/07032 A1 | 1/2002 |
| WO | WO 02/15461 A2 | 2/2002 |
| WO | WO 01/16852 A8 | 6/2002 |
| WO | WO 2005/106637 A2 | 11/2005 |
| WO | WO 2006/013485 A2 | 2/2006 |
| WO | WO 2006/073020 A1 | 7/2006 |
| WO | WO 2007/121557 A1 | 11/2007 |
| WO | WO 2008/030976 A2 | 3/2008 |
| WO | WO 2006/043209 A1 | 4/2008 |
| WO | WO 2008/064142 A2 | 5/2008 |
| WO | WO 2009/059062 A2 | 5/2009 |
| WO | WO 2009/143075 A2 | 11/2009 |
| WO | WO 2009/143076 A2 | 11/2009 |
| WO | WO 2009/143294 A2 | 11/2009 |
| WO | WO 2009/148781 A2 | 12/2009 |
| WO | WO 2009/155981 A1 | 12/2009 |
| WO | WO 2009/158549 A2 | 12/2009 |
| WO | WO 2010/013876 A1 | 2/2010 |
| WO | WO 2010/090010 A1 | 8/2010 |
| WO | WO 2010/122813 A1 | 10/2010 |
| WO | WO 2011/024389 A1 | 3/2011 |
| WO | WO 2011/024465 A1 | 3/2011 |
| WO | WO 2011/093045 A1 | 8/2011 |
| WO | WO 2011/105009 A1 | 9/2011 |
| WO | WO 2011/108190 A1 | 9/2011 |
| WO | WO 2011/114630 A1 | 9/2011 |
| WO | WO 2011/115187 A1 | 9/2011 |
| WO | WO 2011/121375 A1 | 10/2011 |
| WO | WO 2012/021417 A1 | 2/2012 |
| WO | WO 2012/037664 | 3/2012 |
| WO | WO 2012/096804 A2 | 7/2012 |
| WO | WO 2012/108213 A1 | 8/2012 |
| WO | WO 2012/114760 A1 | 8/2012 |
| WO | WO 2012/150540 A2 | 11/2012 |
| WO | WO 2013/169299 A1 | 11/2013 |
| WO | WO 2013/169300 A1 | 11/2013 |
| WO | WO 2013/169845 A1 | 11/2013 |
| WO | WO 2013/169849 A2 | 11/2013 |
| WO | WO 2013/169851 A2 | 11/2013 |
| WO | WO 2013/169853 A1 | 11/2013 |
| WO | WO 2013/169854 A2 | 11/2013 |
| WO | WO 2013/169870 A1 | 11/2013 |
| WO | WO 2013/169875 A2 | 11/2013 |
| WO | WO 2013/169877 A2 | 11/2013 |
| WO | WO 2013/169882 A2 | 11/2013 |
| WO | WO 2013/173838 A2 | 11/2013 |
| WO | WO 2014/105275 A1 | 7/2014 |
| WO | WO 2014/105276 A1 | 7/2014 |
| WO | WO 2014/105277 A1 | 7/2014 |
| WO | WO 2014/105278 A1 | 7/2014 |
| WO | WO 2014/105279 A1 | 7/2014 |
| WO | WO 2014/129655 A1 | 8/2014 |
| WO | WO 2014/149473 A1 | 9/2014 |
| WO | WO 2014/200733 A1 | 12/2014 |
| WO | WO 2016/200584 A2 | 12/2016 |

OTHER PUBLICATIONS

Alzona, "Full Screen Maximization with RightZoom," http://www.brighhub.com/computing/mac-platform/articles/31024.aspx>, Mar. 31, 2009, 6 pages.

Apple Inc., "iPhone User Guide for iPhone and iPhone 3G," http://manuals.info.apple.com/en_US/iPhone_User_Guide.pdf, Jul. 11, 2008, 154 pages.

Ask.MetaFilter, "Enable Screen Resize?" ask. Metafilter.com, Jan. 29, 2006, http://ask.metafilter.com/31720/Enable-screen-resize, 4 pages.

Awduche et al., "Synchronized Broadcast in Cellular Networks," 2nd Telecommunications R&D Conference in Massachusetts, Mar. 1996, 12 pages.

Azundris, "A Fire in the Sky," http://web.archive.org/web/20140722062639/http://blog.azundrix.com/archives/168-A-fire-in-the-sky.html, Jul. 22, 2014, 8 pages.

CrackBerry Forums, Windows 8 Bezel Control and Gestures, http://wwwforums.crackberry.com/blackberry-playbook-f222/windows-8-bezel-control-gestures-705129/, Mar. 1, 2012, 8 pages.

Crook, "Microsoft Patenting Multi-Screen, Milti-Touch Gesures," http://techcrunch.com/2011/08/25/microsoft-awarded-patents-for-multi-screen-multi-touch-gestures/, Aug. 25, 2011, 8 pages.

Cvil.ly—a design blog, Interesting Touch Interactions on Windows 8, http://cvil.ly/2011/06/04/interesting-touch-interactions-on-windows-8/, Jun. 4, 2011, 3 pages.

Deeter, "DigiStamp Signs Strategic Partnership with European Trust Center EuroSignCard to Safeguard Monetary Transactions in Financial Sector," http://proquest.umi.com/, Mar. 14, 2001, 2 pages.

Dilger, "Inside Apple's iPad: Multitasking," Appleinsider.com, <http://www.appleinsider.com/articles/10/02/18/inside_apples_ipad_multitasking.html>, Feb. 17, 2010, 3 pages.

Fahey, "The iPad Blows Up iPhone Apps Read Good," Kotaku http://kotaku.com/5458316/the-ipad-blows-up-iphone-apps-rel-good, Jan. 27, 2010, 3 pages.

Fehily, "Visual QuickStart Guide: Microsoft Windows 7," Peachpit Press, 9 pages.

(56) References Cited

OTHER PUBLICATIONS

Fenlon, "The Case for Bezel Touch Gestures on Apple's iPad," http://www.tested.com/tech/tablets/3104-the case-for-bezel-touch-gestures-on-apples-ipad/, Nov. 2, 2011, 6 pages.
Flowplayer, "Slowmotion: Flowplayer," https://web.archive.org/web/20150226191526/http://flash.flowplayer.org/plugins/streaming/slowmotion.html, Feb. 26, 2015, 4 pages.
Gorman, "Hands-On With Immersion HD Integrator Hi-Fi Haptics," http://www.engadget.com/2010/02/23/hands-on-with-immersion-hd-integrator-hi-fi-haptics/?utm_medium=referral&utm_source=pulsenews, Feb. 23, 2012, 10 pages.
Harris, "Windows 8 Consumer Preview: Product Demo," https://www.youtube.com/watch?feature=[;auer-embedded&v=jDYAQmQ-phX8, Feb. 28, 2012, 3 pages.
HTC, "HTC One (M7)," Wikipedia, the free encyclopedia, https://en.wikipedia.org/wiki/HTC_One_(M7), Mar. 2013, 20 pages.
HTC, "User Manual—PDA Phone—HTC_P3050 Touch," http://web.archive.org/web/20101228223033/http://www.comparecellular.com, Nov. 2, 2007, 154 pages.
ICIMS Recruiting Software, "Blackberry Playbook Review," http://www.tested.com/tech.tablets/5749-blackberry-playbook-review/, 2015, 11 pages.
Jade et al., "Apple's iPhone 4.0 to Support Multitasking via Expose-like Interface," AppleInsider.com, Mar. 31, 2010, 4 pages.
Jade et al., "Apple's iPhone 4.0 Software to Deliver Multitasking Support," AppleSider.com, Mar. 11, 2010, 3 pages.
Kishore, "Make the OS X Maximize Button Work like Windows," http://www.switchingtomac.com/making-the-switch/make-the-os-x-maximize-buttom-work-like-windows/, May 5, 2009, 11 pages.
MacRumors, "Fit to Screen Button Poll for Mac / Windows Users," http://forums.macrumors.com/showthread.php?t=615215>, Dec. 11, 2008, 15 pages.
MacRumors, "Window, Fit to Screen," http://forums.macrumors.com/showthread.php?t=439783>, Feb. 22, 2008, 5 pages.
McRitchie, "Internet Explorer Right-Click Menus," http://web.archive.org/web-201405020/http://dmcritchie.mvps.org/ie/rightie6.htm, May 2, 2014, 10 pages.
MetaFilter Network Inc., "Enable Screen Resize?", http://ask.metafilter.com/31720/Enable-screen-resize>, Jan. 29, 2006, 4 pages.
Mick, "iPhone OS 4.0 Will Bring True Multitasking This Summer", Daily Tech, http://www.dailytech.com/report+iphone+os+40+will+bring+true+multitasking+this+summer/article 17878.htm>, Mar. 11, 2010, 3 pages.
Moth, "Share Code—Write Code Once for Both Mobile and Desktop Apps," MSDN Magazine, Jul. 2007, http://msdn.microsoft.com/en-us/magazine/cc163387.aspx, 8 pages.
Newman, "Sprint's HTC EVO 4G: 5 Killer Features," pcworld, http://www.pcworld.com/article/192286/sprints_htc_evo_4g_5_killer_features.html, Mar. 24, 2010, 3 pages.
Nickinson, "Review: The New HTC Sense Interface on Android Phones," Android Central, Feb. 22, 2010, http://www.androidcentral.com/review-new-htc-sense-android-phone, 10 pages.
Nilsson, "Design Guidelines for Mobile Applications," SINTEF ICT, Jun. 2008, 73 pages.
Nilsson et al., "Design Patterns for User Interface for Mobile Applications," Advances in Engineering Software, Elsevier Science, Oxford, GB vol. 40, No. 12, Dec. 1, 2009, 11 pages.
Pallenberg, "Wow, the new iPad had gestures." https://plus.google.com/+SaschaPallenberg/posts/aaJtJogu8ac, Mar. 7, 2012, 2 pages.
Pradeep, "Android App Development—Microsoft Awarded With Patents On Gestures Supported On Windows 8," http://mspoweruser.com/microsoft-awarded-with-patents-on-gestures-supported-on-windows-8/, Aug. 25, 2011, 16 pages.
Reiger, "Effective Design for Multiple Screen Sizes," mobiForge, http://mobiforge.com/designing/story/effective-design-multiple-screen-sizes, Jan. 2009, 12 pages.
Robertson et al., "The Task Gallery: A 3D Window Manager," Redmond, WA, Sep. 12, 1999, 8 pages.

Savov, "HTC Enhances Sense with Leap and Friend Stream (updated with video)," Engadget, http://www.engadget.com/2010/02/16/htc-enhances-sense-with-leap-and-friend-stream/, Feb. 16, 2010, 4 pages.
Seffah et al., Multi-devices "Multiple" User Interfaces: Development Models and Research Opportunities, The Journal of Systems Software, www.sciencedirect.com, Dec. 25, 2003, 14 pages.
Siracusa, "Antacid Tablet," http://arstechnica.com/staff/2010/01/antacid-tablet/>, Jan. 1, 2010, 3 pages.
Sony, "Sony Xperia Z1", Wikipedia, the free encyclopedia, https://en.wikipedia.org/wiki/Sony_Xperia_Z1, Sep. 2013, 10 pages.
Tidwell, "Designing Interfaces," O'Reilly Media, Inc., USA, Nov. 2005, 348 pages.
Viana et al., "Xmobile: A MB-UID Environment for Semi-Automatic Generation of Adaptive Applications for Mobile Devices," The Journal of Systems and Software, www.sciencedirect.com, Jun. 9, 2007, 13 pages.
Windows, "Stupid Geek Tricks: Tile or Cascade Multiple Windows in Windows 7," How to Geek, Feb. 18, 2010, 3 pages.
YouTube, "Blackberry Playbook bezel interation," https://www.youtube.com/watch?v=YGkzFqnOwXl, Jan. 10, 2011, 2 pages.
Office Action, dated May 22, 2012, received in U.S. Appl. No. 12/888,381, 18 pages.
Final Office Action, dated Nov. 19, 2012, received in U.S. Appl. No. 12/888,381, 14 pages.
Office Action, dated Dec. 10, 2013, received in U.S. Appl. No. 12/888,381, 13 pages.
Notice of Allowance, dated Oct. 21, 2014, received in U.S. Appl. No. 12/888,381, 8 pages.
Notice of Allowance, dated Feb. 17, 2015, received in U.S. Appl. No. 12/888,381, 5 pages.
Notice of Allowance (corrected), dated Apr. 9, 2015, received in U.S. Appl. No. 12/888,381, 2 pages.
Office Action, dated Aug. 8, 2013, received in Australian Patent Application No. 2010350740, 3 pages.
Office Action, dated Aug. 28, 2012, received in Chinese Patent Application No. 201010602688.2, which corresponds with U.S. Appl. No. 12/888,381, 6 pages.
Office Action, dated May 24, 2013, received in Chinese Patent Application No. 201010602688.2, which corresponds with U.S. Appl. No. 12/888,381, 7 pages.
Office Action, dated Aug. 6, 2013, received in European Patent Application No. 10760867.1, which corresponds with U.S. Appl. No. 12/888,381, 4 pages.
Office Action, dated Dec. 6, 2013, received in Japanese Patent Application No. 2013-503722, which corresponds with U.S. Appl. No. 12/888,381, 2 pages.
Office Action, dated Nov. 29, 2013, received in Korean Patent Application No. 2012-7029281, which corresponds with U.S. Appl. No. 12/888,381, 4 pages.
Office Action, dated May 10, 2012, received in U.S. Appl. No. 12/888,382, 9 pages.
Final Office Action, dated Nov. 15, 2012, received in U.S. Appl. No. 12/888,382, 11 pages.
Office Action, dated Dec. 10, 2013, received in U.S. Appl. No. 12/888,382, 12 pages.
Notice of Allowance, dated Oct. 31, 2014, received in U.S. Appl. No. 12/888,382, 5 pages.
Notice of Allowance, dated Feb. 13, 2015, received in U.S. Appl. No. 12/888,382, 6 pages.
Office Action, dated May 17, 2012, received in U.S. Appl. No. 12/888,384, 15 pages.
Final Office Action, dated Nov. 7, 2012, received in U.S. Appl. No. 12/888,384, 14 pages.
Office Action, dated May 16, 2012, received in U.S. Appl. No. 12/888,386, 12 pages.
Final Office Action, dated Nov. 8, 2012, received in U.S. Appl. No. 12/888,386, 13 pages.
Office Action, dated Jan. 23, 2013, received in U.S. Appl. No. 12/888,389, 11 pages.
Final Office Action, dated Sep. 12, 2013, received in U.S. Appl. No. 12/888,389, 10 pages.
Notice of Allowance, dated Sep. 8, 2014, received in U.S. Appl. No. 12/888,389, 13 pages.

(56) References Cited

OTHER PUBLICATIONS

Notice of Allowance, dated Feb. 11, 2015, received in U.S. Appl. No. 12/888,389, 13 pages.
Notice of Allowance, dated Jun. 15, 2012, received in U.S. Appl. No. 12/888,391, 23 pages.
Office Action, dated Jun. 28, 2013, received in U.S. Appl. No. 13/077,524, 17 pages.
Office Action, dated Apr. 4, 2013, received in U.S. Appl. No. 12/789,426, 8 pages.
Office Action, dated Feb. 12, 2014, received in U.S. Appl. No. 13/077,524, 13 pages.
Notice of Allowance, dated May 27, 2015, received in U.S. Appl. No. 13/077,524, 9 pages.
Notice of Allowance, dated Sep. 15, 2015, received in U.S. Appl. No. 13/077,524, 9 pages.
Office Action, dated Mar. 19, 2013, received in U.S. Appl. No. 13/333,909, 18 pages.
Final Office Action, dated Dec. 5, 2013, received in U.S. Appl. No. 13/333,909, 24 pages.
Notice of Allowance, dated Mar. 31, 2014, received in U.S. Appl. No. 13/333,909, 20 pages.
Office Action, dated Dec. 18, 2015, received in Australian Patent Application No. 2013368440, which corresponds with U.S. Appl. No. 14/536,426, 3 pages.
Office Action, dated Apr. 5, 2016, received in Korean Patent Application No. 10-2015-7018851, which corresponds with U.S. Appl. No. 14/536,426, 7 pages.
Office Action, dated Dec. 17, 2015, received in U.S. Appl. No. 14/536,426, 28 pages.
Office Action, dated Nov. 18, 2015, received in Australian Patent Application No. 2015101231, which corresponds with U.S. Appl. No. 14/536,426, 3 pages.
Office Action, dated Mar. 4, 2016, received in Japanese Patent Application No. 2015-511644, which corresponds with U.S. Appl. No. 14/536,426, 3 pages.
Office Action, dated Feb. 1, 2016, received in Australian Patent Application No. 2013368441, which corresponds with U.S. Appl. No. 14/608,926, 3 pages.
Notice of Allowance, dated Mar. 30, 2016, received in Australian Patent Application No. 2013368441, which corresponds with U.S. Appl. No. 14/608,926, 1 page.
Office Action, dated Mar. 14, 2016, received in Japanese Patent Application No. 2015-549392, which corresponds with U.S. Appl. No. 14/608,926, 4 pages.
Office Action, dated Nov. 12, 2015, received in European Patent Application No. 13724102.2, which corresponds with U.S. Appl. No. 14/536,646, 6 pages.
Office Action, dated Feb. 29, 2016, received in Japanese Patent Application No. 2015-511645, which corresponds with U.S. Appl. No. 14/536,646, 5 pages.
Office Action, dated Jan. 7, 2016, received in European Patent Application No. 13726053.5, which corresponds with U.S. Appl. No. 14/536,141, 10 pages.
Office Action, dated Feb. 29, 2016, received in Japanese Patent Application No. 2015-511646, which corresponds with U.S. Appl. No. 14/536,141, 3 pages.
Office Action, dated Jan. 29, 2016, received in Australian Patent Application No. 2013368443, which correspond with U.S. Appl. No. 14/536,141, 3 pages.
Notice of Allowance, dated Mar. 11, 2016, received in Australian Patent Application No. 2013368443, which corresponds with U.S. Appl. No. 14/536,141, 2 pages.
Office Action, dated Apr. 5, 2016, received in Korean Patent Application No. 10-2015-7018448, which corresponds with U.S. Appl. No. 14/536,141, 6 pages.
Office Action, dated Nov. 11, 2015, received in European Patent Application No. 13724104.8, which corresponds with U.S. Appl. No. 14/536,203, 5 pages.

Office Action, dated Feb. 15, 2016, received in Japanese Patent Application No. 2015-511650, which corresponds with U.S. Appl. No. 14/536,203, 5 pages.
Office Action, dated Dec. 4, 2015, received in Korean Patent Application No. 2014-7034520, which corresponds with U.S. Appl. No. 14/536,203, 4 pages.
Office Action, dated Jan. 29, 2016, received in Japanese Patent Application No. 2015-511652, which corresponds with U.S. Appl. No. 14/536,267, 3 pages.
Office Action, dated Dec. 4, 2015, received in Korean Patent Application No. 2014-7034530, which corresponds with U.S. Appl. No. 14/536,267, 3 pages.
Office Action, dated Jan. 7, 2016, received in European Patent Application No. 13724107.1, which corresponds with U.S. Appl. No. 14/052,515, 11 pages.
Office Action, dated Mar. 8, 2016, received in Japanese Patent Application No. 2015-511655, which corresponds with U.S. Appl. No. 14/536,291, 4 pages.
Office Action, dated Jan. 15, 2016, received in Australian Patent Application No. 2013368445, which corresponds with U.S. Appl. No. 14/608,985, 3 pages.
Office Action, dated Nov. 23, 2015, received in U.S. Appl. No. 14/183,316, 17 pages.
Office Action, dated Jul. 7, 2015, received in U.S. Appl. No. 14/183,347, 14 pages.
Final Office Action, dated Dec. 18, 2015, received in U.S. Appl. No. 14/183,347, 6 pages.
Notice of Allowance, dated Apr. 6, 2016, received in U.S. Appl. No. 14/183,347, 7 pages.
Notice of Allowance (corrected), dated Apr. 19, 2016, received in U.S. Appl. No. 14/183,347, 3 pages.
Office Action, dated Mar. 31, 2016, received in U.S. Appl. No. 14/864,737, 17 pages.
Certificate of Grant, dated Apr. 7, 2016, received in Australian Patent Application No. 2016100293, which corresponds with U.S. Appl. No. 14/864,737, 1 page.
Office Action, dated Apr. 5, 2016, received in Danish Patent Application No. 201500577, which corresponds with U.S. Appl. No. 14/864,737, 7 pages.
Certificate of Grant, dated Mar. 24, 2016, received in Australian Patent Application No. 2016100254, which corresponds with U.S. Appl. No. 14/866,981, 1 page.
Office Action, dated Mar. 18, 2016, received in Danish Patent Application No. 201500575, which corresponds with U.S. Appl. No. 14/866,981, 9 pages.
Certificate of Grant, dated Mar. 24, 2016, received in Australian Patent Application No. 2016100251, which corresponds with U.S. Appl. No. 14/866,159, 1 page.
Office Action, dated Mar. 9, 2016, received in Danish Patent Application No. 201500574, which corresponds with U.S. Appl. No. 14/866,159, 11 pages.
Certificate of Grant, dated Mar. 24, 2016, received in Australian Patnet Application No. 2016100247, which corresponds with U.S. Appl. No. 14/868,078, 1 page.
Office Action, dated Mar. 30, 2016, received in Danish Patent Application No. 201500588, which corresponds with U.S. Appl. No. 14/868,078, 9 pages.
Office Action, dated Apr. 4, 2016, received in Danish Patent Application No. 201500582, which corresponds with U.S. Appl. No. 14/863,432, 10 pages.
Office Action, dated Mar. 22, 2016, received in Danish Patent Application No. 201500576, which corresponds with U.S. Appl. No. 14/866,989, 10 pages.
Office Action, dated Mar. 28, 2016, received in U.S. Appl. No. 14/869,899, 17 pages.
Office Action, dated Feb. 3, 2016, received in Danish Patent Application No. 201500592, which corresponds with U.S. Appl. No. 14/869,899, 9 pages.
Office Action, dated Mar. 4, 2016, received in U.S. Appl. No. 14/866,992, 30 pages.
Office Action, dated Mar. 18, 2016, received in Danish Patent Application No. 201500593, which corresponds with U.S. Appl. No. 14/866,992, 10 pages.

(56) References Cited

OTHER PUBLICATIONS

Office Action, dated Nov. 30, 2015, received in U.S. Appl. No. 14/845,217, 24 pages.
Final Office Action, dated Apr. 22, 2016, received in U.S. Appl. No. 14/845,217, 36 pages.
Office Action, dated Feb. 3, 2016, received in U.S. Appl. No. 14/856,517, 36 pages.
Office Action, dated Feb. 11, 2016, received in U.S. Appl. No. 14/856,519, 34 pages.
Office Action, dated Feb. 1, 2016, received in U.S. Appl. No. 14/857,645, 15 pages.
Office Action, dated Jan. 25, 2016, received in U.S. Appl. No. 14/864,580, 29 pages.
Office Action, dated Apr. 8, 2016, received in Danish Patent Application No. 201500584, which corresponds with U.S. Appl. No. 14/864,580, 9 pages.
Office Action, dated Apr. 19, 2016, received in U.S. Appl. No. 14/864,627, 9 pages.
Office Action, dated Apr. 8, 2016, received in Danish Patent Application No. 201500585, which corresponds with U.S. Appl. No. 14/864,627, 9 pages.
Office Action, dated Mar. 29, 2016, received in U.S. Appl. No. 14/866,361, 22 pages.
Office Action, dated Apr. 7, 2016, received in Danish Patent Application No. 201500579, which corresponds with U.S. Appl. No. 14/866,361, 10 pages.
Office Action, dated Mar. 22, 2016, received in Danish Patent Application No. 201500587, which corresponds with U.S. Appl. No. 14/866,987, 8 pages.
Office Action, dated Apr. 1, 2016, received in Danish Patent Application No. 201500589, which corresponds with U.S. Appl. No. 14/866,989, 8 pages.
Office Action, dated Apr. 11, 2016, received in U.S. Appl. No. 14/871,236, 23 pages.
Office Action, dated Apr. 8, 2016, received in Danish Patent Application No. 201500595, which corresponds with U.S. Appl. No. 14/871,236, 12 pages.
Office Action, dated Apr. 6, 2016, received in Danish Patent Application No. 201500596, which corresponds with U.S. Appl. No. 14/870,882, 7 pages.
Office Action, dated Apr. 7, 2016, received in Danish Patent Application No. 201500597, which corresponds with U.S. Appl. No. 14/871,227, 7 pages.
Office Action, dated Apr. 18, 2016, received in Danish Patent Application No. 201500601, which corresponds with U.S. Appl. No. 14/871,336, 8 pages.
Notice of Allowance, dated Apr. 18, 2016, received in Danish Patent Application No. 201500600, which corresponds with U.S. Appl. No. 14/871,462, 7 pages.
Office Action, dated Mar. 18, 2016, received in Danish Patent Application No. 201500594, which corresponds with U.S. Appl. No. 14/867,823, 10 pages.
Office Action, dated Mar. 21, 2016, received in Danish Patent Application No. 201500598, which corresponds with U.S. Appl. No. 14/867,892, 9 pages.
Certificate of Grant, dated Mar. 24, 2016, received in Australian Patent Application No. 20161002253, which corresponds with U.S. Appl. No. 14/867,990, 1 page.
Office Action, dated Mar. 18, 2016, received in Danish Patent Application No. 201500581, which corresponds with U.S. Appl. No. 14/867,990, 9 pages.
International Search Report and Written Opinion, dated Dec. 10, 2010, received in International Patent Application No. PCT/US2010/050057, which corresponds with U.S. Appl. No. 14/888,381, 9 pages.
International Preliminary Search Report and Patentability, dated Oct. 9, 2012, received in International Patent Application No. PCT/US2010/050057, which corresponds with U.S. Appl. No. 12/888,381, 6 pages.
Extended European Search Report, dated Nov. 6, 2015, received in European Patent Application No. 15183980.0, which corresponds with U.S. Appl. No. 14/536,426, 7 pages.
International Preliminary Report on Patentability, dated Jun. 30, 2015, received in International Patent Application No. PCT/US2013/069479, which corresponds with U.S. Appl. No. 14/608,926, 11 pages.
B-log—betriebsraum weblog, "Extremely Efficient Menu Selection: Marking Menus for the Flash Platform," http://www.betriebsraum.de/blog/2009/12/11/extremely-efficient-menu-selection-marking-for-the-flash-platform, Dec. 11, 2009, 9 pages.
Clark, "Global Moxie, Touch Means a Renaissance for Radial Menus," http://globalmoxie.com/blog/radial-menus-for-touch-ui~print.shtml, Jul. 17, 2012, 7 pages.
Cohen, Cinemagraphs are Animated Gifs for Adults, http://www.tubefilter.com/2011/07/10/cinemagraph, Jul. 10, 2011, 3 pages.
Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.
Flixel, "Cinemagraph Pro For Mac", https://flixel.com/products/mac/cinemagraph-pro, 2014, 7 pages.
Flock, "Cinemagraphics: What It Looks Like When A Photo Moves," http://www.washingtonpost.com/blogs/blowpost/post/cinemagraphs-what-it-looks-like-when-a-photo-moves/2011/07-08/gl@AONez3H.blog.html, Jul. 12, 2011, 3 pages.
IBM et al., "Pressure-Sensitive Icons", IBM Technical Disclosure Bulletin, vol. 33, No. 1B, Jun. 1, 1990, 3 pages.
Kaaresoja, "Snap-Crackle-Pop: Tactile Feedback for Mobile Touch Screens," Nokia Research Center, Helsinki, Finland, Proceedings of Eurohaptics vol. 2006, Jul. 3, 2006, 2 pages.
Kronfli, "HTC Zoe Comes To Google Play, Here's Everthing You Need To Know," Know Your Mobile, http://www.knowyourmobile.com/htc/htc-one/19550/what-htc-zoe, Aug. 14, 2014, 5 pages.
Laurie, "The Power of the Right Click," http://vlaurie.com/right-click/customize-context-menu.html, 2002-2016, 3 pages.
Microsoft, "Use Radial Menus to Display Commands in OneNote for Windows 8," https://support.office.com/en-us/article/Use-radial-menues-to-display-OneNote-commands-Od75f03f-cde7-493a-a8a0b2ed6f99fbe2, 2016, 5 pages.
Nikon, "Scene Recognition System and Advanced SRS," http://www.nikonusa.com/en.Learn-And-Explore/Article/ftlzi4rr/Scene-Recognition-System.html, Jul. 22, 2015, 2 pages.
PoliceOne.com, "COBAN Technologies Pre-Event Buffer & Fail Safe Feature," http://www.policeone.com/police-products/police-technology/mobile-computures/videos/5955587-COBAN-Technologies-Pre-Event, Nov. 11, 2010, 2 pages.
"Quickly Preview Songs in Windows Media Player 12 in Windows 7," Quickly Preview Songs in Windows Media Player 12 in Windows 7. How-to Geek, Apr. 28, 2010, Web. May 8, 2010, http://web.archive.org/web/20100502013134/http://www.howtogeek.com/howto/16157/quickly-preview-songs-in-windows-media-center-12-in-windows-7>, 6 pages.
Sony, "Intelligent Scene Recognition," https://www.sony-asia.com/article/252999/section/product/product/dsc-t77, downloaded on May 20, 2016, 5 pages.
Stross, "Wearing A Badge, and a Video Camera," The New York Times, http://www.nytimes.com/2013/04/07/business/wearable-video-cameras-for-police-offers.html? R=0, Apr. 6, 2013, 4 pages.
Taser, "Taser Axon Body Camera User Manual," https://www.taser.com/images/support/downloads/product-resourses/axon_body_product_manual.pdf, Oct. 1, 2013, 24 pages.
Wikipedia, "AirDrop,", Wikipedia, the free encyclopedia, http://en.wikipedia.org/wiki/AirDrop, May 17, 2016, 5 pages.
Wikipedia, "Cinemagraph," Wikipedia, the free encyclopedia, http://en.wikipedia.org/wiki/Cinemagraph, Last Modified Mar. 16, 2016, 2 pages.
Wikipedia, "Context Menu," Wikipedia, the free encyclopedia https://en.wikipedia.org/wiki/Context menu, Last Modified May 15, 2016, 4 pages.
Wikipedia, "Mobile Ad Hoc Network," Wikipedia, the free encyclopedia, http://en.wikipedia.org/wiki/Mobile_ad_hoc_network, May 20, 2016, 4 pages.

(56) References Cited

OTHER PUBLICATIONS

Wikipedia, "Pie Menu," Wikipedia, the free encyclopedia, http://en.wikipedia.org/wiki/Pie_menu, Last Modified Jun. 4, 2016, 3 pages.
Wikipedia, "Quick Look," from Wikipedia, the free encyclopedia, https;//en.wikipedia.org/wiki/Quick_Look, Last Modified Jan. 15, 2016, 3 pages.
Office Action, dated Jul. 21, 2016, received in European Patent Application No. 13795391.5, which corresponds with U.S. Appl. No. 14/536,426, 9 pages.
Final Office Action, dated May 6, 2016, received in U.S. Appl. No. 14/536,426, 23 pages.
Notice of Allowance, dated May 23, 2016, received in Australian Patent Application No. 2013259606, which corresponds with U.S. Appl. No. 14/536,426, 3 pages.
Decision to Grant, dated Jul. 14, 2016, received in European Patent Application No. 13724100.6, which corresponds with U.S. Appl. No. 14/536,426, 1 page.
Letters Patent, dated Aug. 10, 2016, received in European Patent Application No. 13724100.6, which corresponds with U.S. Appl. No. 14/536,426, 1 page.
Certificate of Grant, dated Jul. 29, 2016, received in Australian Patent Application No. 2013368441, which corresponds with U.S. Appl. No. 14/608,926, 1 page.
Office Action, dated Apr. 21, 2016, received in European Patent Application No. 13795392.3, which corresponds with U.S. Appl. No. 14/608,926, 6 pages.
Office Action, dated May 6, 2016, received in European Patent Application No. 13795392.3, which corresponds with U.S. Appl. No. 14/608,926, 6 pages.
Office Action, dated May 12, 2016, received in Korean Patent Application No. 10-2015-7018853, which corresponds with U.S. Appl. No. 14/608,926, 4 pages.
Office Action, dated May 31, 2016, received in Australian Patent Application No. 2013259613, which corresponds with U.S. Appl. No. 14/536,646, 4 pages.
Notice of Allowance, dated Jul. 5, 2016, received in Australian Patent Application No. 2013259613, which corresponds with U.S. Appl. No. 14/536,646, 3 pages.
Office Action, dated May 31, 2016, received in European Patent Application No. 13724102.2, which corresponds with U.S. Appl. No. 14/536,646, 5 pages.
Notice of Allowance, dated Aug. 15, 2016, received in Australian Patent Application No. 2013259614, which corresponds with U.S. Appl. No. 14/536,141, 1 page.
Certificate of Grant, dated Jul. 7, 2016, received in Australian Patent Application No. 2013368443, which corresponds with U.S. Appl. No. 14/536,141, 3 pages.
Office Action, dated Jul. 4, 2016, received in Japanese Patent Application No. 2015-549393, which corresponds with U.S. Appl. No. 14/536,141, 4 pages.
Office Action, dated Aug. 1, 2016, received in U.S. Appl. No. 14/536,203, 14 pages.
Notice of Allowance, dated Jun. 15, 2016, received in Australian Patent Applicatin No. 2013259630, which corresponds with U.S. Appl. No. 14/536,203, 3 pages.
Office Action, dated May 31, 2016, received in European Patent Application No. 13724104.8, which corresponds with U.S. Appl. No. 14/536,203, 5 pages.
Notice of Allowance, dated Aug. 5, 2016, received in Japanese Patent Application No. 2015-511650, which corresponds with U.S. Appl. No. 14/536,203, 4 pages.
Office Action, dated Jul. 22, 2016, received in European Office Action No. 13798465.4, which corresponds with U.S. Appl. No. 14/608,965, 8 pages.
Notice of Allowance, dated Jun. 28, 2016, received in Australian Patent Application No. 2013259637, which corresponds with U.S. Appl. No. 14/536,267, 3 pages.
Office Action, dated Jul. 25, 2016, received in Australian Patent Application No. 2013259642, which corresponds with U.S. Appl. No. 14/536,291, 3 pages.
Office Action, dated Aug. 10, 2016, received in Australian Patent Application No. 2013259642, which corresponds with U.S. Appl. No. 14/536,291, 4 pages.
Office Action, dated Aug. 22, 2016, received in European Patent Application No. 13724107.1, which corresponds with U.S. Appl. No. 14/536,291, 7 pages.
Office Action, dated Jul. 25, 2016, received in Japanese Patent Application No. 13811032.5, which corresponds with U.S. Appl. No. 14/608,985, 8 pages.
Office Action, dated Apr. 25, 2016, received in Japanese Patent Application No. 2015-550384, which corresponds with U.S. Appl. No. 14/608,985, 4 pages.
Notice of Allowance, dated Jul. 1, 2016, received in Chinese Patent Application No. 201620214376.7, which correresponds with U.S. Appl. No. 14/864,737, 3 pages.
Patent, dated Aug. 3, 2016, received in Chinese Patent Application No. 201620214376.7, which corresponds with U.S. Appl. No. 14/864,737, 5 pages.
Certificate of Registration, dated Jun. 20, 2016, received in German Patent Application No. 202016001845.1, which corresponds with U.S. Appl. No. 14/864,737, 3 pages.
Intention to Grant, dated Aug. 2, 2016, received in Danish Patent Application No. 201500577, which corresponds with U.S. Appl. No. 14/864,737, 2 pages.
Office Action, dated Jun. 27, 2016, received in U.S. Appl. No. 14/866,981, 22 pages.
Office Action, dated May 10, 2016, received in Australian Patent Application No. 2016100254, which corresponds with U.S. Appl. No. 14/866,981, 6 pages.
Notice of Allowance, dated Jul. 27, 2016, received in Chinese Patent Application No. 201620176169.7, which corresponds with U.S. Appl. No. 14/866,981, 3 pages.
Certificate of Registration, dated Jun. 20, 2016, received in German Patent Application No. 202016001514.2, which corresponds with U.S. Appl. No. 14/864,737, 3 pages.
Office Action, dated Mar. 18, 2016, received in Danish Patent Application No. 2016100254, which corresponds with U.S. Appl. No. 14/866,981, 9 pages.
Office Action, dated May 19, 2016, received in Australian Patent Application No. 2016100251, which corresponds with U.S. Appl. No. 14/866,159, 5 pages.
Certificate of Registration, dated Jun. 16, 2016, received in German Patent No. 202016001483.9, which corresponds with U.S. Appl. No. 14/866,159, 3 pages.
Innovation Patent Certificate, dated Aug. 4, 2016, received in Australian Patent Application No. 2016101201, which corresponds with U.S. Appl. No. 14/686,078, 1 page.
Certificate of Registration, dated Jun. 30, 2016, received in German Patent Application No. 20201600156.9, which corresponds with U.S. Appl. No. 14/868,078, 3 pages.
Office Action, dated Mar. 30, 2016, received in Australian Patent Application No. 201500588, which corresponds with U.S. Appl. No. 14/868,078, 9 pages.
Office Action, dated May 9, 2016, received in U.S. Appl. No. 14/863,432, 26 pages.
Office Action, dated Aug. 19, 2016, received in Australian Patent Application No. 2016100647, which corresponds with U.S. Appl. No. 14/863,432, 5 pages.
Patent, dated Aug. 8, 2016, received in Australian Patent Application 2016100653, corresponds with U.S. Appl. No. 14/866,511, 1 page.
Office Action, dated Mar. 22, 2016, received in Danish Patent Application No. 201500576, which corresponds with U.S. Appl. No. 14/866,511, 10 pages.
Notice of Allowance, dated Jun. 8, 2016, received in Danish Patent Application No. 201500576, which corresponds with U.S. Appl. No. 14/866,511, 2 pages.
Notice of Allowance, dated Aug. 26, 2016, received in Danish Patent Application No. 201500576, which corresponds with U.S. Appl. No. 14/866,511, 2 pages.

(56) References Cited

OTHER PUBLICATIONS

Office Action, dated May 10, 2016, received in U.S. Appl. No. 14/866,489, 15 pages.
Office Action, dated Jun. 28, 2016, received in U.S. Appl. No. 14/869,899, 5 pages.
Final Office Action, dated Jul. 29, 2016, received in U.S. Appl. No. 14/866,992, 35 pages.
Office Action, dated Jun. 27, 2016, received in Danish Patent Application No. 201500593, which corresponds with U.S. Appl. No. 14/866,992, 7 pages.
Notice of Allowance, dated Aug. 26, 2016, received in U.S. Appl. No. 14/845,217, 5 pages.
Final Office Action, dated Jul. 13, 2016, received in U.S. Appl. No. 14/856,517, 30 pages.
Final Office Action, dated Jul. 15, 2016, received in U.S. Appl. No. 14/856,519, 31 pages.
Final Office Action, dated Jun. 16, 2016, received in U.S. Appl. No. 14/857,645, 12 pages.
Notice of Allowance, dated May 23, 2016, received in U.S. Appl. No. 14/864,580, 9 pages.
Corrected Notice of Allowability, dated Jun. 16, 2016, received in U.S. Appl. No. 14/864,580, 2 pages.
Notice of Allowance, dated Aug. 4, 2016, received in U.S. Appl. No. 14/864,580, 9 pages.
Office Action, dated Aug. 19, 2016, received in Australian Patent Application No. 2016100648, which corresponds with U.S. Appl. No. 14/864,580, 6 pages.
Notice of Allowance, dated Jul. 19, 2016, received in U.S. Appl. No. 14/866,361, 8 pages.
Office Action, dated Jun. 10, 2016, received in Australian Patent Application No. 2016100292, which corresponds with U.S. Appl. No. 14/866,361, 4 pages.
Notice of Allowance/Grant, dated Jul. 1, 2016, received in Chinese Patent Application No. 201620251706.X, which corresponds with U.S. Appl. No. 14/866,361, 3 pages.
Letters Patent, dated Aug. 3, 2016, received in Chinese Patent Application No. 201620251706.X, which corresponds with U.S. Appl. No. 14/866,361, 3 pages.
Certificate of Registration, dated Jun. 24, 2016, received in German Patent Application No. 202016001819.2, which corresponds with U.S. Appl. No. 14/866,361, 3 pages.
Patent, dated Aug. 8, 2016, received in Australian Patent Application No. 2016100649, which corresponds with U.S. Appl. No. 14/866,987, 1 page.
Notice of Allowance, dated Jun. 10, 2016, received in Danish Patent Application No. 201500587, which corresponds with U.S. Appl. No. 14/866,987, 2 pages.
Certificate of Exam, dated Jul. 21, 2016, received in Australian Patent Application No. 2016100652, which corresponds with U.S. Appl. No. 14/866,989, 1 page.
Notice of Allowance, dated Jun. 10, 2016, received in Danish Patent Application No. 201500589, which corresponds with U.S. Appl. No. 14/866,989, 2 pages.
Office Action, dated Jun. 28, 2016, received in U.S. Appl. No. 14/871,236, 21 pages.
Office Action, dated May 26, 2016, received in Danish Patent Application No. 201500595, which corresponds with U.S. Appl. No. 14/871,236, 14 pages.
Office Action, dated Jun. 9, 2016, received in Danish Patent Application No. 201500596, which corresponds with U.S. Appl. No. 14/870,882, 9 pages.
Notice of Allowance, dated Jun. 21, 2016, received in Danish Patent Application No. 201500597, which corresponds with U.S. Appl. No. 14/871,227, 2 pages.
Office Action, dated Apr. 29, 2016, received in U.S. Appl. No. 14/867,823, 28 pages.
Office Action, dated May 10, 2016, received in U.S. Appl. No. 14/867,892, 28 pages.

Office Action, dated May 23, 2016, received in Australian Patent Application No. 2016100253, which corresponds with U.S. Appl. No. 14/867,990, 5 pages.
Certificate of Registration, dated Jun. 16, 2016, received in German Patent No. 202016001489.8, which corresponds with U.S. Appl. No. 14/867,990, 3 pages.
International Search Report and Written Opinion, dated Apr. 25, 2016, received in International Patent Application No. PCT/US2016/018758, which corresponds with U.S. Appl. No. 14/866,159, 15 pages.
International Search Report and Written Opinion, dated Jul. 21, 2016, received in International Patent Application No. PCT/US2016/019913, which corresponds with U.S. Appl. No. 14/868,078, 16 pages.
Anonymous, "Nokia 808 PureView screenshots", retrieved from Internet; no URL, Nov. 12, 2012, 8 pages.
Anonymous, "Nokia 808 PureView User Guide," http://download-fds.webapps.microsoft.com/supportFiles/phones/files/pdf_guides/devices/808/Nokia_808_UG_en_APAC.pdf, Jan. 1, 2012, 144 pages.
Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.
Farshad, "SageThumbs-Preview And Convert Pictures From Windows Context Menu", https://web.addictivetips.com/windows-tips/sagethumbs-preview-and-convert-photos-from-windows-context-menu, Aug. 8, 2011, 5 pages.
Flaherty, "Is Apple Watch's Pressure-Sensitive Screen A Bigger Deal Than The Gadget Itself?", http://www.wired.com/2014/09/apple-watchs-pressure-sensitive-screen-bigger-deal-gadget, Sep. 15, 2014, 3 pages.
Gardner, "Recenz—Recent Apps In One Tap", You Tube, https://www.youtube.com/watch?v-qailSHRgsTo, May 15, 2015, 1 page.
IPodHacks 142: "Water Ripple Effects On The Home and Lock Screen: AquaBoard Cydia Tweak Review", YouTube, https://www.youtube.comwatch?v-Auu_uRaYHJs, Sep. 24, 2012, 3 pages.
Kiener, "Force Touch on iPhone", https://www.youtube.com/watch?v=CEMmnsU5fC8, Aug. 4, 2015, 4 pages.
Kumar, "How to Enable Ripple Effect on Lock Screen of Galaxy S2", YouTube, http, http://www.youtube.com/watch?v+B9-4M5abLXA, Feb. 12, 2013, 3 pages.
Matthew, "How to Preview Photos and Images From Right-Click Context Menue in Windows [Tip]", https://dottech.org/159009/add-image-preview-in-windows-context-menu-tip, Jul. 4, 2014, 5 pages.
Mitroff, "Google Android 5.0 Lollipop," http://www.cnet.com/products/google-android-5-0-lollipop, Mar. 12, 2015, 5 pages.
Mohr, "Do Not Disturb—The iPhone Feature You Should Be Using", http.www.wonderoftech.com/do-not-disturb-iphone, Jul. 14, 2014, 30 pages.
Nacca, "NiLS Lock Screen Notifications / Floating Panel—Review", https://www.youtube.com/watch?v=McT4QnS9TDY, Feb. 3, 2014, 4 pages.
Phonebuff, "How To Pair Bluetooth On The iPhone", https://www.youtube.com/watch?v=LudNwEar9A8, Feb. 8, 2012, 3 pages.
VGJFeliz, "How to Master Android Lollipop Notifications in Four Minutes!", https://www.youtube.com/watch?v=S-zBRG7GJgs, Feb. 8, 2015, 5 pages.
Office Action, dated Oct. 18, 2016, received in Australian Patent Application No. 2013368440, which corresponds with U.S. Appl. No. 14/536,426, 3 pages.
Office Action, dated Sep. 13, 2016, received in Japanese Patent Application No. 2015-547948, which corresponds with U.S. Appl. No. 14/536,426, 5 pages.
Certificate of Grant, dated Sep. 15, 2016, received in Australian Patent Australian Patent Application No. 2013259606, which corresponds with U.S. Appl. No. 14/536,426, 1 page.
Office Action, dated Nov. 11, 2016, received in European Patent Application No. 13795392.3, which corresponds with U.S. Appl. No. 14/608,926, 6 pages.
Office Action, dated Aug. 31, 2016, received in European Patent Application No. 13726053.5, which corresponds with U.S. Appl. No. 14/536,141, 10 pages.

(56) References Cited

OTHER PUBLICATIONS

Office Action, dated Oct. 25, 2016, received in Japanese Patent Application No. 2015-511646, which corresponds with U.S. Appl. No. 14/536,141, 6 pages.
Office Action, dated Oct. 7, 2016, received in European Patent Application No. 13798464.7, which corresponds with U.S. Appl. No. 14/608,942, 7 pages.
Certificate of Grant, dated Oct. 21, 2016, received in Australian Patent Application No. 2013259630, which corresponds with U.S. Appl. No. 14/536,203, 3 pages.
Certificate of Patent, dated Sep. 9, 2016, received in Japanese Patent Application No. 2015-511650, which corresponds with U.S. Appl. No. 14/536,203, 3 pages.
Notice of Allowance, dated Sep. 1, 2016, received in Korean Patent Application No. 2014-7034520, which corresponds with U.S. Appl. No. 14/536,203, 5 pages.
Office Action, dated Oct. 20, 2016, received in U.S. Appl. No. 14/536,247, 10 pages.
Certificate of Grant, dated Oct. 21, 2016, received in Australian Patent Application No. 2013259637, which corresponds with U.S. Appl. No. 14/536,267, 3 pages.
Notice of Allowance, dated Sep. 26, 2016, received in Japanese Patent Application No. 2015-511652, which corresponds with U.S. Appl. No. 14/536,267, 5 pages.
Notice of Allowance, dated Sep. 1, 2016, received in Korean Patent Application No. 2014-7034530, which corresponds with U.S. Appl. No. 14/536,267, 3 pages.
Innovation Patent, dated Sep. 1, 2016, received in Australian Patent Application No. 2016101481, which corresponds with U.S. Appl. No. 14/536,291, 1 page.
Office Action, dated Sep. 29, 2016, received in Australian Patent Application No. 2016101481, which corresponds with U.S. Appl. No. 14/536,291, 3 pages.
Office Action, dated Nov. 4, 2016, received in Korean Patent Application No. 10-2015-7019984, which corresponds with U.S. Appl. No. 14/608,985, 8 pages.
Notice of Allowance, dated Oct. 24, 2016, received in U.S. Appl. No. 14/866,981, 7 pages.
Patent, dated Nov. 2, 2016, received in Australian Patent Application No. 2016100254, which corresponds with U.S. Appl. No. 14/866,981, 1 page.
Patent, dated Sep. 28, 2016, received in Chinese Patent Application No. 201620176169.7, which corresponds with U.S. Appl. No. 14/866,981, 4 pages.
Office Action, dated Jul. 5, 2016, received in Chinese Patent Application No. 201620186008.6, which corresponds with U.S. Appl. No. 14/866,159, 3 pages.
Office Action, dated Sep. 27, 2016, received in Danish Patent Application No. 201500574, which corresponds with U.S. Appl. No. 14/866,159, 4 pages.
Office Action, dated Oct. 12, 2016, received in Australian Patent Application No. 2016101201, which corresponds with U.S. Appl. No. 14/686,078, 3 pages.
Notice of Allowance, dated Oct. 1, 2016, received in Chinese Patent Application No. 201620175847.8, which corresponds with U.S. Appl. No. 14/686,078, 1 page.
Office Action, dated Sep. 2, 2016, received in Australian Patent Application No. 201500588, which corresponds with U.S. Appl. No. 14/868,078, 4 pages.
Notice of Allowance, dated Nov. 14, 2016, received in U.S. Patent Application No. 14/863,432, 7 pages.
Office Action and Additional Search Report, dated Oct. 7, 2016, received in Danish Patent Application No. 201500582, which corresponds with U.S. Appl. No. 14/863,432, 6 pages.
Office Action, dated Oct. 13, 2016, received in U.S. Appl. No. 14/866,511, 27 pages.
Final Office Action, dated Sep. 16, 2016, received in U.S. Appl. No. 14/866,489, 24 pages.
Final Office Action, dated Sep. 2, 2016, received in U.S. Appl. No. 14/869,899, 22 pages.
Innovation (Unexamined) Patent, dated Aug. 25, 2016, received in Australian Patent Application No. 2016101438, which corresponds with U.S. Appl. No. 14/869,899, 1 page.
Certificate of Examination, dated Oct. 11, 2016, received in Australian Patent Application No. 2016101438, which corresponds with U.S. Appl. No. 14/869,899, 1 page.
Office Action, dated Oct. 7, 2016, received in Danish Patent Application No. 201500592, which corresponds with U.S. Appl. No. 14/869,899, 6 pages.
Office Action, dated Nov. 22, 2016, received in Danish Patent Application No. 201670594, which corresponds with U.S. Appl. No. 14/869,899, 9 pages.
Innovation Patent, dated Sep. 22, 2016, received in Australian Patent Application No. 2016101418, which corresponds with U.S. Appl. No. 14/866,992, 1 page.
Office Action, dated Nov. 22, 2016, received in Australian Patent Application No. 2016101418, which corresponds with U.S. Appl. No. 14/866,992, 7 pages.
Notice of Allowance, dated Oct. 24, 2016, received in U.S. Appl. No. 14/857,645, 6 pages.
Notice of Allowance, dated Nov. 8, 2016, received in Chinese Patent Application No. 201620470247.4, which corresponds with U.S. Appl. No. 14/864,580, 3 pages.
Certificate of Registration, dated Oct. 14, 2016, received in German Patent Application No. 20201600003234.9, which corresponds with U.S. Appl. No. 14/864,580, 3 pages.
Office Action, dated Oct. 7, 2016, received in Danish Patent Application No. 201500584, which corresponds with U.S. Appl. No. 14/864,580, 3 pages.
Notice of Allowance, dated Nov. 23, 2016, received in U.S. Appl. No. 14/864,601, 12 pages.
Office Action, dated Oct. 7, 2016, received in Danish Patent Application No. 201500585, which corresponds with U.S. Appl. No. 14/864,627, 3 pages.
Office Action, dated Oct. 28, 2016, received in Danish Patent Application No. 201500579, which corresponds with U.S. Appl. No. 14/866,361, 3 pages.
Office Action, dated Oct. 19, 2016, received in Chinese Patent Application No. 2016201470246.X, which corresponds with U.S. Appl. No. 14/866,987, 4 pages.
Notice of Allowance, dated Nov. 1, 2016, received in Danish Patent Application No. 201500587, which corresponds with U.S. Appl. No. 14/866,987, 2 pages.
Office Action and Search Report, dated Sep. 9, 2016, received in Danish Patent Application No. 201670463, which corresponds with U.S. Appl. No. 14/866,987, 7 pages.
Notice of Allowance, dated Nov. 1, 2016, received in Danish Patent Application No. 201500589, which corresponds with U.S. Appl. No. 14/866,989, 2 pages.
Final Office Action, dated Nov. 4, 2016, received in U.S. Appl. No. 14/871,236, 24 pages.
Innovation (Unexamined) Patent, dated Aug. 25, 2016, received in Australian Patent Application No. 2016101433, which corresponds with U.S. Appl. No. 14/871,236, 1 page.
Office Action, dated Oct. 14, 2016, received in Australian Patent Application No. 2016101433, which corresponds with U.S. Appl. No. 14/871,236, 3 pages.
Office Action and Additional Search Report, dated Sep. 30, 2016, received in Danish Patent Application No. 201500595, which corresponds with U.S. Appl. No. 14/871,236, 10 pages.
Innovation (Unexamined) Patent, dated Aug. 25, 2016, received in Australian Patent Application No. 2016101436, which corresponds with U.S. Appl. No. 14/871,236, 1 pages.
Office Action, dated Oct. 31, 2016, received in Australian Patent Application No. 2016101438, which corresponds with U.S. Appl. No. 14/871,236, 6 pages.
Office Action, dated Oct. 17, 2016, received in Australian Patent Application No. 2016203040, which corresponds with U.S. Appl. No. 14/871,227, 7 pages.
Office Action, dated Oct. 18, 2016, received in Australian Patent Application No. 2016101431, which corresponds with U.S. Appl. No. 14/871,227, 3 pages.

(56) References Cited

OTHER PUBLICATIONS

Patent, dated Sep. 26, 2016, received in Danish Patent Application No. 201500597, which corresponds with U.S. Appl. No. 14/871,227, 7 pages.
Office Action, dated Oct. 14, 2016, received in Australian Patent Application No. 2016101437, which corresponds with U.S. Appl. No. 14/871,336, 2 pages.
Office Action, dated Oct. 18, 2016, received in Australian Patent Application No. 201500601, which corresponds with U.S. Appl. No. 14/871,336, 3 pages.
Innovation Patent, dated Aug. 25, 2016, received in Australian Patent Application No. 2016101435, which corresponds with U.S. Appl. No. 14/871,462, 1 page.
Office Action, dated Oct. 4, 2016, received in Australian Patent Application No. 2016101435, which corresponds with U.S. Appl. No. 14/871,462, 3 pages.
Office Action, dated Oct. 4, 2016, received in Australian Patent Application No. 2016231505, which corresponds with U.S. Appl. No. 14/871,462, 3 pages.
Grant, dated Aug. 30, 2016, received in Danish Patent Application No. 201500600, which corresponds with U.S. Appl. No. 14/871,462, 2 pages.
Final Office Action, dated Sep. 28, 2016, received in U.S. Appl. No. 14/867,823, 31 pages.
Office Action, dated Sep. 7, 2016, received in Danish Patent Application No. 201500594, which corresponds with U.S. Appl. No. 14/867,823, 4 pages.
Final Office Action, dated Nov. 2, 2016, received in U.S. Appl. No. 14/867,892, 48 pages.
Office Action, dated Sep. 14, 2016, received in Danish Patent Application No. 201500598, which corresponds with U.S. Appl. No. 14/867,892, 4 pages.
Office Action, dated Jul. 5, 2016, received in Chinese Patent Application No. 201620176221.9, which corresponds with U.S. Appl. No. 14/867,990, 4 pages.
Office Action, dated Oct. 25, 2016, received in Chinese Patent Application No. 201620176221.9, which corresponds with U.S. Appl. No. 14/867,990, 7 pages.
Office Action, dated Sep. 26, 2016, received in Danish Patent Application No. 201500581, which corresponds with U.S. Appl. No. 14/867,990, 5 pages.
Office Action, dated Nov. 25, 2016, received in U.S. Appl. No. 15/081,771, 17 pages.
Office Action and Search Report, dated Oct. 17, 2016, received in Danish Patent Application No. 201670587, which corresponds with U.S. Appl. No. 15/231,745, 9 pages.
Office Action and Search Report, dated Oct. 12, 2016, received in Danish Patent Application No. 201670593, which corresponds with U.S. Appl. No. 15/231,745, 7 pages.
Office Action (Search Report), dated Nov. 10, 2016, received in Danish Patent Application No. 201670591, which corresponds with U.S. Appl. No. 15/231,745, 12 pages.
Office Action and Search Report, dated Oct. 26, 2016, received in Danish Patent Application No. 201670592, which corresponds with U.S. Appl. No. 15/231,745, 8 pages.
Extended European Search Report, dated Oct. 7, 2016, received in European Patent Application No. 16177863.4, which corresponds with U.S. Appl. No. 14/536,267, 12 pages.
International Search Report and Written Opinion, dated Oct. 14, 2016, received in International Patent Application No. PCT/US2016/020697, which corresponds with U.S. Appl. No. 14/866,981, 21 pages.
International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Nov. 14, 2016, received in International Patent Application No. PCT/US2016/033541, which corresponds with U.S. Appl. No. 14/866,511, 29 pages.
International Search Report and Written Opinion, dated Aug. 29, 2016, received in International Patent Application No. PCT/US2016/021400, which corresponds with U.S. Appl. No. 14/869,899, 48 pages.
Minsky, "Computational Haptics The Sandpaper System for Synthesizing Texture for a Force-Feedback Display," Massachusetts Institute of Technology, Jun. 1978, 217 pages.
Office Action, dated Jul. 15, 2015, received in Australian Patent Application No. 2013259606, which corresponds with U.S. Appl. No. 14/536,426, 3 pages.
Office Action, dated Jul. 17, 2015, received in Australian Patent Application No. 2013259613, which corresponds with U.S. Appl. No. 14/536,646, 5 pages.
Office Action, dated Jul. 9, 2015, received in Australian Patent Application No. 2013259630, which corresponds with U.S. Appl. No. 14/536,203, 3 pages.
International Preliminary Report on Patentability, dated Jun. 30, 2015, received in International Patent Application No. PCT/US2013/069472, which corresponds with U.S. Appl. No. 14/608,895, 18 pages.
International Preliminary Report on Patentability, dated Jun. 30, 2015, received in International Application No. PCT/2013/069483, which corresponds to U.S. Appl. No. 14/608,942, 13 pages.
International Preliminary Report on Patentability, dated Jun. 30, 2015, received in International Patent Application No. PCT/US2013/069484, which corresponds with U.S. Appl. No. 14/608,965, 12 pages.
International Preliminary Report on Patentability, dated Jun. 30, 2015, received in International Patent Application No. PCT/US2013/069486, which corresponds with U.S. Appl. No. 14/608,985, 19 pages.
International Preliminary Report on Patentability, dated Jun. 30, 2015, received in International Patent Application No. PCT/US2013/069489, which corresponds with U.S. Appl. No. 14/609,006, 10 pages.
Bautista, "Microsoft Mathematics Tutorial 7—The Ink Input", <URL:http://mathandmultimedia.com/2012/05/23/microsoft-math-tutorial-7-ink>, May 23, 2012, 3 pages.
Davidson, et al., "Extending 2D Object Arrangement with Pressure-Sensitive Layering Cues", Proceedings of the 21st Annual ACM Symposium on User Interface Software and Technology, Oct. 19, 2008, 4 pages.
Dinwiddie, et al., "Combined-User Interface for Computers, Television, Video Recorders, and Telephone, Etc", ip.com Journal, Aug. 1, 1990, 3 Pages.
Forlines, et al., "Glimpse: a Novel Input Model for Multi-level Devices", Chi '05 Extended Abstracts on Human Factors in Computing Systems, Apr. 2, 2005, 4 pages.
Harrison, "Stylus-Based Interface with Full Mouse Emulation", IBM Technical Disclosure Bulletin, vol. 34, No. 10B, Mar. 1, 1992, 3 pages.
International Preliminary Report on Patentability dated Nov. 20, 2014, received in International Application No. PCT/US2013/040053, which corresponds to U.S. Appl. No. 14/535,671, 26 pages.
International Preliminary Report on Patentability dated Nov. 20, 2014, received in International Application No. PCT/US2013/040054, which corresponds to U.S. Appl. No. 14/536,235, 11 pages.
International Preliminary Report on Patentability dated Nov. 20, 2014, received in International Application No. PCT/US2013/040056, which corresponds to U.S. Appl. No. 14/536,367, 11 pages.
International Preliminary Report on Patentability dated Nov. 20, 2014, received in International Application No. PCT/US2013/040058, which corresponds to U.S. Appl. No. 14/536,426, 11 pages.
International Preliminary Report on Patentability dated Nov. 20, 2014, received in International Application No. PCT/US2013/040061, which corresponds to U.S. Appl. No. 14/536,464, 26 pages.
International Preliminary Report on Patentability dated Nov. 20, 2014, received in International Application No. PCT/US2013/040067, which corresponds to U.S. Appl. No. 14/536,644, 36 pages.
International Preliminary Report on Patentability dated Nov. 20, 2014, received in International Application No. PCT/US2013/040070, which corresponds to U.S. Appl. No. 14/535,646, 10 pages.

(56) References Cited

OTHER PUBLICATIONS

International Preliminary Report on Patentability dated Nov. 20, 2014, received in International Application No. PCT/US2013/040072, which corresponds to U.S. Appl. No. 14/536,141, 32 pages.
International Preliminary Report on Patentability dated Nov. 20, 2014, received in International Application No. PCT/2013/040087, which corresponds to U.S. Appl. No. 14/536,166, 29 pages.
International Preliminary Report on Patentability dated Nov. 20, 2014, received in International Application No. PCT/2013040093, which corresponds to U.S. Appl. No. 14/536,203, 9 pages.
International Preliminary Report on Patentability dated Nov. 20, 2014, received in International Application No. PCT/2013/040098, which corresponds to U.S. Appl. No. 14/536,247, 27 pages.
International Preliminary Report on Patentability dated Nov. 20, 2014, received in International Application No. PCT/2013/040101, which corresponds to U.S. Appl. No. 14/536,267, 24 pages.
International Preliminary Report on Patentability dated Nov. 20, 2014, received in International Application No. PCT/2013/040108, which corresponds to U.S. Appl. No. 14/536,291, 25 pages.
International Search Report and Written Opinion dated Aug. 6, 2013, received in International Application No. PCT/US2013/040058, which corresponds to U.S. Appl. No. 14/536,426, 12 pages.
International Search Report and Written Opinion dated Aug. 7, 2013, received in International Application No. PCT/US2013/040054, which corresponds to U.S. Appl. No. 14/536,235, 12 pages.
International Search Report and Written Opinion dated Aug. 7, 2013, received in International Application No. PCT/US2013/040056, which corresponds to U.S. Appl. No. 14/536,367, 12 pages.
International Search Report and Written Opinion dated Aug. 7, 2013, received in International Application No. PCT/US2013/040070, which corresponds to U.S. Appl. No. 14/535,646, 12 pages.
International Search Report and Written Opinion dated Aug. 7, 2013, received in International Application No. PCT/US2013/040093, which corresponds to U.S. Appl. No. 14/536,203, 11 pages.
International Search Report and Written Opinion dated Jan. 8, 2014, received in International Application No. PCT/US2013/040108, 30 pages.
International Search Report and Written Opinion dated Jan. 27, 2014, received in International Application No. PCT/US2013/040101, 30 pages.
International Search Report and Written Opinion dated Feb. 5, 2014, received in International Application No. PCT/US2013/040061, which corresponds to U.S. Appl. No. 14/536,464, 30 pages.
International Search Report and Written Opinion dated Feb. 5, 2014, received in International Application No. PCT/US2013/040098, which corresponds to U.S. Appl. No. 14/536,247, 35 pages.
International Search Report and Written Opinion dated Mar. 3, 2014, received in International Application No. PCT/US2013/040087, which corresponds to U.S. Appl. No. 14/536,166, 35 pages.
International Search Report and Written Opinion dated Mar. 6, 2014, received in International Application No. PCT/US2013/069489, 12 pages.
International Search Report and Written Opinion dated Mar. 12, 2014, received in International Application No. PCT/US2013/069479, 14 pages.
International Search Report and Written Opinion dated Apr. 7, 2014, received in International Application No. PCT/US2013/040072, which corresponds to U.S. Appl. No. 14/536,141, 38 pages.
International Search Report and Written Opinion dated Apr. 7, 2014, received in International Application No. PCT/US2013/069483, 18 pages.
International Search Report and Written Opinion dated May 8, 2014, received in International Application No. PCT/US2013/040067, which corresponds to U.S. Appl. No. 14/536,644, 45 pages.
International Search Report and Written Opinion dated Apr. 7, 2014, received in International Application No. PCT/US2013/069472, 24 pages.
International Search Report and Written Opinion dated May 26, 2014, received in International Application No. PCT/US2013/040053, which corresponds to U.S. Appl. No. 14/535,671, 32 pages.
International Search Report and Written Opinion dated Jun. 2, 2014, received in International Application No. PCT/US2013/069486, 7 pages.
International Search Report and Written Opinion dated Jul. 9, 2014, received in International Application No. PCT/US2013/069484, 17 pages.
International Search Report and Written Opinion dated Sep. 30, 2014, received in International Application No. PCT/US2014/047303, 10 pages.
Invitation to Pay Additional Fees dated Aug. 7, 2013, received in International Application No. PCT/US2013/040101, which corresponds to U.S. Appl. No. 14/536,267, 7 pages.
Invitation to Pay Additional Fees dated Aug. 7, 2013, received in International Application No. PCT/US2013/040108, which corresponds to U.S. Appl. No. 14/536,291, 6 pages.
Invitation to Pay Additional Fees dated Sep. 25, 2013, received in International Application No. PCT/US2013/040061, which corresponds to U.S. Appl. No. 14/536,464, 6 pages.
Invitation to Pay Additional Fees dated Sep. 25, 2013, received in International Application No. PCT/US2013/040098, which corresponds to U.S. Appl. No. 14/536,247, 8 pages.
Invitation to Pay Additional Fees dated Oct. 8, 2013, received in International Application No. PCT/US2013/040067, which corresponds to U.S. Appl. No. 14/536,644, 8 pages.
Invitation to Pay Additional Fees dated Oct. 28, 2013, received in International Application No. PCT/US2013/040072, which corresponds to U.S. Appl. No. 14/536,141, 7 pages.
Invitation to Pay Additional Fees dated Oct. 28, 2013, received in International Application No. PCT/US2013/040087, which corresponds to U.S. Appl. No. 14/536,166, 8 pages.
Invitation to Pay Additional Fees dated Feb. 10, 2014, received in International Application No. PCT/US2013/069472, 6 pages.
Invitation to Pay Additional Fees dated Feb. 14, 2014, received in International Application No. PCT/US2013/069483, 7 pages.
Invitation to Pay Additional Fees dated Apr. 1, 2014, received in International Application No. PCT/US2013/069486, 7 pages.
Invitation to Pay Additional Fees dated Apr. 17, 2014, received in International Application No. PCT/US2013/069484, 7 pages.
Kaaresoja, et al., "Snap-Crackle-Pop: Tactile Feedback for Mobile Touch Screens", Proceedings of Eurohaptics vol. 2006, Jul. 3, 2006, 2 pages.
O'Hara, et al., "Pressure-Sensitive Icons", ip.com Journal, Jun. 1, 1990, 2 Pages.
Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.
Rekimoto, et al., "PreSense: Interaction Techniques for Finger Sensing Input Devices", Proceedings of the 16th Annual ACM Symposium on User Interface Software and Technology, Nov. 30, 2003, 10 pages.
Rekimoto, et al., "PreSensell: Bi-directional Touch and Pressure Sensing Interactions with Tactile Feedback", Conference on Human Factors in Computing Systems Archive, ACM, Apr. 22, 2006, 6 pages.
Song, et al., "Grips and Gestures on a Multi-Touch Pen," The ACM CHI Conference on Human Factors in Computing Systems, <URL:research.microsoft.com/pubs/.../gripsandgenstures%20mtpen-chi201>, May 7-12, 2011,10 pages.
Office Action, dated Aug. 27, 2015, received in Australian Patent Application No. 2013259614, which corresponds with U.S. Appl. No. 14/536,141, 4 pages.
Office Action, dated Aug. 10, 2015, received in Australian Patent Application No. 2013259637, which corresponds with U.S. Appl. No. 14/536,203, 3 pages.
Office Action, dated Aug. 18, 2015, received in Australian Patent Application No. 2013259642, which corresponds with U.S. Appl. No. 14/536,291, 3 pages.
Brownlee, "Android 5.0 Lollipop Feature Review!", https//www.youtube.com/watch?v=pEDQ1z1-PvU, Oct. 27, 2014, 5 pages.
Google-Chrome, "Android 5.0 Lollipop", http://androidlover.net/android-os/android-5-0-lollipop/android-5-0-lollipop-recent-apps-card-google-search.html, Oct. 19, 2014, 10 pages.

(56) References Cited

OTHER PUBLICATIONS

YouTube, "How to Master Android Lollipop Notifications in Four Minutes!", Video Gadgets Journal (VGJFelix), https://www.youtube.com/watch!v=S-zBRG7GGJgs, Feb. 8, 2015, 4 pages.
Office Action, dated Jun. 29, 2017, received in U.S. Appl. No. 14/608,895, 30 pages.
Patent, dated May 12, 2017, received in Japanese Patent Application No. 2015-547948, which corresponds with U.S. Appl. No. 14/536,426, 3 pages.
Patent, dated May 26, 2017, received in Korean Patent Application No. 2015-7018851, which corresponds with U.S. Appl. No. 14/536,426, 3 pages.
Office Action, dated Jul. 26, 2017, received in U.S. Appl. No. 14/536,235, 14 pages.
Office action, dated Aug. 3, 2017, received in U.S. Appl. No. 14/536,426, 10 pages.
Office Action, dated May 15, 2017, received in Australian Patent Application No. 2016216580, which corresponds with U.S. Appl. No. 14/536,426, 3 pages.
Office Action, dated Jul. 4, 2017, received in European Patent Application No. 13795392.3, which corresponds with U.S. Appl. No. 14/608,926, 4 pages.
Patent, dated Jun. 30, 2017, received in Korean Patent Application No. 2015-7018853, which corresponds with U.S. Appl. No. 14/608,926, 3 pages.
Patent, dated May 26, 2017, received in European Patent Application No. 13724102.2, which corresponds with U.S. Appl. No. 14/536,646, 1 page.
Office Action, dated Jul. 21, 2017, received in Australian Patent Application No. 2016262773, which corresponds with U.S. Appl. No. 14/536,141, 3 pages.
Notice of Allowance, dated Jun. 30, 2017, received in Japanese Patent Application No. 2015-511646, which corresponds with U.S. Appl. No. 14/536,141, 5 pages.
Office Action, dated Jun. 16, 2017, received in Chinese Patent Application No. 20138068295.X, which corresponds with U.S. Appl. No. 14/608,942, 6 pages.
Notice of Allowance, dated May 12, 2017, received in Japanese Patent Application No. 2015-549393, which corresponds with U.S. Appl. No. 14/608,942, 5 pages.
Patent, dated Jun. 16, 2017, received in Japanese Patent Application No. 2015-549393, which corresponds with U.S. Appl. No. 14/608,942, 3 pages.
Office Action, dated Jul. 17, 2017, received in U.S. Appl. No. 14/536,166, 19 pages.
Office Action, dated Jul. 4, 2017, received in Australian Patent Application No. 2016238917, which corresponds with U.S. Appl. No. 14/536,203, 5 pages.
Office Action, dated Jun. 23, 2017, received in Japanese Patent Application No. 2016173113, which corresponds with U.S. Appl. No. 14/536,203, 5 pages.
Office Action, dated Jul. 21, 2017, received in Australian Patent Application No. 2016216658, which corresponds with U.S. Appl. No. 14/536,291, 3 pages.
Patent, dated May 18, 2017, received in Australian Patent Application No. 2013368445, which corresponds with U.S. Appl. No. 14/608,985, 1 page.
Office Action, dated May 19, 2017, received in Chinese Patent Application No. 201380068399.0, which corresponds with U.S. Appl. No. 14/608,985, 5 pages.
Office Action, dated Jul. 21, 2017, received in Australian Patent Application No. 2016247194, which corresponds with U.S. Appl. No. 14/536,648, 3 pages.
Notice of Allowance, dated Jul. 10, 2017, received in U.S. Appl. No. 14/609,042, 8 pages.
Notice of Allowance, dated Jun. 19, 2017, received in U.S. Appl. No. 14/864,737, 8 pages.
Office Action, dated May 15, 2017, received in Japanese Patent Application No. 2016-558331, which corresponds with U.S. Appl. No. 14/864,737, 5 pages.
Notice of Allowance, dated Jun. 23, 2017, received in Japanese Patent Application No. 2016-558331, which corresponds with U.S. Appl. No. 14/864,737, 5 pages.
Office Action, dated Jul. 7, 2017, received in Danish Patent Application No. 201500575, 4 pages.
Office Action, dated Jul. 6, 2017, received in Danish Patent Application No. 201500574, which corresponds with U.S. Appl. No. 14/866,159, 3 pages.
Office Action, dated Jun. 12, 2017, received in Danish Patent Application No. 201500582, which corresponds with U.S. Appl. No. 14/863,432, 5 pages.
Grant, dated Jul. 21, 2016, received in Dutch Patent Application No. 2016801, which corresponds with U.S. Appl. No. 14/871,227, 8 pages.
Office Action, dated Jun. 9, 2017, received in Japanese Patent Application No. 2016558214, which corresponds with U.S. Appl. No. 14/866,511, 6 pages.
Notice of Allowance, dated Jul. 14, 2017, received in Japanese Patent Application No. 2016558214, which corresponds with U.S. Appl. No. 14/866,511, 5 pages.
Notice of Allowance, dated Jul. 6, 2017, received in U.S. Appl. No. 14/866,489, 12 pages.
Office Action, dated Jul. 3, 2017, received in Danish Patent Application No. 201500592, which corresponds with U.S. Appl. No. 14/869,899, 5 pages.
Office Action, dated May 18, 2017, received in U.S. Appl. No. 14/856,519, 35 pages.
Office Action, dated Jun. 9, 2017, received in U.S. Appl. No. 14/856,520, 36 pages.
Office Action, dated Jun. 30, 2017, received in U.S. Appl. No. 14/856,522, 22 pages.
Notice of Allowance, dated Jun. 16, 2017, received in in U.S. Appl. No. 14/857,645, 5 pages.
Office Action, dated Jun. 15, 2017, received in Danish Patent Application No. 201500579, which corresponds with U.S. Appl. No. 14/866,361, 2 pages.
Office Action, dated Jul. 31, 2017, received in Japanese Patent Application No. 2017126445, which corresponds with U.S. Appl. No. 14/866,987, 6 pages.
Office Action, dated Jun. 16, 2017, received in Japanese Patent Application No. 2016-233450, which corresponds with U.S. Appl. No. 14/866,989, 6 pages.
Office Action, dated Jun. 15, 2017, received in Danish Patent Application No. 201500595, which corresponds with U.S. Appl. No. 14/871,236, 4 pages.
Office Action, dated Aug. 4, 2017, received in Japanese Patent Application No. 2016-533201, which corresponds with U.S. Appl. No. 14/871,227, 6 pages.
Office Action, dated Apr. 20, 2017, received in Chinese Patent Application No. 201621044346.2, which corresponds with U.S. Appl. No. 14/871,462, 3 pages.
Office Action, dated May 15, 2017, received in Danish Patent Application No. 201500594, which corresponds with U.S. Appl. No. 14/867,823, 4 pages.
Office Action, dated Jul. 6, 2017, received in U.S. Appl. No. 14/867,892, 55 pages.
Final Office Action, dated Jun. 2, 2017, received in U.S. Appl. No. 15/081,771, 17 pages.
Office Action, dated May 23, 2017, received in Danish Patent Application No. 201770190, which corresponds with U.S. Appl. No. 15/136,782, 7 pages.
Office Action, dated Jun. 29, 2017, received in Danish Patent Application No. 201670587, which corresponds with U.S. Appl. No. 15/231,745, 4 pages.
Office Action, dated Jul. 6, 2017, received in Danish Patent Application No. 201670590, which corresponds with U.S. Appl. No. 15/231,745, 3 pages.
Office Action, dated Jul. 27, 2017, received in Australian Patent Application No. 2017100535, which corresponds with U.S. Appl. No. 15/272,341, 4 pages.
Office Action, dated Aug. 4, 2017, received in Danish Patent Application No. 201770377, 9 pages.

(56) References Cited

OTHER PUBLICATIONS

Search Report, dated Apr. 13, 2017, received in Dutch Patent Application No. 2016452, which corresponds with U.S. Appl. No. 14/864,737, 22 pages.
Search Report, dated Jun. 22, 2017, received in Dutch Patent Application No. 2016375, which corresponds with U.S. Appl. No. 14/866,981, 17 pages.
Search Report, dated Jun. 19, 2017, received in Dutch Patent Application No. 2016377, which corresponds with U.S. Appl. No. 14/866,159, 13 pages.
Search Report, dated Apr. 13, 2017, received in Dutch Patent Application No. 2016376, which corresponds with U.S. Appl. No. 14/868,078, 15 pages.
Search Report, dated Apr. 18, 2017, received in Dutch Patent Application No. 2016801, which corresponds with U.S. Appl. No. 14/863,432, 34 pages.
Extended European Search Report, dated Jun. 22, 2017, received in European Patent Application No. 16189421.7, which corresponds with U.S. Appl. No. 14/866,987, 7 pages.
Extended European Search Report, dated Jun. 8, 2017, received in European Patent Application No. 16189425.8, which corresponds with U.S. Appl. No. 14/866,989, 8 pages.
Extended European Search Report, dated Jul. 25, 2017, received in European Patent Application No. 17171972.7, which corresponds with U.S. Appl. No. 14/870,882, 12 pages.
Extended European Search Report, dated Jul. 25, 2017, received in European Patent Application No. 17172266.3, which corresponds with U.S. Appl. No. 14/871,336, 9 pages.
Anonymous, "Google Android 5.0 Release Date, Specs and Editors Hands On Review—CNET", http://www.cnet.com/products/google-an-android-5-0-lollipop/, Mar. 12, 2015, 10 pages.
Sood, "MultitaskingGestures", http://cydia.saurik.com/package/org.thebigboxx.multitaskinggestures/, Mar. 3, 2014, 2 pages.
YouTube, "Multitasking Gestures: Zephyr Like Gestures on iOS", https://www.youtube.com/watch?v=Jcod-f7Lw0l, Jan. 27, 2014, 3 pages.
YouTube, "Recentz—Recent Apps in A Tap", https://www.youtube.com/watch?v=qailSHRgsTo, May 15, 2015, 1 page.
Certificate of Grant, dated Apr. 29, 2017, received in Australian Patent Application No. 2013368440, which corresponds with U.S. Appl. No. 14/536,426, 3 pages.
Office Action, dated Sep. 19, 2017, received in Chinese Patent Application No. 201380035982.1, which corresponds with U.S. Appl. No. 14/536,426, 5 pages.
Office Action, dated Sep. 20, 2017, received in Chinese Patent Application No. 201510566550.4, which corresponds with U.S. Appl. No. 14/536,426, 11 pages.
Office Action, dated Aug. 21, 2017, received in European Patent Application No. 15183980.0, which corresponds with U.S. Appl. No. 14/536,426, 3 pages.
Final Office Action, dated Aug. 25, 2017, received in U.S. Appl. No. 14/536,464, 30 pages.
Office Action, dated Sep. 25, 2017, received in U.S. Appl. No. 14/536,644, 29 pages.
Office Action, dated Aug. 22, 2017, received in Korean Patent Application No. 2017-7018250, which corresponds with U.S. Appl. No. 14/608,926, 2 pages.
Notice of Allowance, dated Sep. 20, 2017, received in U.S. Appl. No. 14/536,141, 10 pages.
Patent, dated Jul. 28, 2017, received in Japanese Patent Application No. 2015-511646, which corresponds with U.S. Appl. No. 14/536,141, 3 pages.
Office Action, dated Sep. 13, 2017, received in European Patent Application No. 16177863.4, which corresponds with U.S. Appl. No. 14/536,267, 6 pages.
Notice of Allowance, dated Sep. 1, 2017, received in Korean Patent Application No. 2016-7029533, which corresponds with U.S. Appl. No. 14/536,267, 4 pages.

Notice of Allowance, dated Sep. 19, 2017, received in Chinese Patent Application No. 201380068399.0, which corresponds with U.S. Appl. No. 14/608,985, 3 pages.
Office Action, dated Sep. 19, 2017, received in Korean Patent Application No. 2015-7019984, which corresponds with U.S. Appl. No. 14/608,985, 4 pages.
Final Office Action, dated Sep. 21, 2017, received in U.S. Appl. No. 14/609,006, 17 pages.
Patent, dated Jul. 28, 2017, received in Japanese Patent Application No. 2016-558331, which corresponds with U.S. Appl. No. 14/864,737, 3 pages.
Patent, dated Jul. 12, 2017, received in Dutch Patent Application No. 2016452, which corresponds with U.S. Appl. No. 14/864,737, 2 pages.
Patent, dated Sep. 7, 2017, received in Dutch Patent Application No. 2016377, which corresponds with U.S. Appl. No. 14/866,159, 4 pages.
Office Action, dated Oct. 6, 2017, received in U.S. Appl. No. 14/868,078, 40 pages.
Notice of Allowance, dated Sep. 1, 2017, received in Korean Patent Application No. 2016229421, which corresponds with U.S. Appl. No. 14/868,078, 3 pages.
Patent, dated Sep. 11, 2017, received in Danish Patent Application No. 201500588, which corresponds with U.S. Appl. No. 14/868,078, 5 pages.
Patent, dated Jul. 12, 2017, received in Dutch Patent Application No. 2016376, which corresponds with U.S. Appl. No. 14/868,078, 2 pages.
Notice of Allowance, dated Sep. 18, 2017, received in U.S. Appl. No. 14/863,432, 8 pages.
Notice of Allowance, dated Oct. 4, 2017, received in U.S. Appl. No. 14/866,511, 37 pages.
Patent, dated Aug. 18, 2017, received in Japanese Patent Application No. 2016558214, which corresponds with U.S. Appl. No. 14/866,511, 3 pages.
Final Office Action, dated Oct. 3, 2017, received in U.S. Appl. No. 14/866,992, 37 pages.
Office Action, dated Sep. 5, 2017, received in Danish Patent Application No. 201500593, which corresponds with U.S. Appl. No. 14/866,992, 6 pages.
Final Office Action, dated Oct. 4, 2017, received in U.S. Appl. No. 14/856,517, 33 pages.
Office Action, dated Sep. 22, 2017, received in Japanese Patent Application No. 2017-029201, which corresponds with U.S. Appl. No. 14/857,636 8 pages.
Notice of Allowance, dated Sep. 29, 2017, received in Danish Patent Application No. 201670463, which corresponds with U.S. Appl. No. 14/866,987, 2 pages.
Notice of Allowance, dated Sep. 22, 2017, received in Japanese Patent Application No. 2016-233449, which corresponds with U.S. Appl. No. 14/866,987, 5 pages.
Office Action, dated Sep. 1, 2017, received in U.S. Appl. No. 14/870,754, 22 pages.
Office Action, dated Sep. 1, 2017, received in U.S. Appl. No. 14/870,988, 14 pages.
Office Action, dated Sep. 29, 2017, received in Australian Patent Application No. 2016231505, which corresponds with U.S. Appl. No. 14/871,462, 5 pages.
Final Office Action, dated Aug. 18, 2017, received in U.S. Appl. No. 14/869,873, 20 pages.
Office Action, dated Aug. 29, 2017, received in Korean Patent Application No. 2017-7014536, which corresponds with U.S. Appl. No. 15/081,771, 5 pages.
Notice of Allowance, dated Jul. 6, 2017, received in U.S. Appl. No. 15/231,745, 18 pages.
Office Action, dated Aug. 30, 2017, received in U.S. Appl. No. 15/655,749, 22 pages.
Extended European Search Report, dated Sep. 11, 2017, received in European Patent Application No. 17163309.2, which corresponds with U.S. Appl. No. 14/866,987, 8 pages.
Angelov, "Sponsor Flip Wall With Jquery & CSS", Tutorialzine. N.p., Mar. 24, 2010. Web. http://tutorialzine.com/2010/03/sponsor-wall-slip-jquery-css/, Mar. 24, 2010, 8 pages.

(56) References Cited

OTHER PUBLICATIONS

Anonymous, "Notifications, Android 4.4 and Lower", Android Developers, https://developer.android.com/design/patterns/notifications_k.html, May 24, 2015, 9 pages.
Dzyre, "10 Android Notification Features You Can Fiddle With", http://www.hongkiat.com/blog/android-notification-features, Mar. 10, 2014, 10 pages.
Elliot, "Mac System 7", YouTube. Web. Mar. 8, 2017, http://www.youtube.com/watch?v=XLv22hfuuik, Aug. 3, 2011, 1 page.
Gonzalo et al., "Zliding: Fluid Zooming and Sliding for High Precision Parameter Manipulation", Department of Computer Science, University of Toronto, Seattle, Washington, Oct. 23, 2005, 10 pages.
Grant, "Android's Notification Center", https://www.objc.io/issues/11-android/android-notifications, Apr. 30, 2014, 26 pages.
Kost, "LR3-Deselect All Images But One", Julieanne Kost's Blog, blogs.adobe.com/jkost/2011/12/lr3-deselect-all-images-but-one.html, Dec. 22, 2011, 1 page.
Microsoft, "Lumia—How to Personalize Your Start Screen", https://www.youtube.com/watch?v=6GI5Z3TrSEs, Nov. 11, 2014, 3 pages.
Notice of Allowance, dated Dec. 20, 2016, received in Australian Patent Application No. 2013368440, which corresponds with U.S. Appl. No. 14/536,426, 3 pages.
Office Action, dated Feb. 24, 2017, received in Korean Patent Application No. 10-2015-7018851, which corresponds with U.S. Appl. No. 14/536,426, 3 pages.
Office Action, dated Jan. 20, 2017, received in European Patent Application No. 15183980.0, which corresponds with U.S. Appl. No. 14/536,426, 5 pages.
Office Action, dated Feb. 6, 2017, received in Japanese Patent Application No. 2015-511644, which corresponds with U.S. Appl. No. 14/536,426, 6 pages.
Office Action, dated Mar. 9, 2017, received in U.S. Appl. No. 14/536,464, 21 pages.
Office Action, dated Jan. 3, 2017, received in Australian Patent Application No. 2016201451, which corresponds with U.S. Appl. No. 14/608,926, 3 pages.
Notice of Allowance, dated Jan. 17, 2017, received in Japanese Patent Application No. 2015-549392, which corresponds with U.S. Appl. No. 14/608,926, 2 pages.
Patent, dated Feb. 17, 2017, received in Japanese Patent Application No. 2015-549392, which corresponds with U.S. Appl. No. 14/608,926, 3 pages.
Office Action, dated Dec. 1, 2016, received in Chinese Patent Application No. 2013800362059, which corresponds with U.S. Appl. No. 14/536,646, 3 pages.
Notice of Allowance, dated Jan. 4, 2017, received in European Patent Application No. 13724102.2, which corresponds with U.S. Appl. No. 14/536,646, 5 pages.
Notice of Allowance, dated Dec. 22, 2016, received in Japanese Patent Application No. 2015-511645, which corresponds with U.S. Appl. No. 14/536,646, 2 pages.
Office Action, dated Mar. 3, 2017, received in Chinese Patent Application No. 201380035893.7, which corresponds with U.S. Appl. No. 14/536,646, 8 pages.
Office Action, dated Dec. 8, 2016, received in U.S. Appl. No. 14/608,942, 9 pages.
Office Action, dated Feb. 24, 2017, received in Korean Patent Application No. 2015-7018448, which corresponds with U.S. Appl. No. 14/536,141, 4 pages.
Notice of Allowance, dated Feb. 1, 2017, received in U.S. Appl. No. 14/536,203, 9 pages.
Office Action, dated Feb. 6, 2017, received in Korean Patent Application No. 2016-7033834, which corresponds with U.S. Appl. No. 14/536,203, 4 pages.
Final Office Action, dated Mar. 24, 2017, received in U.S. Appl. No. 14/536,247, 14 pages.
Office Action, dated Mar. 24, 2017, received in U.S. Appl. No. 14/536,267, 12 pages.
Office Action, dated Mar. 24, 2017, received in Australian Patent Application No. 2016204411, which corresponds with U.S. Appl. No. 14/536,267, 3 pages.
Office Action, dated Dec. 9, 2016, received in Chinese Patent Application No. 2016120601564130, which corresponds with U.S. Appl. No. 14/536,267, 4 pages.
Office Action, dated Mar. 3, 2017, received in Japanese Patent Application No. 2016-125839, which corresponds with U.S. Appl. No. 14/536,267, 6 pages.
Office Action, dated Jan. 5, 2017, received in Korean Patent Application No. 2016-7029533, which corresponds with U.S. Appl. No. 14/536,267, 2 pages.
Final Office Action, dated Dec. 22, 2016, received in Japanese Patent Application No. 2015-511655, which corresponds with U.S. Appl. No. 14/536,291, 3 pages.
Notice of Allowance, dated Jan. 18, 2017, received in Australian Patent Application No. 2013368445, which corresponds with U.S. Appl. No. 14/608,985, 3 pages.
Office Action, dated Feb. 27, 2017, received in European Patent Application No. 13811032.5, which corresponds with U.S. Appl. No. 14/608,985, 6 pages.
Notice of Allowance, dated Jan. 24, 2017, received in Japanese Patent Application No. 2015-550384, which corresponds with U.S. Appl. No. 14/608,985, 5 pages.
Patent, dated Feb. 24, 2017, received in Japanese Patent Application No. 2015-550384, which corresponds with U.S. Appl. No. 14/608,985, 2 pages.
Office Action, dated Mar. 24, 2017, received in U.S. Appl. No. 14/609,006, 13 pages.
Office Action, dated Jan. 19, 2017, received in U.S. Appl. No. 14/609,042, 12 pages.
Notice of Allowance, dated Feb. 27, 2017, received in U.S. Appl. No. 14/864,737, 9 pages.
Notice of Allowance, dated Feb. 10, 2017, received in U.S. Appl. No. 14/866,981, 5 pages.
Office Action, dated Dec. 5, 2016, received in Danish Patent Application No. 201500575, which corresponds with U.S. Appl. No. 14/866,981, 3 pages.
Office Action, dated Mar. 14, 2017, received in Danish Patent Application No. 201500574, which corresponds with U.S. Appl. No. 14/866,159, 5 pages.
Notice of Allowance, dated Jan. 30, 2017, received in received in Danish Patent Application No. 201500588, which corresponds with U.S. Appl. No. 14/868,078, 2 pages.
Notice of Allowance, dated Jan. 12, 2017, received in Chinese Patent Application No. 201620470063.8, which corresponds with U.S. Appl. No. 14/863,432, 1 page.
Final Office Action, dated Jan. 27, 2017, received in U.S. Appl. No. 14/866,511, 26 pages.
Notice of Allowance, dated Jan. 12, 2017, received in Chinese Patent Application No. 201620470281.1, which corresponds with U.S. Appl. No. 14/866,511, 1 page.
Patent, dated Jan. 23, 2017, received in Danish Patent Application No. 201500576, which corresponds with U.S. Appl. No. 14/866,511, 3 pages.
Notice of Allowance, dated Feb. 28, 2017, received in U.S. Appl. No. 14/869,899, 9 pages.
Office Action, dated Feb. 7, 2017, received in Australian Patent Application No. 2016101418, which corresponds with U.S. Appl. No. 14/866,992, 5 pages.
Office Action, dated Feb. 6, 2017, received in Danish Patent Application No. 201500593, which corresponds with U.S. Appl. No. 14/866,992, 4 pages.
Notice of Allowance, dated Jan. 4, 2017, received in U.S. Appl. No. 14/845,217, 5 pages.
Notice of Allowance, dated Dec. 28, 2016, received in U.S. Appl. No. 14/864,580, 8 pages.
Notice of Allowance, dated Jan. 31, 2017, received in U.S. Appl. No. 14/864,627, 7 pages.
Certificate of Examination, dated Dec. 8, 2016, received in Australian Patent Application No. 2016100292, which corresponds with U.S. Appl. No. 14/866,361, 1 page.

(56) References Cited

OTHER PUBLICATIONS

Patent, dated Sep. 19, 2016, received in German Patent Application No. 202016002908.9, which corresponds with U.S. Appl. No. 14/866,987, 3 pages.
Notice of Allowance, dated Jan. 31, 2017, received in Danish Patent Application No. 201670463, which corresponds with U.S. Appl. No. 14/866,987, 3 pages.
Notice of Allowance, dated Feb. 28, 2017, received in U.S. Appl. No. 14/871,236, 9 pages.
Notice of Allowance, dated Mar. 23, 2017, received in Danish Patent Application No. 201500601, which corresponds with U.S. Appl. No. 14/871,336, 2 pages.
Office Action, dated Mar. 13, 2017, received in Japanese Patent Application No. 2016-183289, which corresponds with U.S. Appl. No. 14/871,462, 5 pages.
Office Action, dated Mar. 1, 2017, received in U.S. Appl. No. 14/869,855, 14 pages.
Office Action, dated Feb. 9, 2017, received in U.S. Appl. No. 14/869,873, 17 pages.
Office Action, dated Jan. 20, 2017, received in U.S. Appl. No. 15/231,745, 21 pages.
Office Action (Search Report), dated Dec. 14, 2016, received in Danish Patent Application No. 201670590, which corresponds with U.S. Appl. No. 15/231,745, 9 pages.
Office Action, dated Jan. 5, 2017, received in Danish Patent Application No. 201670592, which corresponds with U.S. Appl. No. 15/231,745, 3 pages.
Extended European Search Report, dated Mar. 15, 2017, received in European Patent Application No. 17153418.3, which corresponds with U.S. Appl. No. 14/536,648, 7 pages.
International Search Report and Written Opinion, dated Jan. 12, 2017, received in International Patent No. PCT/US2016/046419, which corresponds with U.S. Appl. No. 14/866,992, 23 pages.
International Search Report and Written Opinion, dated Dec. 15, 2016, received in International Patent Application No. PCT/US2016/046403, which corresponds with U.S. Appl. No. 15/009,661, 17 pages.
International Search Report and Written Opinion, dated Feb. 27, 2017, received in International Patent Application No. PCT/US2016/046407, which corresponds with U.S. Appl. No. 15/009,688, 30 pages.
Extended European Search Report, dated Dec. 21, 2016, received in European Patent Application No. 16189790.5, which corresponds with U.S. Appl. No. 14/871,462, 8 pages.
International Search Report and Written Opinion, dated Jan. 3, 2017, received in International Patent Application No. PCT/US2016/046214, which corresponds with U.S. Appl. No. 15/231,745, 25 pages.
IPhoneOperator, "Wasser Liveeffekt fur Homescreen & Lockscreen—Aquaboard (Cydia)", http://www.youtube.com/watch?v=fG9YMF-mB0Q, Sep. 22, 2012, 3 pages.
Office Action, dated Mar. 15, 2017, received in U.S. Appl. No. 14/535,671, 13 pages.
Office Action, dated May 4, 2017, received in Chinese Patent Application No. 201380068414.1, which corresponds with U.S. Appl. No. 14/608,926, 5 pages.
Notice of Allowance, dated Mar. 31, 2017, received in Korean Patent Application No. 2015-7018853, which corresponds with U.S. Appl. No. 14/608,926, 4 pages.
Office Action, dated Apr. 3, 2017, received in U.S. Appl. No. 14/536,141, 11 pages.
Notice of Allowance, dated May 12, 2017, received in U.S. Appl. No. 14/608,942, 10 pages.
Office Action, dated Mar. 29, 2017, received in Australian patent Application No. 2016201303, which corresponds with U.S. Appl. No. 14/608,942, 3 pages.
Office Action, dated Apr. 7, 2017, received in U.S. Appl. No. 14/536,291, 11 pages.
Office Action, dated Mar. 23, 2017, received in European Patent Application No. 13724107.1, which corresponds with U.S. Appl. No. 14/536,291, 8 pages.
Office Action, dated Apr. 19, 2017, received in U.S. Appl. No. 14/536,296, 12 pages.
Notice of Allowance, dated May 2, 2017, received in received in Danish Patent Application No. 201500588, which corresponds with U.S. Appl. No. 14/868,078, 2 pages.
Notice of Allowance, dated Apr. 27, 2017, received in U.S. Appl. No. 14/863,432, 7 pages.
Notice of Allowance, dated Apr. 27, 2017, received in U.S. Appl. No. 16/866,489, 27 pages.
Office Action, dated Apr. 13, 2017, received in U.S. Appl. No. 14/866,992, 34 pages.
Office Action, dated May 2, 2017, received in U.S. Appl. No. 14/856,517, 34 pages.
Office Action, dated Mar. 31, 2017, received in U.S. Appl. No. 14/857,700, 14 pages.
Office Action, dated May 5, 2017, received in Danish Patent Application No. 201500584, which corresponds with U.S. Appl. No. 14/864,580, 3 pages.
Notice of Allowance, dated Apr. 20, 2017, received in U.S. Appl. No. 14/864,601, 13 pages.
Office Action, dated May 4, 2017, received in Danish Patent Application No. 201500585, which corresponds with U.S. Appl. No. 14/864,627, 4 pages.
Patent, dated May 3, 2017, received in Chinese Patent Application No. 2016201470246.X, which corresponds with U.S. Appl. No. 14/866,987, 2 pages.
Office Action, dated Apr. 19, 2017, received in Danish Patent Application No. 201670463, which corresponds with U.S. Appl. No. 14/866,987, 3 pages.
Office Action, dated Apr. 13, 2017, received in Australian Patent Application No. 2016101431, which corresponds with U.S. Appl. No. 14/871,227, 4 pages.
Office Action, dated Mar. 24, 2017, received in Japanese Patent Application No. 2016-533201, which corresponds with U.S. Appl. No. 14/871,227, 6 pages.
Office Action, dated Apr. 11, 2017, received in Australian Patent Application No. 2016101437, which corresponds with U.S. Appl. No. 14/871,336, 4 pages.
Office Action, dated May 11, 2017, received in U.S. Appl. No. 14/867,823, 42 pages.
Office Action, dated May 4, 2017, received in Danish Patent Application No. 201500598, which corresponds with U.S. Appl. No. 14/867,892, 4 pages.
Office Action, dated May 3, 2017, received in Danish Patent Application No. 201500581, which corresponds with U.S. Appl. No. 14/867,990, 5 pages.
Final Office Action, dated May 1, 2017, received in U.S. Appl. No. 15/136,782, 18 pages.
Office Action, dated Nov. 6, 2017, received in Chinese Patent Application No. 201380068493.6, which corresponds with U.S. Appl. No. 14/608,895, 5 pages.
Office Action, dated Oct. 19, 2017, received in U.S. Appl. No. 14/608,926, 14 pages.
Notice of Allowance, dated Oct. 9, 2017, received in Chinese Patent Application No. 2013800362059, which corresponds with U.S. Appl. No. 14/536,646, 3 pages.
Office Action, dated Oct. 19, 2017, received in U.S. Appl. No. 14/536,646, 21 pages.
Office Action, dated Oct. 25, 2017, received in Chinese Patent Application No. 201380035977.0, which corresponds with U.S. Appl. No. 14/536,203, 5 pages.
Notice of Allowance, dated Oct. 30, 2017, received in Korean Patent Application No. 2016-7033834, which corresponds with U.S. Appl. No. 14/536,203, 5 pages.
Office Action, dated Oct. 20, 2017, received in U.S. Appl. No. 14/608,965, 14 pages.
Office action, dated Oct. 11, 2017, received in Chinese Patent Application No. 201380074060.1, which corresponds with U.S. Appl. No. 14/608,965, 5 pages.

(56) References Cited

OTHER PUBLICATIONS

Notice of Allowance, dated Nov. 22, 2017, received in U.S. Appl. No. 14/536,247, 6 pages.
Notice of Allowance, dated Nov. 9, 2017, received in U.S. Appl. No. 14/536,267, 8 pages.
Notice of Allowance, dated Nov. 17, 2017, received in Japanese Patent Application No. 2016-125839, which corresponds with U.S. Appl. No. 14/536,267, 5 pages.
Office Action, dated Oct. 23, 2017, received in Chinese Patent Application No. 201380035986.X, which corresponds with U.S. Appl. No. 14/536,291, 9 pages.
Office Action, dated Oct. 19, 2017, received in U.S. Appl. No. 14/608,985, 13 pages.
Summons, dated Oct. 6, 2017, received in European Patent Application No. 13811032.5, which corresponds with U.S. Appl. No. 14/608,985, 6 pages.
Final Office Action, dated Nov. 2, 2017, received in U.S. Appl. No. 14/536,296, 13 pages.
Office Action, dated Nov. 1, 2017, received in U.S. Appl. No. 14/536,648, 22 pages.
Final Office Action, dated Nov. 15, 2017, received in U.S. Appl. No. 14/856,519, 31 pages.
Final Office Action, dated Oct. 11, 2017, received in U.S. Appl. No. 14/857,700, 13 pages.
Patent, dated Nov. 6, 2017, received in Danish Patent Application No. 201670463, which corresponds with U.S. Appl. No. 14/866,987, 6 pages.
Patent, dated Oct. 27, 2017, received in Japanese Patent Application No. 2016-233449, which corresponds with U.S. Appl. No. 14/866,987, 3 pages.
Office Action, dated Nov. 14, 2017, received in U.S. Appl. No. 14/870,882, 25 pages.
Notice of Allowance, dated Oct. 31, 2017, received in Danish Patent Application No. 201500596, which corresponds with U.S. Appl. No. 14/870,882, 2 pages.
Office Action, dated Nov. 22, 2017, received in U.S. Appl. No. 14/871,227, 24 pages.
Office Action, dated Oct. 16, 2017, received in Australian Patent Application No. 2016203040, which corresponds with U.S. Appl. No. 14/871,227, 5 pages.
Office Action, dated Oct. 26, 2017, received in U.S. Appl. No. 14/871,336, 22 pages.
Office Action, dated Oct. 16, 2017, received in U.S. Appl. No. 14/871,462, 26 pages.
Innovation Patent, dated Oct. 11, 2017, received in Australian Patent Application No. 2016231505, which corresponds with U.S. Appl. No. 14/871,462, 1 page.
Office Action, dated Nov. 13, 2017, received in Japanese Patent Application No. 2016-183289, which corresponds with U.S. Appl. No. 14/871,462, 5 pages.
Office Action, dated Oct. 31, 2017, received in Danish Patent Application No. 201500598, which corresponds with U.S. Appl. No. 14/867,892, 2 pages.
Final Office Action, dated Oct. 10, 2017, received in U.S. Appl. No. 14/869,855, 16 pages.
Notice of Allowance, dated Oct. 20, 2017, received in U.S. Appl. No. 15/136,782, 9 pages.
Patent, dated Oct. 30, 2017, received in Danish Patent Application No. 201670593, which corresponds with U.S. Appl. No. 15/231,745, 3 pages.
Office Action, dated Oct. 16, 2017, received in Danish Patent Application No. 201770710, 10 pages.
Office Action, dated Oct. 31, 2017, received in U.S. Appl. No. 15/723,069, 7 pages.
Extended European Search Report, dated Oct. 17, 2017, received in European Patent Application No. 17184437.6, Which corresponds with U.S. Appl. No. 14/868,078, 8 pages.
Extended European Search Report, dated Oct. 10, 2017, received in European Patent Application No. 17188507.2, which corresponds with U.S. Appl. No. 14/866,361, 9 pages.
VisioGuy, "Getting a Handle on Selecting and Subselecting Visio Shapes", http://www.visguy.com/2009/10/13/getting-a-handle-on-selecting-and-subselecting-visio-shapes/, Oct. 13, 2009, 18 pages.
Office Action, dated Nov. 30, 2017, received in U.S. Appl. No. 14/535,671, 21 pages.
Notice of Allowance, dated Dec. 1, 2017, received in U.S. Appl. No. 14/536,291, 19 pages.
Office Action, dated Dec. 15, 2017, received in U.S. Appl. No. 14/866,159, 35 pages.
Office Action, dated Jan. 29, 2018, received in U.S. Appl. No. 14/866,992, 44 pages.
Office Action, dated Jan. 18, 2018, received in U.S. Appl. No. 15/009,676, 21 pages.
Notice of Allowance, dated Jan. 31, 2018, received in U.S. Appl. No. 14/856,519, 9 pages.
Office Action, dated Nov. 30, 2017, received in U.S. Appl. No. 14/857,636, 19 pages.
Office Action, dated Dec. 1, 2017, received in U.S. Appl. No. 14/857,663, 15 pages.
Office Action, dated Jan. 22, 2018, received in U.S. Appl. No. 14/866,987, 22 pages.
Office Action, dated Nov. 29, 2017, received in U.S. Appl. No. 14/866,989, 31 pages.
Final Office Action, dated Nov. 29, 2017, received in U.S. Appl. No. 14/867,823, 47 pages.
Final Office Action, dated Dec. 14, 2017, received in U.S. Appl. No. 14/867,892, 53 pages.
Office Action, dated Jan. 23, 2018, received in U.S. Appl. No. 14/869,855, 24 pages.
Office Action, dated Jan. 18, 2018, received in U.S. Appl. No. 14/869,873, 25 pages.
Office Action, dated Jan. 11, 2018, received in U.S. Appl. No. 14/869,997, 17 pages.
Notice of Allowance, dated Jan. 17, 2018, received in U.S. Appl. No. 14/867,990, 12 pages.
Office Action, dated Dec. 12, 2017, received in U.S. Appl. No. 15/009,668, 32 pages.
Notice of Allowance, dated Dec. 4, 2017, received in U.S. Appl. No. 15/081,771, 10 pages.
Notice of Allowance, dated Dec. 21, 2017, received in U.S. Appl. No. 15/723,069, 7 pages.
MacKenzie et al., "The Tactile Touchpad", Chi '97 Extended Abstracts on Human Factors in Computing Systems Looking to the Future, Chi '97, Mar. 22, 1997, 5 pages.
YouTube, "HTC One Favorite Camera Features", http://www.youtube.com/watch?v=sUYHfcjI4RU, Apr. 28, 2013, 3 pages.
Certificate of Grant, dated Nov. 10, 2017, received in Hong Kong Patent Application No. 15107535.0, which corresponds with U.S. Appl. No. 14/536,426, 2 pages.
Notice of Allowance, dated Dec. 8, 2017, received in Japanese Patent Application No. 2015-511644, which corresponds with U.S. Appl. No. 14/536,426, 6 pages.
Patent, dated Jan. 12, 2018, received in Japanese Patent Application No. 2015511644, which corresponds with U.S. Appl. No. 14/536,426, 3 pages.
Notice of Acceptance, dated Dec. 20, 2017, received in Australian Patent Application No. 2016201451, which corresponds with U.S. Appl. No. 14/608,926, 3 pages.
Notice of Allowance, dated Dec. 29, 2017, received in Korean Patent Application No. 2017-7018250, which corresponds with U.S. Appl. No. 14/608,926, 3 pages.
Office Action, dated Dec. 6, 2017, received in European Patent Application No. 13724104.8, which corresponds with U.S. Appl. No. 14/536,203, 9 pages.
Notice of Allowance, dated Jan. 12, 2018, received in Japanese Patent Application No. 2016173113, which corresponds with U.S. Appl. No. 14/536,203, 5 pages.
Patent, dated Jan. 23, 2018, received in Korean Patent Application No. 2016-7033834, which corresponds with U.S. Appl. No. 14/536,203, 4 pages.
Office Action, dated Jan. 25, 2018, received in European Patent Application No. 13724106.3, which corresponds with U.S. Appl. No. 14/536,267, 5 pages.

(56) References Cited

OTHER PUBLICATIONS

Patent, dated Dec. 1, 2017, received in Korean Patent Application No. 2016-7029533, which corresponds with U.S. Appl. No. 14/536,267, 2 pages.
Patent, dated Dec. 8, 2017, received in Chinese Patent Application No. 201380068399.0, which corresponds with U.S. Appl. No. 14/608,985, 4 pages.
Patent, dated Dec. 19, 2017, received in Korean Patent Application No. 2015-7019984, which corresponds with U.S. Appl. No. 14/608,985, 3 pages.
Office Action, dated Jan. 10, 2018, received in Danish Patent Application No. 201500574, which corresponds with U.S. Appl. No. 14/866,159, 2 pages.
Certificate of Grant, dated Jan. 3, 2018, received in Australian Patent Application No. 2016229421, which corresponds with U.S. Appl. No. 14/868,078, 1 page.
Office Action, dated Nov. 24, 2017, received in European Patent Application No. 16727900.9, which corresponds with U.S. Appl. No. 14/866,511, 5 pages.
Office Action, dated Dec. 14, 2017, received in Danish Patent Application No. 201670594, which corresponds with U.S. Appl. No. 14/869,899, 3 pages.
Office Action, dated Jan. 19, 2018, received in Australian Patent Application No. 201761478, which corresponds with U.S. Appl. No. 14/866,992, 6 pages.
Office Action, dated Jan. 17, 2018, received in Australian Patent Application No. 2017202816, which corresponds with U.S. Appl. No. 14/857,636, 3 pages.
Office Action, dated Dec. 15, 2017, received in Danish Patent Application No. 201500584, which corresponds with U.S. Appl. No. 14/864,580, 4 pages.
Office Action, dated Dec. 15, 2017, received in Danish Patent Application No. 201500585, which corresponds with U.S. Appl. No. 14/864,627, 5 pages.
Office Action, dated Jan. 4, 2018, received in Danish Patent Application No. 201500579, which corresponds with U.S. Appl. No. 14/866,361, 2 pages.
Notice of Allowance, dated Jan. 4, 2018, received in Japanese Patent Application No. 2016-533201, which corresponds with U.S. Appl. No. 14/871,227, 4 pages.
Office Action, dated Jan. 23, 2018, received in Danish Patent Application No. 201500594, which corresponds with U.S. Appl. No. 14/867,823, 8 pages.
Office Action, dated Feb. 1, 2018, received in Australian Patent Application No. 2017202058, which corresponds with U.S. Appl. No. 15/081,771, 4 pages.
Office Action, dated Jan. 26, 2018, received in Japanese Patent Application No. 2017-086460, which corresponds with U.S. Appl. No. 15/081,771, 6 pages.
Office Action, dated Jan. 8, 2018, received in Danish Patent Application No. 201770190, which corresponds with U.S. Appl. No. 15/136,782, 2 pages.
Office Action, dated Jan. 10, 2018, received in Danish Patent Application No. 201670590, which corresponds with U.S. Appl. No. 15/231,745, 2 pages.
Extended European Search Report, dated Nov. 24, 2017, received in European Patent Application No. 17186744.3, which corresponds with U.S. Appl. No. 14/536,291, 10 pages.
Notice of Allowance, dated Jun. 26, 2018, received in U.S. Appl. No. 14/608,895, 9 pages.
Final Office Action, dated Jun. 22, 2018, received in U.S. Appl. No. 14/536,464, 32 pages.
Final Office Action, dated Jun. 6, 2018, received in U.S. Appl. No. 14/608,926, 19 pages.
Office Action, dated Jul. 2, 2018, received in U.S. Appl. No. 14/608,965, 16 pages.
Notice of Allowance, dated Jun. 1, 2018, received in U.S. Appl. No. 14/536,267, 5 pages.
Notice of Allowance, dated May 18, 2018, received in U.S. Appl. No. 14/866,159, 8 pages.
Notice of Allowance, dated May 24, 2018, received in U.S. Appl. No. 14/868,078, 6 pages.
Notice of Allowance, dated Jun. 29, 2018, received in U.S. Appl. No. 14/856,517, 11 pages.
Final Office Action, dated Jul. 3, 2018, received in U.S. Appl. No. 14/866,989, 17 pages.
Notice of Allowance, dated Jul. 2, 2018, received in U.S. Appl. No. 14/870,754, 9 pages.
Notice of Allowance, dated Jun. 11, 2018, received in U.S. Appl. No. 14/871,227, 11 pages.
Notice of Allowance, dated May 31, 2018, received in U.S. Appl. No. 14/869,855, 10 pages.
Final Office Action, dated May 23, 2018, received in U.S. Appl. No. 14/869,873, 18 pages.
Final Office Action, dated Jul. 3, 2018, received in U.S. Appl. No. 15/009,668, 19 pages.
Anonymous, "1-Click Installer for Windows Media Taskbar Mini-Player for Windows 7, 8, 8.1 10", http://metadataconsulting.blogspot.de/2014/05/installer-for-windows-media-taskbar.htm, May 5, 2014, 6 pages.
Anonymous, "[new] WMP12 with Taskbar Toolbar for Windows 7—Windows Customization—WinMatrix", hrrp://www.winmatrix.com/forums/index/php?/topic/25528-new-wmp12-with-taskbar-toolbar-for-windows-7, Jan. 27, 2013, 6 pages.
Anonymous, "Taskbar Extensions", https://web.archive.org/web/2014122812443/http://msdn.microsoft.com:80/en-us/library/windows/desktop/dd378460(v=vs.85).aspx, Dec. 28, 2014, 8 pages.
Oh, et al., "Moving Objects with 2D Input Devices in CAD Systems and Destop Virtual Environments", Proceedings of Graphics Interface 2005, 8 pages, May 2005.
Stewart, et al., "Characteristics of Pressure-Based Input for Mobile Devices", Proceedings of the SIGCHI Conference on Human Factors in Computing Systems, Apr. 2010, 10 pages.
Notice of Allowance, dated May 17, 2018, received in Australian Patent Application No. 2016216580, which corresponds with U.S. Appl. No. 14/536,426, 3 pages.
Certificate of Grant, date May 3, 2018, received in Australian Patent Application No. 2016201451, which corresponds with U.S. Appl. No. 14/608,926, 1 page.
Patent, dated May 4, 2018, received in Chinese Patent Application No. 201380068414.1, which corresponds with U.S. Appl. No. 14/608,926, 4 pages.
Patent, dated Apr. 27, 2018, received in Japanese Patent Application No. 2017-024234, which corresponds with U.S. Appl. No. 14/608,926, 3 pages.
Office Action, dated Jun. 13, 2018, received in Chinese Patent Application No. 201810332044.2, which corresponds with U.S. Appl. No. 14/536,267, 2 pages.
Intention to Grant, dated Jun. 27, 2018, received in European Patent Application No. 13724106.3, which corresponds with U.S. Appl. No. 14/536,267, 5 pages.
Office Action, dated Jun. 29, 2018, received in Japanese Patent Application No. 2017-083027, which corresponds with U.S. Appl. No. 14/536,291, 5 pages.
Grant Certificate, dated Apr. 25, 2018, received in European Patent Application No. 16710871.1, which corresponds with U.S. Appl. No. 14/864,737, 2 pages.
Office Action, dated Jun. 5, 2018, received in Chinese Patent Application No. 201610137839.9, which corresponds with U.S. Appl. No. 14/866,159, 11 pages.
Patent, dated May 22, 2018, received in Danish Patent Application No. 201500574, which corresponds with U.S. Appl. No. 14/866,159, 2 pages.
Office Action, dated May 24, 2018, received in European Patent Application No. 16727900.9, which corresponds with U.S. Appl. No. 14/866,511, 7 pages.
Patent, dated May 28, 2018, received in Danish Patent Application No. 201500592, which corresponds with U.S. Appl. No. 14/869,899, 2 pages.
Office Action, dated Jun. 25, 2018, received in Japanese Patent Application No. 2017-029201, which corresponds with U.S. Appl. No. 14/857,636, 4 pages.

(56) References Cited

OTHER PUBLICATIONS

Patent, dated May 22, 2018, received in Danish Patent Application No. 201500579, which coresponds with U.S. Appl. No. 14/866,361, 2 pages.
Office Action, dated Jun. 11, 2018, received in European Patent Application No. 17188507.2, which corresponds with U.S. Appl. No. 14/866,361, 10 pages.
Patent, dated Jun. 18, 2018, received in Danish Patent Application No. 201500595, which corresponds with U.S. Appl. No. 14/871,236, 3 pages.
Notice of Allowance, dated Jun. 28, 2018, received in Korean Patent Application No. 2017-7014536, which corresponds with U.S. Appl. No. 15/081,771, 4 pages.
Patent, dated May 22, 2018, received in Danish Patent Application No. 201770190, which corresponds with U.S. Appl. No. 15/136,782, 2 pages.
Office Action, dated Jun. 1, 2018, received in Japanese Patent Application No. 2018-062161, which corresponds with U.S. Appl. No. 15/136,782, 5 pages.
Patent, dated May 28, 2018, received in Danish Patent Application No. 201670590, which corresponds with U.S. Appl. No. 15/231,745, 2 pages.
Patent, dated May 28, 2018, received in Danish Patent Application No. 201670592, which corresponds with U.S. Appl. No. 15/231,745, 2 pages.
Extended European Search Report, dated May 30, 2018, received in International Patent Application No. 18155939.4, which corresponds with U.S. Appl. No. 15/272,327, 8 pages.
Easton-Ellett, "Three Free Cydia Utilies To Remove iOS Notification Badges", http://www.ijailbreak.com/cydie/three-free-cydia-utilies-to-remove-ios-notification-badges, Apr. 14, 2012, 2 pages.
iPhoneHacksTV, "Confero allows you to easily manage your Badge notifications—iPhone Hacks", youtube, https://wwwyoutube.com/watch?v=JCk61pnL4SU, Dec. 26, 2014, 3 pages.
Mahdi, Confero now available in Cydia, brings a new way to manage Notification badges [Jailbreak Tweak], http://www.iphonehacks.com/2015/01/confero/tweak-manage-notification-badges,html, Jan. 1, 2015, 2 pages.
Ritchie, "How to see all the unread message notifications on your iPhone, all at once, all in the same place | iMore", https://www.imore.com/how-see-all-unread-message-notifications-your-iphone-all-once-all-same-place, Feb. 22, 2014, 2 pages.
YouTube, "Android Lollipop Lock-Screen Notification Tips", https://www.youtube.com/watch?v=LZTxHBOwzIU, Nov. 13, 2014, 3 pages.
Final Office Action, dated Feb. 22, 2018, received U.S. Appl. No. 14/608,895, 20 pages.
Office Action, dated Mar. 9, 2018, received in European Patent Application No. 13795391.5, which corresponds with U.S. Appl. No. 14/536,426, 4 pages.
Final Office Action, dated Feb. 26, 2018, received in U.S. Appl. No. 14/536,235, 13 pages.
Intention to Grant, dated Mar. 9, 2018, received in European Patent Application No. 15183980.0, which corresponds with U.S. Appl. No. 14/536,426, 5 pages.
Office Action, dated Feb. 12, 2018, received in U.S. Appl. No. 14/536,464, 33 pages.
Notice of Allowance, dated Feb. 8, 2018, received in Chinese Patent Application No. 201380068414.1, which corresponds with U.S. Appl. No. 14/608,926, 2 pages.
Oral Summons, dated Feb. 13, 2017, received in European Patent Application No. 13795392.3, which corresponds with U.S. Appl. No. 14/608,926, 11 pages.
Office Action, dated Feb. 2, 2018, received in Chinese Patent Application No. 201380035893.7, which corresponds with U.S. Appl. No. 14/536,141, 5 pages.
Office Action, dated Apr. 9, 2018, received in European Patent Application No. 13726053.5, which corresponds with U.S. Appl. No. 14/536,141, 9 pages.
Notice of Acceptance, dated Mar. 7, 2018, received in Australian Patent Application No. 2016201303, which corresponds with U.S. Appl. No. 14/608,942, 3 pages.
Office Action, dated Mar. 28, 2018, received in Chinese Patent Application No. 201380068295.X, which corresponds with U.S. Appl. No. 14/608,942, 5 pages.
Notice of Allowance, dated Feb. 28, 2018, received in U.S. Appl. No. 14/536,166, 5 pages.
Notice of Allowance, dated Apr. 4, 2018, received in Chinese Patent Application No. 201380035977.0, which corresponds with U.S. Appl. No. 14/536,203, 3 pages.
Patent, dated Feb. 16, 2018, received in Japanese Patent Application No. 2016173113, which corresponds with U.S. Appl. No. 14/536,203, 3 pages.
Oral Proceedings, dated Mar. 7, 2018, received in European Office Action No. 13798465.4, which corresponds with U.S. Appl. No. 14/608,965, 5 pages.
Notice of Acceptance, dated Feb. 27, 2018, received in Australian Patent Application No. 2016204411, which corresponds with U.S. Appl. No. 14/536,267, 3 pages.
Notice of Allowance, dated Jan. 29, 2018, received in Chinese Patent Application No. 201380035968.1, which corresponds with U.S. Appl. No. 14/536,267, 3 pages.
Patent, dated Apr. 20, 2018, received in Chinese Patent Application No. 201380035968.1, which corresponds with U.S. Appl. No. 14/536,267, 4 pages.
Notice of Allowance, dated Apr. 20, 2018, received in U.S. Appl. No. 14/608,985, 5 pages.
Office Action, dated Mar. 20, 2018, received in U.S. Appl. No. 14/609,006, 13 pages.
Notice of Allowance, dated Mar. 14, 2018, received in U.S. Appl. No. 14/536,296, 8 pages.
Decision to grant, dated Mar. 29, 2018, received in European Patent Application No. 16710871.1, which corresponds with U.S. Appl. No. 14/864,737, 2 pages.
Office, Action, dated Feb. 14, 2018, received in Korean Patent Application No. 2017-7030129, which corresponds with U.S. Appl. No. 14/864,737, 17 pages.
Patent, Nov. 16, 2017, received in Dutch Patent Application No. 2016375, which corresponds with U.S. Appl. No. 14/866,981, 2 pages.
Notice of Allowance, dated Mar. 21, 2018, received in Danish Patent Application No. 201500574, which corresponds with U.S. Appl. No. 14/866,159, 2 pages.
Office Action, dated Apr. 25, 2018, received in European Patent Application No. 16708916.8, which corresponds with U.S. Appl. No. 14/868,078, 6 pages.
Office Action, dated Jan. 29, 2018, received in Danish Patent Application No. 201500592, which corresponds with U.S. Appl. No. 14/869,899, 2 pages.
Notice of Allowance, dated Apr. 24, 2018, received in Danish Patent Application No. 201500592, which corresponds with U.S. Appl. No. 14/869,899, 2 pages.
Office Action, dated Mar. 26, 2018, received in Australian Patent Application No. 2016304890, which corresponds with U.S. Appl. No. 14/866,992, 3 pages.
Office, Action, dated Feb. 12, 2018, received in U.S. Appl. No. 15/009,661, 36 pages.
Office Action, dated Mar. 13, 2018, received in U.S. Appl. No. 15/009,688, 10 pages.
Final Office Action, dated Nov. 16, 2017, received in U.S. Appl. No. 14/856,520, 41 pages.
Notice of Allowance, dated Feb. 9, 2018, received in U.S. Appl. No. 14/856,522, 9 pages.
Notice of Allowance, dated Feb. 12, 2018, received in U.S. Appl. No. 14/857,700, 13 pages.
Notice of Allowance, dated Apr. 9, 2018, received in U.S. Appl. No. 14/857,700, 7 pages.
Notice of Allowance, dated Apr. 19, 2018, received in U.S. Appl. No. 14/864,529, 11 pages.
Grant of Patent, dated Apr. 16, 2018, received in Dutch Patent Application No. 2019215, 2 pages.

(56) References Cited

OTHER PUBLICATIONS

Notice of Allowance, dated Mar. 16, 2018, received in Danish Patent Application No. 201500579, which corresponds with U.S. Appl. No. 14/866,361, 2 pages.
Notice of Allowance, dated Mar. 6, 2018, received in Japanese Patent Applicaton No. 2017-126445, which corresponds with U.S. Appl. No. 14/866,987, 5 pages.
Patent, dated Apr. 6, 2018, received in Japanese Patent Application No. 2017-126445, which corresponds with U.S. Appl. No. 14/866,987, 3 pages.
Office Action, dated Feb. 26, 2018, received in Australian Patent Application No. 2017201079, which corresponds with U.S. Appl. No. 14/866,989, 6 pages.
Patent, dated Mar. 9, 2018, received in Japanese Patent Application No. 2016-233450, which corresponds with U.S. Appl. No. 14/866,989, 4 pages.
Notice of Allowance, dated Feb. 5, 2018, received in Japanese Patent Application No. 2016-233450, which corresponds with U.S. Appl. No. 14/866,989, 5 pages.
Office Action, dated Jan. 29, 2018, received in Danish Patent Application No. 201500595, which corresponds with U.S. Appl. No. 14/871,236, 2 pages.
Final Office Action, dated Mar. 9, 2018, received in U.S. Appl. No. 14/870,754, 19 pages.
Patent, dated Jan. 29, 2018, received in Danish Patent Application No. 201500596, which corresponds with U.S. Appl. No. 14/870,882, 4 pages.
Final Office Action, dated Feb. 16, 2018, received in U.S. Appl. No. 14/870,988, 18 pages.
Patent, dated Feb. 9, 2018, received in Japanese Patent Application No. 2016-533201, which corresponds with U.S. Appl. No. 14/871,227, 4 pages.
Office Action, dated Feb. 20, 2018, received in Korean Patent Application No. 2016-7019816, which corresponds with U.S. Appl. No. 14/871,227, 8 pages.
Final Office Action, dated Mar. 15, 2018, received in U.S. Appl. No. 14/871,336, 23 pages.
Patent, dated Oct. 30, 2017, Danish Patent Application No. 201500601, which corresponds with U.S. Appl. No. 14/871,336, 5 pages.
Office Action, dated Apr. 2, 2018, received in Japanese Patent Application No. 2018-020324, which corresponds with U.S. Appl. No. 14/874,336, 4 pages.
Notice of Allowance, dated Apr. 18, 2018, received in U.S. Appl. No. 14/867,823, 10 pages.
Office Action, dated Apr. 24, 2018, received in U.S. Appl. No. 14/867,892, 63 pages.
Notice of Allowance, dated Jan. 26, 2018, received in Danish Patent Application No. 201500598, which corresponds with U.S. Appl. No. 14/867,892, 2 pages.
Office Action, dated Feb. 28, 2018, received in U.S. Appl. No. 14/869,261, 26 pages.
Notice of Allowance, dated Mar. 30, 2018, received in U.S. Appl. No. 14/867,990, 5 pages.
Office Action, dated Feb. 19, 2018, received in Danish Patent Application No. 201500581, which corresponds with U.S. Appl. No. 14/867,990, 4 pages.
Office Action, dated Apr. 19, 2018, received in U.S. Appl. No. 14/869,703, 19 pages.
Notice of Allowance, dated Mar. 19, 2018, received in Danish Patent Application No. 201770190, which corresponds with U.S. Appl. No. 15/136,782, 2 pages.
Office Action, dated Feb. 22, 2018, received in Danish Patent Application No. 201670587, which corresponds with U.S. Appl. No. 15/231,745, 4 pages.
Office Action, dated Apr. 11, 2018, received in Danish Patent Application No. 201670591, which corresponds with U.S. Appl. No. 15/231,745, 3 pages.
Office Action, dated Jan. 30, 2018, received in Danish Patent Application No. 201670592, which corresponds with U.S. Appl. No. 15/231,745, 2 pages.
Notice of Allowance, dated Mar. 27, 2018, received in Danish Patent Application No. 201670592, which corresponds with U.S. Appl. No. 15/231,745, 2 pages.
Notice of Acceptance, dated Mar. 2, 2018, received in Australian Patent Application No. 2018200705, which corresponds with U.S. Appl. No. 15/272,327, 3 pages.
Notice of Acceptance, dated Mar. 2, 2018, received in Australian Patent Application No. 2016304832, which corresponds with U.S. Appl. No. 15/272,345, 3 pages.
Office Action, dated Apr. 20, 2018, received in European Patent Application No. 16756862.5, which corresponds with U.S. Appl. No. 15/272,345, 15 pages.
Office Action, dated Mar. 7, 2018, received in U.S. Appl. No. 15/482,618, 7 pages.
Office Action, dated Apr. 23, 2018, received in U.S. Appl. No. 15/499,693, 29 pages.
Search Report, dated Feb. 15, 2018, received in Dutch Patent Application No. 2019215, which corresponds with U.S. Appl. No. 14/864,529, 13 pages.
Search Report, dated Feb. 15, 2018, received in Dutch Patent Application No. 2019214, which corresponds with U.S. Appl. No. 14/864,601, 12 pages.
Extended European Search Report, dated Mar. 2, 2018, received in European Patent Application No. 17206374.5, which corresponds with U.S. Appl. No. 15/272,343, 11 pages.
Office Action, dated May 8, 2018, received in Australian Patent Application No. 2016216580, which corresponds with U.S. Appl. No. 14/536,426, 5 pages.
Notice of Allowance, dated May 10, 2018, received in Chinese Patent Application No. 201380035982.1, which corresponds with U.S. Appl. No. 14/536,426, 2 pages.
Final Office Action, dated May 3, 2018, received U.S. Appl. No. 14/536,644, 28 pages.
Office Action, dated Apr. 27, 2018, received in Japanese Patent Application No. 2017-008764, which corresponds with U.S. Appl. No. 14/536,648, 5 pages.
Office Action, dated Apr. 16, 2018, received in Australian Patent Application No. 2016233792, which corresponds with U.S. Appl. No. 14/864,737, 2 pages.
Office Action, dated May 1, 2018, received in Danish Patent Application No. 201670594, which corresponds with U.S. Appl. No. 14/869,899, 2 pages.
Notice of Allowance, dated May 2, 2018, received in U.S. Appl. No. 14/856,519, 10 pages.
Office Action, dated May 7, 2018, received in European Patent Application No. 16189421.7, which corresponds with U.S. Appl. No. 14/866,987, 5 pages.
Final Office Action, dated Apr. 20, 2018, received in U.S. Appl. No. 14/870,882, 7 pages.
Office Action, dated May 4, 2018, received in Australian Patent Application No. 2018202855, which corresponds with U.S. Appl. No. 15/136,782, 3 pages.
Final Office Action, dated May 10, 2018, received in U.S. Appl. No. 15/655,749, 19 pages.
Notice of Allowance, dated Mar. 20, 2018, received in U.S. Appl. No. 14/536,291, 5 pages.
International Preliminary Report on Patentability, dated Sep. 12, 2017, received in International Patent Application No. PCT/US2016/021400, which corresponds with U.S. Appl. No. 14/869,899, 39 pages.
International Preliminary Report on Patentability, dated Feb. 13, 2018, received in International Patent Application No. PCT/US2016/046407, which corresponds with U.S. Appl. No. 15/009,688, 20 pages.

* cited by examiner

2200

```
┌─────────────────────────────────────────────────────────────────┐
│ Display a user interface that includes a first region and a     │
│ second region. The second region is embedded in the first       │
│ region so that when content in the first region is moved, the   │──2202
│ second region moves together with the content in the first      │
│ region. content in second region is scrollable independently of │
│ other content in the first region so that the second region is  │
│ configured to be moved without moving the first region.         │
│ ┌─────────────────────────────────────────────────────────────┐ │
│ │ Content in the first region includes a displayed webpage,   │ │──2204
│ │ and content in the second region includes a map embedded    │ │
│ │ in the webpage                                              │ │
│ └─────────────────────────────────────────────────────────────┘ │
└─────────────────────────────────────────────────────────────────┘
                                │
                                ▼
┌─────────────────────────────────────────────────────────────────┐
│ Detect, on a touch-sensitive surface, a contact that            │──2206
│ corresponds to a focus selector on the display                  │
└─────────────────────────────────────────────────────────────────┘
                                │
                                ▼
┌─────────────────────────────────────────────────────────────────┐
│ Prior to detecting first movement of the contact across the     │
│ touch-sensitive surface detect an increase in intensity of the  │──2208
│ contact above a respective intensity threshold                  │
└─────────────────────────────────────────────────────────────────┘
                                │
                                ▼
┌─────────────────────────────────────────────────────────────────┐
│ In response to detecting the increase in intensity of the       │
│ contact above the respective intensity threshold, modify the    │
│ display of the first region or the second region to indicate    │──2210
│ that movement of the contact on the touch-sensitive surface     │
│ will cause content in the second region to be translated on the │
│ display without translating other content in the first region   │
│ on the display.                                                 │
└─────────────────────────────────────────────────────────────────┘
                                │
                                ▼
┌─────────────────────────────────────────────────────────────────┐
│ Detect first movement of the contact across the touch-          │──2212
│ sensitive surface                                               │
└─────────────────────────────────────────────────────────────────┘
          │                              │
          ▼                              ▼
        (A)              ┌────────────────────────────────┐
                         │ In response to detecting the   │
                         │ first movement of the contact  │
                         │ when the focus selector is at  │
                         │ a location on the display      │
                         │ within the first region that   │
                         │ does not include the second    │
                         │ region, translate all content  │
                         │ in the first region, including │
                         │ content not in the second      │
                         │ region, on the display without │
                         │ regard to whether the contact  │
                         │ is above or below the          │
                         │ respective intensity threshold │
                         │                                │
                         │              2216              │
                         └────────────────────────────────┘
```

Display a plurality of words in an electronic document on a display, where the plurality of words include a respective word ⌐2802

While a focus selector is at a location corresponding to the respective word, detect a gesture that includes a contact on a touch-sensitive surface ⌐2806

In response to detecting the gesture: ⌐2808

In accordance with a determination that the contact had a maximum intensity during the gesture that was below a respective intensity threshold: ⌐2810

Display a user interface for interacting with the respective word within the electronic document on the display ⌐2812

⌐2816
The user interface for interacting with the respective word within the document includes one or more of:

a text cursor displayed proximate to the respective word, an affordance for copying and deleting the respective word, an affordance for copying the respective word, an affordance for replacing the respective word with previously copied text, an affordance for highlighting the respective word, an affordance for creating a note to be associated with the respective word, an affordance for searching the electronic document using the respective word as a search term, and an affordance for searching an information repository using the respective word as a search term Select the respective word ⌐2818

Figure 9A

DEVICE, METHOD, AND GRAPHICAL USER INTERFACE FOR SCROLLING NESTED REGIONS

RELATED APPLICATIONS

This application is a Continuation of PCT Patent Application Serial No. PCT/US2013/040056, filed on May 8, 2013, entitled "Device, Method, and Graphical User Interface for Scrolling Nested Regions," which claims the benefit of and priority to U.S. Provisional Patent Application Ser. No. 61/778,179, filed on Mar. 12, 2013, entitled "Device, Method, and Graphical User Interface for Scrolling Nested Regions;" U.S. Provisional Patent Application No. 61/747,278, filed Dec. 29, 2012, entitled "Device, Method, and Graphical User Interface for Manipulating User Interface Objects with Visual and/or Haptic Feedback;" and U.S. Provisional Patent Application No. 61/688,227, filed May 9, 2012, entitled "Device, Method, and Graphical User Interface for Manipulating User Interface Objects with Visual and/or Haptic Feedback," which applications are incorporated by reference herein in their entireties.

This application is also related to the following: U.S. Provisional Patent Application Ser. No. 61/778,092, filed on Mar. 12, 2013, entitled "Device, Method, and Graphical User Interface for Selecting Object within a Group of Objects;" U.S. Provisional Patent Application Ser. No. 61/778,125, filed on Mar. 12, 2013, entitled "Device, Method, and Graphical User Interface for Navigating User Interface Hierarchies;" U.S. Provisional Patent Application Ser. No. 61/778,156, filed on Mar. 12, 2013, entitled "Device, Method, and Graphical User Interface for Manipulating Framed Graphical Objects;" U.S. Provisional Patent Application Ser. No. 61/778,171, filed on Mar. 12, 2013, entitled "Device, Method, and Graphical User Interface for Displaying Additional Information in Response to a User Contact;" U.S. Provisional Patent Application Ser. No. 61/778,191, filed on Mar. 12, 2013, entitled "Device, Method, and Graphical User Interface for Displaying User Interface Objects Corresponding to an Application;" U.S. Provisional Patent Application Ser. No. 61/778,211, filed on Mar. 12, 2013, entitled "Device, Method, and Graphical User Interface for Facilitating User Interaction with Controls in a User Interface;" U.S. Provisional Patent Application Ser. No. 61/778,239, filed on Mar. 12, 2013, entitled "Device, Method, and Graphical User Interface for Forgoing Generation of Tactile Output for a Multi-Contact Gesture;" U.S. Provisional Patent Application Ser. No. 61/778,284, filed on Mar. 12, 2013, entitled "Device, Method, and Graphical User Interface for Providing Tactile Feedback for Operations Performed in a User Interface;" U.S. Provisional Patent Application Ser. No. 61/778,287, filed on Mar. 12, 2013, entitled "Device, Method, and Graphical User Interface for Providing Feedback for Changing Activation States of a User Interface Object;" U.S. Provisional Patent Application Ser. No. 61/778,363, filed on Mar. 12, 2013, entitled "Device, Method, and Graphical User Interface for Transitioning between Touch Input to Display Output Relationships;" U.S. Provisional Patent Application Ser. No. 61/778,367, filed on Mar. 12, 2013, entitled "Device, Method, and Graphical User Interface for Moving a User Interface Object Based on an Intensity of a Press Input;" U.S. Provisional Patent Application Ser. No. 61/778,265, filed on Mar. 12, 2013, entitled "Device, Method, and Graphical User Interface for Transitioning between Display States in Response to a Gesture;" U.S. Provisional Patent Application Ser. No. 61/778,373, filed on Mar. 12, 2013, entitled "Device, Method, and Graphical User Interface for Managing Activation of a Control Based on Contact Intensity;" U.S. Provisional Patent Application Ser. No. 61/778,412, filed on Mar. 13, 2013, entitled "Device, Method, and Graphical User Interface for Displaying Content Associated with a Corresponding Affordance;" U.S. Provisional Patent Application Ser. No. 61/778,413, filed on Mar. 13, 2013, entitled "Device, Method, and Graphical User Interface for Selecting User Interface Objects;" U.S. Provisional Patent Application Ser. No. 61/778,414, filed on Mar. 13, 2013, entitled "Device, Method, and Graphical User Interface for Moving and Dropping a User Interface Object;" U.S. Provisional Patent Application Ser. No. 61/778,416, filed on Mar. 13, 2013, entitled "Device, Method, and Graphical User Interface for Determining Whether to Scroll or Select Content;" and U.S. Provisional Patent Application Ser. No. 61/778,418, filed on Mar. 13, 2013, entitled "Device, Method, and Graphical User Interface for Switching between User Interfaces," which are incorporated herein by reference in their entireties.

This application is also related to the following: U.S. Provisional Patent Application Ser. No. 61/645,033, filed on May 9, 2012, entitled "Adaptive Haptic Feedback for Electronic Devices;" U.S. Provisional Patent Application Ser. No. 61/665,603, filed on Jun. 28, 2012, entitled "Adaptive Haptic Feedback for Electronic Devices;" and U.S. Provisional Patent Application Ser. No. 61/681,098, filed on Aug. 8, 2012, entitled "Adaptive Haptic Feedback for Electronic Devices," which are incorporated herein by reference in their entireties.

TECHNICAL FIELD

This relates generally to electronic devices with touch-sensitive surfaces, including but not limited to electronic devices with touch-sensitive surfaces that detect inputs for manipulating user interfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But existing methods for performing these manipulations are cumbersome and inefficient. In addition, existing methods take longer than necessary, thereby wasting energy. This latter consideration is particularly important in battery-operated devices.

SUMMARY

Accordingly, there is a need for electronic devices with faster, more efficient methods and interfaces for manipulating user interfaces. Such methods and interfaces optionally complement or replace conventional methods for manipulating user interfaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

There is a need for electronic devices with faster, more efficient methods and user interfaces for scrolling content in regions within said user interfaces by using user inputs, such as inputs on a track pad, touch screen or a mouse. In particular, there is a need for electronic devices with faster, more efficient methods for distinguishing whether to scroll a first region or a second region that is embedded, or nested, in the first region. Such methods and interfaces may complement or replace conventional methods for scrolling regions within interfaces. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes displaying a user interface. The user interface includes a first region and a second region. The second region is embedded in the first region so that when content in the first region is moved, the second region moves together with the content in the first region. Content in second region is scrollable independently of other content in the first region. The method further includes detecting, on the touch-sensitive surface, a contact that corresponds to a focus selector on the display and detecting first movement of the contact across the touch-sensitive surface. The method further includes, in response to detecting the first movement of the contact when the focus selector is at a location on the display within the second region, in accordance with a determination that the contact has a maximum intensity that is below a respective intensity threshold, translating content in the first region on the display, and, in accordance with a determination that the contact has a maximum intensity that is above the respective intensity threshold, translating content in the second region on the display without translating other content in the first region on the display.

In accordance with some embodiments, an electronic device includes a display unit configured to display a user interface. The user interface includes a first region and a second region. The second region is embedded in the first region so that when content in the first region is moved, the second region moves together with the content in the first region. Content in second region is scrollable independently of other content in the first region. The electronic device further includes a touch-sensitive surface unit configured to detect a contact that corresponds to a focus selector on the display unit and detect first movement of the contact across the touch-sensitive surface unit. The electronic device further includes a processing unit coupled to the display unit and the touch-sensitive surface unit, the processing unit configured to, in response to detecting the first movement of the contact when the focus selector is at a location on the display unit within the second region and in accordance with a determination that the contact has a maximum intensity that is below a respective intensity threshold, translate content in the first region on the display unit. The processing unit is further configured to, in response to detecting the first movement of the contact when the focus selector is at a location on the display unit within the second region and in accordance with a determination that the contact has a maximum intensity that is above the respective intensity threshold, translate content in the second region on the display unit without translating other content in the first region on the display unit.

Thus, electronic devices with displays, touch-sensitive surfaces and one or more sensors to detect intensity of contacts with the touch-sensitive surface are provided with faster, more efficient methods and user interfaces for scrolling regions within said user interfaces, thereby increasing the effectiveness, efficiency, and user satisfaction with such devices. Such methods and interfaces may complement or replace conventional methods for scrolling regions within user interfaces.

There is a need for electronic devices with faster, more efficient methods and interfaces for displaying word definitions. Such methods and interfaces may complement or replace conventional methods for displaying word definitions. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes: displaying a plurality of words in an electronic document on the display, where the plurality of words include a respective word, and while a focus selector is at a location corresponding to the respective word, detecting a gesture that includes a contact on the touch-sensitive surface. The method further includes, in response to detecting the gesture: in accordance with a determination that the contact had a maximum intensity during the gesture that was below a respective intensity threshold, displaying a user interface for interacting with the respective word within the electronic document on the display; and in accordance with a determination that the contact reached an intensity during the gesture that was above the respective intensity threshold, displaying a definition for the respective word on the display.

In accordance with some embodiments, an electronic device includes a display unit configured to display a plurality of words in an electronic document, where the plurality of words include a respective word; a touch-sensitive surface unit configured to receive gestures, the gestures including contacts on the touch-sensitive surface unit; and one or more sensors units configured to detect intensity of contacts with the touch-sensitive surface unit; and a processing unit coupled to the display unit, the touch-sensitive surface unit and the sensor units. The processing unit is configured to: while a focus selector is at a location corresponding to the respective word, detect a gesture that includes a contact on the touch-sensitive surface. The processing unit is further configured to, in response to detecting the gesture: in accordance with a determination that the contact had a maximum intensity during the gesture that was below a respective intensity threshold, enable display of a user interface for interacting with the respective word within the electronic document on the display; and in accordance with a determination that the contact reached an intensity during the gesture that was above the respective intensity threshold, enable display of a definition for the respective word on the display.

Thus, electronic devices with displays, touch-sensitive surfaces and one or more sensors to detect intensity of contacts with the touch-sensitive surface are provided with faster, more efficient methods and interfaces for displaying word definitions, thereby increasing the effectiveness, efficiency, and user satisfaction with such devices. Such methods and interfaces may complement or replace conventional methods for displaying word definitions.

There is a need for electronic devices with faster, more efficient methods and interfaces for displaying content associated with a hyperlink. Such methods and interfaces may complement or replace conventional methods for displaying content associated with a hyperlink. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes: displaying, on the display, an electronic document in a first tabbed window of an application with a tabbed document interface, the electronic document including a hyperlink; while a focus selector is over the hyperlink, detecting a press input from a contact on the touch-sensitive surface, the contact having an intensity. The method further includes, in accordance with a determination that the intensity of the contact is above a first intensity threshold, displaying, within the first tabbed window, a representation of a tab surrounding or proximate to the hyperlink in the electronic document; detecting a liftoff of the contact from the touch-sensitive surface while the focus selector is over the hyperlink. The method also includes, in response to detecting the liftoff of the contact from the touch-sensitive surface: in accordance with a determination that the contact met predefined intensity criteria, loading content associated with the hyperlink in a second tabbed window, different from the first tabbed window, while maintaining the electronic document in the first tabbed window, and in accordance with a determination that the contact did not meet the predefined intensity criteria, replacing the electronic document in the first tabbed window with the content associated with the hyperlink.

In accordance with some embodiments, an electronic device includes a display unit configured to display an electronic document in a first tabbed window of an application with a tabbed document interface, the electronic document including a hyperlink; a touch-sensitive surface unit configured to receive contacts; one or more sensor unit configured to detect intensity of contacts with the touch-sensitive surface unit; and a processing unit coupled to the display unit, the touch-sensitive surface unit, and the sensor unit. The processing unit is configured to: while a focus selector is over the hyperlink, detect a press input from a contact on the touch-sensitive surface unit, the contact having an intensity; in accordance with a determination that the intensity of the contact is above a first intensity threshold, enable display of, within the first tabbed window, a representation of a tab surrounding or proximate to the hyperlink in the electronic document. The processing unit is further configured to detect a liftoff of the contact from the touch-sensitive surface unit while the focus selector is over the hyperlink; and in response to detecting the liftoff of the contact from the touch-sensitive surface unit: in accordance with a determination that the liftoff of the contact met predefined intensity criteria, load content associated with the hyperlink in a second tabbed window, different from the first tabbed window, while maintaining the electronic document in the first tabbed window; and in accordance with a determination that the liftoff of the contact did not meet the predefined intensity criteria, replace the electronic document in the first tabbed window with the content associated with the hyperlink.

Thus, electronic devices with displays, touch-sensitive surfaces and one or more sensors to detect intensity of contacts with the touch-sensitive surface are provided with faster, more efficient methods and interfaces for displaying content associated with a hyperlink, thereby increasing the effectiveness, efficiency, and user satisfaction with such devices. Such methods and interfaces may complement or replace conventional methods for displaying content associated with a hyperlink.

There is a need for electronic devices with faster, more efficient methods and interfaces for enlarging content in a document. Such methods and interfaces may complement or replace conventional methods for enlarging content in a document. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface, and one or more sensors to detect intensity of contacts with the touch-sensitive surface. The method includes: displaying, on the display, an electronic document that includes a first content element and a second content element; detecting a first gesture that includes movement of two or more contacts relative to each other on the touch-sensitive surface while a focus selector is at a location corresponding to the first content element; and in response to detecting the first gesture: in accordance with a determination that the two or more contacts meet respective contact intensity criteria, enlarging the first content element relative to the second content element, and in accordance with a determination that the two or more contacts do not meet the respective contact intensity criteria, zooming the electronic document so that the first content element and the second content element are both enlarged on the display by a same amount.

In accordance with some embodiments, an electronic device includes a display unit configured to display an electronic document that includes a first content element and a second content element; a touch-sensitive surface unit configured to receive gestures that include contacts; one or more sensors configured to detect intensity of contacts with the touch-sensitive surface unit; and a processing unit coupled to the display unit, the touch-sensitive surface unit, and the sensors. The processing unit is configured to: detect a first gesture that includes movement of two or more contacts relative to each other on the touch-sensitive surface unit while a focus selector is at a location corresponding to the first content element; and in response to detecting the first gesture: in accordance with a determination that the two or more contacts meet respective contact intensity criteria, enlarge the first content element relative to the second content element, and in accordance with a determination that the two or more contacts do not meet the respective contact intensity criteria, zoom the electronic document so that the first content element and the second content element are both enlarged on the display unit by a same amount.

Thus, electronic devices with displays, touch-sensitive surfaces, and one or more sensors to detect intensity of contacts with the touch-sensitive surface are provided with faster, more efficient methods and interfaces for enlarging content in a document, thereby increasing the effectiveness, efficiency, and user satisfaction with such devices. Such methods and interfaces may complement or replace conventional methods for enlarging content in a document.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing the operations of any of the methods referred to in the fifth paragraph of the Description of Embodiments. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods referred to in the fifth paragraph of the Description of Embodiments, which are updated in response to inputs, as described in any of the methods referred to in the fifthe paragraph of the Description of Embodiments. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform the operations of any of the methods referred to in the fifth paragraph of the Description of Embodiments . In accordance with some embodiments, an electronic device includes: a display, a touch-sensitive surface, and optionally one or more sensors to detect intensity of contacts with the touch-sensitive surface; and means for performing the operations of any of the methods referred to in the fifth paragraph of the Description of Embodiments. In accordance with some embodiments, an information processing apparatus, for use in an electronic device with a display and a touch-sensitive surface, optionally one or more sensors to detect intensity of contacts with the touch-sensitive surface, includes means for performing the operations of any of the methods referred to in the fifth paragraph of the Description of Embodiments.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6C are flow diagrams illustrating a method of scrolling regions within user interfaces in accordance with some embodiments.

FIGS. 9A-9B are flow diagrams illustrating a method of displaying word definitions in accordance with some embodiments.

DESCRIPTION OF EMBODIMENTS

Figure 1A:
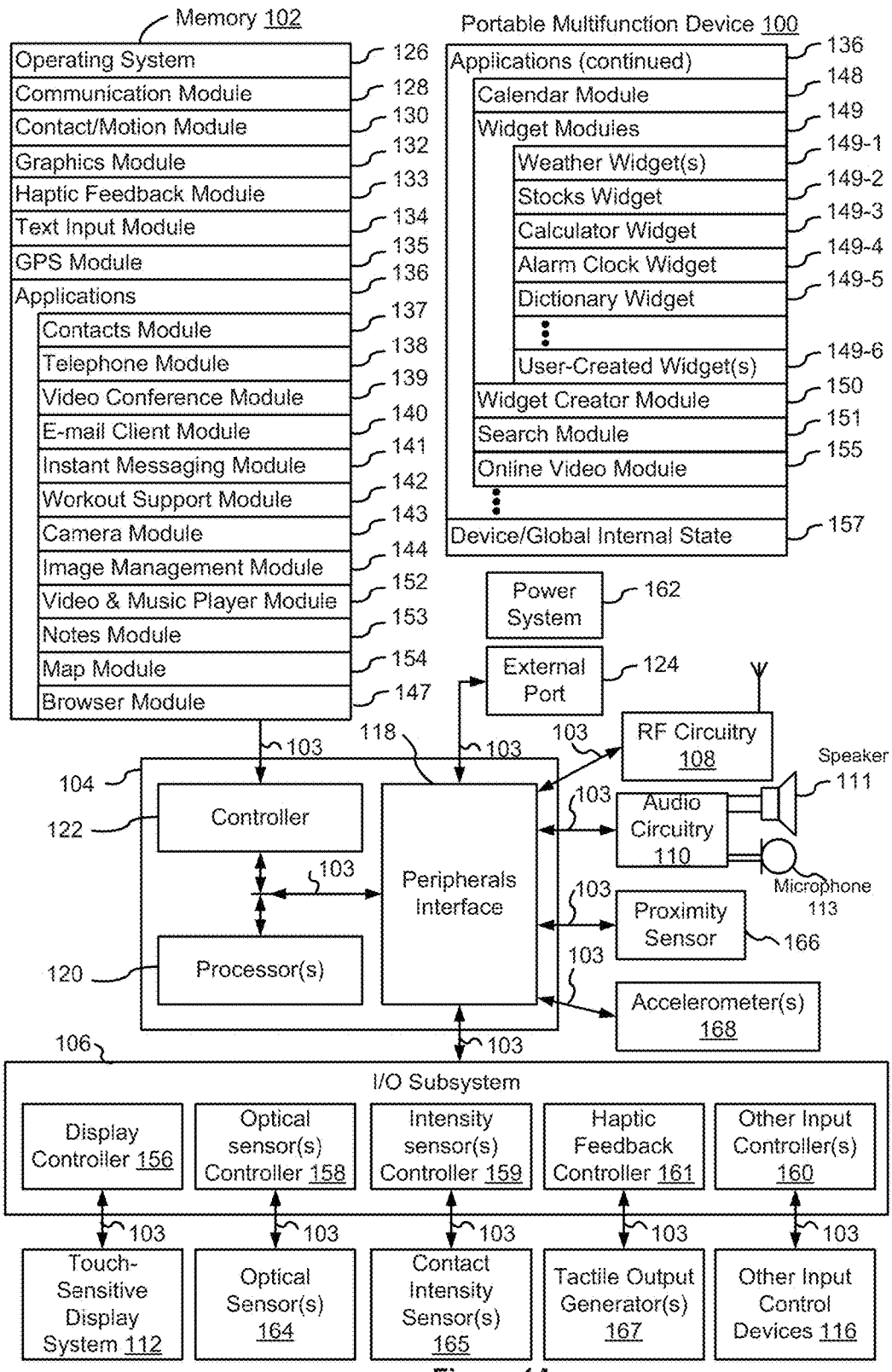
FIG. 1A is a block diagram illustrating a portable multifunction device with a touch-sensitive display in accordance with some embodiments.

The methods, devices and GUIs described herein provide visual and/or haptic feedback that makes manipulation of user interface objects more efficient and intuitive for a user. For example, in a system where the clicking action of a trackpad is decoupled from the contact intensity (e.g., contact force, contact pressure, or a substitute therefore) that is needed to reach an activation threshold, the device can generate different tactile outputs (e.g., "different clicks") for different activation events (e.g., so that clicks that accomplish a particular result are differentiated from clicks that do not produce any result or that accomplish a different result from the particular result). Additionally, tactile outputs can be generated in response to other events that are not related to increasing intensity of a contact, such as generating a tactile output (e.g., a "detent") when a user interface object is moved to a particular position, boundary or orientation, or when an event occurs at the device.

Additionally, in a system where a trackpad or touchscreen display is sensitive to a range of contact intensity that includes more than one or two specific intensity values (e.g., more than a simple on/off, binary intensity determination), the user interface can provide responses (e.g., visual or tactile cues) that are indicative of the intensity of the contact within the range. In some implementations, a pre-activation-threshold response and/or a post-activation-threshold response to an input are displayed as continuous animations. As one example of such a response, a preview of an operation is displayed in response to detecting an increase in contact intensity that is still below an activation threshold for performing the operation. As another example of such a response, an animation associated with an operation continues even after the activation threshold for the operation has been reached. Both of these examples provide a user with a continuous response to the force or pressure of a user's contact, which provides a user with visual and/or haptic feedback that is richer and more intuitive. More specifically, such continuous force responses give the user the experience of being able to press lightly to preview an operation and/or press deeply to push "past" or "through" a predefined user interface state corresponding to the operation.

Additionally, for a device with a touch-sensitive surface that is sensitive to a range of contact intensity, multiple contact intensity thresholds can be monitored by the device and different functions can be mapped to different contact intensity thresholds. This serves to increase the available "gesture space" providing easy access to advanced features for users who know that increasing the intensity of a contact at or beyond a second "deep press" intensity threshold will cause the device to perform a different operation from an operation that would be performed if the intensity of the contact is between a first "activation" intensity threshold and the second "deep press" intensity threshold. An advantage of assigning additional functionality to a second "deep press" intensity threshold while maintaining familiar functionality at a first "activation" intensity threshold is that inexperienced users who are, in some circumstances, confused by the additional functionality can use the familiar functionality by just applying an intensity up to the first "activation" intensity threshold, whereas more experienced users can take advantage of the additional functionality by applying an intensity at the second "deep press" intensity threshold.

Additionally, for a device with a touch-sensitive surface that is sensitive to a range of contact intensity, the device can provide additional functionality by allowing users to perform complex operations with a single continuous contact. For example, when selecting a group of objects, a user can move a continuous contact around the touch-sensitive surface and can press while dragging (e.g., applying an intensity greater than a "deep press" intensity threshold) to add additional elements to a selection. In this way, a user can intuitively interact with a user interface where pressing harder with a contact causes objects in the user interface to be "stickier."

A number of different approaches to providing an intuitive user interface on a device where a clicking action is decoupled from the force that is needed to reach an activation threshold and/or the device is sensitive to a wide range of contact intensities are described below. Using one or more of these approaches (optionally in conjunction with each other) helps to provide a user interface that intuitively provides users with additional information and functionality, thereby reducing the user's cognitive burden and improving the human-machine interface. Such improvements in the human-machine interface enable users to use the device faster and more efficiently. For battery-operated devices, these improvements conserve power and increase the time between battery charges. For ease of explanation, systems, methods and user interfaces for including illustrative examples of some of these approaches are described below, as follows:

Many electronic devices have graphical user interfaces with nested regions for displaying content (e.g., a map nested within a displayed webpage). Consequently, there is a need for methods and user interfaces capable of determining whether such a contact or gesture on a touch-sensitive surface corresponds to a request to scroll a larger region containing an embedded region or the embedded region itself. The embodiments below provide methods for determining which region to scroll based on the location of a contact as well as the intensity of the contact, thereby providing added control to the user and improving the ease of manipulation of a nested or embedded scrollable region. In particular, FIGS. 5A-5I illustrate exemplary user interfaces for scrolling regions within said user interfaces. FIGS. 6A-6C are flow diagrams illustrating a method of scrolling regions within user interfaces. The user interfaces in FIGS. 5A-5I are used to illustrate the processes in FIGS. 6A-6C.

Figure 8A:
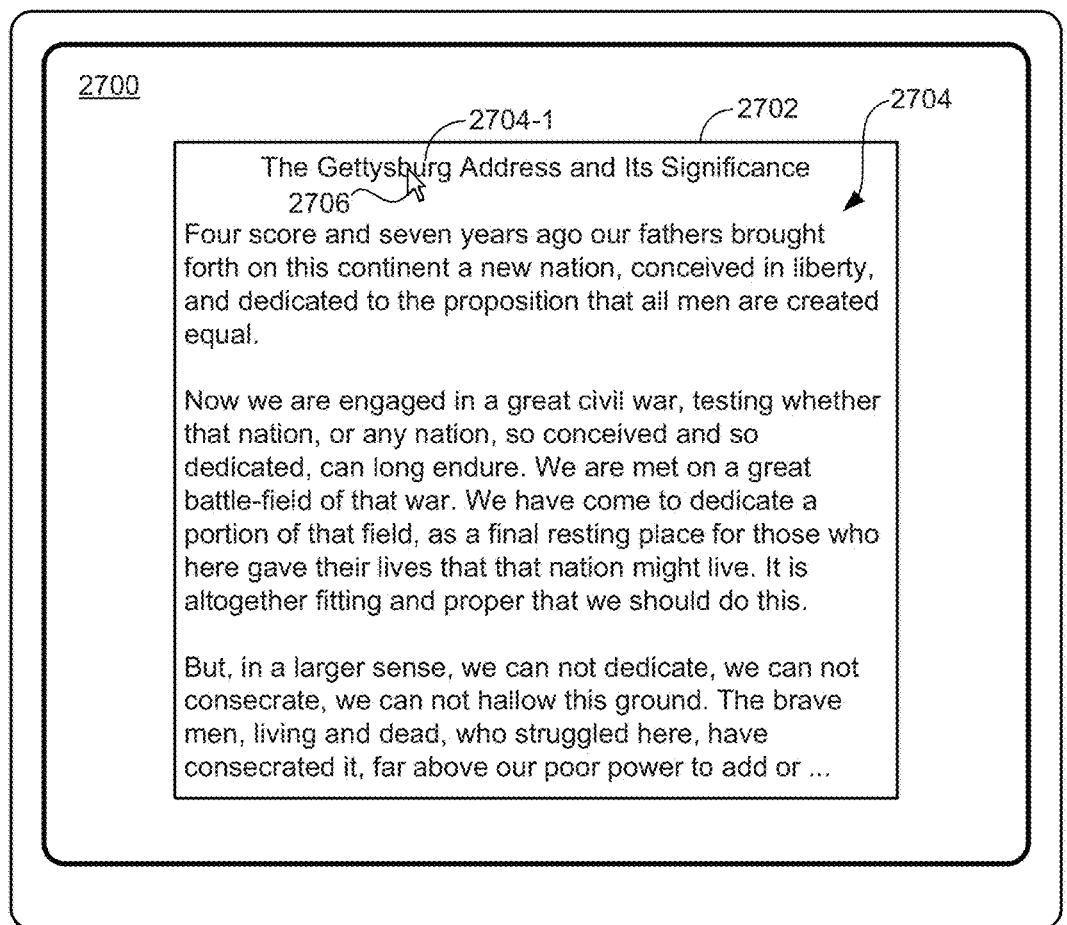
FIGS. 8A-8N illustrate exemplary user interfaces for displaying word definitions in accordance with some embodiments.
Figure 8A:
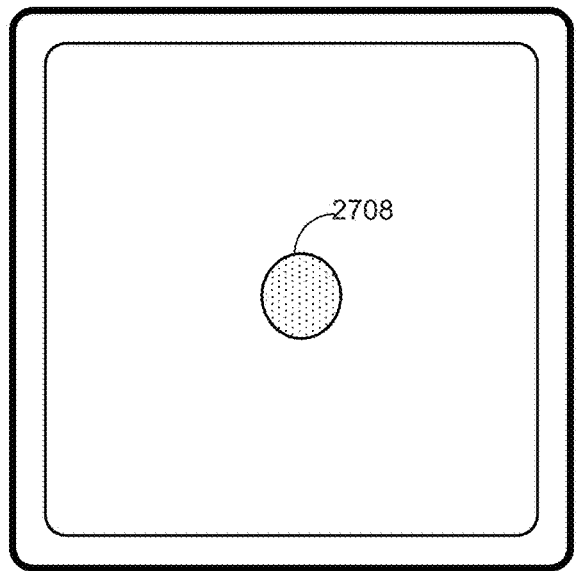
Figure 8A:
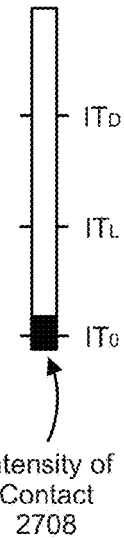
Figure 8B:
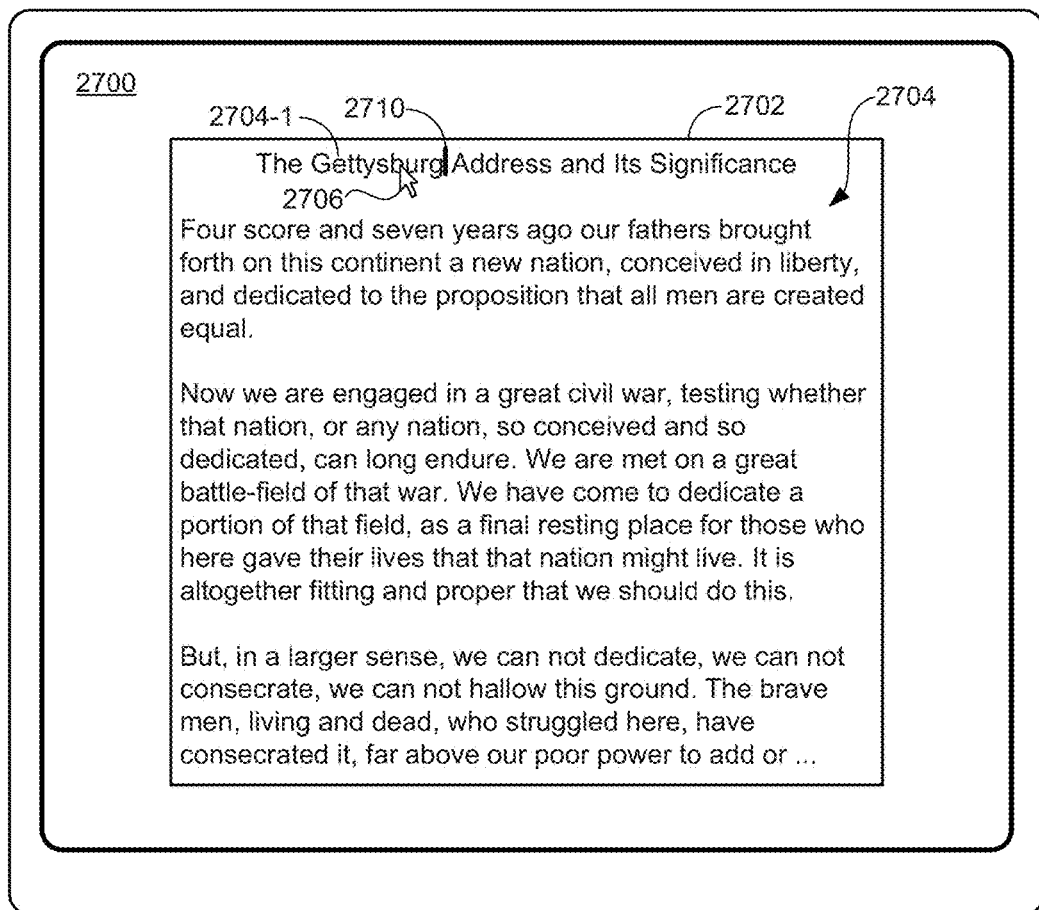
Figure 8B:
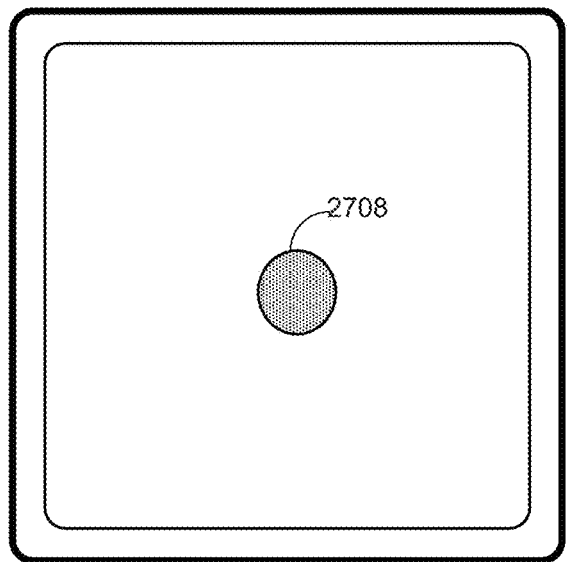
Figure 8B:
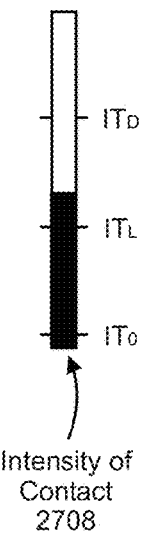
Figure 8C:
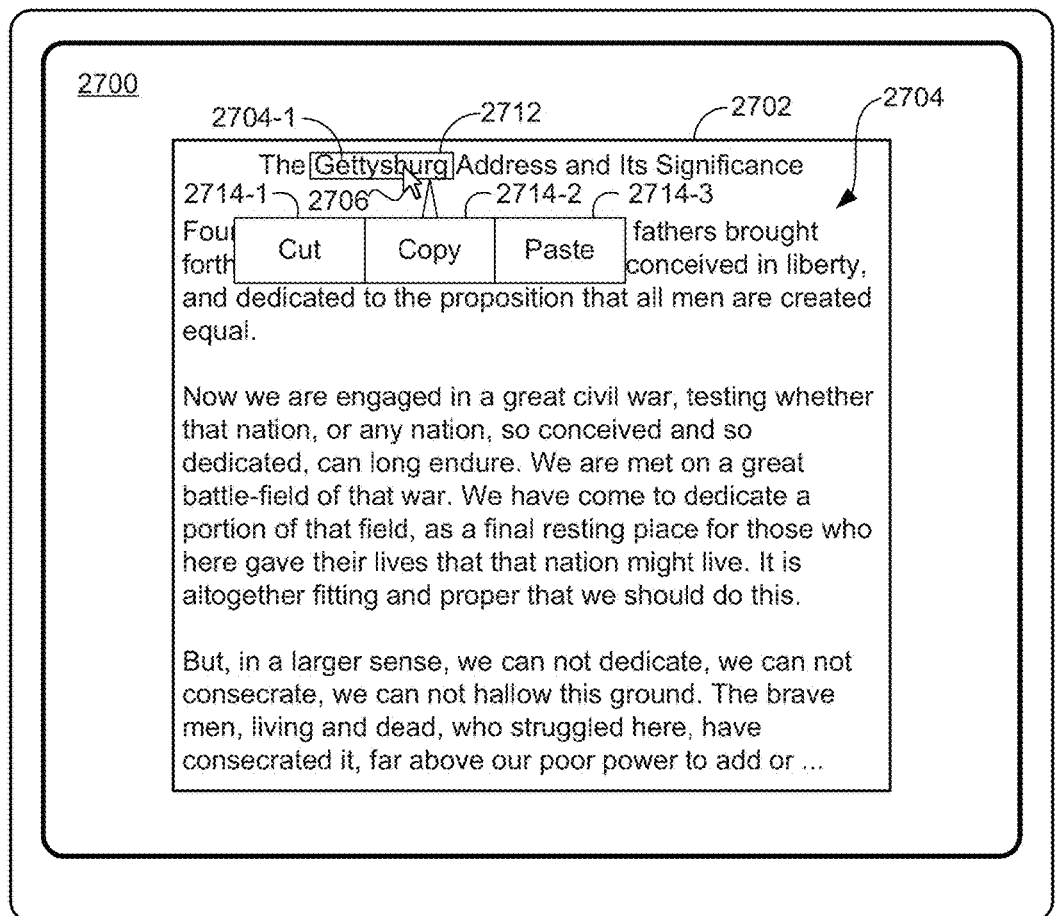
Figure 8C:
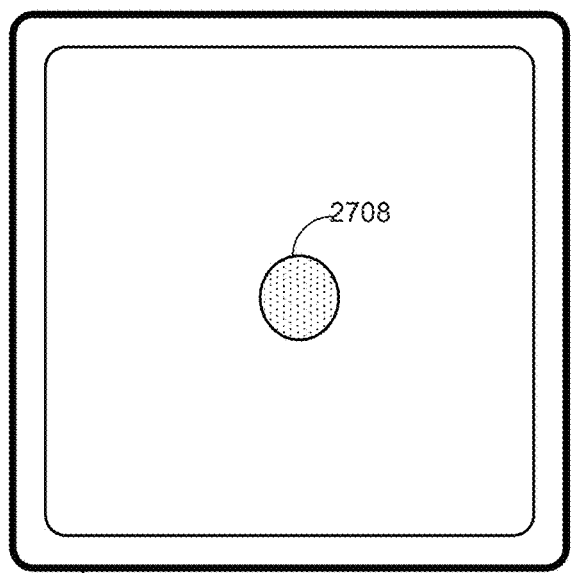
Figure 8C:
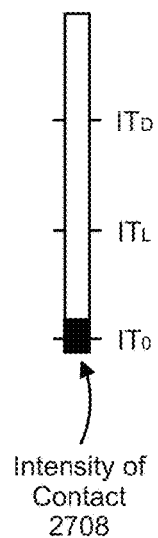

When a user is reading or entering text in an electronic document, a user may wish to obtain a definition for a word. However, some methods for obtaining the definition for a word include multiple steps such as navigation through a series of menus or dialogues that are inconvenient and distracting for a user. The embodiments below provide methods and user interfaces for allowing the user to activate display of a definition for a word by performing a gesture with contact whose intensity goes above an intensity threshold, thereby providing a more efficient and intuitive user interface for displaying definitions of words in a document. In particular, Below, FIGS. 8A-8N illustrate exemplary user interfaces for displaying word definitions. FIGS.

9A-9B are flow diagrams illustrating a method of displaying word definitions. The user interfaces in FIGS. 8A-8N are used to illustrate the processes in FIGS. 9A-9B.

Figure 11A:
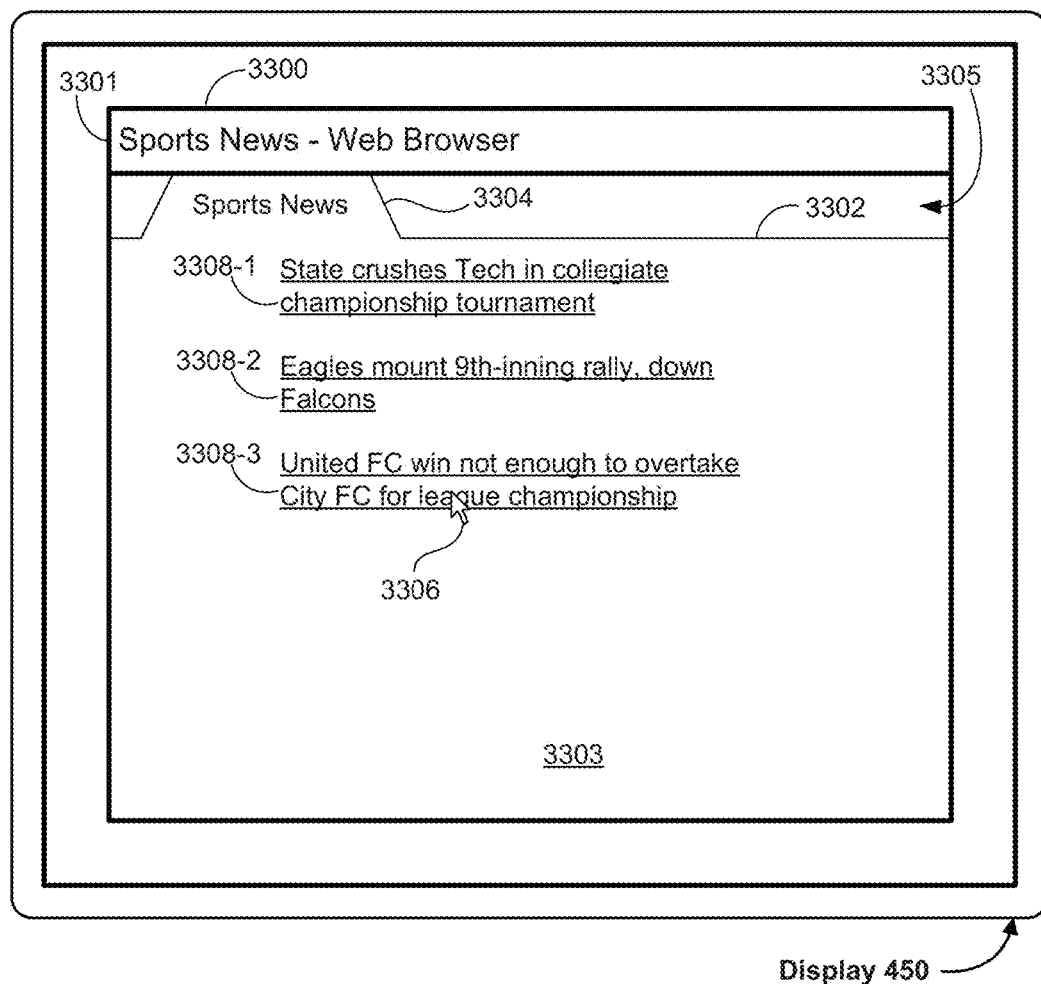
FIGS. 11A-11Z illustrate exemplary user interfaces for displaying content associated with a hyperlink in accordance with some embodiments.
Figure 11A:
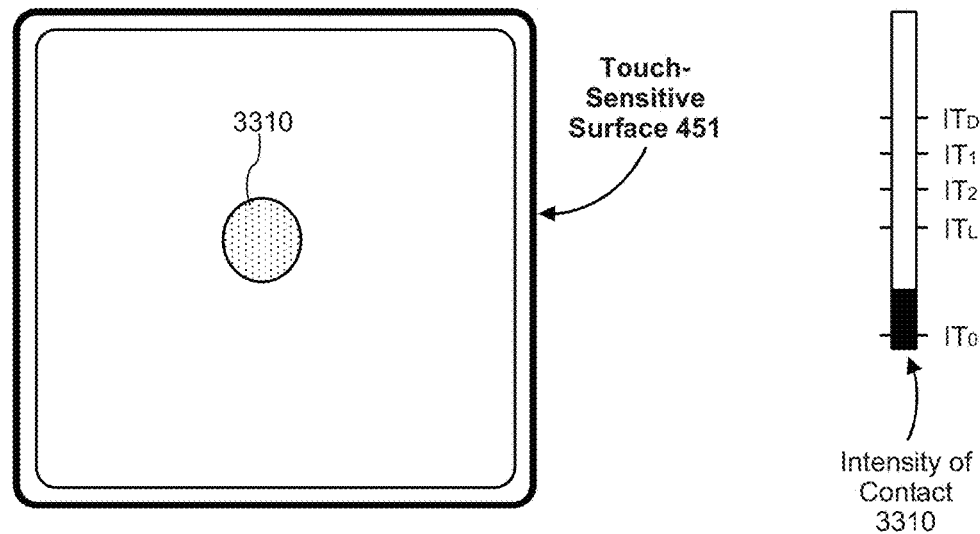

Some applications have tabbed document interfaces, where multiple documents are, in some circumstances, opened in respective tabbed windows within one application window, and the user may switch between the tabbed windows within the application window to view the multiple documents. However determining whether to load a document in a new tabbed window or in the current tabbed window sometimes is based on navigation through a series of menus or dialogues that are inconvenient and distracting for a user. The embodiments described below provide methods and user interfaces for giving a user per-document control over whether to load a document in a new tabbed window or in the current tabbed window based on an intensity of a contact, thereby providing a more efficient and intuitive user interface for loading a document in a tabbed document interface. In particular, FIGS. 11A-11Z illustrate exemplary user interfaces for displaying content associated with a hyperlink. FIGS. 12A-12B are flow diagrams illustrating a method of displaying content associated with a hyperlink. The user interfaces in FIGS. 11A-11Z are used to illustrate the processes in FIGS. 12A-12B.

Figure 14A:
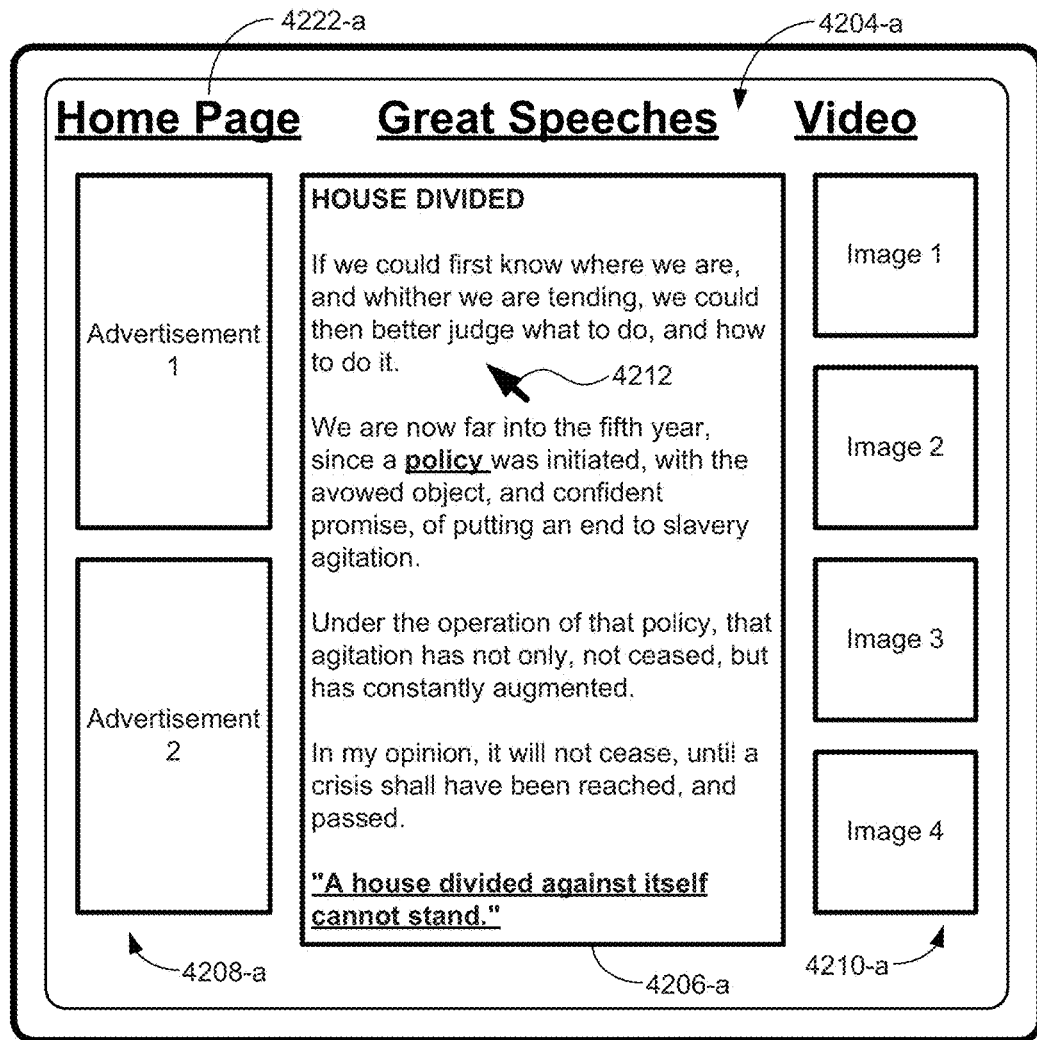
FIGS. 14A-14O illustrate exemplary user interfaces for enlarging content in a document in accordance with some embodiments.
Figure 14A:
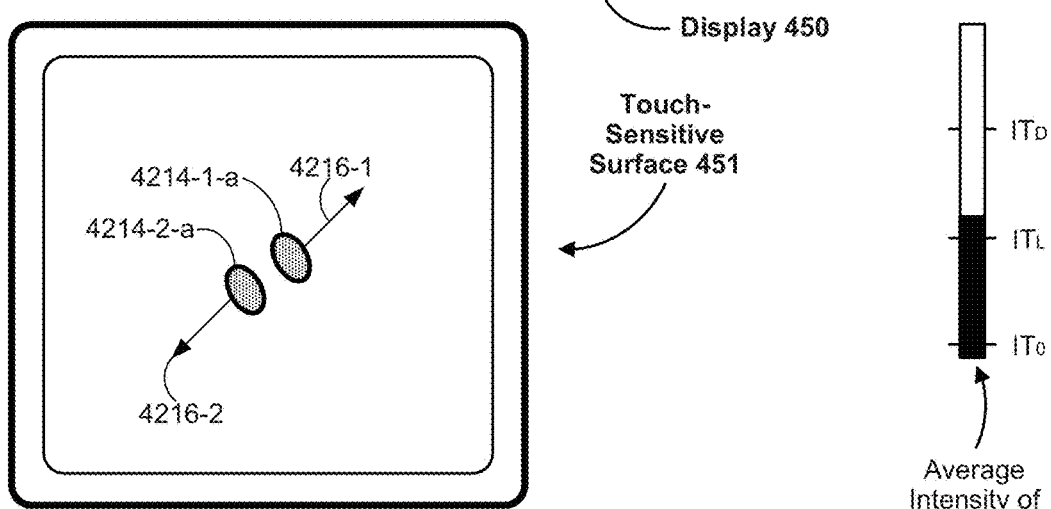
Figure 14B:
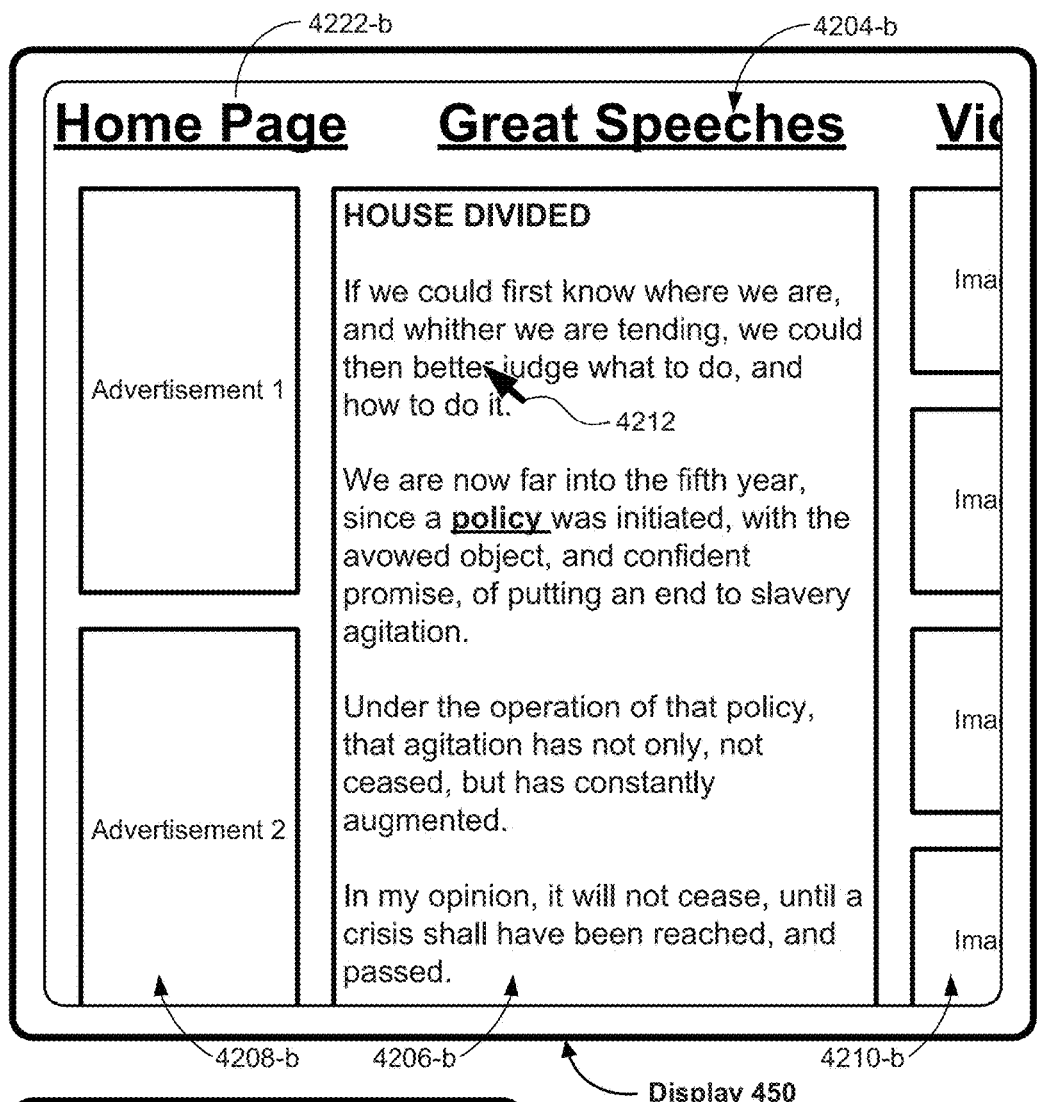
Figure 14B:
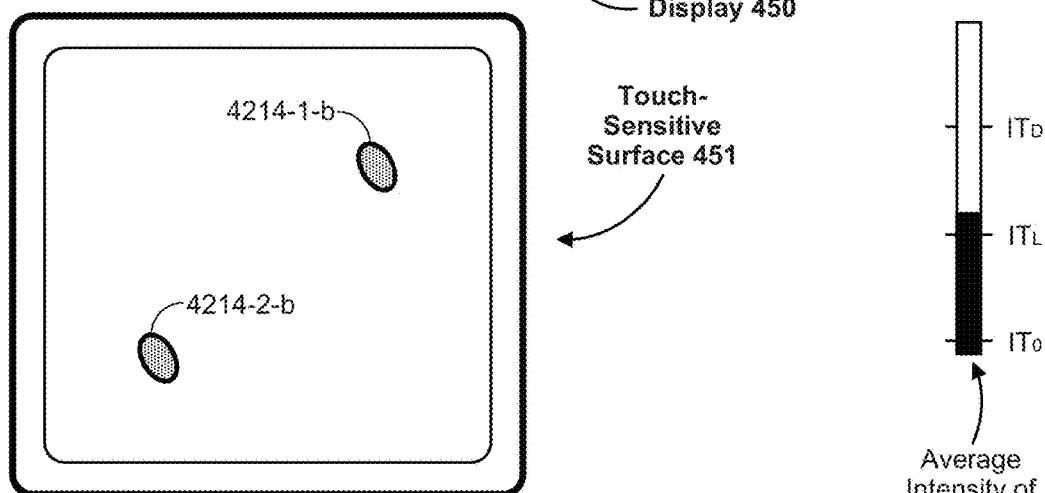

Many electronic documents have multiple content elements (e.g., images, a main article or body text, and advertisements, etc.), however focusing on a particular content element can be difficult when other content elements are distracting. Moreover, some methods for zooming or otherwise emphasizing a content element include multiple steps such as navigation through a series of menus or dialogues that are inconvenient and distracting for a user. The embodiments described below provide methods and user interfaces for enlarging a particular content element based on an intensity of one or more contacts, thereby providing a more efficient and intuitive user interface for enlarging a content element in a document. In particular, FIGS. 14A-14O illustrate exemplary user interfaces for enlarging content in a document. FIGS. 15A-15C are flow diagrams illustrating a method of enlarging content in a document. The user interfaces in FIGS. 14A-14O are used to illustrate the processes in FIGS. 15A-15C.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
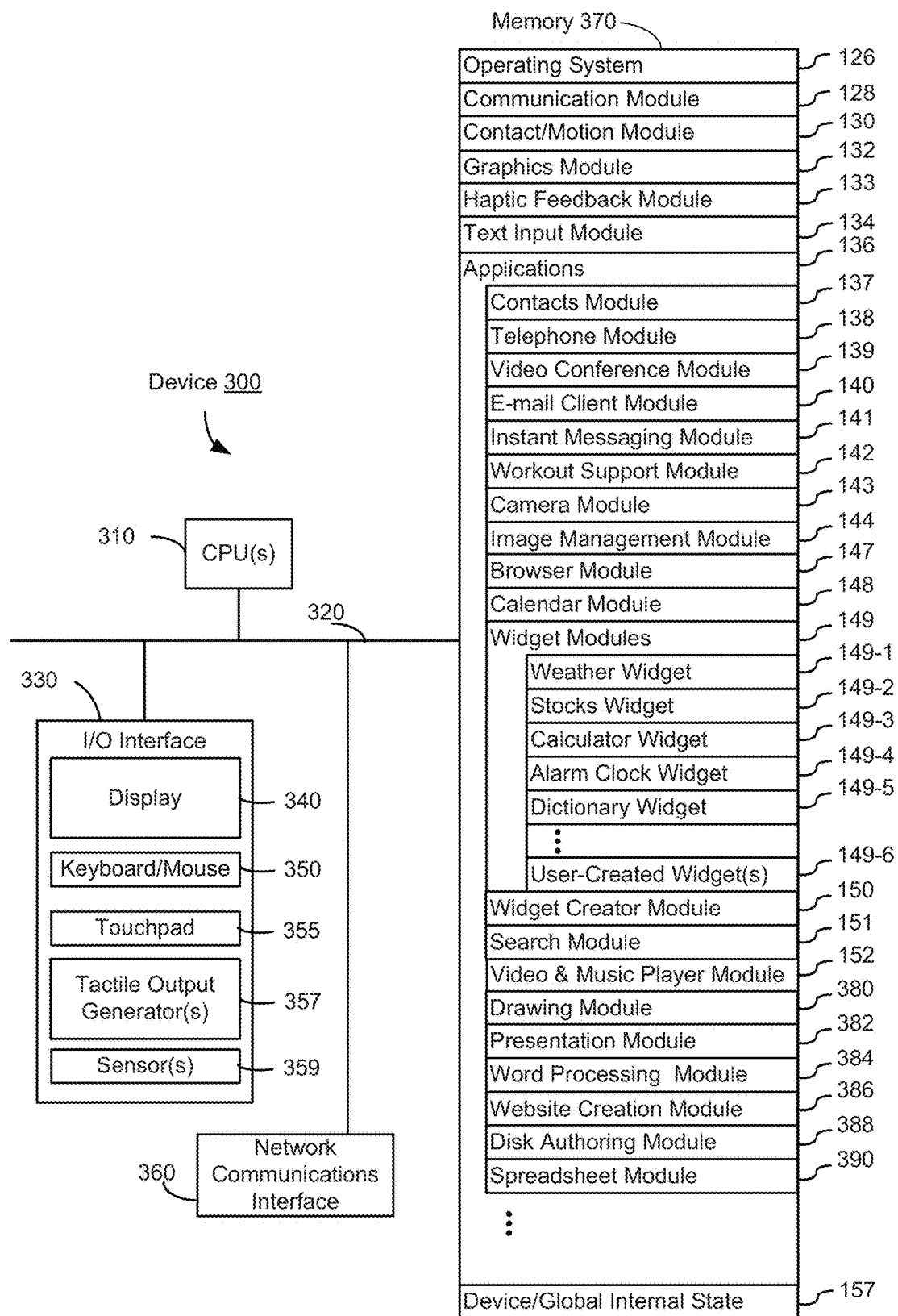
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
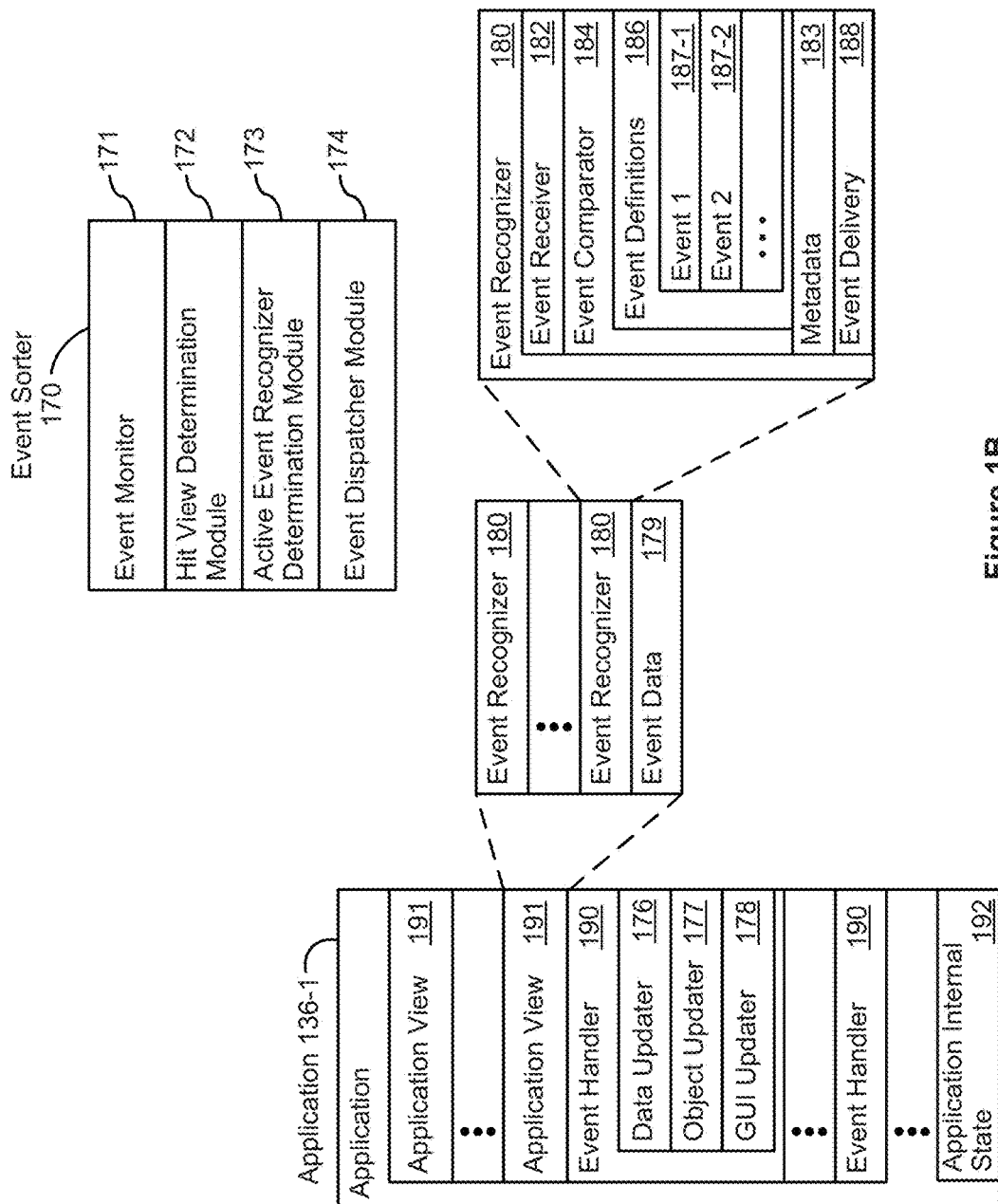
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
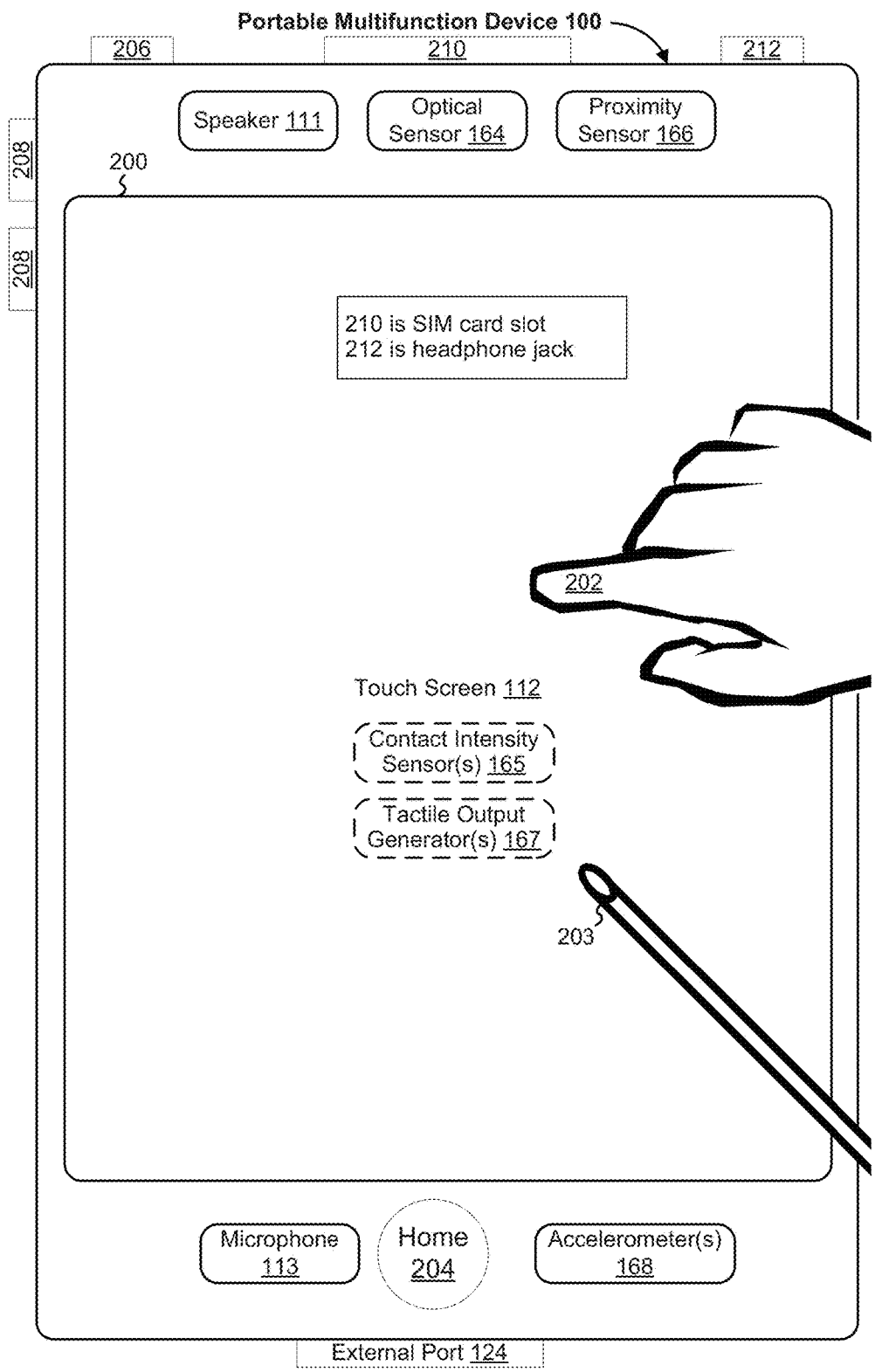
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
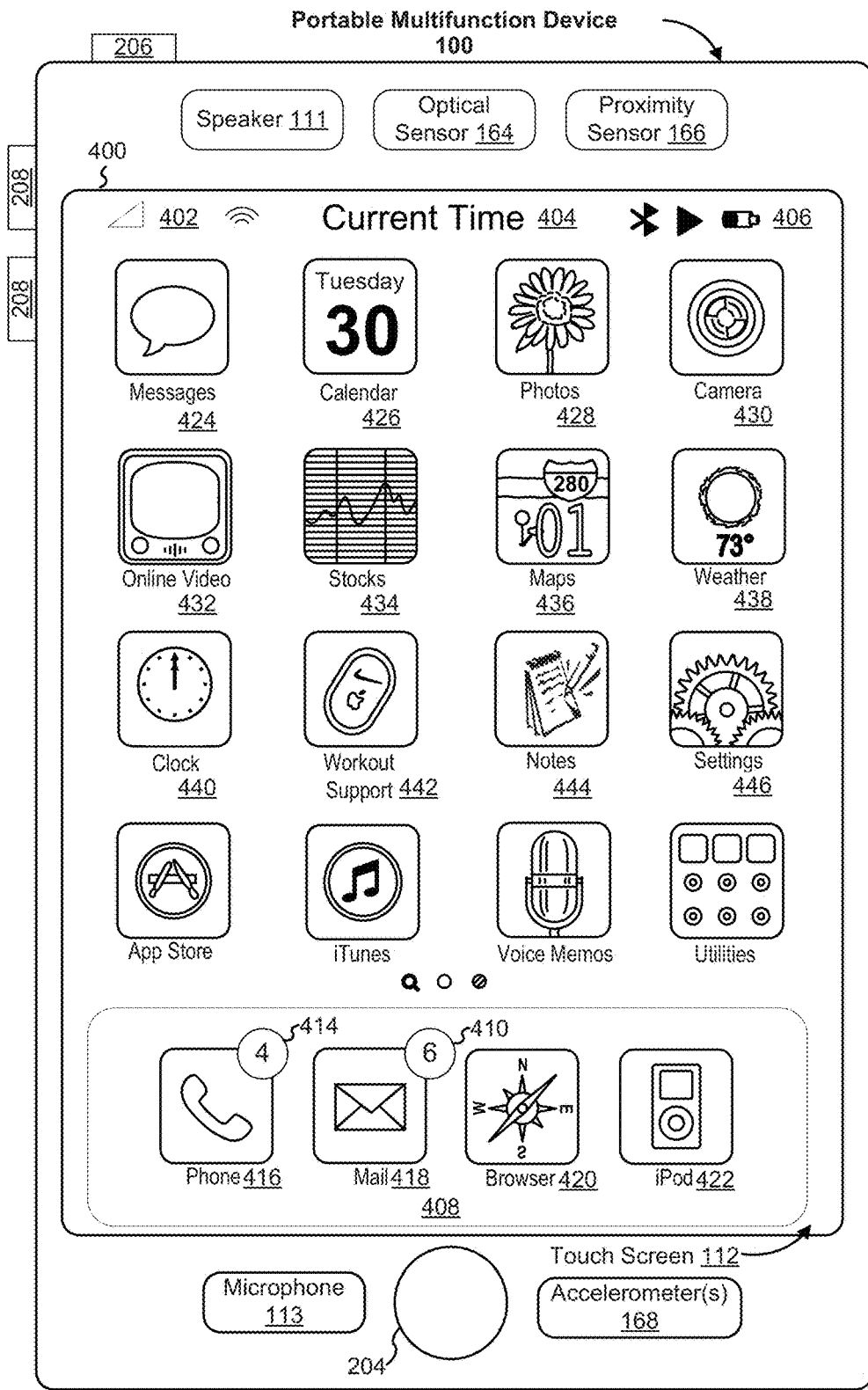
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Text;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
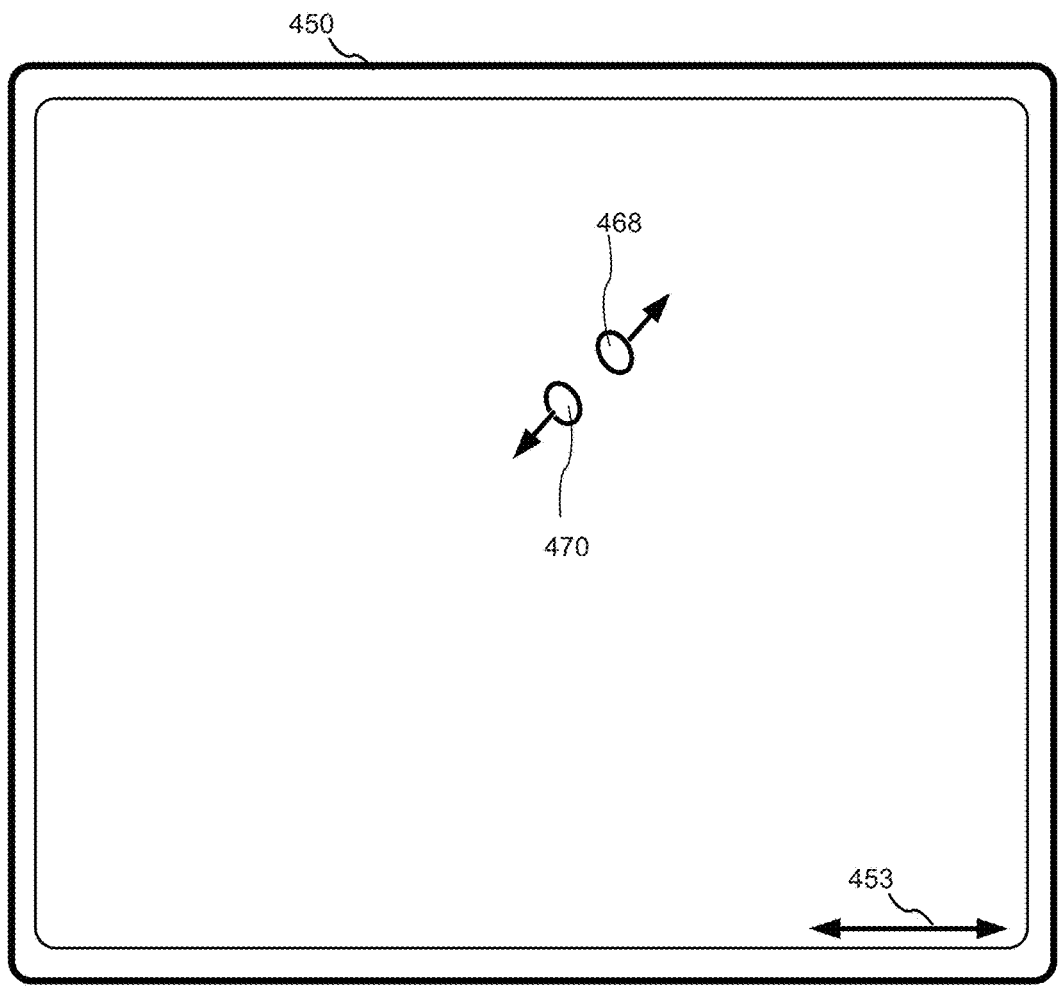
FIG. 4B illustrates an exemplary user interface for a multifunction device with a touch-sensitive surface that is separate from the display in accordance with some embodiments.
Figure 4B:
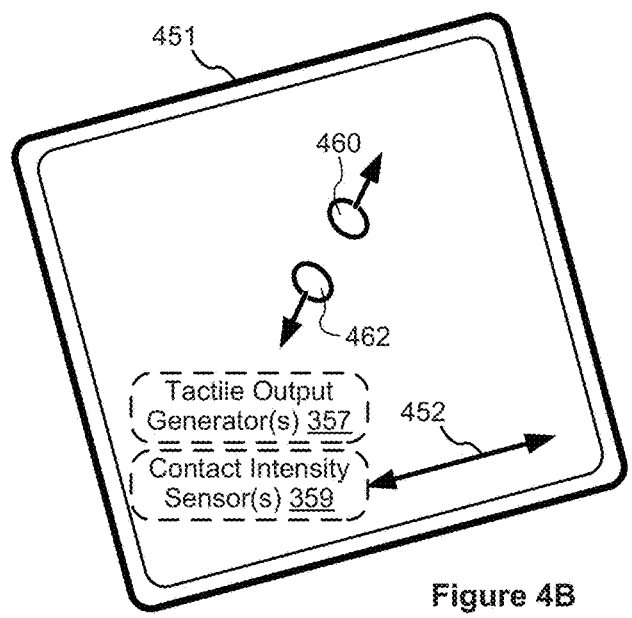

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

The user interface figures described below include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with an intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of intensity of the contact from an intensity below the light press intensity threshold $IT_L$ to an intensity between the light press intensity threshold $IT_L$ and the deep press intensity threshold $IT_D$ is sometimes referred to as a "light press" input. An increase of intensity of the contact from an intensity below the deep press intensity threshold $IT_D$ to an intensity above the deep press intensity threshold $IT_D$ is sometimes referred to as a "deep press" input. An increase of intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of intensity of the contact from an intensity above the contact-detection intensity threshold $IT_0$ to an intensity below the contact intensity threshold $IT_0$ is sometimes referred to as detecting liftoff of the contact from the touch-surface. In some embodiments $IT_0$ is zero. In some embodiments $IT_0$ is greater than zero. In some illustrations a shaded circle or oval is used to represent intensity of a contact on the touch-sensitive surface. In some illustrations a circle or oval without shading is used represent a respective contact on the touch-sensitive surface without specifying the intensity of the respective contact.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

User Interfaces and Associated Processes

Scrolling Nested Regions

Many electronic devices have graphical user interfaces for displaying content. For example, a web browser in a graphical user interface will display the content of a webpage, which may include nested regions. Both the webpage and the nested regions may be independently scrollable. For example, in some circumstances, a user will need to scroll the entire webpage, including the nested region, to view content "below" the currently displayed content. In other circumstances, for example when a webpage includes an embedded map, the user will want to translate the displayed content of the map to view additional areas of the map not originally shown, without scrolling the entire webpage.

Electronic devices with touch-sensitive surfaces often utilize contacts or gestures on the touch-sensitive surface for scrolling. Consequently, there is a need for user interfaces capable of determining whether such a contact or gesture on a touch-sensitive surface corresponds to a request to scroll a larger region containing an embedded region or the embedded region itself (e.g., a webpage with an embedded map or the embedded map). Some methods use only the location at which the contact originates. For example, on electronic devices with separate touch-sensitive surfaces (e.g., touchpads), some methods utilize the initial location of a cursor when a "click" is detected through the touchpad to determine whether to translate content in (e.g., scroll) the embedded region or the larger region. As another example, on electronic devices with touch screen displays, some methods use the initial location of a contact to determine whether to translate content in (e.g., scroll) the embedded region or the larger region (e.g., when a contact is detected over the map, the map will be translated while, on the other hand, when the contact is detected over a region other than the map, the webpage will be scrolled). These methods, however, are susceptible to accidental scrolling of the wrong region and also require multiple separate contacts for separate scrolling events. Such methods therefore limit user satisfaction and increase the cognitive burden on the user. In the embodiments described below, an improved method for determining whether to translate content in a larger region containing a nested region, or the nested region itself is provided. In some embodiments of this method, the determination of which region to scroll is based on the location of a contact as well as the intensity of the contact, therefore providing added control to the user and ease of manipulation of scrollable regions.

FIGS. 5A-5I illustrate exemplary user interfaces for scrolling regions within said user interfaces in accordance with some embodiments. The user interfaces in these figures are used to illustrate the processes described below, including the processes in FIGS. 6A-6C. Where a contact is present (e.g., contact 2106, FIG. 5B), FIGS. 5A-5I include intensity diagrams that show the current intensity of the contact on the touch-sensitive surface relative (e.g., the intensity at a particular time) compared to a plurality of intensity thresholds including a respective intensity threshold (e.g., "$IT_D$"). In some embodiments, operations similar to those described below with reference $IT_D$ are performed with reference to a different intensity threshold (e.g., "$IT_L$").

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 5A-5I and FIGS. 6A-6C will be discussed with reference to display 450 and a separate touch-sensitive surface 451, however analogous operations are, optionally, performed on a device with a touch-sensitive display system 112 in response to detecting the contacts described in FIGS. 5A-5I on the touch-sensitive display system 112 while displaying the user interfaces shown in FIGS. 5A-5I on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 2108.

Figure 5A:
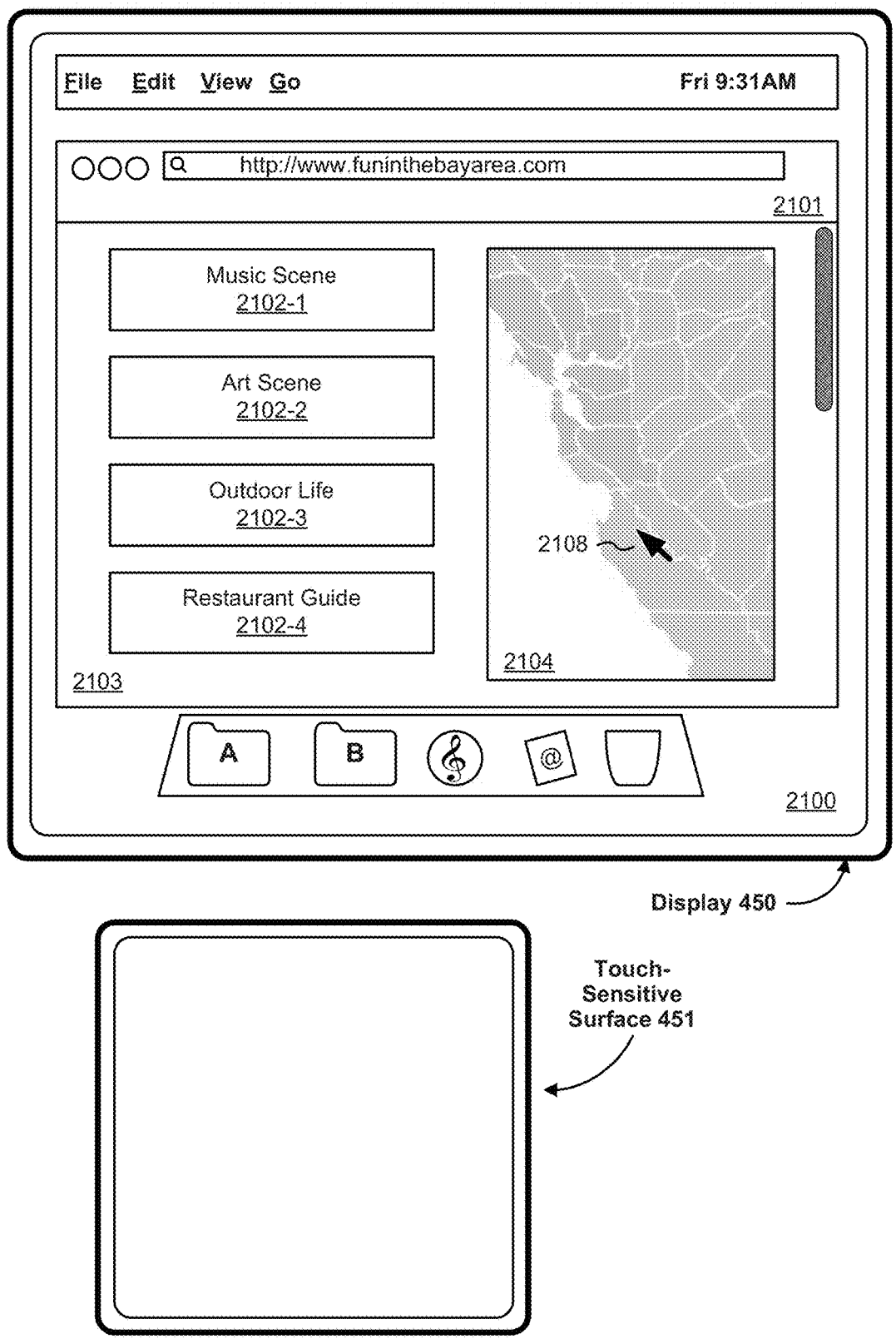
FIGS. 5A-5I illustrate exemplary user interfaces for scrolling regions within said user interfaces in accordance with some embodiments.
Figure 6B:
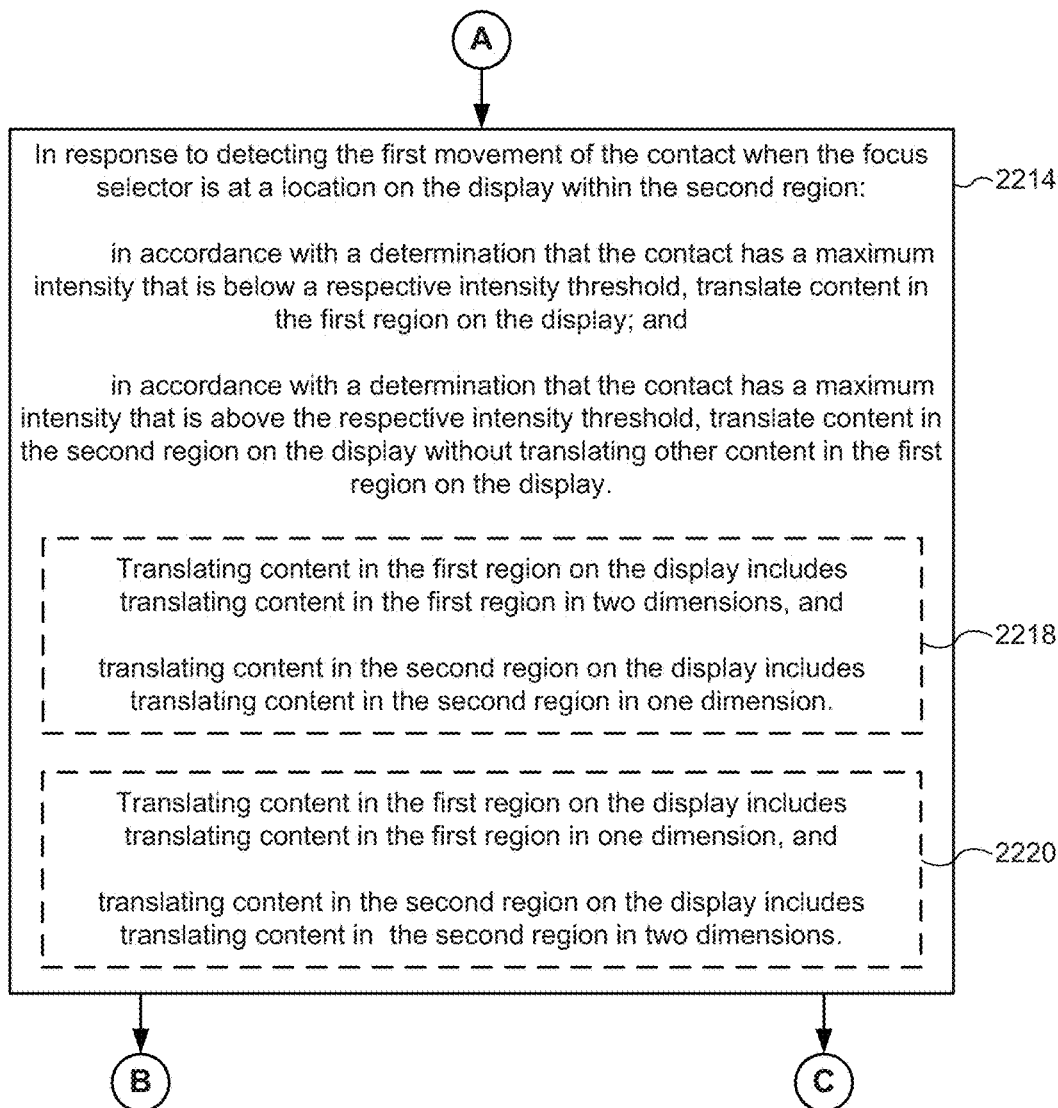
Figure 6C:
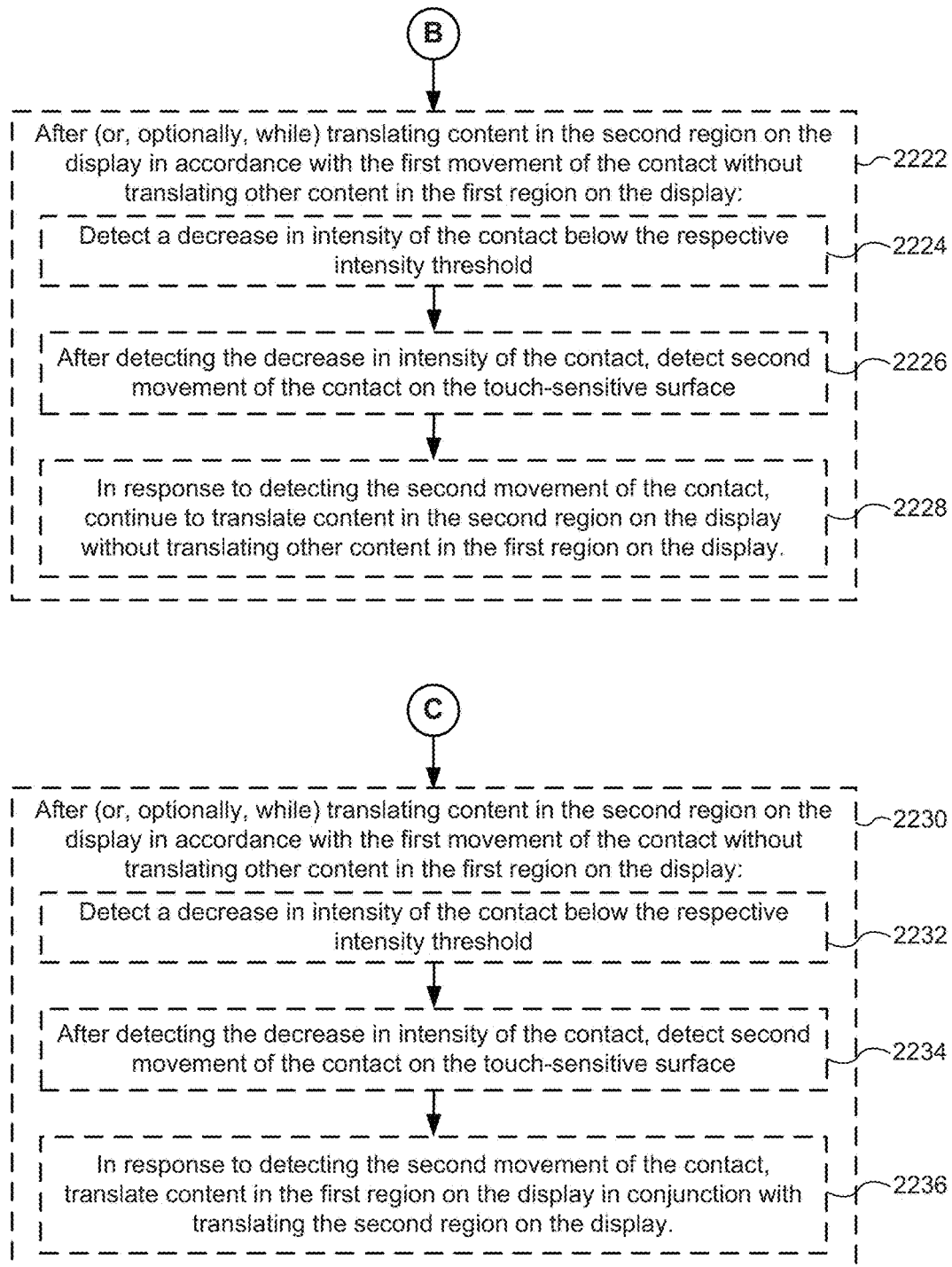

FIG. 5A illustrates an exemplary user interface (e.g., a graphic user interface) 2100. User interface 2100 is displayed on display 450 and includes user interface objects (e.g., thumbnails, a dock, taskbar, etc.) as well as a focus selector (e.g., cursor 2108). The device also displays a browser window 2103 (e.g., a first region) that displays content. In the instant example, browser window 2103 is a web browser window displaying content of a webpage (e.g., the content corresponding to the identified universal resource locator "http://www.funinthebayarea.com" shown in bar 2101). The content of the webpage includes user interface objects 2102. In some embodiments, such user interface objects include images or banners with hyperlinks to more information about a particular topic (e.g., user interface object 2102-1 is a banner that is linked to another webpage with more information about the music scene in the bay area). Browser window 2103 also includes a map 2104 that is used, for example, to indicate the location of various bay area activities. In some embodiments, map 2104 is embedded (e.g., nested) within the web browser window (e.g., a second region is nested within the first region). In some circumstances, map 2104 is configured to be scrolled with the rest of the content in web browser window 2103. In some circumstances, map 2104 is also configured to be scrolled independently of the rest of the content of web browser window 2103. For example, map 2104 can be scrolled to reveal areas of California not shown in FIG. 5A while continuing to display user interface objects 2102-1 through 2102-4, as described below.

Figure 5B:
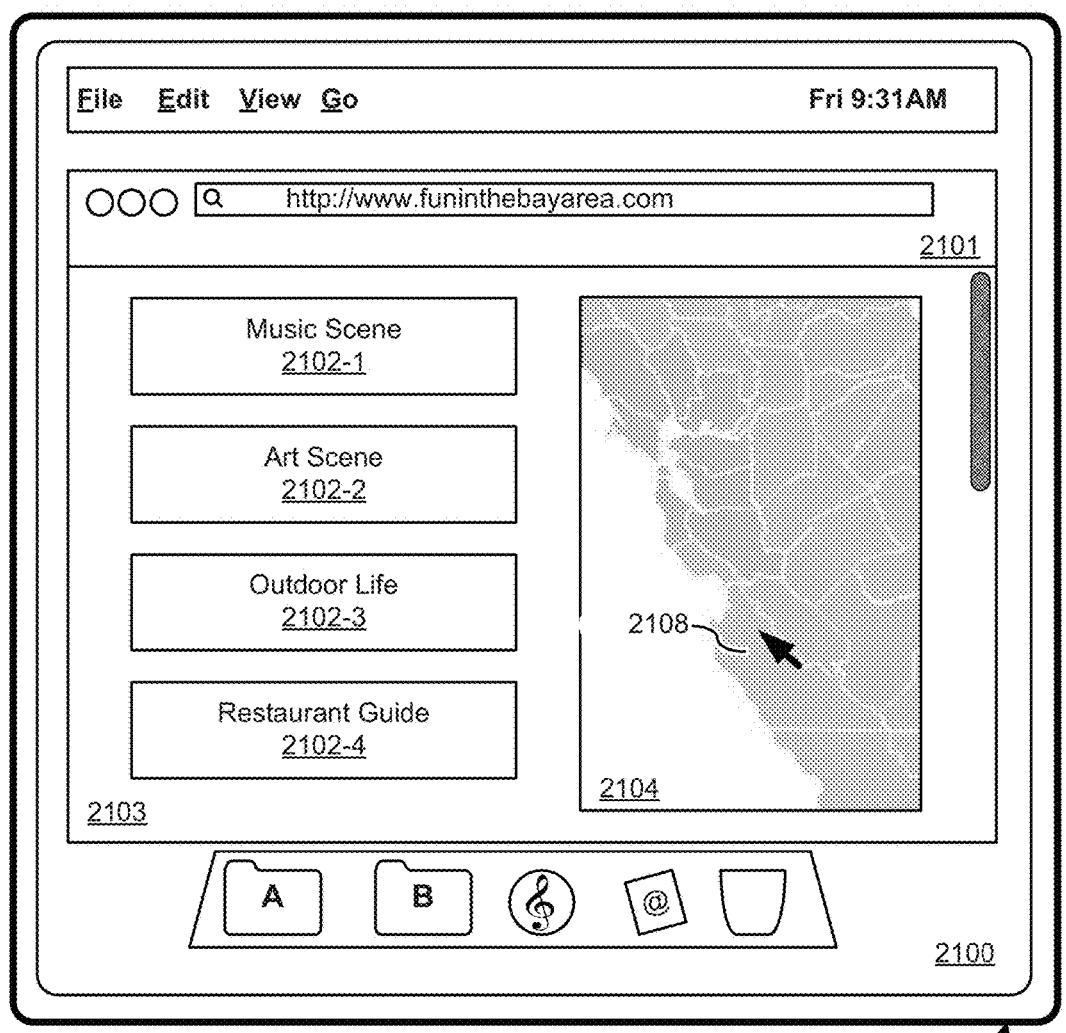
Figure 5B:
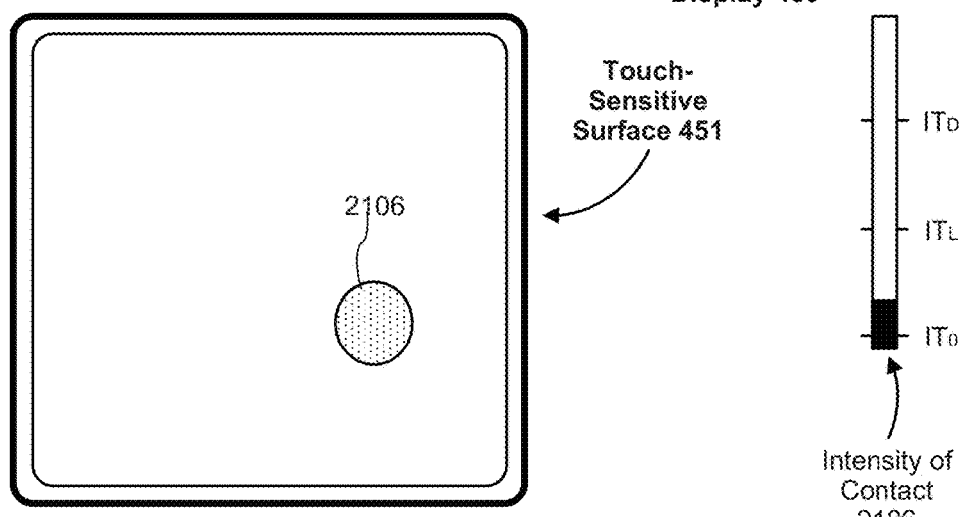
Figure 5C:
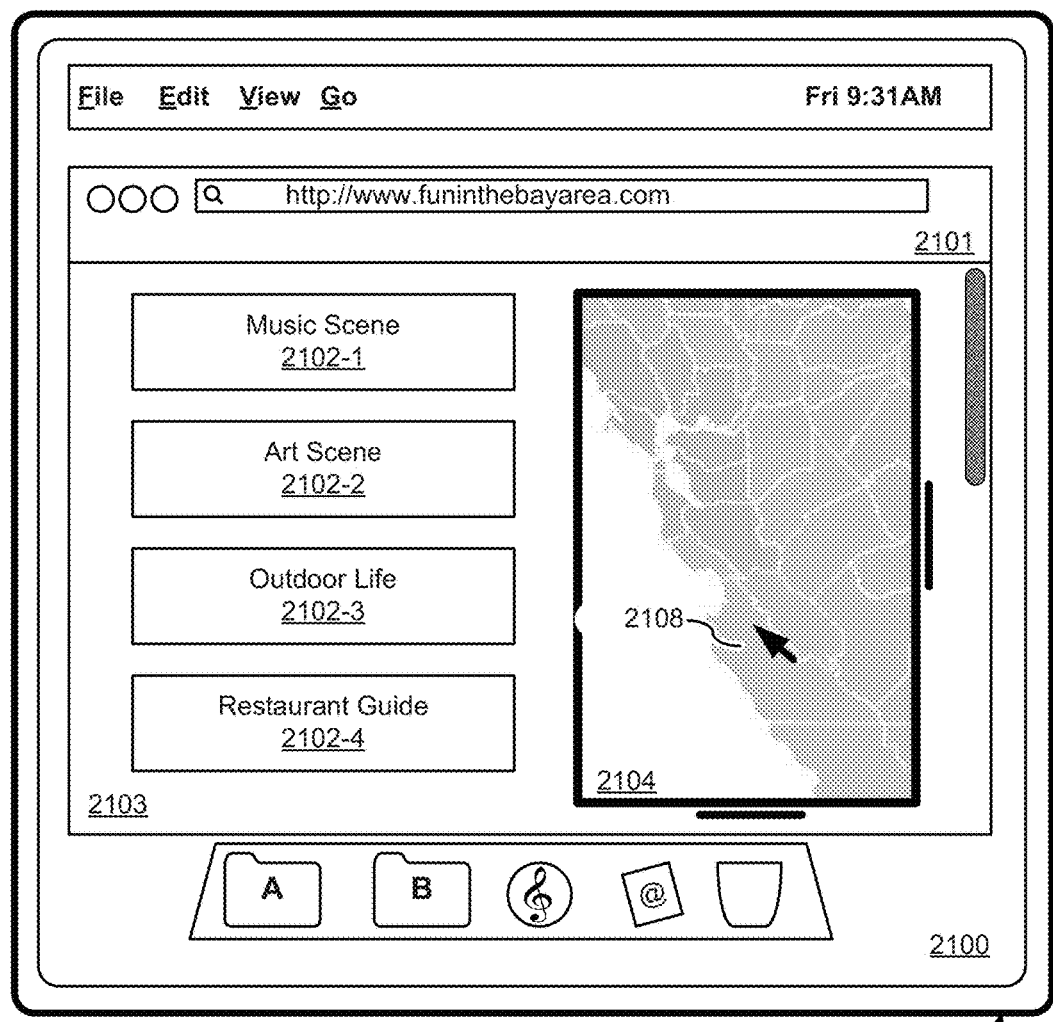
Figure 5C:
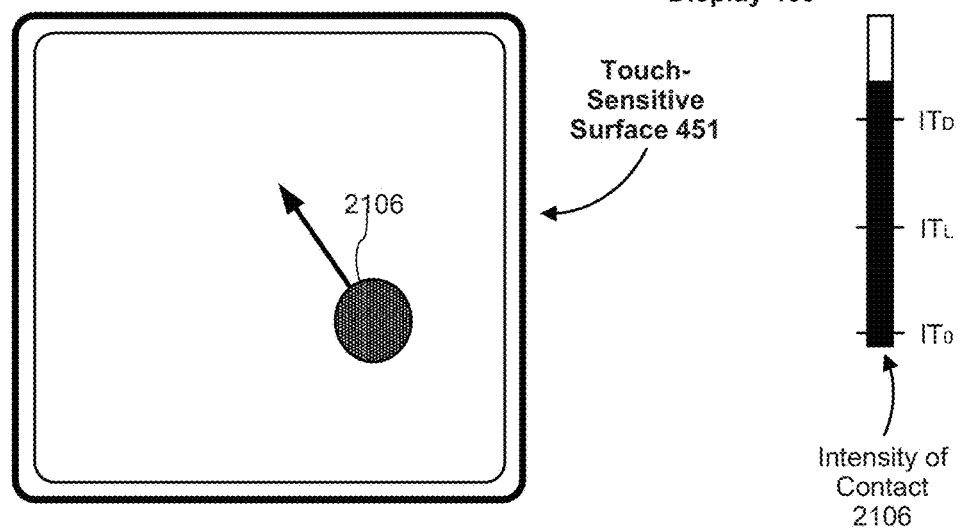

FIG. 5B illustrates detection of a contact 2106 having an intensity above $IT_0$ but below $IT_L$. FIG. 5C illustrates detection of an increase in the intensity of contact 2106. In the instant example, cursor 2108 is initially located over map 2104. It should be understood, however, that, in some circumstances, cursor 2108 is positioned over map 2104 via a series of gestures, contacts, and/or movements of contacts not shown. In any event, detection of an increase in the intensity of contact 2106 above a respective intensity threshold (e.g., the deep press intensity threshold) causes the device to indicate that map 2104 will be scrolled independently of the rest of the content of web browser window 2103. For example, as shown in FIG. 5C, the display of a border of map 2104 is optionally changed by increasing the border line weight as shown and optionally displaying scroll bars for map 2104. Additionally or alternatively, although not shown, map 2104 is optionally displayed with a "shadow" border.

In some embodiments, detection of a contact with a maximum intensity greater than $IT_D$ (or a different intensity threshold, such as $IT_L$) while cursor 2108 is initially located over map 2104 is sufficient to cause the device to scroll map 2104 independently of the rest of the content of web browser window 2103 (e.g., a nested region scrolling mode is activated, or triggered by a maximum intensity rather than a change in intensity across a particular threshold).

Figure 5D:
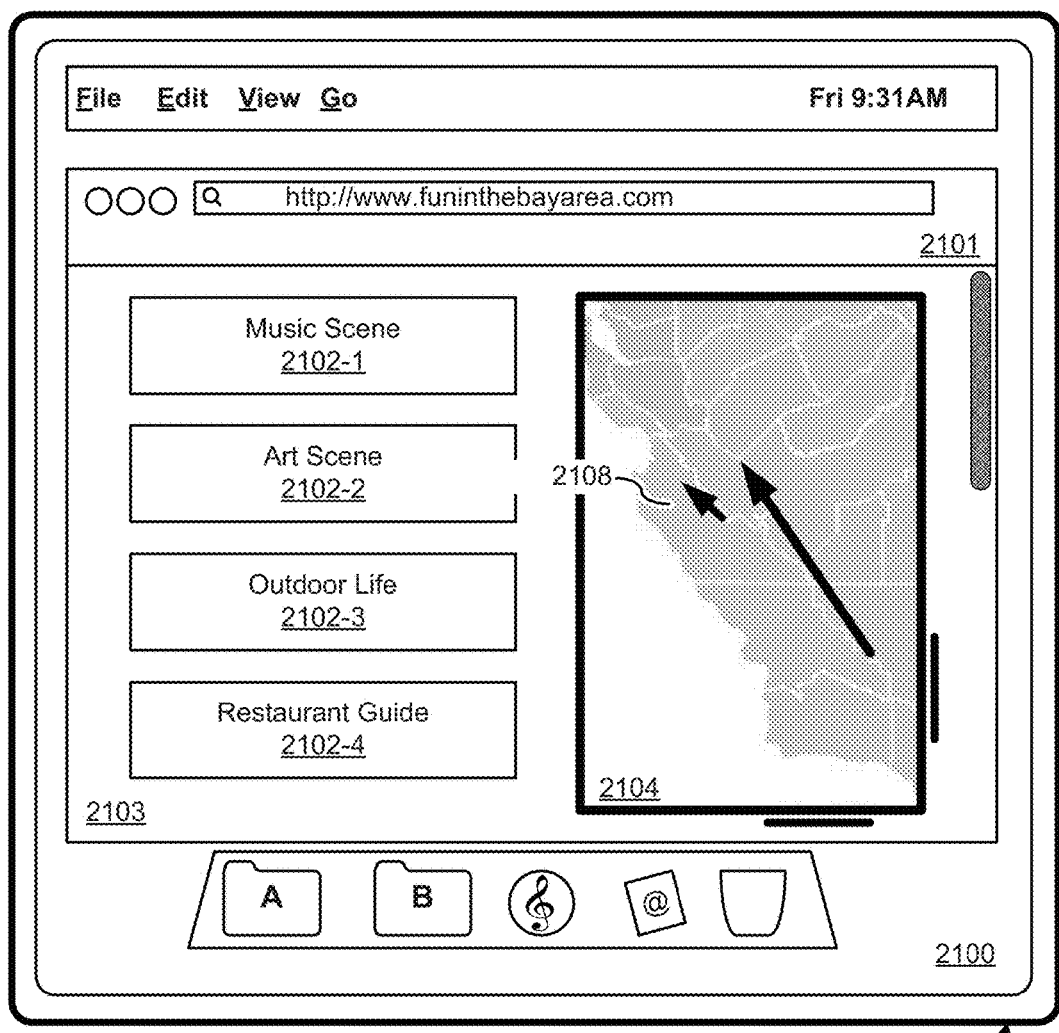
Figure 5D:
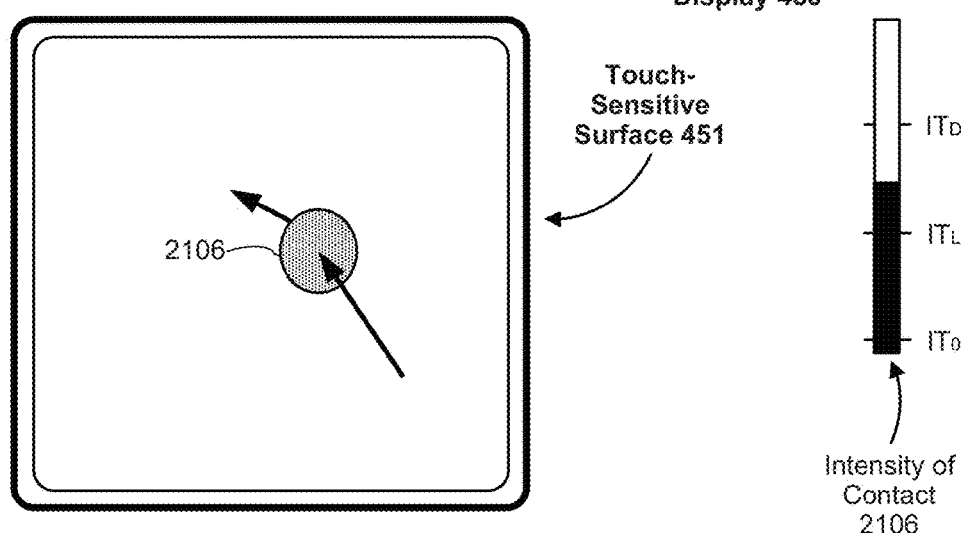

FIG. 5C also shows detection of movement of contact 2106 when cursor 2108 is over map 2104. Because the device is in a nested region scrolling mode, map 2104 is translated on the display without translating the webpage displayed in web browser window 2103, as shown in FIG. 5D. For example, map 2104 has been translated in FIG. 5D southeast as indicated by the arrow on map 2104. (The arrow is, itself, not typically displayed but is instead illustrated in the figure for ease of explanation.) In some embodiments, including the instant example, scrolling is performed using a direct scrolling paradigm (i.e., content is translated in the direction of movement of contact 2106, for example, more typical of touch-screen devices and modern touch-pads). In some embodiments, though not shown, scrolling is performed using a reverse scrolling paradigm (e.g., content is translated in the opposite direction of movement of contact 2106, for example, more typical of scroll wheels in conventional mice).

Figure 5E:
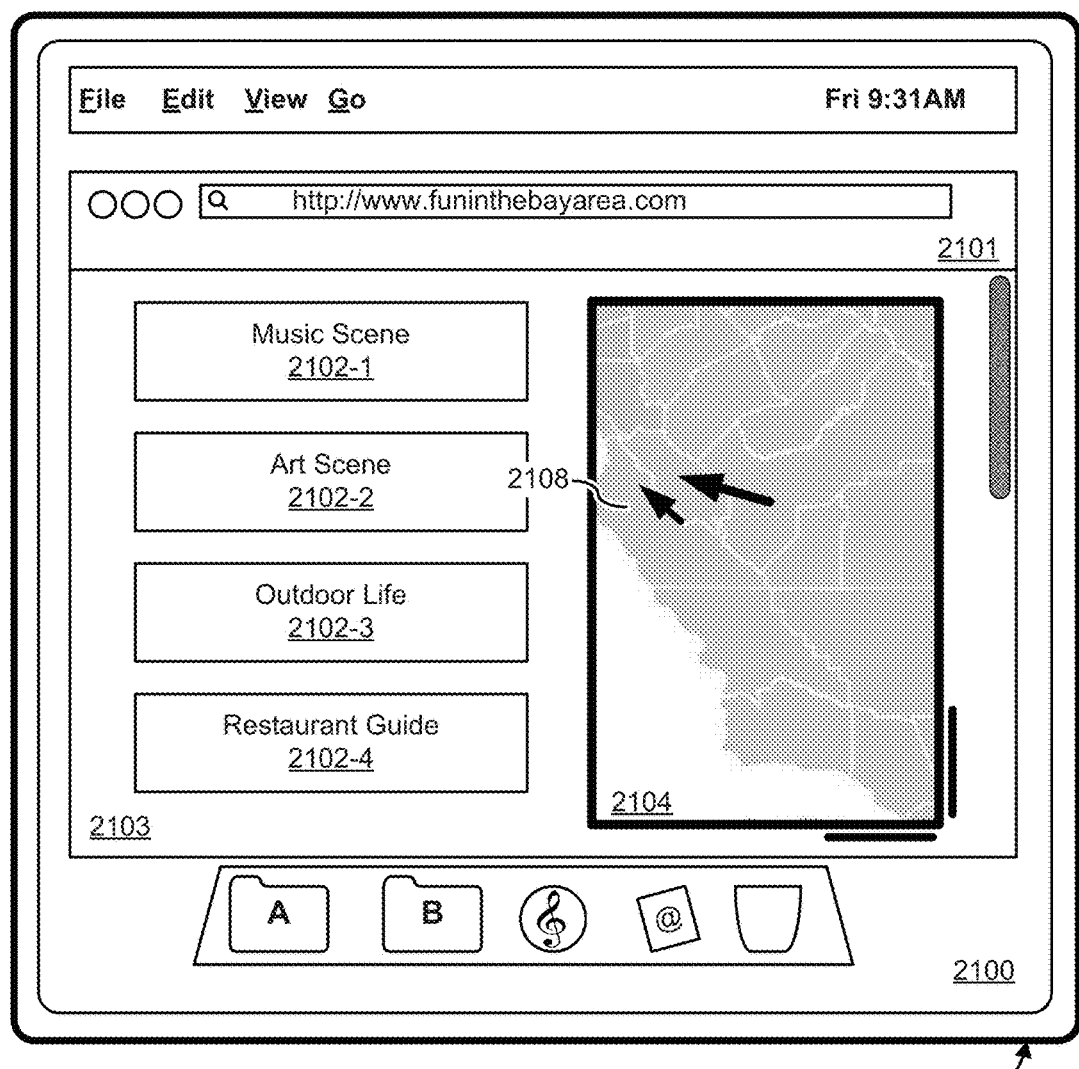
Figure 5E:
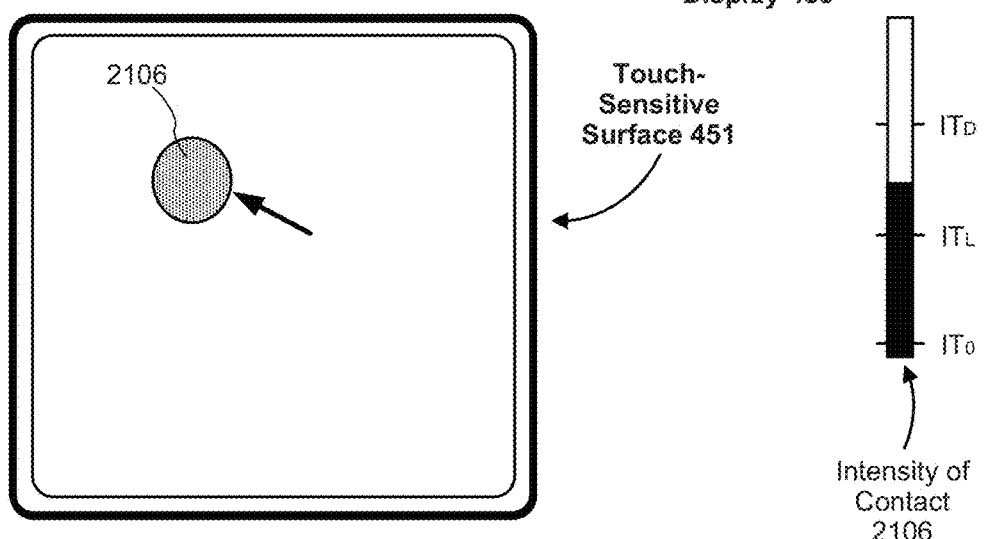

FIG. 5D also illustrates detection of a decrease in intensity of contact 2106 while scrolling map 2104 and while cursor 2108 is still within the region of map 2104. In some embodiments, as illustrated in FIGS. 5D-5E, the device continues to translate map 2104 without translating the webpage displayed in web browser window 2103 despite the drop in intensity below the respective intensity threshold (e.g., $IT_D$).

In some embodiments, though not shown, when a decrease in intensity of contact 2106 is detected below the respective intensity threshold the device ceases translating map 2104 independently and instead scrolls web browser window 2103 (including the currently displayed region of map 2104). Scrolling of web browser window 2103 including map 2104 is described in greater detail below with reference to FIGS. 5F-5G.

In some embodiments, when a contact crosses from a location within map 2104 to a location within web browser 2103 but outside of map 2104, the original scrolling behavior is maintained (e.g., depending on the intensity of contact, map 2104 is scrolled independently or, alternatively, web browser 2103 is scrolled). In some embodiments, the scrolling behavior is changed (e.g., the device translates the webpage displayed in web browser window 2103 regardless of intensity, as described below with reference to FIGS. 5H-5I).

Figure 5F:
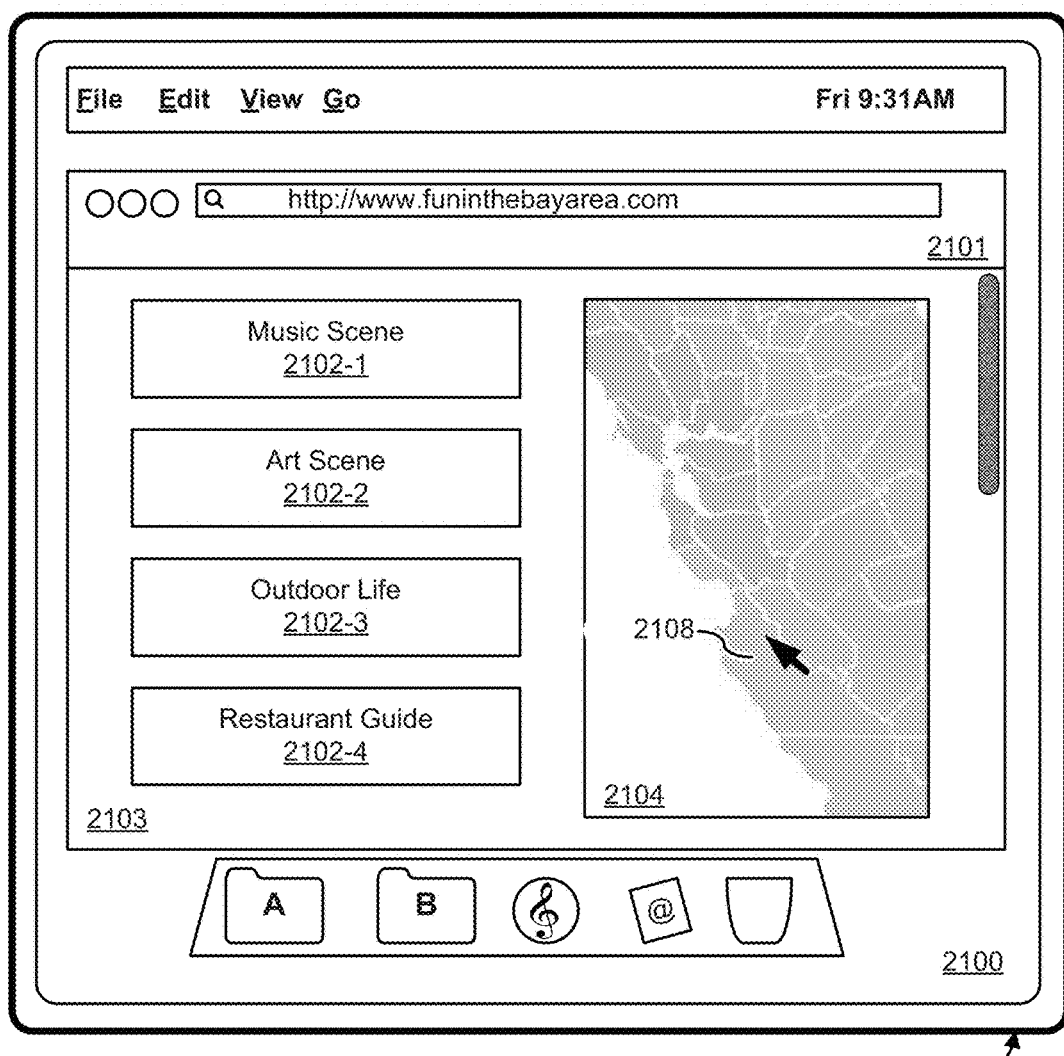
Figure 5F:
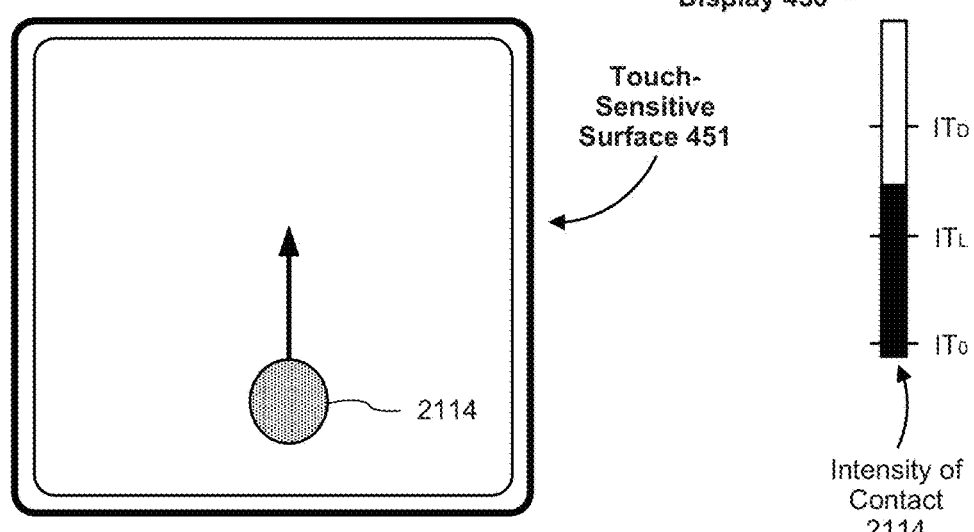
Figure 5G:
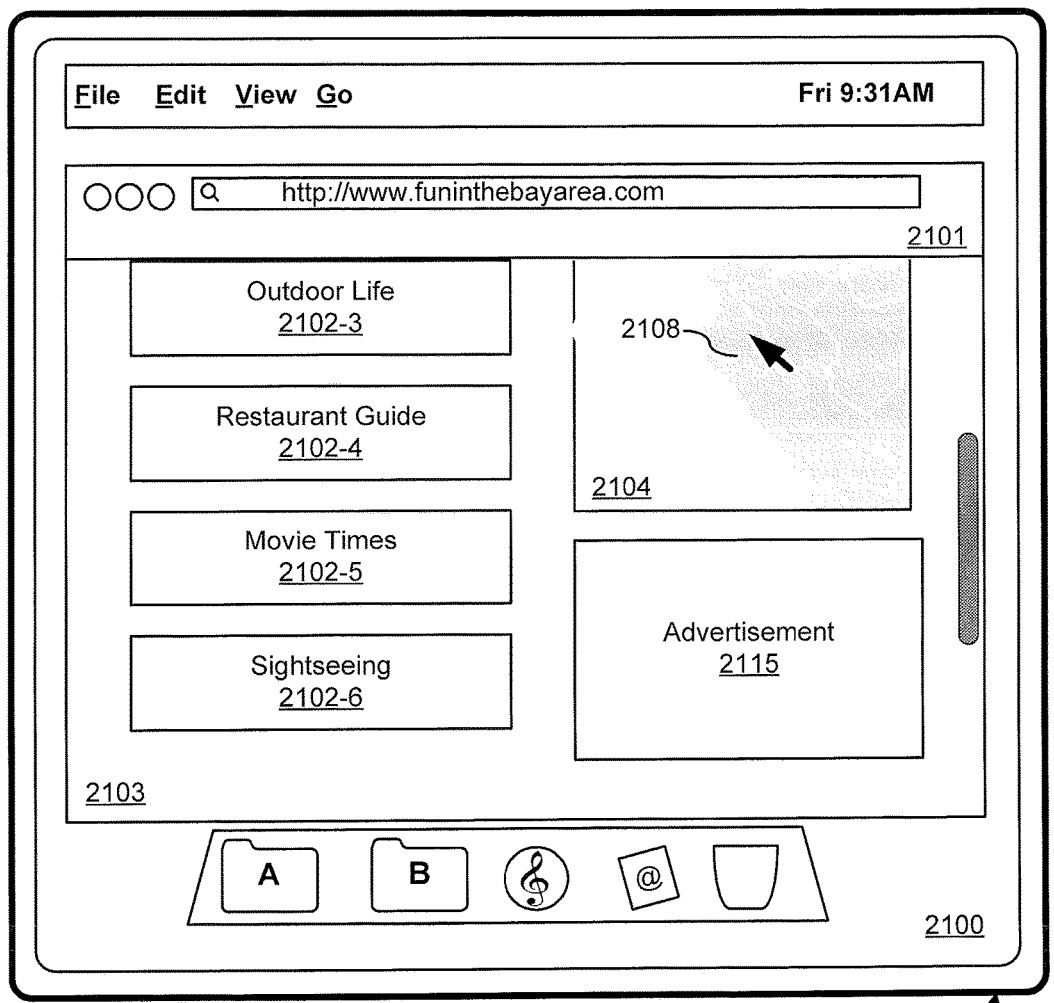
Figure 5G:
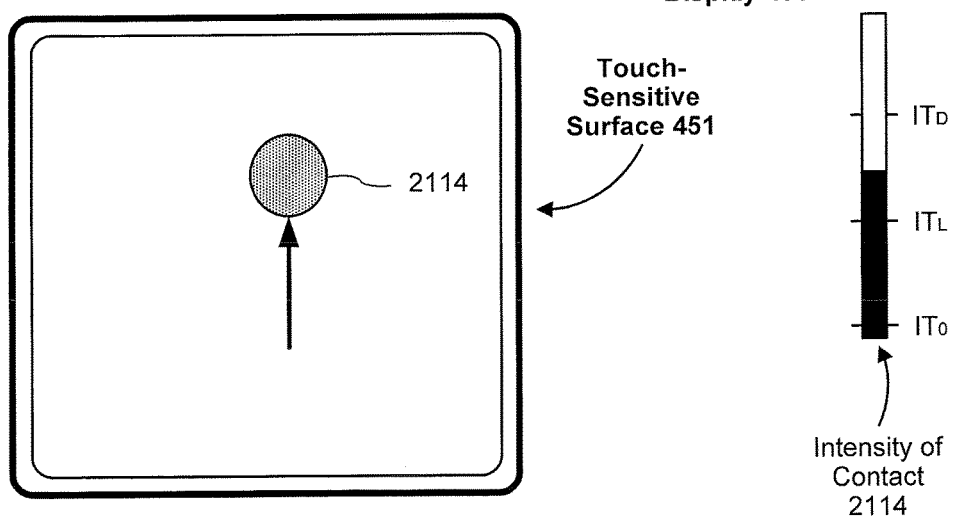

FIG. 5F illustrates detection of a contact 2114 having an intensity above $IT_L$ but below $IT_D$ while cursor 2108 is over map 2104. FIG. 5F also illustrates detection of movement of contact 2114 corresponding to movement of cursor 2108 shown in FIGS. 5F-5G. As a result, as shown in FIG. 5G, the device translates the content of web browser window 2103 including the currently displayed content of map 2104 (e.g., the region of California displayed in map 2104 remains the same while web browser window 2103 is scrolled). Content below the previously displayed content, including user interface objects 2102-5 and 2102-6 and advertisement 2115 is displayed in this manner.

Figure 5H:
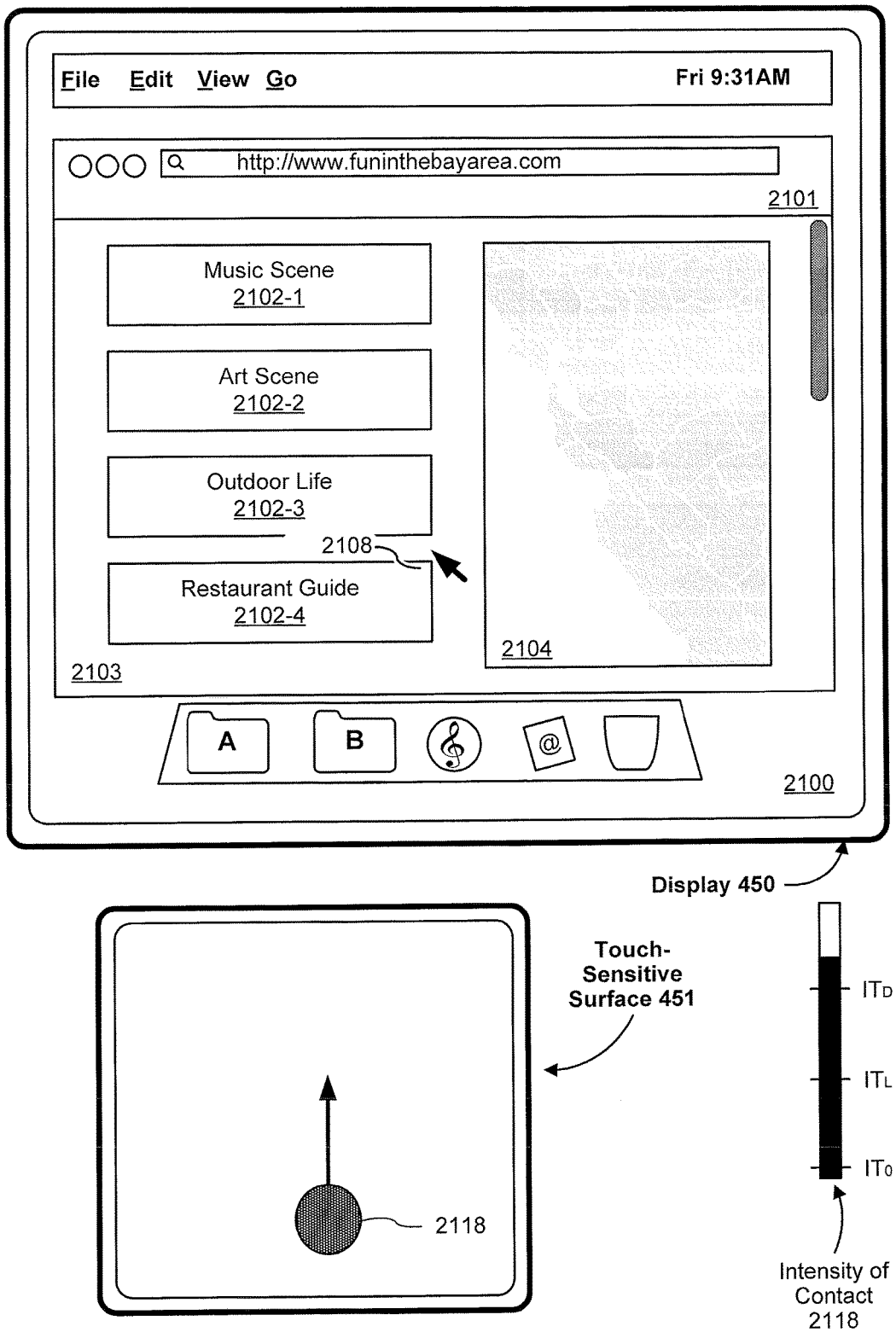
Figure 5I:
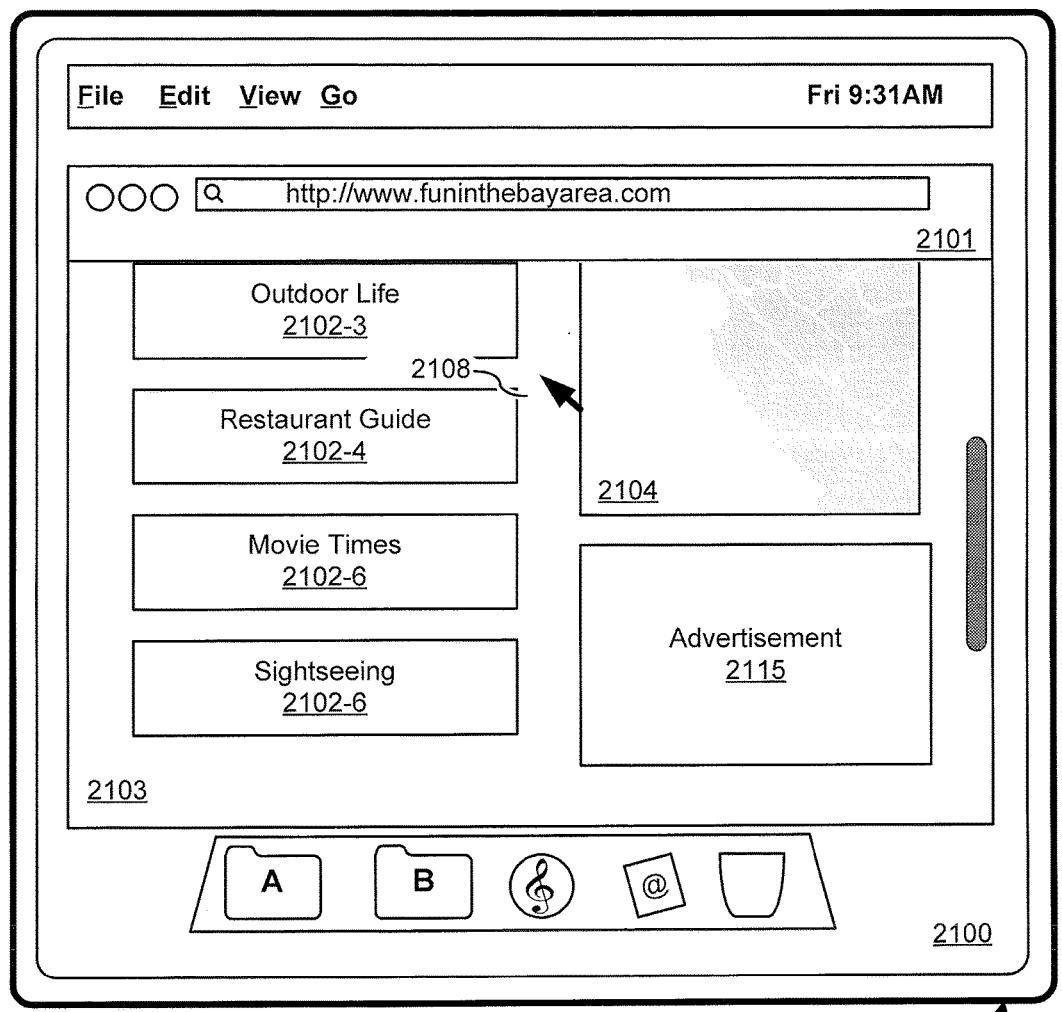
Figure 5I:
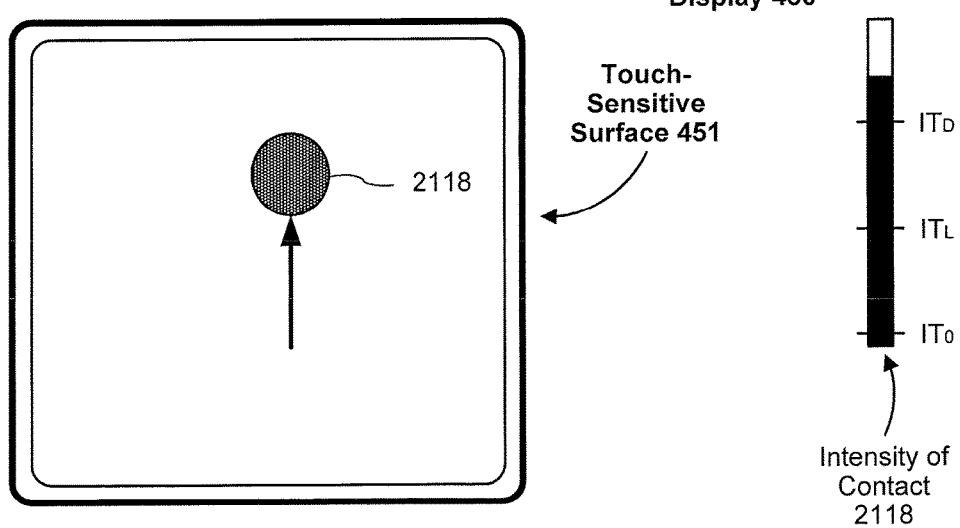

In some embodiments, as shown in FIGS. 5H-5I, detection of a contact 2118 while cursor 2108 is within web browser window 2103 but outside of map 2104 (e.g., within the first region but outside the embedded second region), and detection of movement of contact 2118 while cursor 2108 is within web browser window 2103 but outside of map 2104 results in scrolling of web browser window 2103.

In some embodiments, when a contact crosses from a location within web browser 2103 but outside of map 2104 to a location within map 2104 the original scrolling behavior is maintained (e.g., the device continues to translate the content of web browser window 2103 regardless of intensity). In some embodiments, the scrolling behavior is changed (e.g., depending on the intensity of contact, map 2104 is scrolled independently or web browser 2103 is scrolled).

FIGS. 6A-6C are flow diagrams illustrating a method 2200 of scrolling regions within user interfaces in accordance with some embodiments. The method 2200 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 2200 are, optionally, combined and/or the order of some operations are, optionally, changed.

As described below, the method 2200 provides an intuitive way to scroll regions within user interfaces. The method reduces the cognitive burden on a user when scrolling regions within user interfaces, thereby creating a more efficient human-machine interface. For battery-operated electronic devices, enabling a user to scroll regions within user interfaces faster and more efficiently conserves power and increases the time between battery charges.

The device displays (2202) a user interface (e.g., user interface 2100, FIG. 5A) that includes a first region and a second region. The second region is embedded in the first region so that when content in the first region is moved, the second region moves together with the content in the first region. Content in second region is scrollable independently of other content in the first region. In some embodiments, content in the first region includes (2204) a displayed webpage (e.g., the webpage displayed in browser window 2103, FIG. 5A), and content in the second region includes a map embedded in the webpage (e.g., map 2104, FIG. 5A).

The device detects (2206), on a touch-sensitive surface, a contact (e.g., contact 2106, FIG. 5B) that corresponds to a focus selector (e.g., cursor 2108) on the display. In some embodiments, prior to detecting first movement of the contact across the touch-sensitive surface, the device detects (2208) an increase in intensity of the contact above a respective intensity threshold (e.g., the device detects an increase in intensity of contact 2106 above $IT_D$, FIG. 5C). In some embodiments, the respective intensity threshold is an intensity threshold that is higher than an input-detection intensity threshold at which the contact is initially detected. In some embodiments, in response to detecting the increase in intensity of the contact above the respective intensity threshold, the device modifies (2210) the display of the first region or the second region to indicate that movement of the contact on the touch-sensitive surface will cause content in the second region to be translated on the display without translating other content in the first region on the display (e.g., displaying a drop shadow that corresponds to the first region or the second region on the display to indicate that the first region has been "pushed below" the second region or that the second region has been "pushed below" the first region).

The device detects (2212) first movement of the contact across the touch-sensitive surface. For example, in FIGS. 5C-5D, the device detects movement of contact 2106, in FIGS. 5F-5G, the device detects movement of contact 2114, and in FIGS. 5H-5I, the device detects movement of contact 2118.

In response to detecting the first movement of the contact when the focus selector is at a location on the display within the second region and in accordance with a determination that the contact has a maximum intensity that is below the respective intensity threshold, the device translates (2214) content in the first region on the display (e.g., scrolling the webpage displayed in browser window 2103, FIGS. 5F-5G). In some embodiments, translating content in the first region includes translating all of the content in the first region including content not in the second region. In some embodiments, translating content in the first region also includes translating the second region (e.g., translating the second region rather than translating content in the second region).

In response to detecting the first movement of the contact when the focus selector is at a location on the display within the second region and in accordance with a determination that the contact has a maximum intensity that is above the respective intensity threshold, the device translates (2214) content in the second region on the display without translating other content in the first region on the display (e.g., translating map 2104, FIGS. 5C-5E). In some embodiments, translating content in the first region on the display includes translating (2218) content in the first region in two dimensions, and translating content in the second region on the display includes translating content in the second region in one dimension. In some embodiments, translating content in the first region on the display includes translating (2220) content in the first region in one dimension, and translating content in the second region on the display includes translating content the second region in two dimensions.

In some embodiments, (e.g., scrolling web browser window 2103 in FIGS. 5H-5I) in response to detecting the first movement of the contact when the focus selector is at a location on the display within the first region that does not include the second region, the device translates (2216) all content in the first region, including content not in the second region, on the display without regard to whether the contact is above or below the respective intensity threshold (e.g., when the device detects a gesture on a part of the first region that does not include the second region, the device translates content in the first region without regard to whether or not the contact has an intensity above the respective intensity threshold). In some of these circumstances, translating content in the first region on the display includes translating content in the first region in two dimensions. In some of these circumstances, translating content in the first region on the display includes translating content in the first region in one dimension.

In some embodiments, after (or, optionally, while) translating (2222) content in the second region on the display in accordance with the first movement of the contact without translating other content in the first region on the display, the device detects (2224) a decrease in intensity of the contact below the respective intensity threshold. After detecting the decrease in intensity of the contact, the device detects (2226) second movement of the contact on the touch-sensitive surface. In response to detecting the second movement of the contact, the device continues (2228) to translate content in the second region on the display without translating other content in the first region on the display (e.g., if the intensity of the contact is reduced after independent movement of the second region is initiated, content in the second region continues to move independently of the first region while the contact is continuously detected on the touch-sensitive surface, as shown, for example, in FIGS. 5D-5E).

In some embodiments, after (or, optionally, while) translating (2230) content in the second region on the display in accordance with the first movement of the contact without translating other content in the first region on the display, the device detects (2232) a decrease in intensity of the contact below the respective intensity threshold. After detecting the decrease in intensity of the contact, the device detects (2234) second movement of the contact on the touch-sensitive surface. In response to detecting the second movement of the contact, the device translates (2236) content in the first region on the display in conjunction with translating the second region on the display (e.g., if the intensity of the contact is reduced after independent movement of the second region is initiated, content in the second region stops moving independently of the first region and content in the first region, including the second region, begins to move in response to detection of the second movement of the contact).

It should be understood that the particular order in which the operations in FIGS. 6A-6C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments are also applicable in an analogous manner to method 2200 described above with respect to FIGS. 6A-6C. For example, the contacts, gestures, user interface objects, intensity thresholds, and focus selectors described above with reference to method 2200 optionally have one or more of the characteristics of the contacts, gestures, user interface objects, intensity thresholds, and focus selectors described herein with reference to other methods described herein (e.g., those listed in the fifth paragraph of the Description of Embodiments). For brevity, these details are not repeated here.

Figure 7:
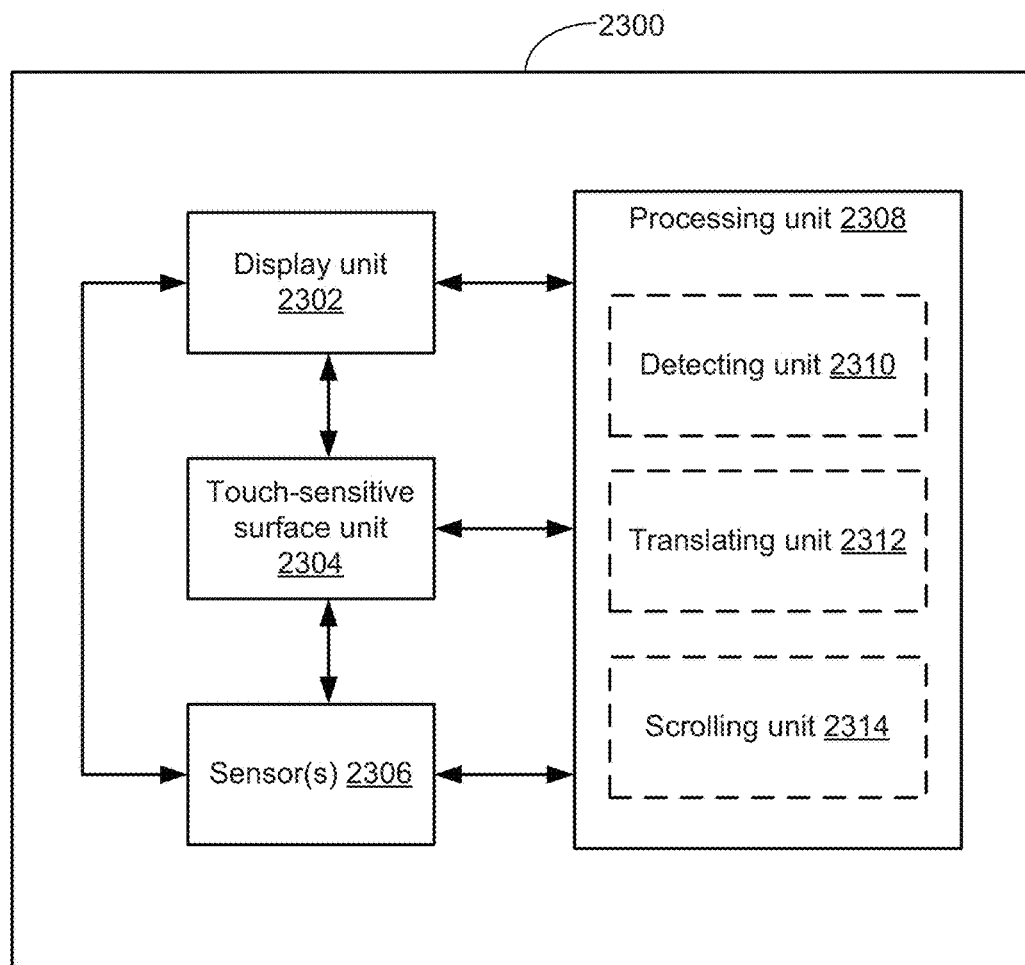
FIG. 7 is a functional block diagram of an electronic device in accordance with some embodiments.

In accordance with some embodiments, FIG. 7 shows a functional block diagram of an electronic device 2300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein. As shown in FIG. 7, an electronic device 2300 includes a display unit 2302 configured to display a user interface. The user interface includes a first region and a second region. The second region is embedded in the first region so that when content in the first region is moved, the second region moves together with the content in the first region. Content in second region is scrollable independently of other content in the first region. In some embodiments, content in the first region includes a displayed webpage, and content in the second region includes a map embedded in the webpage.

The electronic device 2300 includes a touch-sensitive surface unit 2304 configured to receive contacts, one or more sensor units 2306 configured to detect intensity of contacts with the touch-sensitive surface unit 2304; and a processing unit 2308 coupled to the display unit 2302, the touch-sensitive surface unit 2304 and the one or more sensor units 2306. In some embodiments, the processing unit 2308 includes a detecting unit 2310, a translating unit 2312, and a scrolling unit 2314.

The touch-sensitive surface unit 2304 is configured to detect a contact that corresponds to a focus selector on the display unit 2302 and detect first movement of the contact across the touch-sensitive surface unit 2304. The processing unit 2308 is configured to, in response to detecting the first movement of the contact when the focus selector is at a location on the display unit 2302 within the second region and in accordance with a determination that the contact has a maximum intensity that is below a respective intensity threshold, translate content in the first region on the display unit 2302 (e.g., with translating unit 2312). The processing unit 2308 is further configured to, in response to detecting the first movement of the contact when the focus selector is at a location on the display unit 2302 within the second region and in accordance with a determination that the contact has a maximum intensity that is above the respective intensity threshold, translate content in the second region on the display unit 2302 without translating other content in the first region on the display unit 2302.

In some embodiments, the processing unit 2308 is further configured to, prior to detecting the first movement of the contact across the touch-sensitive surface unit 2304, detect (e.g., with detecting unit 2310) an increase in intensity of the contact above the respective intensity threshold. In response to detecting the increase in intensity of the contact above the respective intensity threshold, modify the display of the first region or the second region to indicate that movement of the contact on the touch-sensitive surface unit 2304 will cause the second region to be translated on the display unit 2302 without translating the first region on the display unit 2302.

In some embodiments, the processing unit 2308 is further configured to, in response to detecting the first movement of the contact when the focus selector is at a location on the display unit 2302 within the first region that does not include the second region, translate all content in the first region, including content not in the second region, on the display unit 2302 without regard to whether the contact is above or below the respective intensity threshold.

In some embodiments, translating content in the first region on the display unit 2302 includes translating content in the first region in two dimensions, and translating content in the second region on the display unit 2302 includes translating content in the second region in one dimension. In some embodiments, translating content in the first region on the display unit 2302 includes translating content in the first region in one dimension; and translating content in the second region on the display unit 2302 includes translating content in the second region in two dimensions.

In some embodiments, the processing unit 2308 is further configured to, after translating content in the second region on the display unit 2302 in accordance with the first movement of the contact without translating other content in the first region on the display unit 2302, detect a decrease in intensity of the contact below the respective intensity threshold. After detecting the decrease in intensity of the contact, the processing unit 2308 is further configured to detect second movement of the contact on the touch-sensitive surface unit 2304 and, in response to detecting the second movement of the contact, continue to translate content in the second region on the display unit 2302 without translating other content in the first region on the display unit 2302.

In some embodiments, the processing unit 2308 is further configured to, after translating content in the second region on the display unit 2302 in accordance with the first movement of the contact without translating other content in the first region on the display unit 2302, detect a decrease in intensity of the contact below the respective intensity threshold. After detecting the decrease in intensity of the contact, the processing unit 2308 is configured to detect second movement of the contact on the touch-sensitive surface unit 2304, and in response to detecting the second movement of the contact, translate content in the first region on the display unit 2302 in conjunction with translating the second region on the display unit 2302.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6C are, optionally, implemented by components depicted in FIGS. 1A-1B or FIG. 7. For example, displaying operation 2202, detecting operation 2204, and translating operation 2214 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Displaying Word Definitions

When a user is reading or entering text in an electronic document, the user may wish to interact with a particular word in the text. For example, the user may wish to obtain a definition for the word. In some methods, the user can request display of the definition for a word by selecting the word, performing another input while the word is selected (for example, a right-click) to bring up an affordance for looking the word up in a dictionary, and then activating the affordance. This process involves multiple steps on the part of the user, and thus can be tedious and time-consuming. The embodiments below improve on these methods by allowing the user to activate display of a definition for a word by, while a focus selector is located at the word, performing a gesture with contact whose intensity goes above an intensity threshold. This makes reading and text input more efficient by allowing the user to get word definitions more quickly.

FIGS. 8A-8N illustrate exemplary user interfaces for displaying word definitions in accordance with some embodiments. The user interfaces in these figures are used to illustrate the processes described below, including the processes in FIGS. 9A-9B. FIGS. 8A-8C, 8E-8J and 8L-8N include intensity diagrams that show the current intensity of the contact on the touch-sensitive surface relative to a plurality of intensity thresholds including a respective threshold (e.g., "$IT_D$"). In some embodiments, operations similar to those described below with reference to "$IT_D$" are performed with reference to a different intensity threshold (e.g., "$IT_L$").

FIG. 8A illustrates user interface 2700 displayed on display 450 (e.g., display 340) of a device (e.g., device 300), and textual content 2702 displayed in user interface 2700. User interface 2700 is an interface corresponding to an application that can display text. For example, user interface 2700 is, optionally, an interface for a web browser application, text editor application, word processor application, note application, messaging (e.g., email, chat) application, e-book application, document reader application, and so on. Depending on the application to which user interface 2700 corresponds, textual content 2702 is, optionally, editable by a user from within user interface 2700. In some embodiments, textual content 2702 is an electronic document (for example, text document, word processor document, email message, web page, electronic book). Textual content 2702 includes one or more words 2704. For example, as shown in FIG. 8A, words 2704 includes word 2704-1 "Gettysburg," as well as other words.

Cursor 2706 (for example, a mouse pointer) is also displayed in user interface 2700. Cursor 2706 is an example of a focus selector. A user may use an input device (e.g., mouse 350, touchpad 355, touch-sensitive surface 451) to position pointer 2704 to a location in user interface 2700.

A gesture (for example, a tap gesture or a press input) that includes an increase in intensity of contact 2708 from an intensity below a light press intensity threshold (e.g., "$IT_L$") to an intensity above the light press intensity threshold (e.g., "$IT_L$") is detected on touch-sensitive surface 451 (e.g., touchpad 355) of the device while a focus selector (e.g., cursor 2706) is displayed at a location corresponding to word 2704-1 (for example, over the word 2704-1 "Gettysburg"). The device determines, based on measurements from one or more sensors for detecting the intensity of contacts on touch-sensitive surface 451, that the maximum intensity of contact 2708 is below a predefined intensity threshold (e.g., below deep press intensity threshold "$IT_D$"). Contact 2708 is depicted as a shape with a blank background to represent its status of having a maximum intensity below the predefined threshold. In some embodiments, the gesture ends with a decrease in intensity of contact 2708 to an intensity below a gesture-detection intensity threshold that is at or below the light press intensity threshold (e.g., "$IT_L$") as shown in FIG. 8C. In some embodiments, the gesture ends with liftoff of contact 2708, as shown in FIG. 8D.

In response to detecting the gesture that included a press input performed with contact 2708, and in accordance with the determination that the maximum intensity of contact 2708 is below the predefined threshold (e.g., "$IT_D$"), a user interface for interacting with word 2704-1 is displayed when the end of the gesture is detected. In some embodiments, the use interface for interacting with word 2704-1 includes a text cursor, insertion point, or the like. For example, if textual content 2702 is editable from within user interface 2700, text cursor 2710 is, optionally, displayed near word 2704-1 (for example, at the beginning or end of word 2704-1, or within word 2704-1), as shown in FIG. 8B. Text cursor 2710 indicates a current location in textual content 2702 at which the user optionally request that the device insert additional characters or delete characters from textual content 2702 (e.g., by activating keys on a physical or virtual keyboard).

Figure 8D:
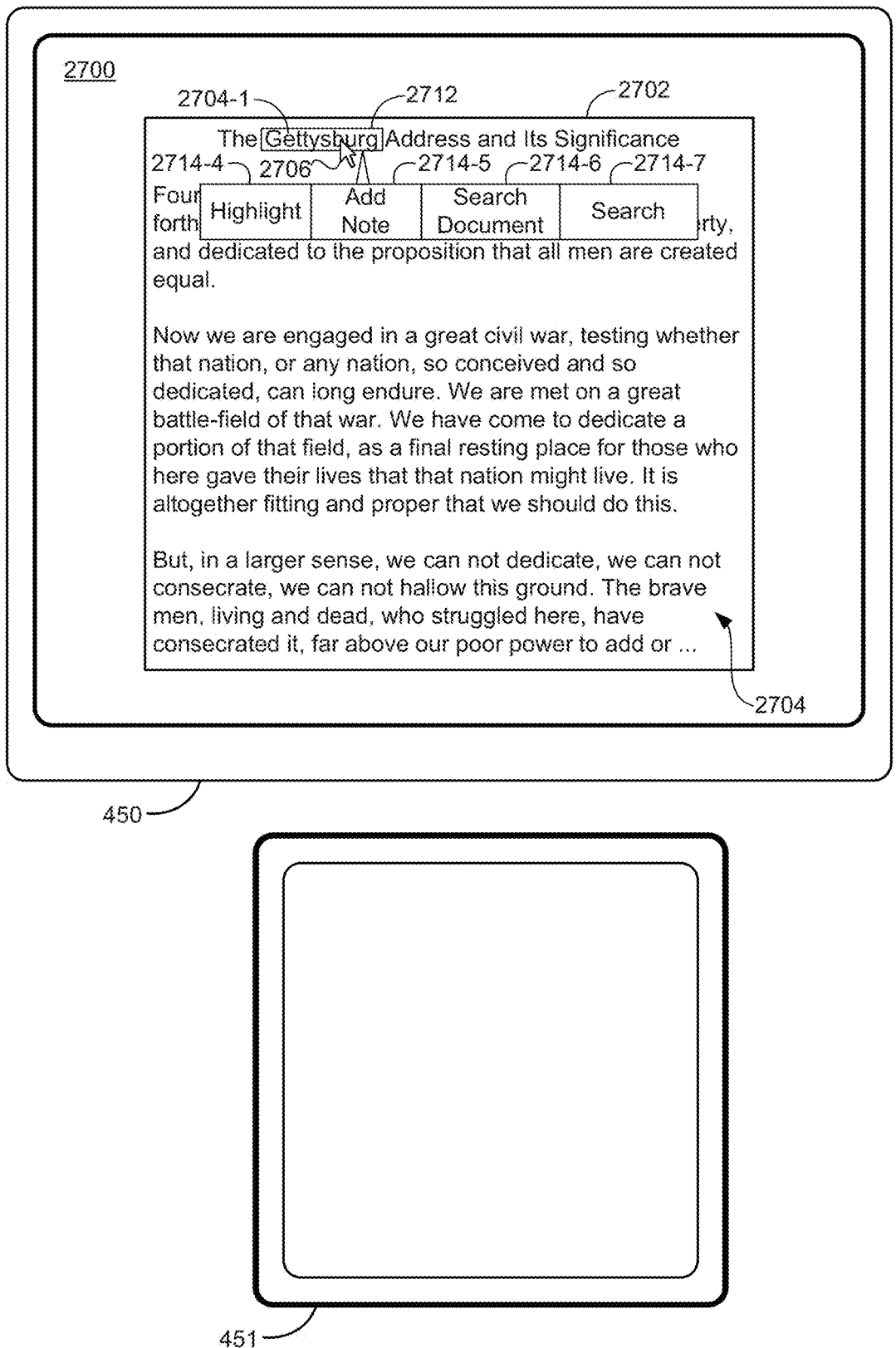

In some embodiments, word 2704-1 is selected, as shown in FIGS. 8C-8D, where word 2704-1 is shown with selection area 2712. In some embodiments, the use interface for interacting with word 2704-1 includes one or more affordances 2714 for interacting with word 2704-1. For example, "Cut" affordance 2714-1, "Copy" affordance 2714-2, and "Paste" affordance 2714-3 is, optionally, displayed, as shown in FIG. 8C. A user optionally activates "Cut" affordance 2714-1 to copy word 2704-1 (e.g., to a virtual clipboard for pasting elsewhere) and to delete word 2704-1 from textual content 2702. A user optionally activates "Copy" affordance 2714-2 to copy word 2704-1 (e.g., to a virtual clipboard for pasting elsewhere). A user optionally activates "Paste" affordance 2714-3 to insert previously copied text (e.g., text copied into a virtual clipboard) as a replacement for word 2704-1.

Other examples of affordances for interacting with word 2704-1 include, for example, "Highlight" affordance 2714-4, "Add Note" affordance 2714-5, "Search Document" affordance 2714-6, and "Search" affordance 2714-7, as shown in FIG. 8D. A user optionally activates "Highlight" affordance 2714-4 to highlight (e.g., with yellow or green color) word 2704-1. A user optionally activates "Add Note" affordance 2714-5 to create a note to be associated with word 2704-1. A user optionally activates "Search Document" affordance 2714-6 to search textual content 2702 using word 2704-1 as a search term. A user optionally activates "Search" affordance 2714-7 to search an information repository (e.g., a search engine, an online encyclopedia) using word 2704-1 as a search term.

Figure 8E:
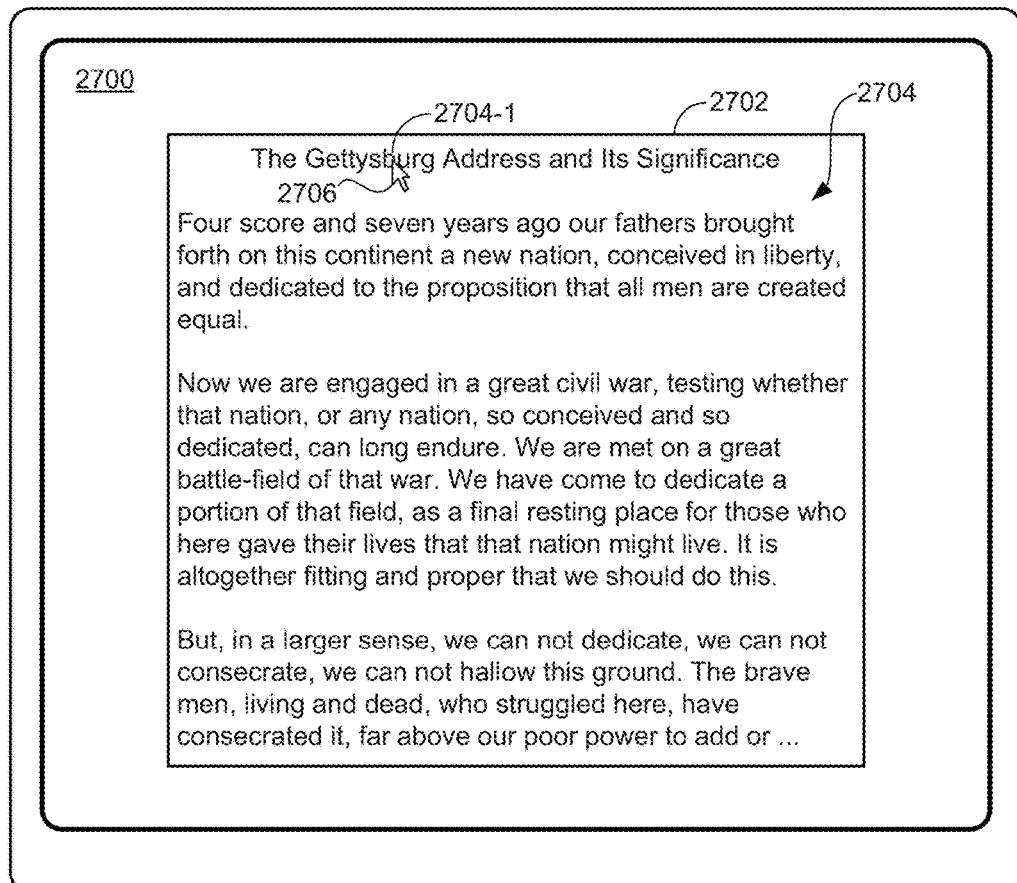
Figure 8E:
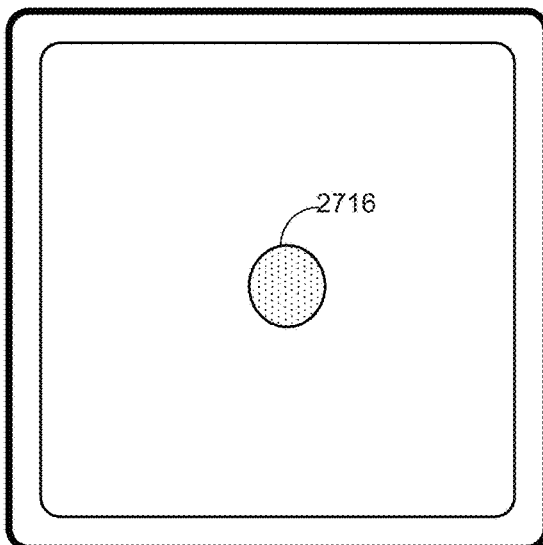
Figure 8E:
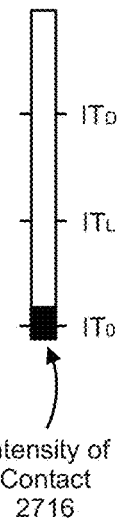
Figure 8F:
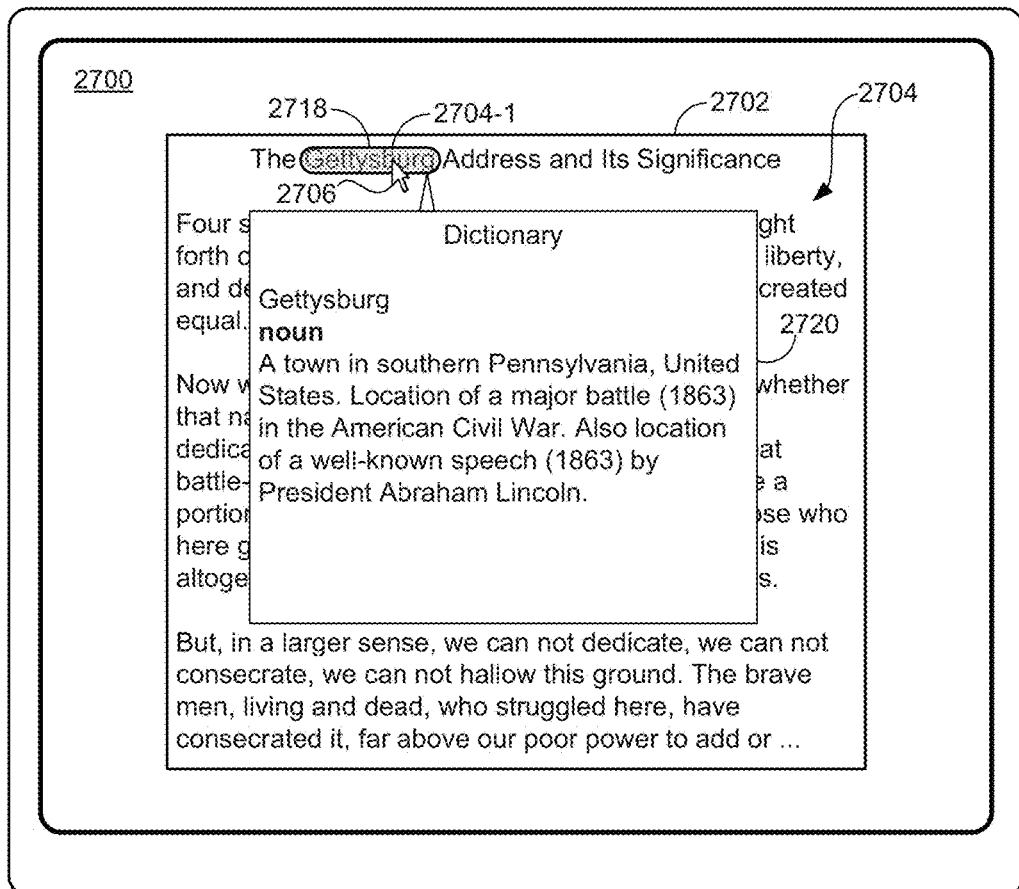
Figure 8F:
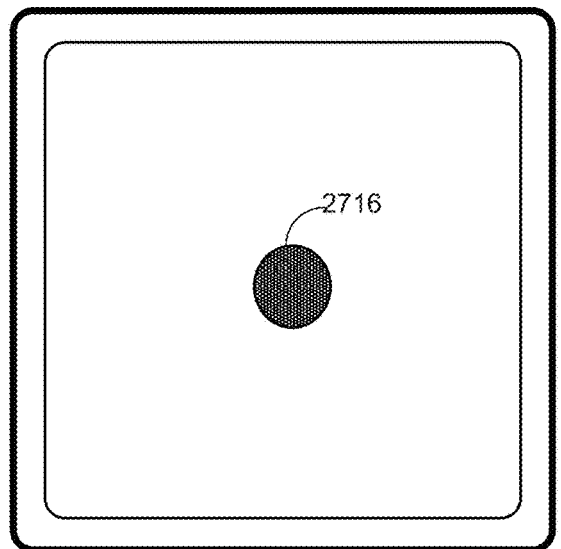
Figure 8F:
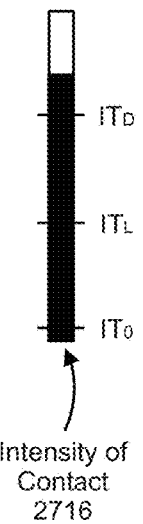

FIGS. 8E-8F show, instead of (or after) detecting the gesture that includes an increase in intensity of contact 2708, detecting a gesture (e.g., a pressing gesture) that includes an increase in intensity of contact 2716 from an intensity below a deep press intensity threshold (e.g., "$IT_D$") to an intensity above the deep press intensity threshold (e.g., "$IT_D$") on touch-sensitive surface 451. The device determines, based on measurements form one or more sensors for detecting the intensity of contacts on touch-sensitive surface 451, that intensity of contact 2716 goes above the predefined threshold (e.g., "$IT_D$") during the gesture. In some embodiments, the gesture ends with a liftoff of contact 2716 or a decrease in intensity of contact 2716 below a gesture-detection intensity threshold that is at or below the deep press intensity threshold (e.g., "$IT_D$").

Figure 8G:
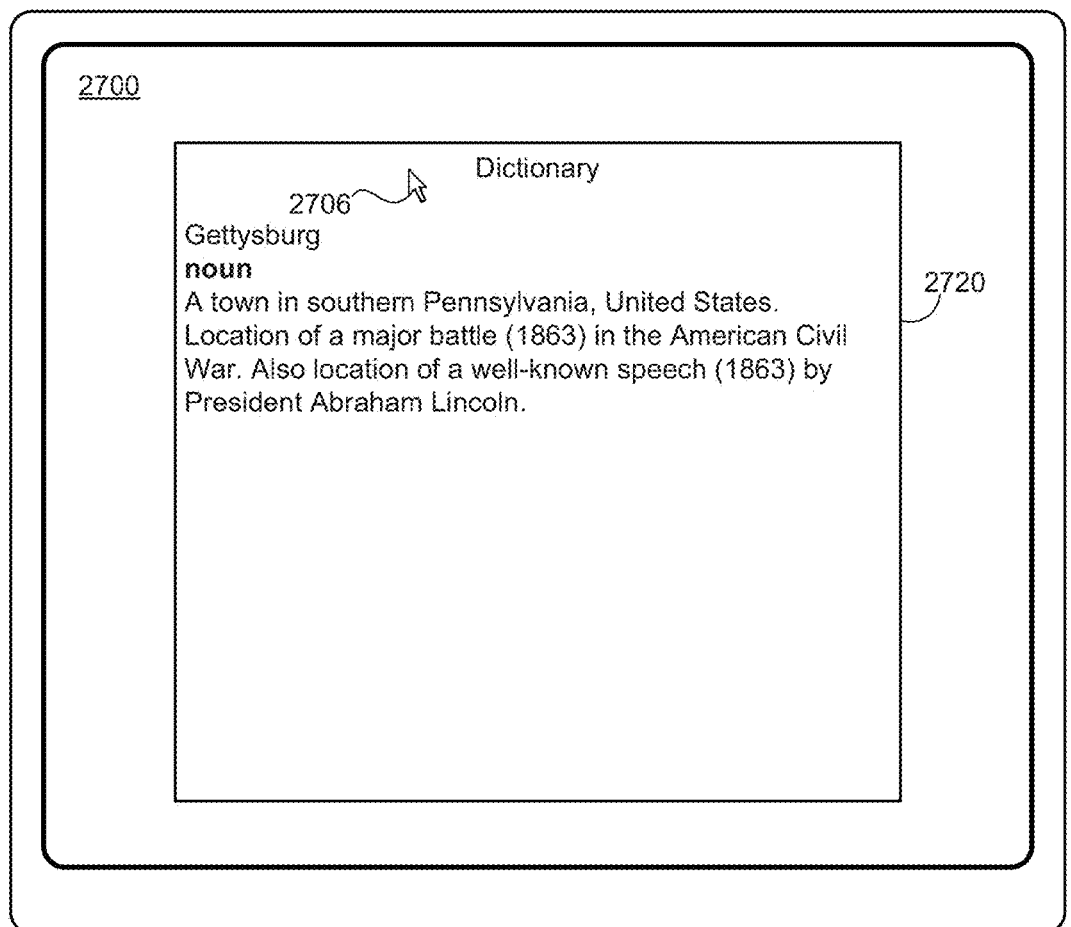
Figure 8G:
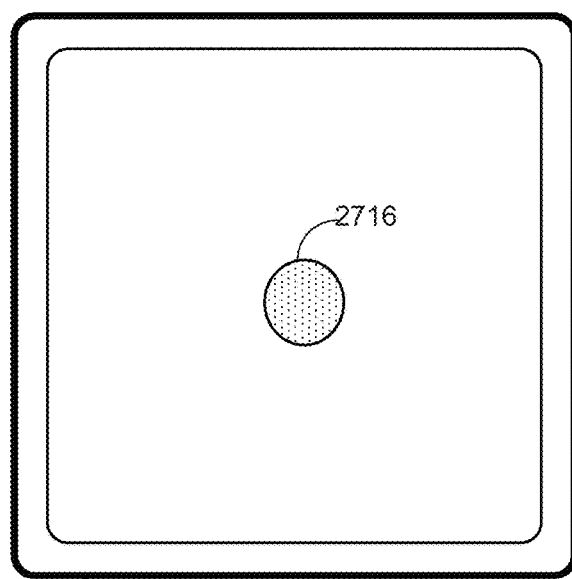
Figure 8G:
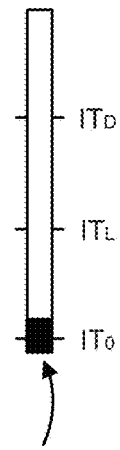

In response to detecting the gesture that corresponds to the increase in intensity of contact 2716, and in accordance with the determination that the maximum intensity of contact 2716 is above the predefined threshold (e.g., "$IT_D$"), definition 2720 for word 2704-1 is displayed, as shown in FIGS. 8F-8G. Definition 2720 for word 2704-1 is, optionally, retrieved from a dictionary stored in memory (e.g., memory 370) or from an online source (e.g., an online dictionary).

In some embodiments, word 2704-1 is, optionally, displayed with visual embellishments or emphasis to indicate the association between definition 2720 and word 2704-1. For example, word 2704-1 is, optionally, displayed with colored background area 2718, as shown in FIG. 8F. Other visual embellishments optionally include highlighting, bold font, italics, larger font size, and visual effects that make word 2704-1 appear to hover above textual content 2702.

In some embodiments, words 2704 cease to be displayed and definition 2720 is displayed in place of words 2704, as shown in FIG. 8G. For example, definition 2720 is, optionally, displayed in place of textual content 2702 or as an overlay or pop-up over the part of textual content 2702 with words 2704. In some other embodiments, word 2704-1 (and at least parts of textual content 2702) continues to be displayed while definition 2720 is displayed, as shown in FIG. 8F. For example, definition 2720 is, optionally, displayed as an overlay or pop-up that does not cover word 2704-1.

In some embodiments, definition 2720 is displayed during the gesture, in response to the intensity of contact 2716 going above the predefined threshold (e.g., "$IT_D$"), as shown in FIG. 8F. In some other embodiments, definition 2720 is displayed when the end of the gesture (e.g., in response to detecting a liftoff of contact 2716 or a decrease in intensity of contact 2716 below a contact-detection threshold that is below the predefined threshold) is detected, as shown in FIG. 8G.

Figure 8H:
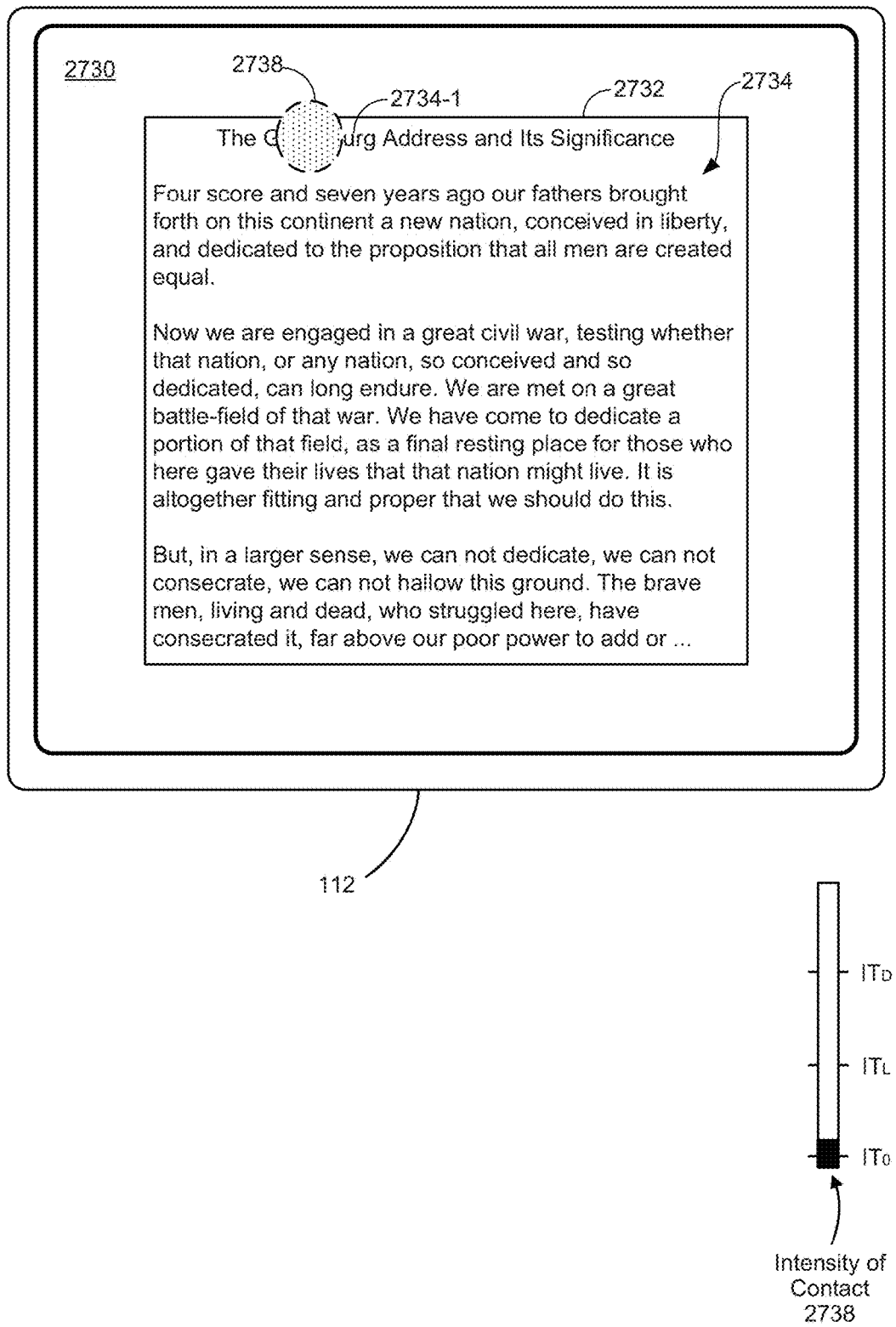
Figure 8I:
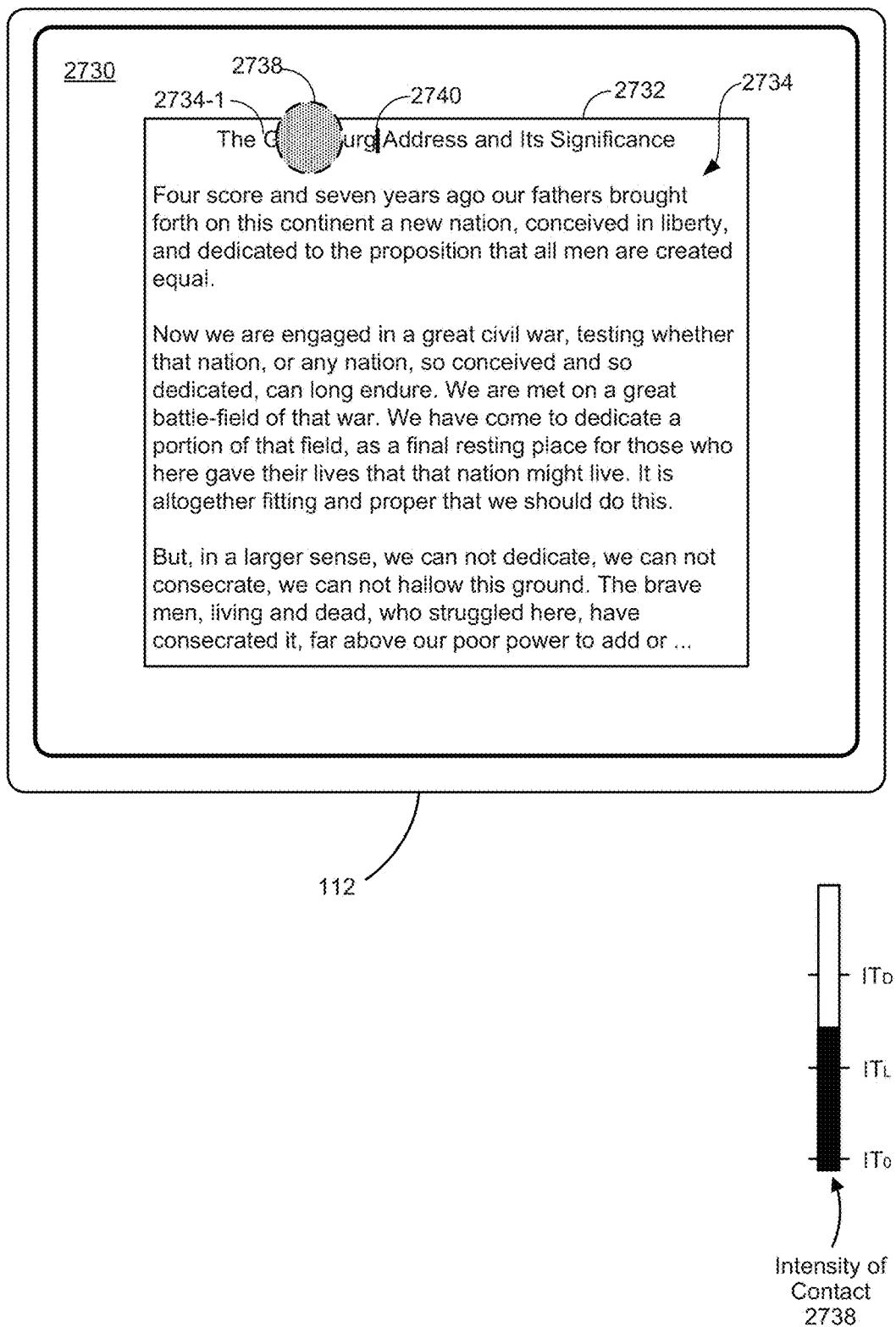
Figure 8J:
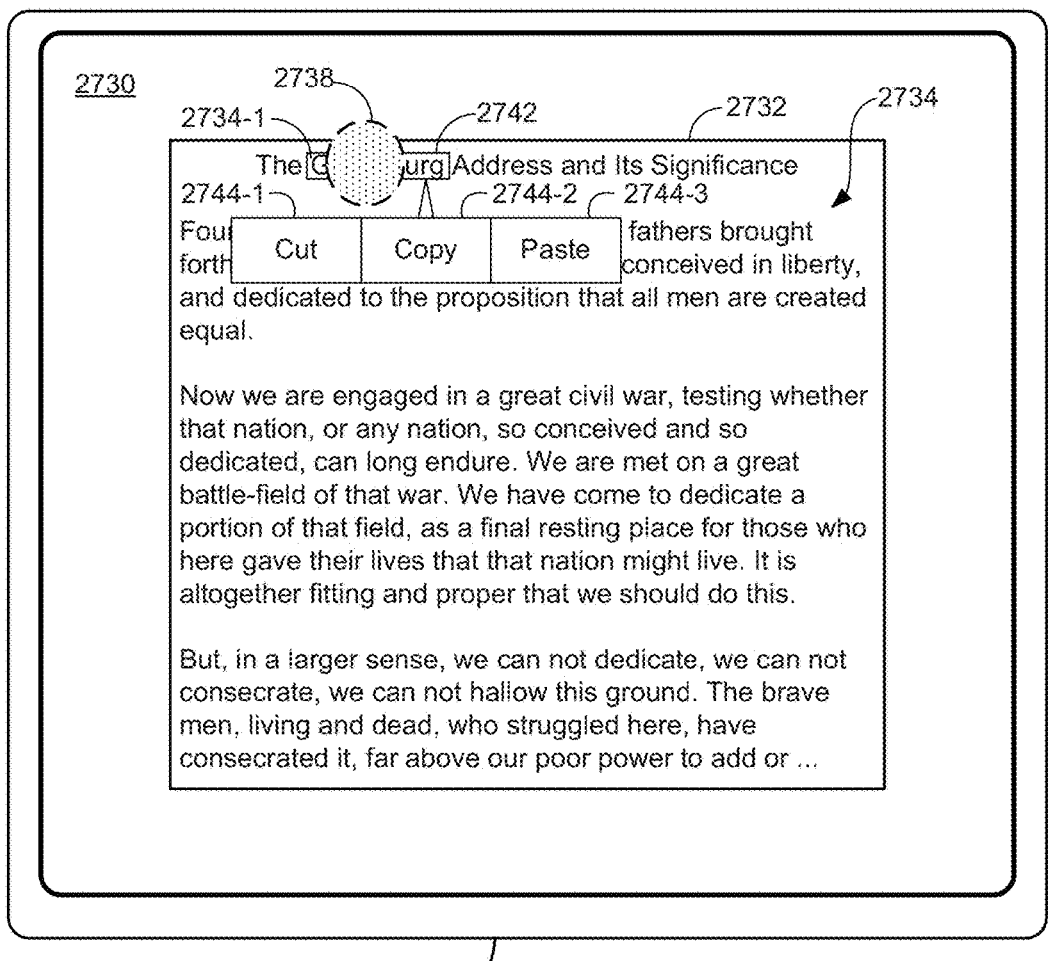
Figure 8J:
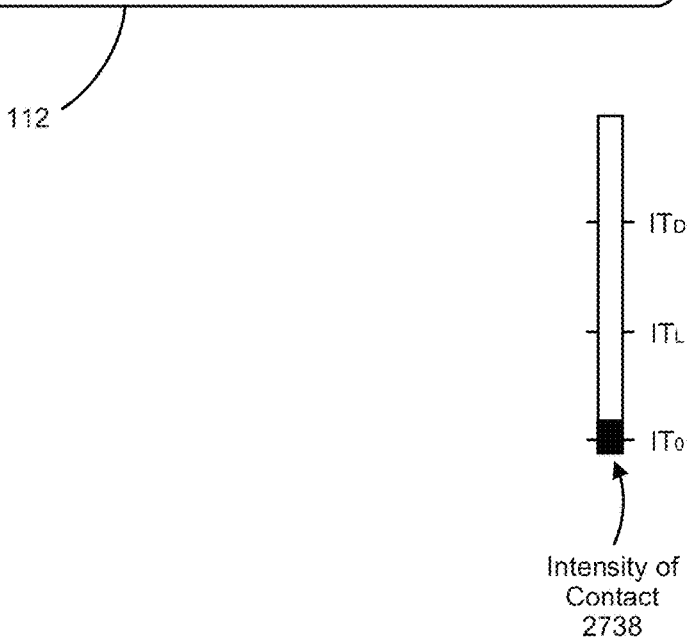
Figure 8K:
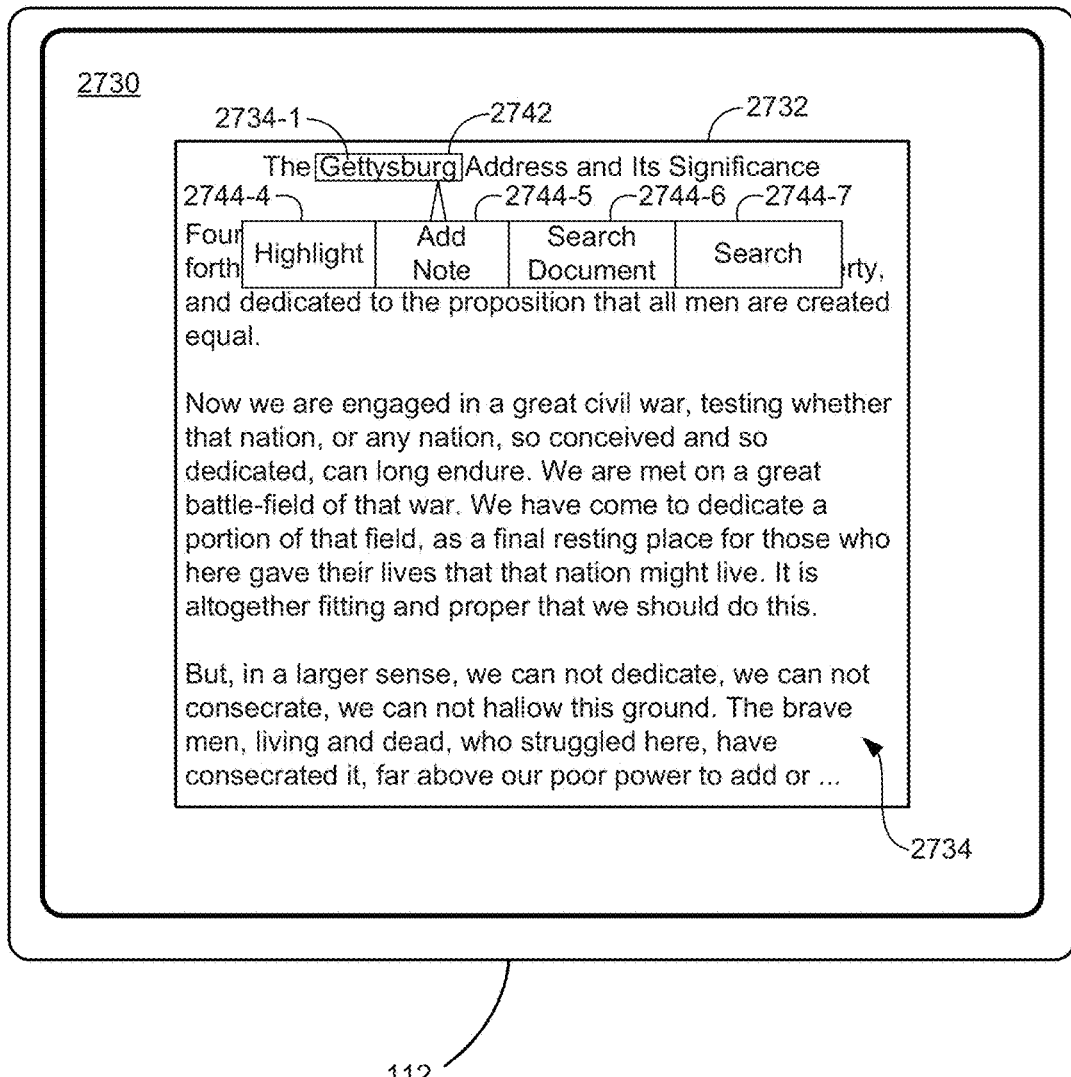
Figure 8L:
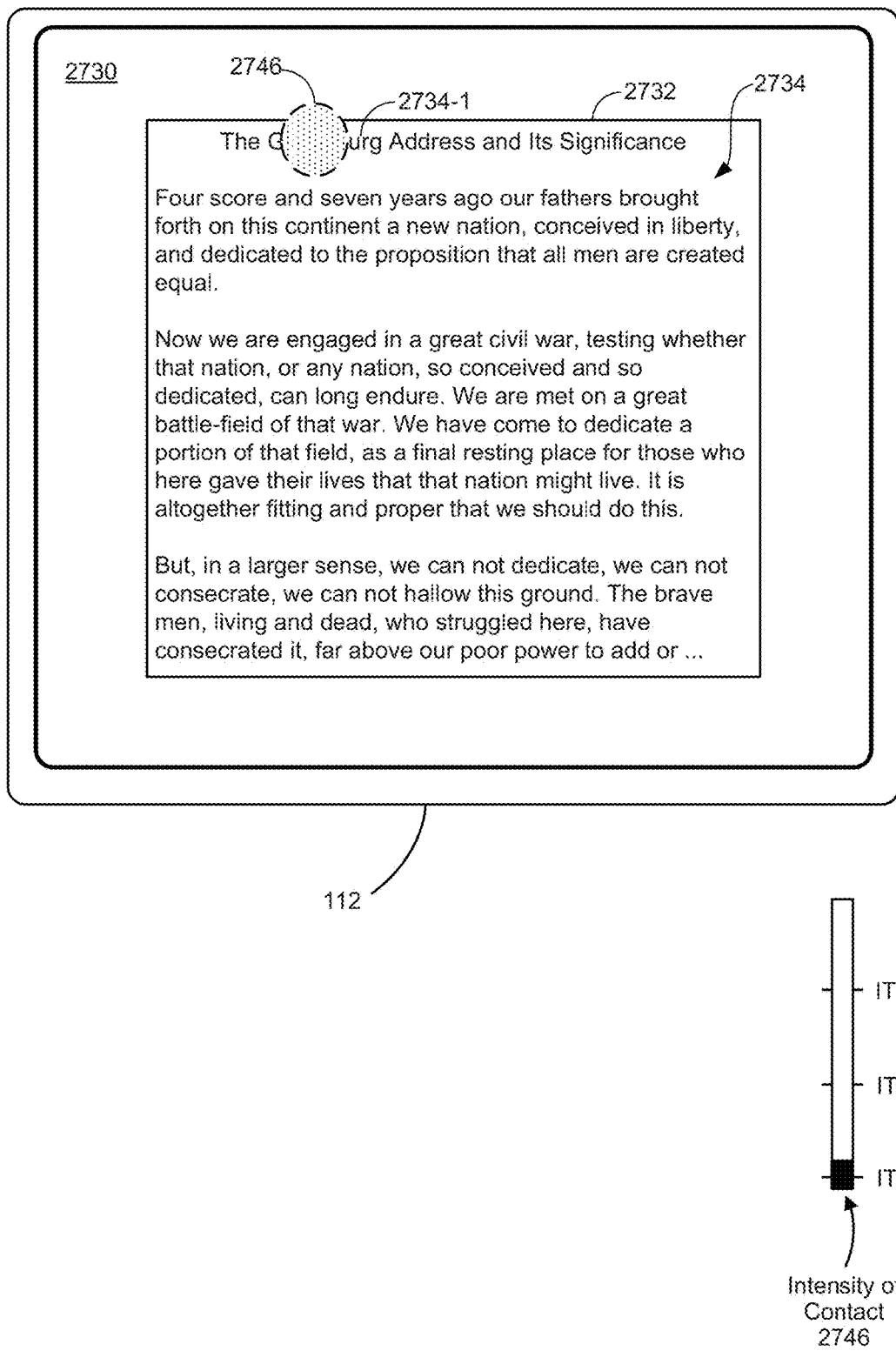
Figure 8M:
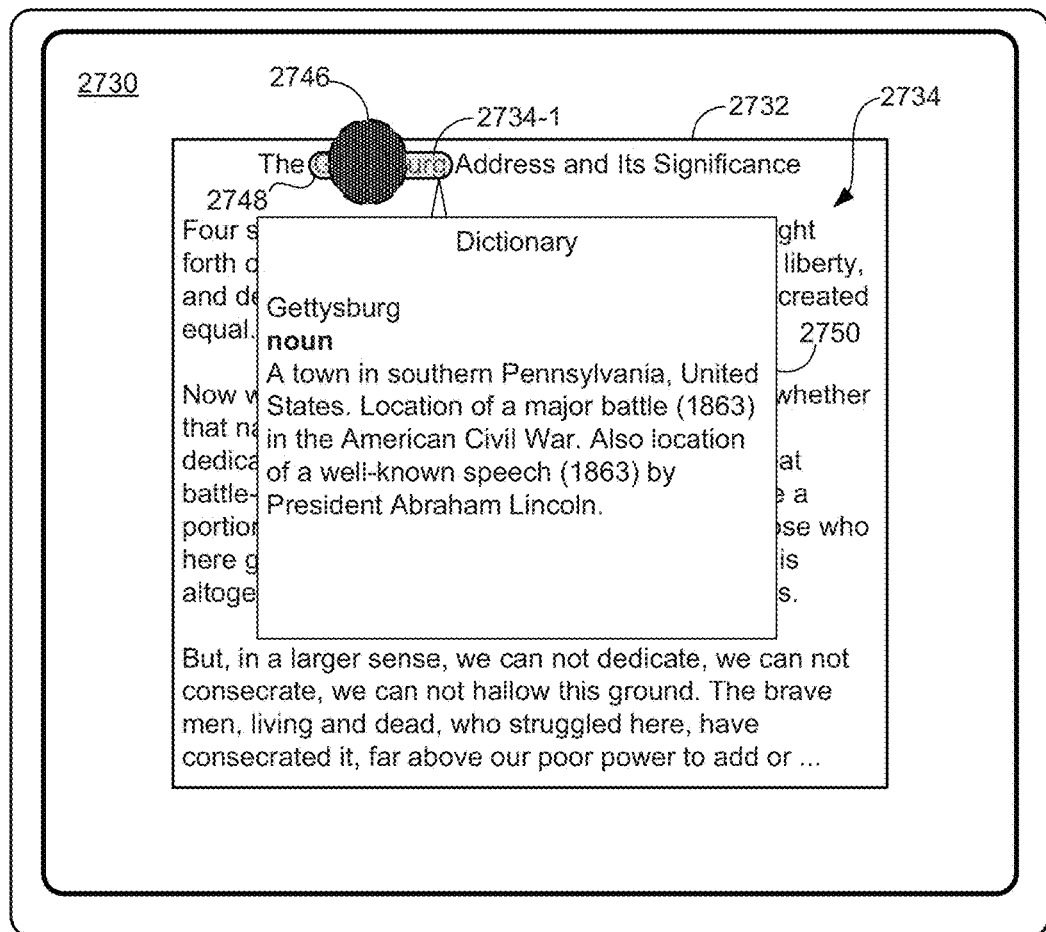
Figure 8M:
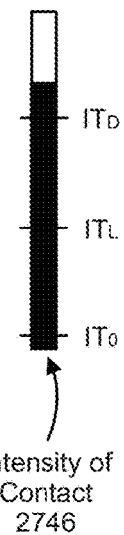
Figure 8N:
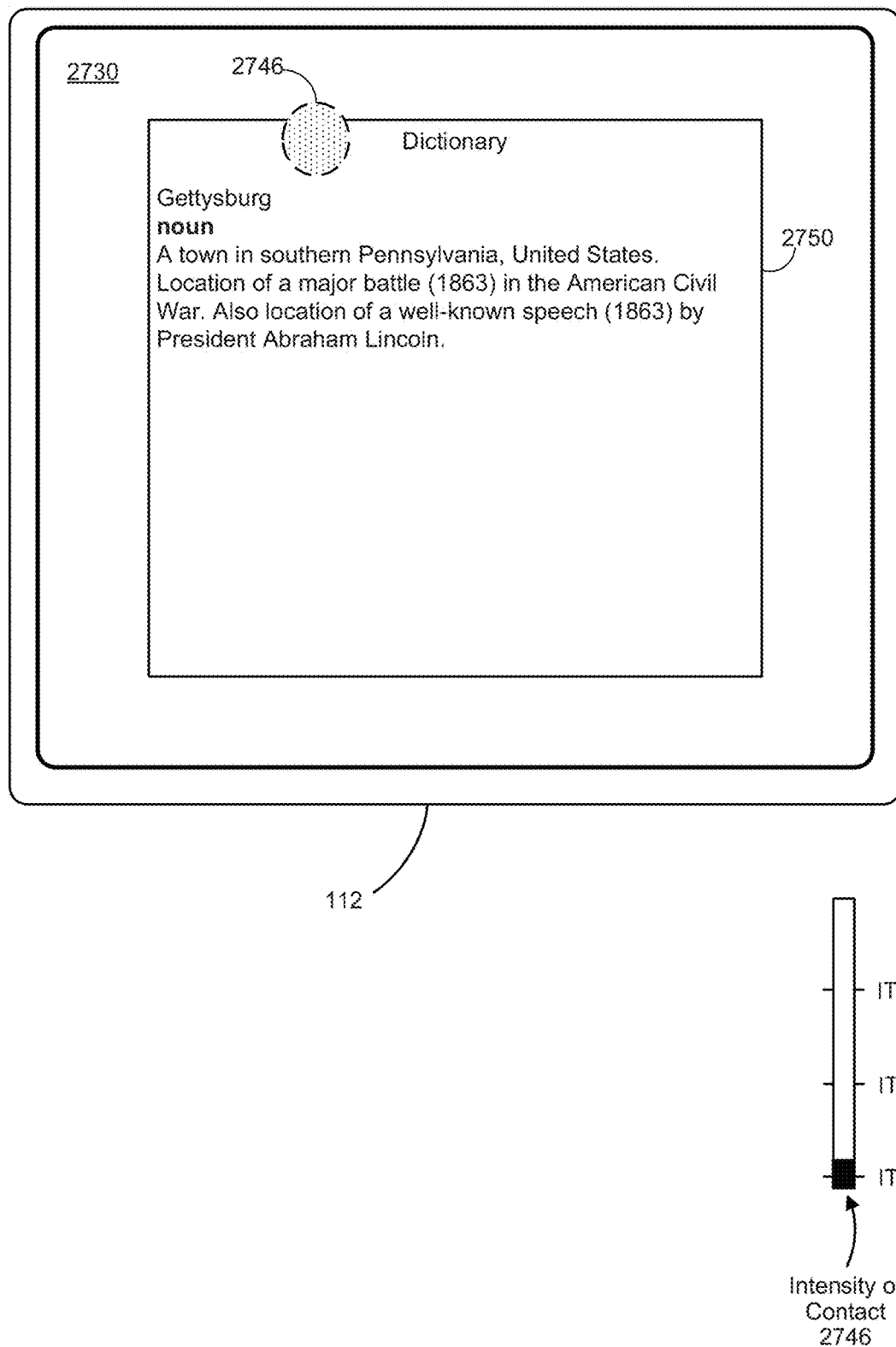

FIGS. 8H-8N illustrate examples of the user interfaces described above, with reference to FIGS. 8A-8G, implemented on a device (e.g., device 100) with a touch-sensitive display (e.g., touch screen 112). FIG. 8H illustrates user interface 2730 displayed on touch-sensitive display (e.g., touch screen 112) of a device (e.g., device 100), and textual content 2732 is displayed in user interface 2730. In some embodiments, textual content 2732 is an electronic document (for example, text document, word processor document, email message, web page, electronic book). Textual content 2732 includes one or more words 2734. For example, as shown in FIG. 8H, words 2734 includes word 2734-1 "Gettysburg," as well as other words.

A gesture (for example, a tap gesture or a press input) that includes an increase in intensity of contact 2738 from an intensity below a light press intensity threshold (e.g., "$IT_L$") to an intensity above the light press intensity threshold (e.g., "$IT_L$") is detected on touch-sensitive display 112 at a location corresponding to word 2734-1 (for example, over word 2734-1). The device determines, based on measurements from one or more sensors for detecting the intensity of contacts on touch-sensitive display 112 that the maximum intensity of contact 2738 is below a predefined intensity threshold (e.g., below deep press intensity threshold "$IT_D$"). In some embodiments, the gesture ends with a decrease in intensity of contact 2738 to an intensity below a gesture-detection intensity threshold that is at or below the light press intensity threshold (e.g., "$IT_L$") as shown in FIG. 8J. In some embodiments, the gesture ends with liftoff of contact 2738, as shown in FIG. 8K.

In response to detecting the gesture that included a press input performed with contact 2738, and in accordance with the determination that the maximum intensity of contact 2738 is below the predefined threshold (e.g., "$IT_D$"), a user interface for interacting with word 2734-1 is displayed when the end of the gesture is detected. In some embodiments, the use interface for interacting with word 2734-1 includes a text cursor, insertion point, or the like. For example, if textual content 2732 is editable from within user interface 2730, text cursor 2740 is, optionally, displayed near word 2734-1 (for example, at the beginning or end of word 2734-1, or within word 2704-1), as shown in FIG. 8I. Text cursor 2740 indicates a current location in textual content 2732 at which the user optionally requests that the device insert additional characters or delete characters from textual content 2732. In some embodiments, word 2734-1 is selected, as shown in FIGS. 8J-8K, where word 2734-1 is shown with selection area 2742 (e.g., by activating keys on a physical or virtual keyboard).

In some embodiments, the use interface for interacting with word 2734-1 includes one or more affordances 2744 for interacting with word 2734-1. For example, "Cut" affordance 2744-1, "Copy" affordance 2744-2, and "Paste" affordance 2744-3 is, optionally, displayed, as shown in FIG. 8J. A user optionally activates "Cut" affordance 2744-1 to copy word 2734-1 (e.g., to a virtual clipboard for pasting elsewhere) and to delete word 2734-1 from textual content 2732. A user optionally activates "Copy" affordance 2744-2 to copy word 2734-1 (e.g., to a virtual clipboard for pasting elsewhere). A user optionally activates "Paste" affordance 2744-3 to insert previously copied text (e.g., text copied into a virtual clipboard) as a replacement for word 2734-1.

Other examples of affordances for interacting with word 2734-1 include, for example, "Highlight" affordance 2744-4, "Add Note" affordance 2744-5, "Search Document" affordance 2744-6, and "Search" affordance 2744-7, as shown in FIG. 8K. A user optionally activates "Highlight" affordance 2744-4 to highlight (e.g., with yellow or green color) word 2734-1. A user optionally activates "Add Note" affordance 2744-5 to create a note to be associated with word 2734-1. A user optionally activates "Search Document" affordance 2744-6 to search textual content 2732 using word 2734-1 as a search term. A user optionally activates "Search" affordance 2744-7 to search an information repository (e.g., a search engine, an online encyclopedia) using word 2734-1 as a search term.

FIGS. 8L-8M show, instead of (or after) detecting the gesture that includes an increase in intensity of contact 2738, detecting a gesture (e.g., a pressing gesture) that includes an increase in intensity of contact 2746 from an intensity below a deep press intensity threshold (e.g., "$IT_D$") to an intensity above the deep press intensity threshold (e.g., "$IT_D$") on touch-sensitive display 112. The device determines, based on measurements form one or more sensors for detecting the intensity of contacts on touch-sensitive display 112 that intensity of contact 2746 goes above the predefined threshold (e.g., "$IT_D$") during the gesture. In some embodiments, the gesture ends with a liftoff of contact 2746 or a decrease in intensity of contact 2716 below a gesture-detection intensity threshold that is at or below the deep press intensity threshold (e.g., "$IT_D$").

In response to detecting the gesture that corresponds to the increase in intensity of contact 2746, and in accordance with the determination that the maximum intensity of contact 2746 is above the predefined threshold (e.g., "$IT_D$"), definition 2750 for word 2734-1 is displayed, as shown in FIGS. 8M-8N. Definition 2750 for word 2734-1 is, optionally, retrieved from a dictionary stored in memory (e.g., memory 370) or from an online source (e.g., an online dictionary).

In some embodiments, word 2734-1 is, optionally, displayed with visual embellishments or emphasis to indicate the association between definition 2750 and word 2734-1. For example, word 2734-1 is, optionally, displayed with colored background area 2748, as shown in FIG. 8M. Other visual embellishments optionally include highlighting, bold font, italics, larger font size, and visual effects that make word 2734-1 appear to hover above textual content 2732.

In some embodiments, words 2734 cease to be displayed and definition 2750 is displayed in place of words 2734, as shown in FIG. 8N. For example, definition 2750 is, optionally, displayed in place of textual content 2732 or as an overlay or pop-up over the part of textual content 2732 with words 2734. In some other embodiments, word 2734-1 (and at least parts of textual content 2732) continues to be displayed while definition 2750 is displayed, as shown in FIG. 8M. For example, definition 2750 is, optionally, displayed as an overlay or pop-up that does not cover word 2734-1.

In some embodiments, definition 2750 is displayed during the gesture, in response to the intensity of contact 2746 going above the predefined threshold (e.g., "IT$_D$"), as shown in FIG. 8M. In some other embodiments, definition 2750 is displayed when the end of the gesture (e.g., in response to detecting a liftoff of contact 2746 or a decrease in intensity of contact 2746 below a contact-detection threshold that is below the predefined threshold) is detected, as shown in FIG. 8N.

Figure 9B:
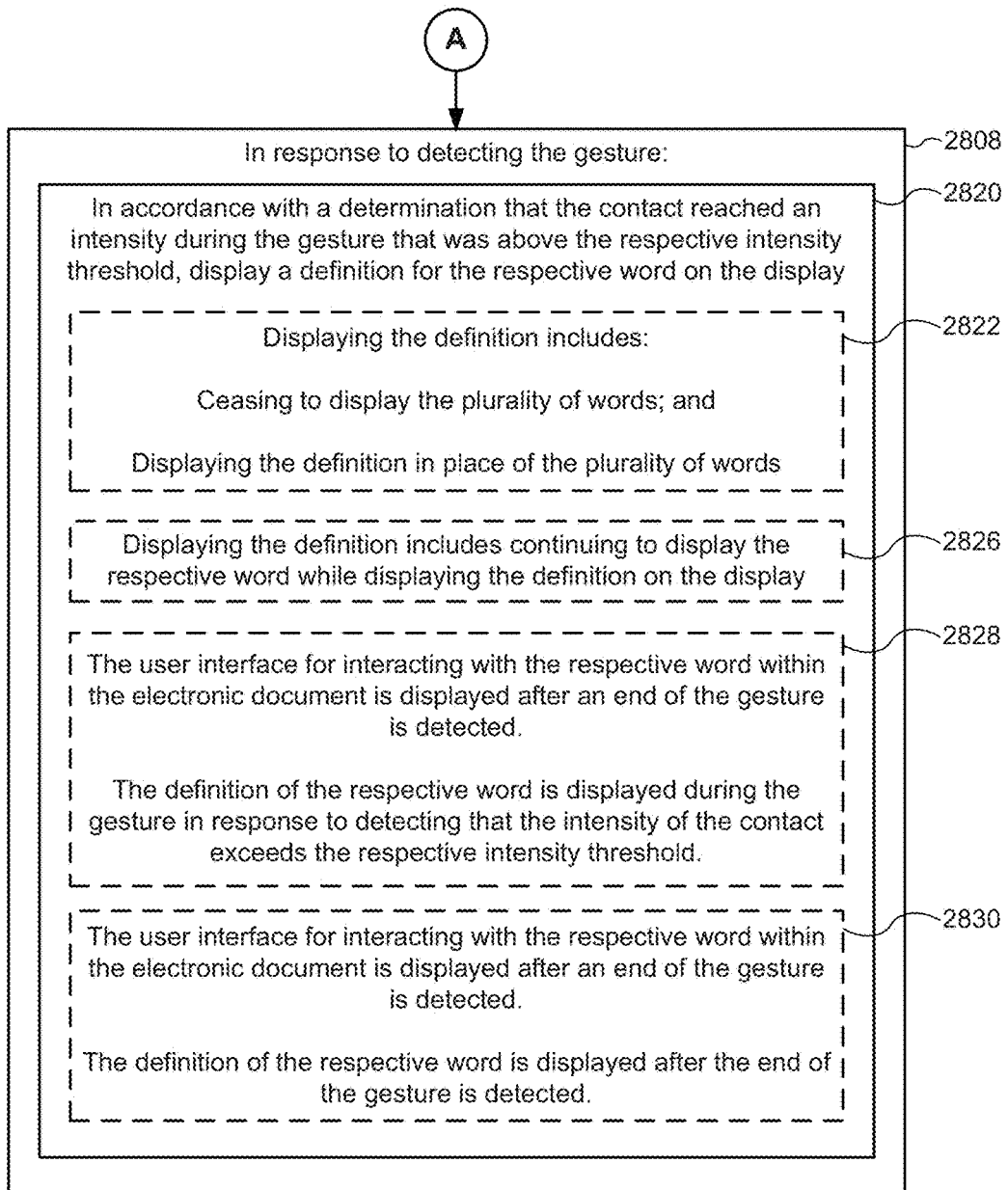

FIGS. 9A-9B are flow diagrams illustrating a method 2800 of displaying word definitions in accordance with some embodiments. The method 2800 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 2800 are, optionally, combined and/or the order of some operations are, optionally, changed.

As described below, the method 2800 provides an intuitive way to display word definitions. The method reduces the cognitive burden on a user when displaying word definitions, thereby creating a more efficient human-machine interface. For battery-operated electronic devices, enabling a user to display word definitions faster and more efficiently conserves power and increases the time between battery charges.

The device displays (2802) a plurality of words in an electronic document on the display, where the plurality of words include a respective word. FIG. 8A shows, for example, words 2704 in textual content 2702 displayed on display 450. Words 2704 include word 2704-1 "Gettysburg." FIG. 8H shows words 2734 in textual content 2732 displayed on touch-sensitive display 112. Words 2734 include word 2734-1 "Gettysburg."

While a focus selector is at a location corresponding to the respective word, the device detects (2806) a gesture that includes a contact (e.g., a finger contact) on the touch-sensitive surface. As shown in FIG. 8A, for example, a gesture that includes contact 2708 is detected on touch-sensitive surface 451 while a focus selector (e.g., cursor 2706) is over word 2704-1. As another example, in FIG. 8E, a gesture that includes contact 2716 is detected on touch-sensitive surface 451 a focus selector (e.g., while cursor 2706) is over word 2704-1.

In embodiments, where the touch-sensitive surface is a touch-sensitive display, the position of the contact is optionally the location of the focus selector described above. As shown in FIGS. 8H-8J, for example, a gesture that includes contact 2738 (e.g., a press input performed with contact 2738) is detected on touch-sensitive display 112 at a location over word 2734-1. As another example, in FIGS. 8L-8N, a gesture that includes contact 2746 (e.g., a press input performed with contact 2746) is detected on touch-sensitive display 112 at a location over word 2734-1.

In response (2808) to detecting the gesture, in accordance with a determination that the contact had a maximum intensity during the gesture that was below (2810) a respective intensity threshold, the device displays (2812) a user interface for interacting with the respective word within the electronic document on the display. In contrast, in accordance with a determination that the contact reached an intensity during the gesture that was above the respective intensity threshold, the device displays a definition for the respective word on the display, as described in greater detail below.

For example, in FIG. 8B, contact 2708 is determined to have a maximum intensity that is below a predefined threshold (e.g., "IT$_D$"). In accordance with that determination, in response to detecting the gesture that includes the increase in intensity of contact 2708, user interfaces for interacting with word 2704-1 are displayed (e.g., a cut/copy/paste interface or a highlight/add note/search document/search interface), as shown in FIGS. 8C-8D. In FIG. 8F, the intensity of contact 2716 is determined to have reached above the predefined threshold (e.g., "IT$_D$") during the gesture. In accordance with that determination, in response to detecting the gesture that includes the increase in intensity of contact 2716, definition 2720 for word 2704-1 is displayed, as shown in FIGS. 8F-8G.

As another example, in FIG. 8I, contact 2738 is determined to have a maximum intensity that is below a predefined threshold (e.g., "IT$_D$"). In accordance with that determination, in response to detecting the gesture that includes the increase in intensity of contact 2738, user interfaces for interacting with word 2734-1 are displayed (e.g., a cut/copy/paste interface or a highlight/add note/search document/search interface), as shown in FIGS. 8J-8K. In FIG. 8M, the intensity of contact 2746 is determined to have reached above the predefined threshold (e.g., "IT$_D$") during the gesture. In accordance with that determination, in response to detecting the gesture that includes the increase in intensity of contact 2746, definition 2750 for word 2734-1 is displayed, as shown in FIGS. 8M-8N.

In some embodiments, the user interface for interacting with the respective word within the document (e.g., the user interface displayed in accordance with a determination that the contact had a maximum intensity during the gesture that was below the respective intensity threshold) includes (2816) one or more of: a text cursor displayed proximate to the respective word, an affordance for copying and deleting the respective word (e.g., a "cut" button), an affordance for copying the respective word, an affordance for replacing the respective word with previously copied text (e.g., a paste button), an affordance for highlighting the respective word, an affordance for creating a note to be associated with the respective word, an affordance for searching the electronic document using the respective word as a search term, and an affordance for searching an information repository using the respective word as a search term. (e.g., submitting the respective word to a search engine or Wikipedia). The user interface for interacting with word 2704-1 or 2734-1 is, optionally, text cursor 2710 (FIG. 8B) or 2740 (FIG. 8I), "Cut" affordance 2714-1 (FIG. 8C) or 2744-1 (FIG. 8J), "Copy" affordance 2714-2 (FIG. 8C) or 2744-2 (FIG. 8J), "Paste" affordance 2714-3 (FIG. 8C) or 2744-3 (FIG. 8J), "Highlight" affordance 2714-4 (FIG. 8D) or 2744-4 (FIG. 8K), "Add Note" affordance 2714-5 (FIG. 8D) or 2744-5 (FIG. 8K), "Search Document" affordance 2714-6 (FIG. 8D) or 2744-6 (FIG. 8K), and "Search" affordance 2714-7 (FIG. 8D) or 2744-7 (FIG. 8K). Text cursor 2710 or 2740 and affordances 2714 or 2744 are described in greater detail above with reference to FIGS. 8B-8D and 8I-8K.

In some embodiments, in accordance with a determination that the contact had a maximum intensity during the gesture that was below (2810) the respective intensity threshold, the device selects (2818) the respective word. For example, as shown in FIGS. 8C-8D, in accordance with the determination that contact 2708 had a maximum intensity during the gesture that was below the predefined threshold (e.g., $IT_D$), word 2704-1 is displayed with selection area 2712. As shown in FIGS. 8J-8K, in accordance with the determination that contact 2738 had a maximum intensity during the gesture that was below the predefined threshold, word 2734-1 is displayed with selection area 2742.

In contrast, in response (2808) to detecting the gesture, in accordance with a determination that the contact reached an intensity during the gesture that was above the respective intensity threshold (e.g., "$IT_D$"), the device displays (2820) a definition for the respective word on the display. In some embodiments, displaying the definition includes ceasing (2822) to display the plurality of words and displaying the definition in place of the plurality of words. For example, in FIG. 8G, words 2704 cease to be displayed and definition 2720 is displayed in place of words 2704 (and textual content 2702). As another example, in FIG. 8N, words 2734 cease to be displayed and definition 2750 is displayed in place of words 2734 (and textual content 2732). In contrast, in some embodiments, displaying the definition includes continuing (2826) display the respective word while displaying the definition on the display. For example, in FIG. 8F, word 2704-1 continues to be displayed while definition 2720 is displayed. As another example, in FIG. 8M, word 2734-1 continues to be displayed while definition 2750 is displayed.

In some embodiments, the user interface for interacting with the respective word within the electronic document is displayed after an end of the gesture is detected, and the definition of the respective word is (2828) displayed during the gesture in response to detecting that the intensity of the contact exceeds the respective intensity threshold. For example, in FIGS. 8C-8D, the user interfaces for interacting with word 2704-1 are displayed after detection of the end of gesture as detected in accordance with a reduction in intensity of the contact below a gesture-detection intensity threshold that is lower than the respective intensity threshold (e.g., "$IT_D$") as shown in FIG. 8C, or by liftoff of contact 2708 as shown in FIG. 8D. In contrast, in FIG. 8F, definition 2720 is displayed during the gesture (e.g., while contact 2716 is sill detected and above $IT_D$) in response to the intensity of contact 2716 going above the predefined threshold. In FIGS. 8I-8K, the user interfaces for interacting with word 2734-1 are displayed after detection of the end of gesture (e.g., by liftoff of contact 2738 or reduction in intensity of contact 2738 below a gesture-detection intensity threshold that is lower than the respective intensity threshold). In FIG. 8M, definition 2750 is displayed during the gesture (e.g., while contact 2746 is sill detected and above $IT_D$) in response to the intensity of contact 2746 going above the predefined threshold (e.g., $IT_D$).

In some embodiments, the user interface for interacting with the respective word within the electronic document is displayed after an end of the gesture is detected, and the definition of the respective word is displayed after the end of the gesture is detected (2830). For example, in FIGS. 8C-8D, the user interfaces for interacting with word 2704-1 are displayed after detection of the end of gesture as detected in accordance with a reduction in intensity of the contact below a gesture-detection intensity threshold that is lower than the respective intensity threshold (e.g., "$IT_D$") as shown in FIG. 8C, or by liftoff of contact 2708 as shown in FIG. 8D. Similarly, in FIG. 8G, definition 2720 is displayed after detection of the end of gesture as detected in accordance with a reduction in intensity of the contact below a gesture-detection intensity threshold that is lower than the respective intensity threshold (e.g., "$IT_D$") as shown in FIG. 8G, or by liftoff of contact 2716. In FIGS. 8I-8K, the user interfaces for interacting with word 2734-1 are displayed after detection of the end of gesture (e.g., by liftoff of contact 2738 or reduction in intensity of contact 2738 below a gesture-detection intensity threshold that is lower than the respective intensity threshold). In FIG. 8N, definition 2750 is displayed after detection of the end of gesture by detecting a reduction in intensity of contact 2746 below a gesture-detection intensity threshold that is lower than the respective intensity threshold (e.g., "$IT_D$").

It should be understood that the particular order in which the operations in FIGS. 9A-9B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 2800 described above with respect to FIGS. 9A-9B. For example, the contacts, gestures, user interface objects, intensity thresholds, and focus selectors described above with reference to method 2800 optionally have one or more of the characteristics of the contacts, gestures, user interface objects, intensity thresholds, and focus selectors described herein with reference to other methods described herein (e.g., those listed in the fifth paragraph of the Description of Embodiments). For brevity, these details are not repeated here.

Figure 10:
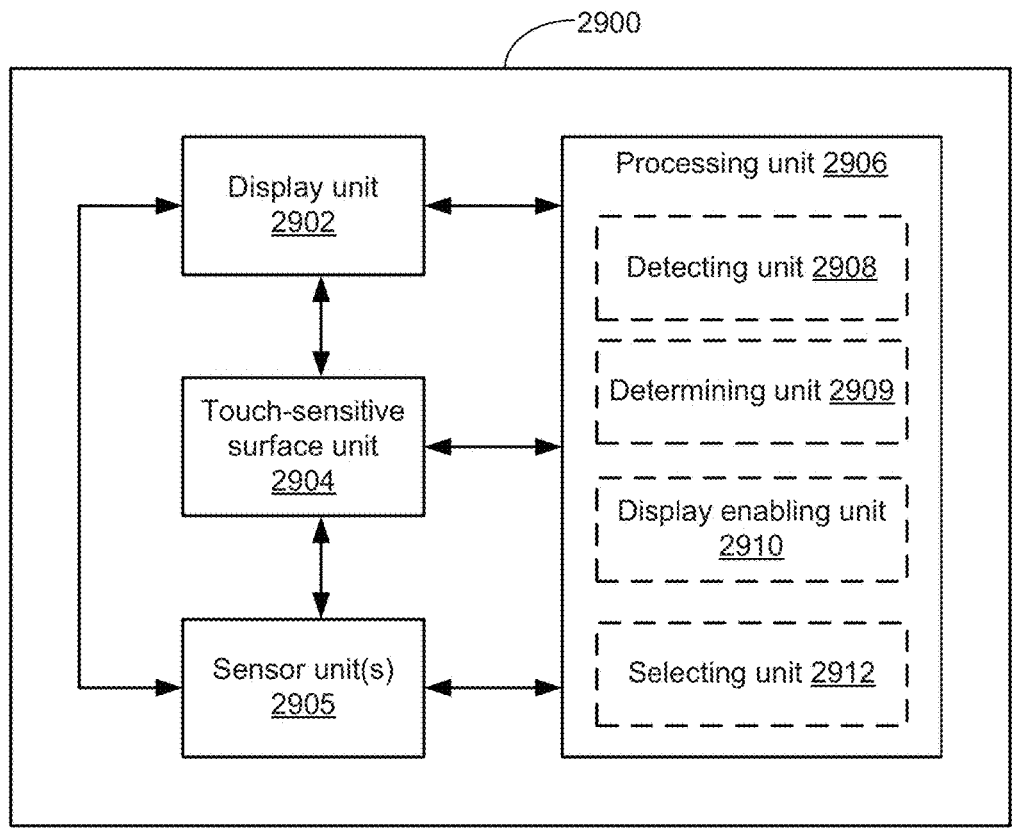
FIG. 10 is a functional block diagram of an electronic device in accordance with some embodiments.

In accordance with some embodiments, FIG. 10 shows a functional block diagram of an electronic device 2900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 2900 includes a display unit 2902 configured to display a plurality of words in an electronic document, where the plurality of words include a respective word; a touch-sensitive surface unit 2904 configured to receive gestures, the gestures including contacts on the touch-sensitive surface unit 2904; and one or more sensors units configured to detect intensity of contacts with the touch-sensitive surface unit 2904; and a processing unit 2906 coupled to the display unit 2902, the touch-sensitive surface unit 2904 and the sensor units 2905. In some embodiments, the processing unit 2906 includes a detecting unit 2908, a determining unit 2909, a display enabling unit 2910, and a selecting unit 2912.

The processing unit 2906 is configured to: while a focus selector is at a location corresponding to the respective word, detect a gesture that includes a contact on the touch-sensitive surface unit 2904 (e.g., with the detecting unit 2908); and in response to detecting the gesture: in accordance with a determination (e.g., with the determining unit 2909) that the contact had a maximum intensity during the gesture that was below a respective intensity threshold, enable display of a user interface for interacting with the respective word within the electronic document on the display unit 2902 (e.g., with the display enabling unit 2910); and in accordance with a determination (e.g., with the determining unit 2909) that the contact reached an intensity during the gesture that was above the respective intensity threshold, enable display of a definition for the respective word on the display unit 2902 (e.g., with the display enabling unit 2910).

In some embodiments, displaying the definition includes ceasing to display the plurality of words and displaying the definition in place of the plurality of words.

In some embodiments, displaying the definition includes continuing to display the respective word while displaying the definition on the display unit 2902.

In some embodiments, the processing unit 2906 is configured to, in accordance with a determination (e.g., with the determining unit 2909) that the contact had a maximum intensity during the gesture that was below the respective intensity threshold, select the respective word (e.g., with the selecting unit 2912).

In some embodiments, the user interface for interacting with the respective word within the electronic document is displayed after an end of the gesture is detected, and the definition of the respective word is displayed during the gesture in response to detecting (e.g., with the detecting unit 2908) that the intensity of the contact exceeds the respective intensity threshold.

In some embodiments, the user interface for interacting with the respective word within the electronic document is displayed after an end of the gesture is detected, and the definition of the respective word is displayed after the end of the gesture is detected.

In some embodiments, the user interface for interacting with the respective word within the document includes one or more of: a text cursor displayed proximate to the respective word, an affordance for copying and deleting the respective word, an affordance for copying the respective word, an affordance for replacing the respective word with previously copied text, an affordance for highlighting the respective word, an affordance for creating a note to be associated with the respective word, an affordance for searching the electronic document using the respective word as a search term, and an affordance for searching an information repository using the respective word as a search term.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9B are, optionally, implemented by components depicted in FIGS. 1A-1B or FIG. 10. For example, detection operation 2806 and displaying operations 2812 and 2820 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be A-1B.

Displaying Content Associated with a Hyperlink

Some applications have tabbed document interfaces, where multiple documents are, in some circumstances, opened in respective tabbed windows within one application window, and the user may switch between the tabbed windows within the application window to view the multiple documents. When a user clicks on a document hyperlink, the document is, optionally, opened in a new tabbed window or replaces the document in the currently active tabbed window. In some methods, whether the document is loaded in a new tabbed window or the current tabbed window is controlled by an application setting that the user is enabled to change or by contextual menus or other multi-step interfaces. The embodiments described below improve on these methods by giving the user per-document control over whether to load the document in a new tabbed window or in the current tabbed window that does not require the user to perform multiple steps to perform. The user makes an input that includes a contact and liftoff of the contact to click on a hyperlink. Depending on whether the liftoff of the contact meets predefined intensity criteria, the document is either loaded in a new tabbed window or in the current tabbed window. Thus, some of the embodiments described below give the user per-document control over how the document is loaded, as well as facilitating more efficient tabbed document interfaces on touch-screen devices.

FIGS. 11A-11Z illustrate exemplary user interfaces for displaying content associated with a hyperlink in accordance with some embodiments. The user interfaces in these figures are used to illustrate the processes described below, including the processes in FIGS. 12A-12B. FIGS. 11A-11Z include intensity diagrams that show the current intensity of the contact on the touch-sensitive surface relative to a plurality of intensity thresholds including a light press intensity threshold (e.g., "$IT_L$") a representation appearance intensity threshold (e.g., "$IT_1$"), a representation disappearance intensity threshold (e.g., "$IT_2$"), and a new tab intensity threshold (e.g., "$IT_D$").

FIG. 11A illustrates user interface 3300 displayed on display 450 (e.g., display 340) of a device (e.g., device 300). User interface 3300 corresponds to an application (e.g., web browser application, word processor application, spreadsheet application, presentation application, drawing application, image editing application, text editor application, messaging application, email application, electronic reader, e-book application) configured to display electronic documents (e.g., web page, text document, word processing document, spreadsheet, presentation slides, drawing, image, message, email, electronic book, electronic magazine) or other content in a tabbed document interface. In a tabbed document interface, multiple items of content (e.g., electronic documents) is, optionally, displayed in respective tabbed windows or views within, for example, an application window. Each tabbed window or view (hereinafter "tabbed window" for convenience) has a corresponding tab that optionally displays information about the electronic document being displayed in the respective tabbed window. Also, a user optionally selects the tab for a corresponding tabbed window to cause the corresponding tabbed window to be displayed in the foreground. In FIG. 11A, user interface 3300 is an application window for a web browser application. Tabbed window 3302 is displayed within user interface 3300. Electronic document 3303 (in this case, a web page titled "Sports News") is displayed in tabbed window 3302.

Tab 3304, corresponding to tabbed window 3302, is, optionally, displayed in tab bar 3305 in user interface 3300. In FIG. 11A, tab bar 3305 is located between tabbed window 3302 and title bar 3301 of user interface 3300. Tab 3304 is, optionally, visually connected to tabbed window 3302 as shown in FIG. 11A; there is no clear boundary line between tab 3304 and tabbed window 3302. The title "Sports News" of electronic document 3303 is, optionally, displayed in tab 3304. The title of the electronic document displayed in the active tabbed window in user interface 3300 is, optionally, displayed in title bar 3301. For example, in FIG. 11A, the title "Sports News," corresponding to electronic document 3303 displayed in active tabbed window 3302, is displayed in title bar 3301.

User interface 3300 optionally includes other elements that are not shown, including, for example, an address bar, one or more buttons or icons for activating various operations or functions, and one or more menus. Electronic document 3303 includes one or more hyperlinks 3308 to other electronic documents (e.g., other web pages) or items of content. For example, electronic document 3303 includes hyperlinks 3308 to respective electronic documents. FIG. 11A also shows cursor 3306 displayed at a location over hyperlink 3308-3. Cursor 3306 is an example of a focus selector. Cursor 3306 is, optionally, positioned over hyperlink 3308-3 by a user performing an input on touch-sensitive surface 451 (e.g., touchpad 355) of the device to move cursor 3306 to the desired position over hyperlink 3308-3.

FIG. 11A shows contact 3310 detected on touch-sensitive surface 451 while cursor 3306 is located over hyperlink 3308-3. Contact 3310 is, optionally, used to perform a gesture including a press input on touch-sensitive surface 451 (e.g., a user pushing down on touch-sensitive surface 451 with contact 3310 so as to increase the intensity of contact 3310). Contact 3310 has an intensity that is detected by the device. If the device determines that the intensity of contact 3310 is above the representation appearance intensity threshold (e.g., "$IT_1$"), a representation (e.g., representation 3312) of a tab is displayed, within tabbed window 3302, surrounding or near hyperlink 3308-3 (the hyperlink over which cursor 3306 is positioned), as shown in FIG. 11C, 11D, or 11E.

As described above, the representation of a tab is, optionally, displayed as surrounding or near hyperlink 3308-3. In some embodiments, the representation (e.g., representation 3312) is displayed proximate to or near (e.g., adjacent to) hyperlink 3308-3, as shown in FIG. 11C. In some other embodiments, the representation (e.g., representation 3314 or 3316) is displayed as surrounding hyperlink 3308-3, as shown in FIG. 11D or 11E. In some embodiments, the representation (e.g., representation 3312, 3314, or 3316) is, optionally, displayed such that the representation (and hyperlink 3308-3, if the representation is surrounding the hyperlink) appears to be hovering over electronic document 3303.

The description below uses representation 3312 as an illustrative example of the representation that is displayed in accordance with the determination that the intensity of contact 3310 is above the representation appearance intensity threshold. It should be appreciated that the description below is applicable to other representations of a tab, including representation 3314 in FIG. 11D and representation 3316 in FIG. 11E.

Figure 11B:
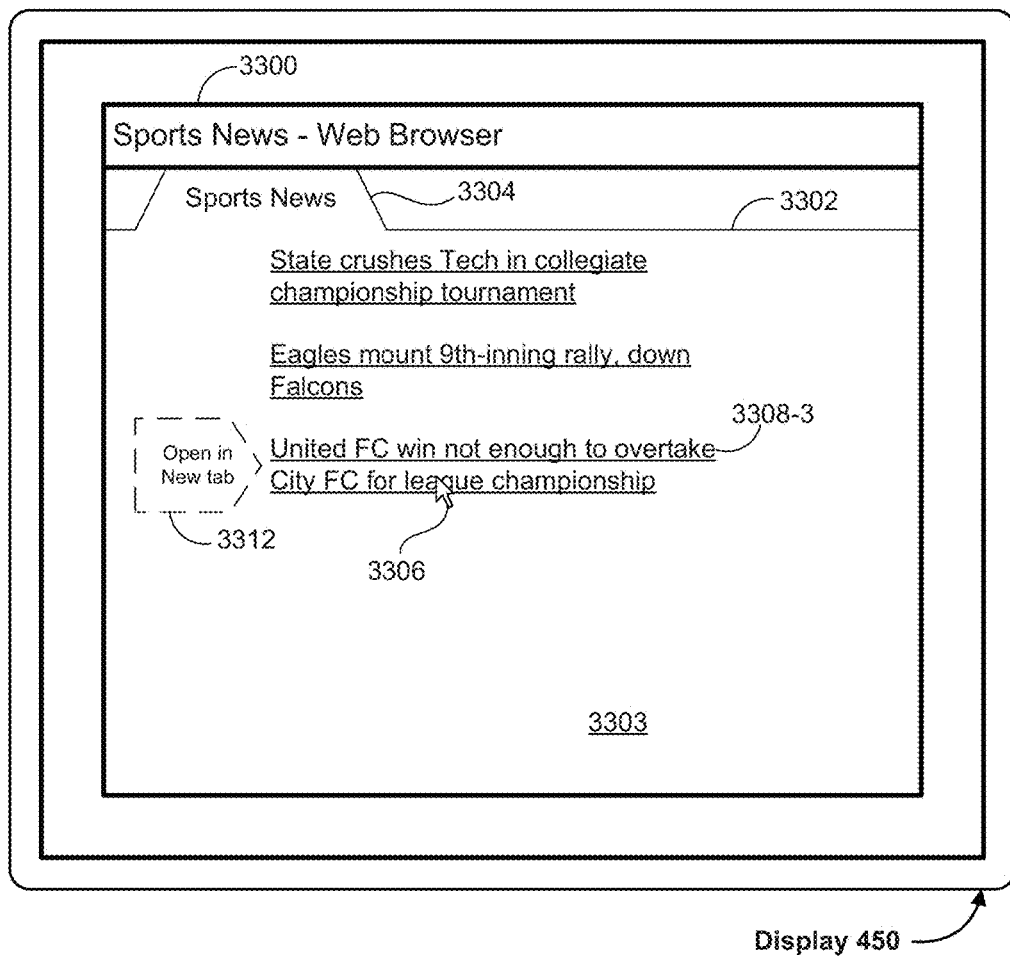
Figure 11B:
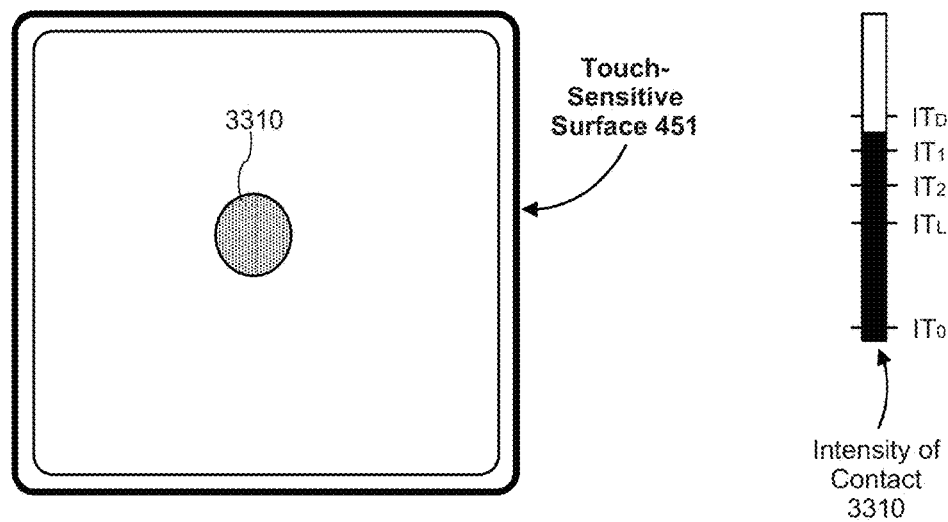
Figure 11C:
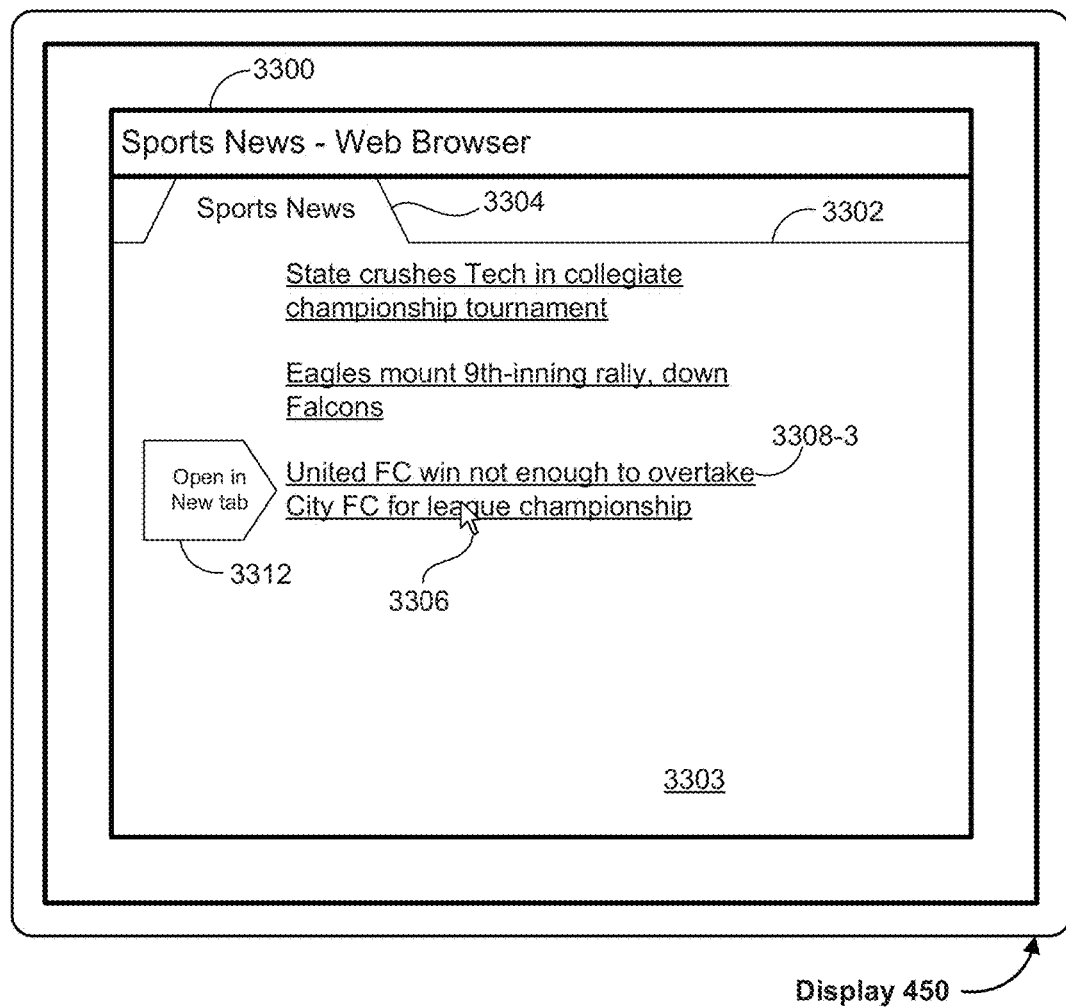
Figure 11C:
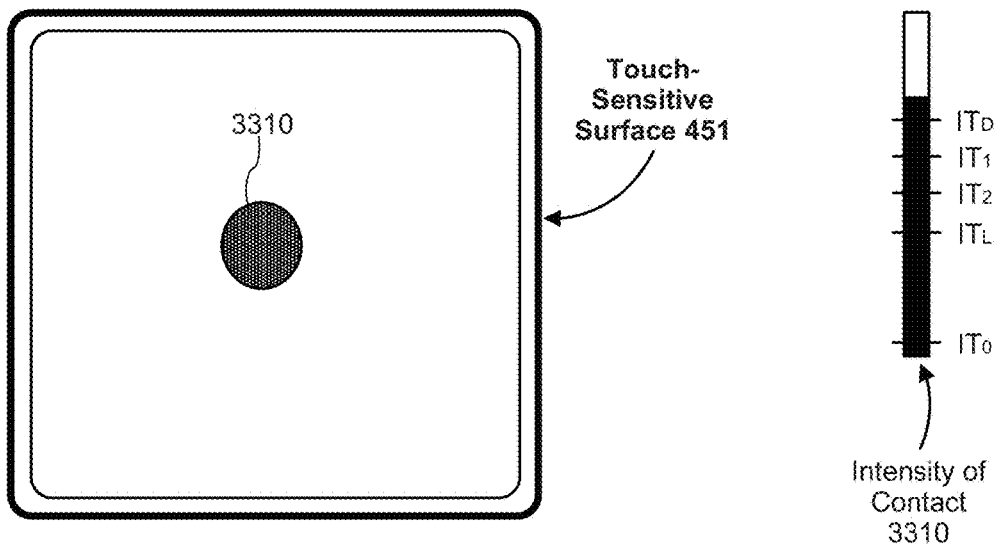
Figure 11D:
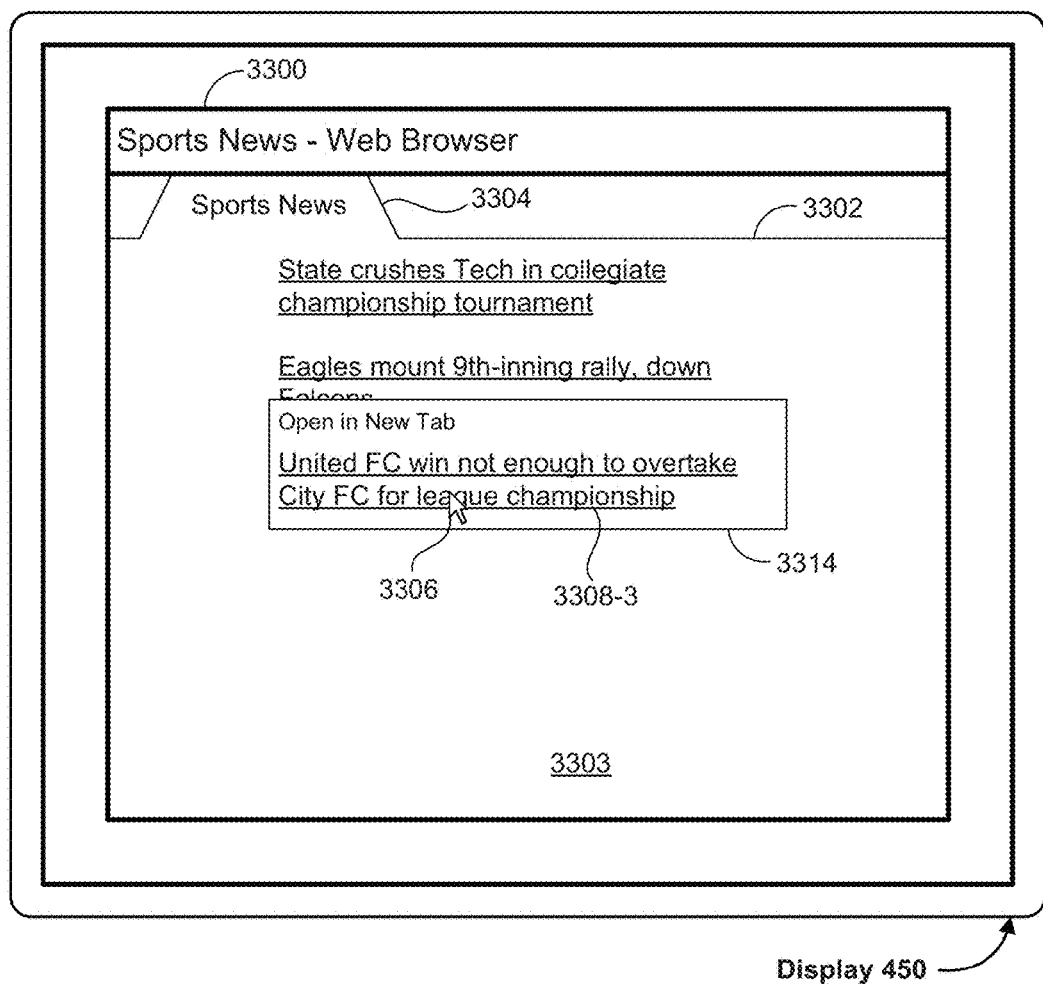
Figure 11D:
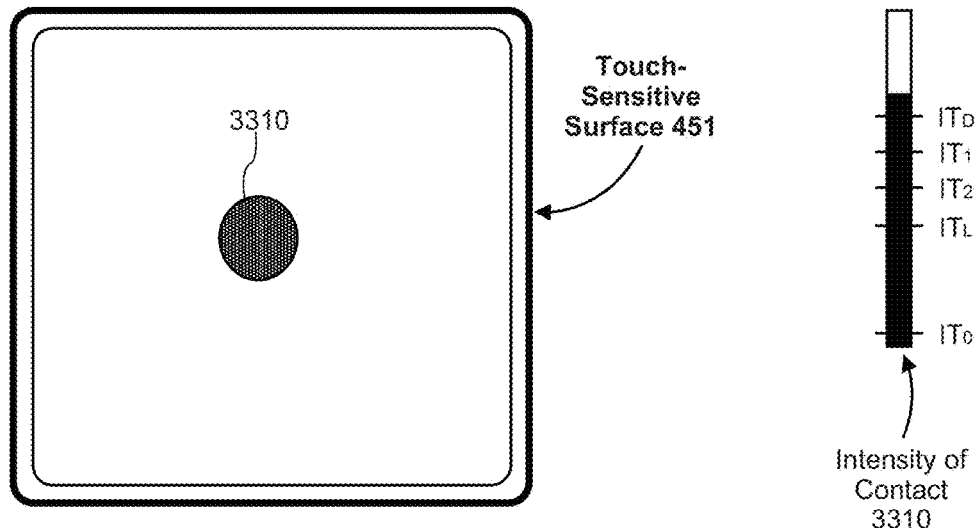
Figure 11E:
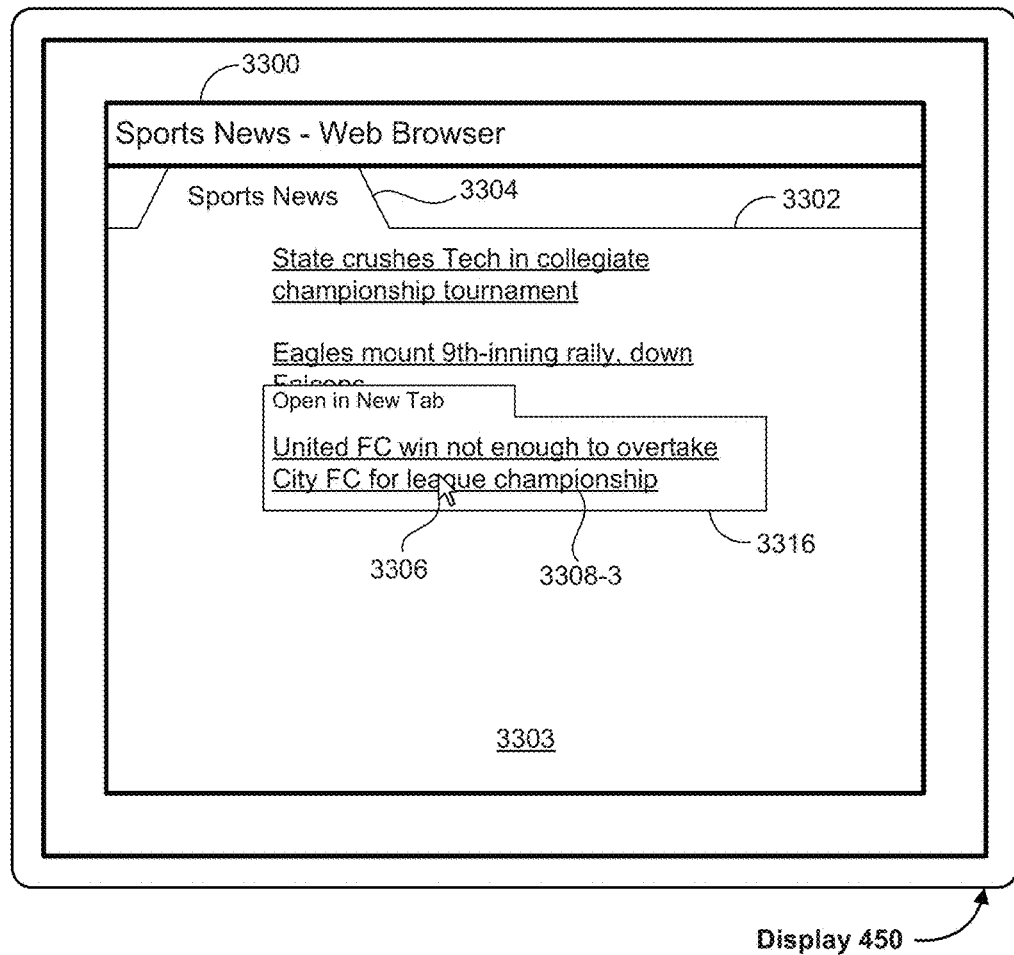
Figure 11E:
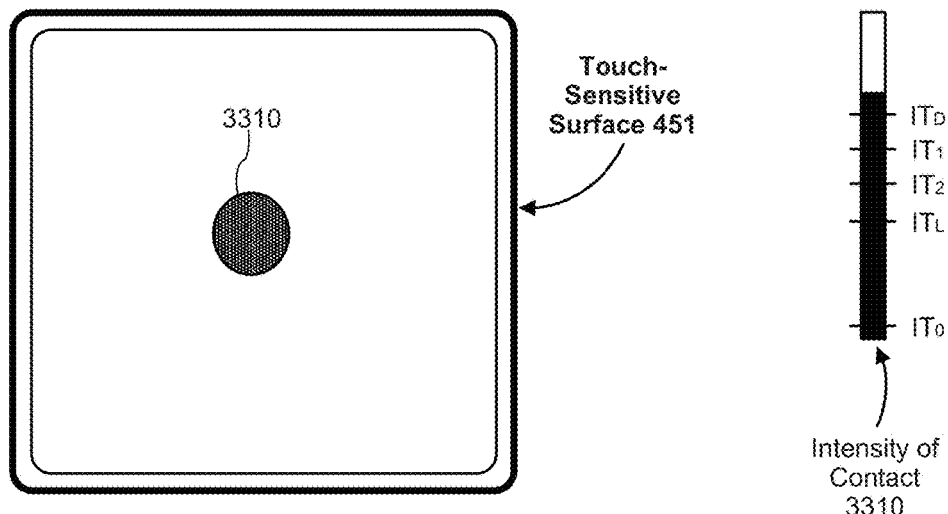

In FIGS. 11A-11C, the device detects an increase in intensity of contact 3310 from an intensity below the light press intensity threshold (e.g., "$IT_L$") in FIG. 11A to an intensity between the representation appearance intensity threshold (e.g., $IT_1$) and the new tab intensity threshold (e.g., "$IT_D$") in FIG. 11B and then to an intensity above the new tab intensity threshold (e.g., "$IT_D$") in FIG. 11C. In some embodiments, displaying representation 3312 includes displaying an animation in which representation 3312 gradually appears. When the device determines that the intensity of contact 3310 is above the representation appearance intensity threshold, as described above, representation 3312 is, optionally, animated to fade in, as shown in FIG. 11B, until it is completely displayed, as shown in FIG. 11C. In some embodiments, the animation of the representation to gradually appear has a progression (e.g., rate of fade-in) that is determined in accordance with the intensity of contact 3310. For example, a higher intensity corresponds to a faster fade-in speed. In some embodiments, animation of the representation appearing is based on a current intensity of the contact (e.g., sequential stages in the animation are mapped to sequential intensity values between the representation appearance intensity threshold and the new tab intensity threshold).

Figure 11F:
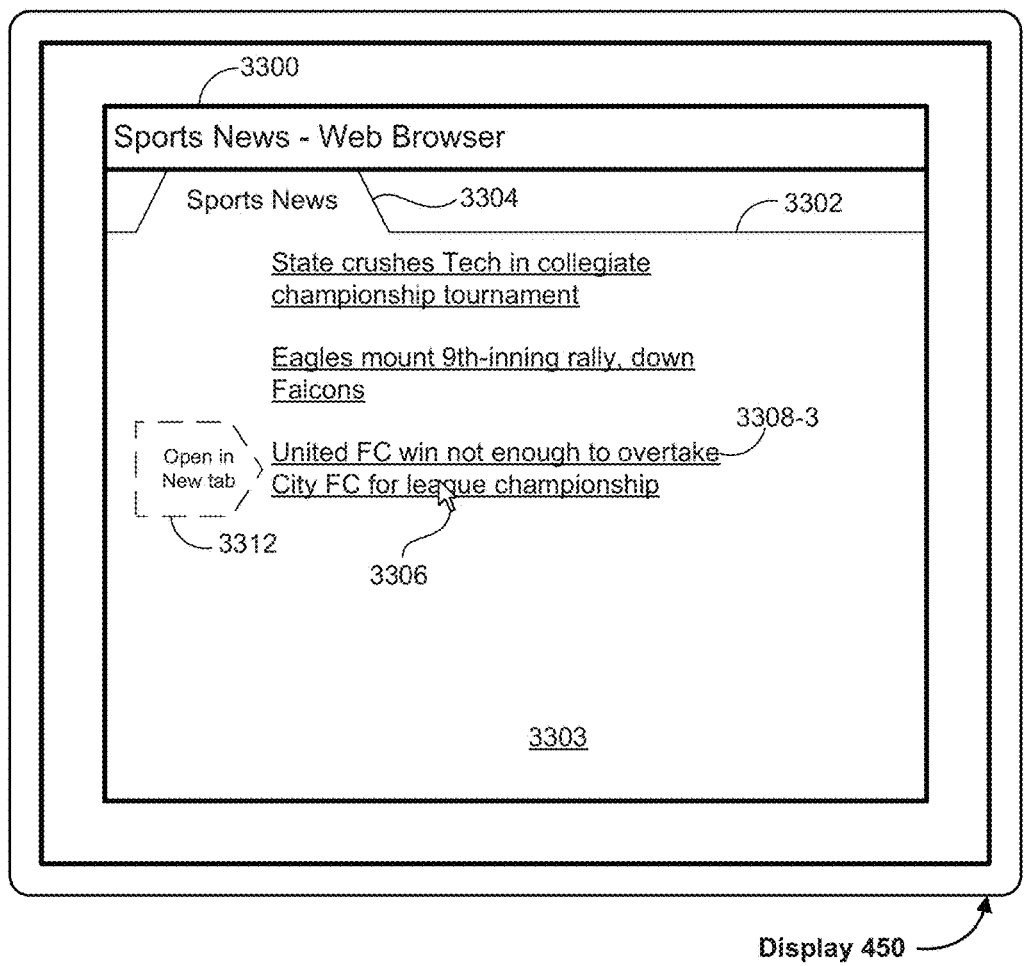
Figure 11F:
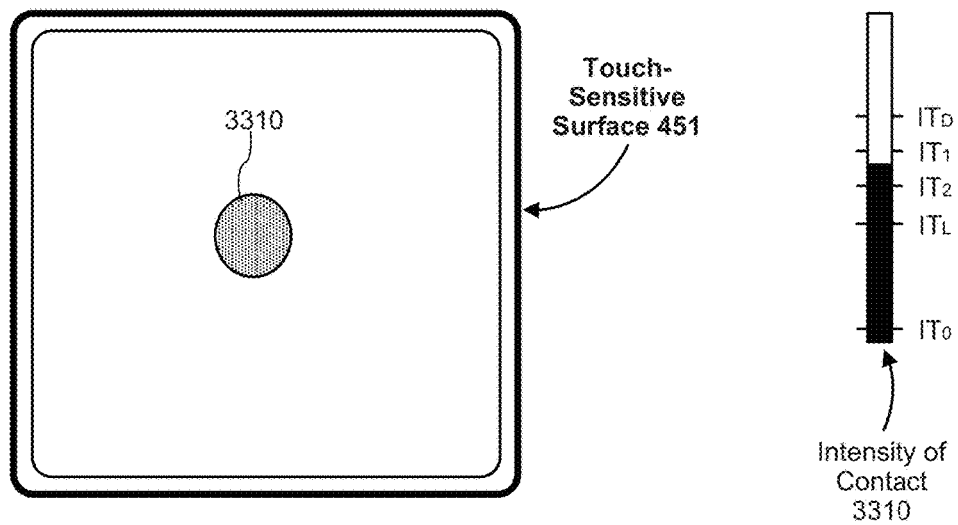

In FIG. 11F, after displaying representation 3312, the device detects a decrease in the intensity of contact 3310, to an intensity below the representation appearance threshold (e.g., "$IT_1$") and above the representation disappearance intensity threshold (e.g., "$IT_2$") without detecting liftoff of contact 3310. In response to detection of the decrease in intensity, the device displays an animation of representation 3312 gradually disappearing (e.g., fade out), as shown in FIG. 11F. In some embodiments, the animation of the representation to gradually disappear has a progression (e.g., rate of fade-out) that is determined in accordance with the intensity of contact 3310. For example, a lower intensity corresponds to a faster fade-out speed. In some embodiments, animation of the representation disappearing is based on a current intensity of the contact (e.g., sequential stages in the animation are mapped to sequential intensity values between the representation disappearance intensity threshold and the new tab intensity threshold).

Figure 11G:
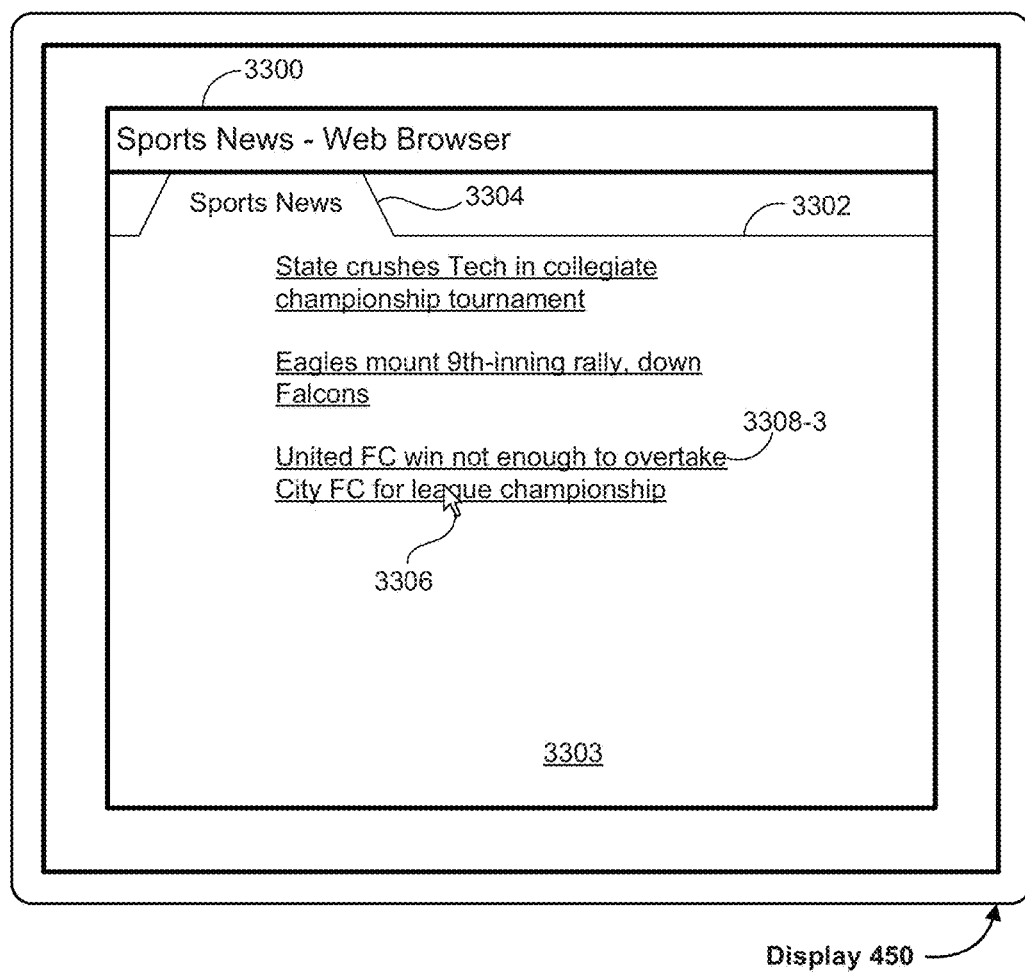
Figure 11G:
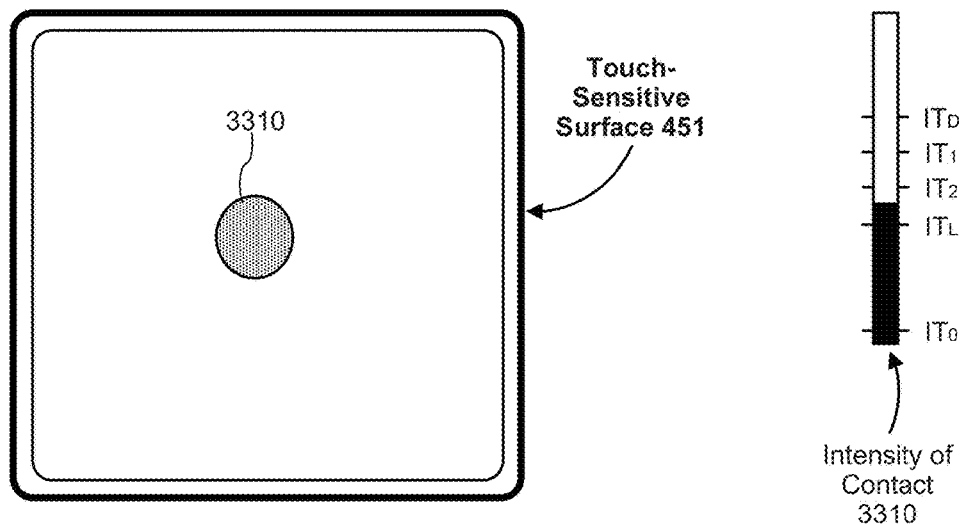

When the intensity of contact 3310 decreases below the representation disappearance intensity threshold (e.g., "$IT_2$") that is below the representation appearance intensity threshold (e.g., "$IT_1$"), but still without liftoff of contact 3310, representation 3312 ceases to be displayed, as shown in FIG. 11G. The cessation of display of representation 3312 in response to the decrease in the intensity of contact 3310 below the representation disappearance intensity threshold (e.g., "$IT_2$") is, optionally, a culmination of the animation described above in reference to FIG. 11F.

In some embodiments, the displaying of representation 3312 indicates that liftoff of contact 3310 at that point in time will meet a set of one or more predefined intensity criteria, and content (e.g., an electronic document) associated with hyperlink 3308-3 will be loaded into a second tabbed window distinct from tabbed window 3302 in response to detection of a liftoff of contact 3310.

In some embodiments, the predefined intensity criteria includes that the intensity of contact 3310 be above the new tab intensity threshold (e.g., "$IT_D$") at a predefined time relative to detection of liftoff of contact 3310. In some other embodiments, the predefined intensity criteria includes that the intensity of contact 3310 be above the new tab intensity threshold (e.g., "$IT_D$") at any time prior to detection of liftoff of contact 3310 (e.g., that contact 3310 had a maximum intensity above $IT_D$).

In some embodiments, the new tab intensity threshold is the same as the representation appearance intensity threshold (e.g., the representation appearance intensity threshold and the new tab intensity threshold are both $IT_D$). In some other embodiments, the new tab intensity threshold is different from the representation appearance intensity threshold (e.g., the representation appearance intensity threshold is $IT_1$, while the new tab intensity threshold is $IT_D$).

In some embodiments, cessation of display of representation 3312 indicates that a liftoff of contact 3310 at that point in time will not meet the predefined intensity criteria, and content (e.g., an electronic document) associated with hyperlink 3308-3 will be loaded into tabbed window 3302, replacing electronic document 3303 within tabbed window 3302, in response to detection of a liftoff of contact 3310.

Figure 11H:
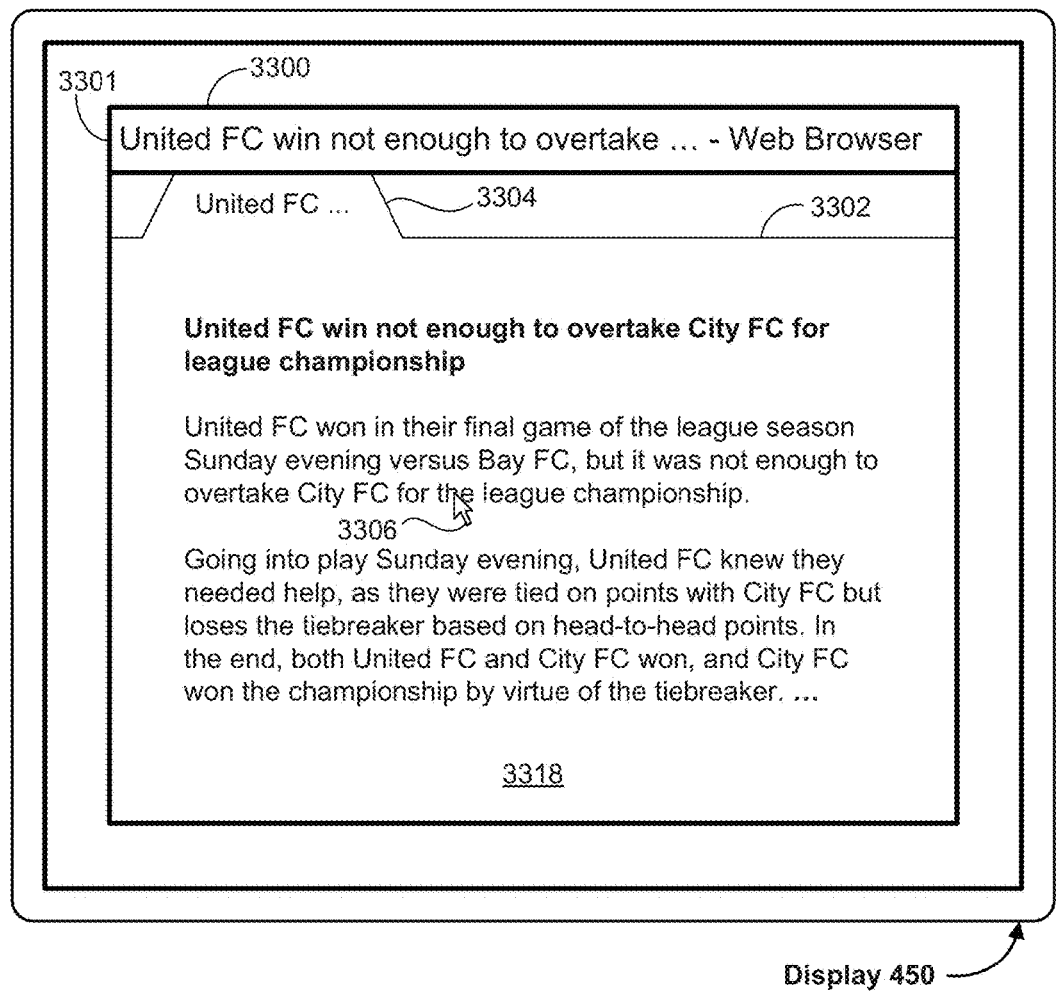
Figure 11H:
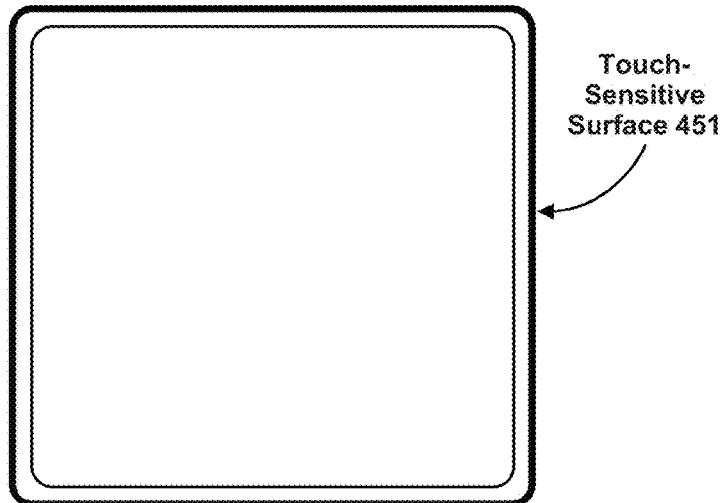

Returning to FIG. 11G, representation 3312 ceases to be displayed in response to a decrease in the intensity of contact 3310 below the representation disappearance intensity threshold (e.g., "$IT_2$"), and cursor 3306 remains positioned over hyperlink 3308-3. After representation 3312 ceases to be displayed, the device detects liftoff of contact 3310 from touch-sensitive surface 451, as shown in FIG. 11H. In response to detection of the liftoff of contact 3310 from touch-sensitive surface 451, if the liftoff of contact 3310 does not meet the predefined intensity criteria, electronic document 3318, associated with hyperlink 3308-3, is displayed in tabbed window 3302 in place of electronic document 3303, and title bar 3301 is updated with the title of electronic document 3318, as shown in FIG. 11H.

In some embodiments, liftoff of contact 3310 with an intensity below the representation disappearance intensity threshold (e.g., "$IT_2$") does not meet the predefined intensity criteria. When contact 3310 is lifted off from touch-sensitive surface 451 after representation 3312 ceases to be displayed, electronic document 3318 is displayed within tabbed window 3302 in response to detection of the liftoff, and title bar 3301 is updated with the title of electronic document 3318, as shown in FIG. 11H.

Figure 11I:
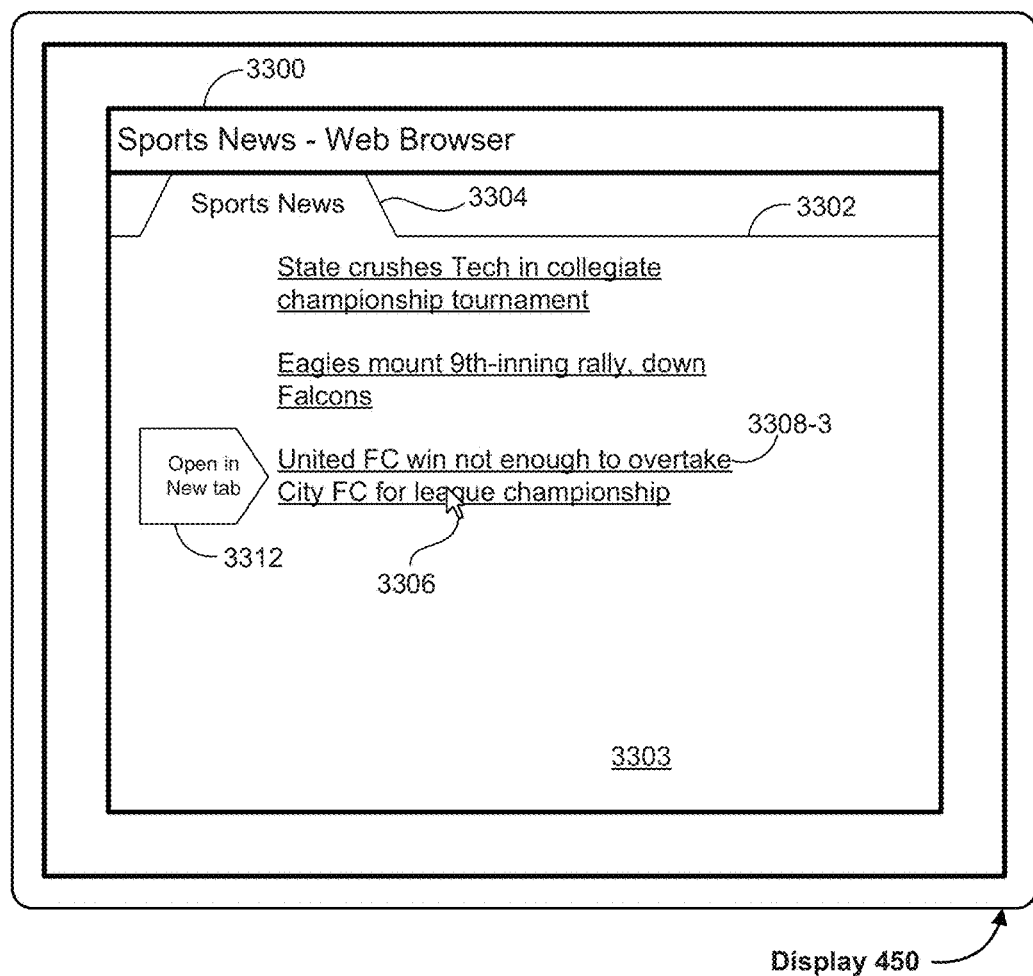
Figure 11I:
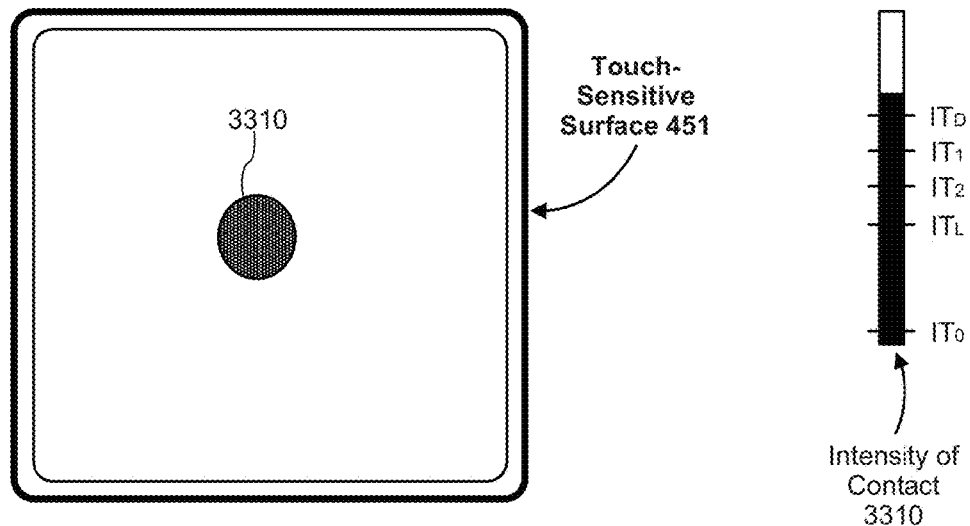

Returning to, and continuing from, FIG. 11C, FIG. 11I shows contact 3310 on touch-sensitive surface 451 with an intensity that is above the new tab intensity threshold (e.g., "$IT_D$"). Also, representation 3312 is displayed. In response to detection of the liftoff of contact 3310 from touch-sensitive surface 451 (e.g., as detected in FIG. 11J), electronic document 3318 is loaded in a new tabbed window distinct from tabbed window 3302, and electronic document 3303 remains in tabbed window 3302; liftoff of contact 3310 meets the predefined intensity criteria, as shown in FIGS. 11J-11P.

Figure 11J:
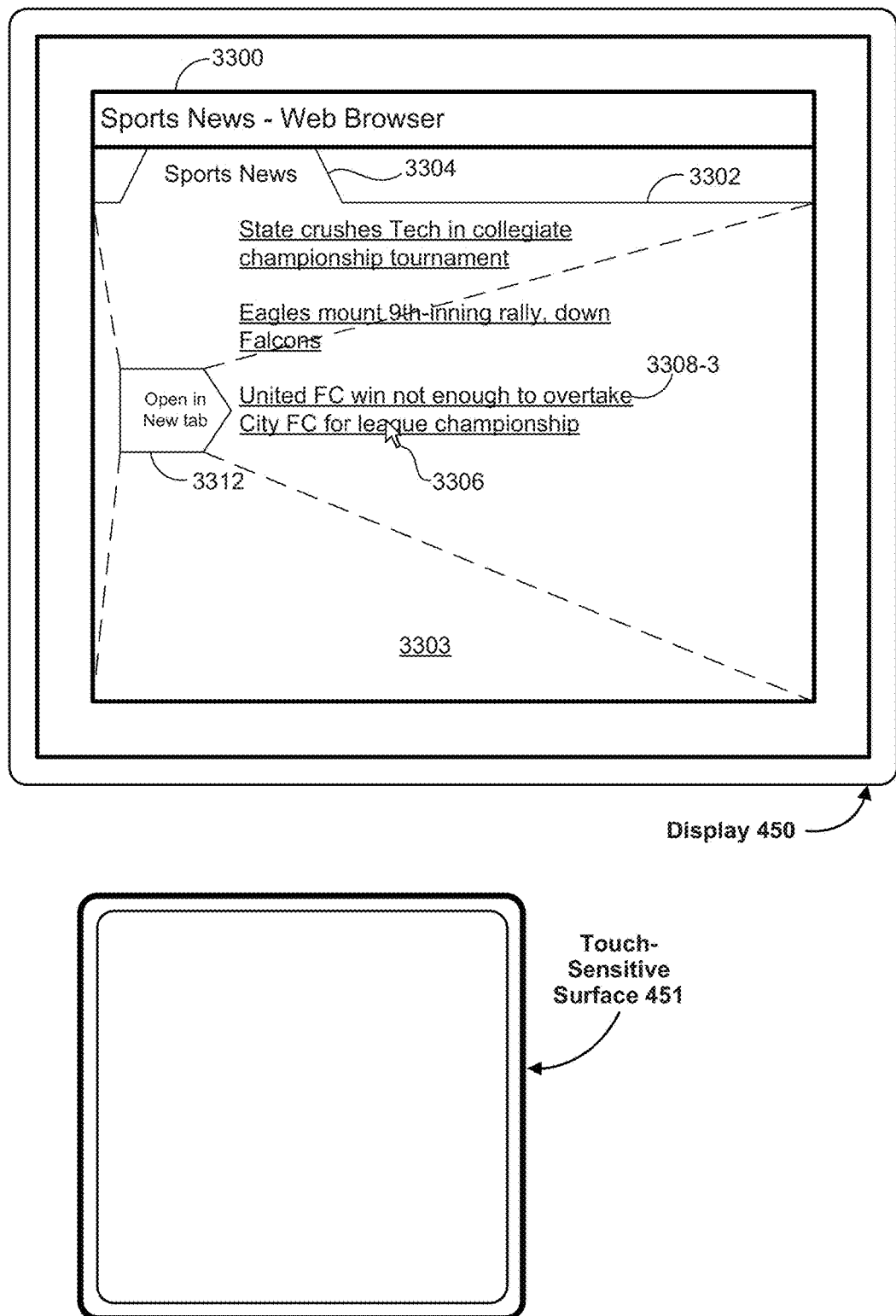
Figure 11K:
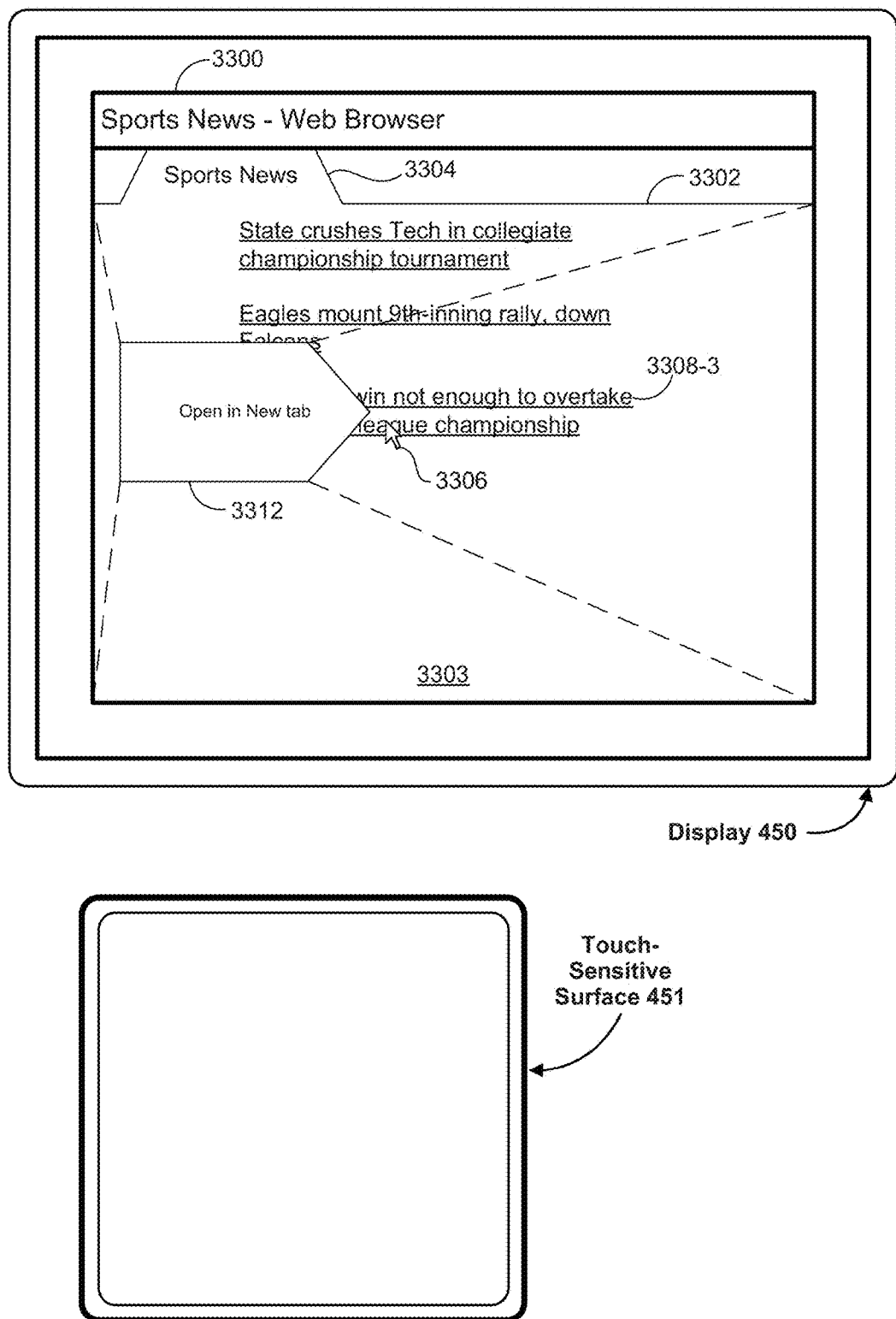
Figure 11L:
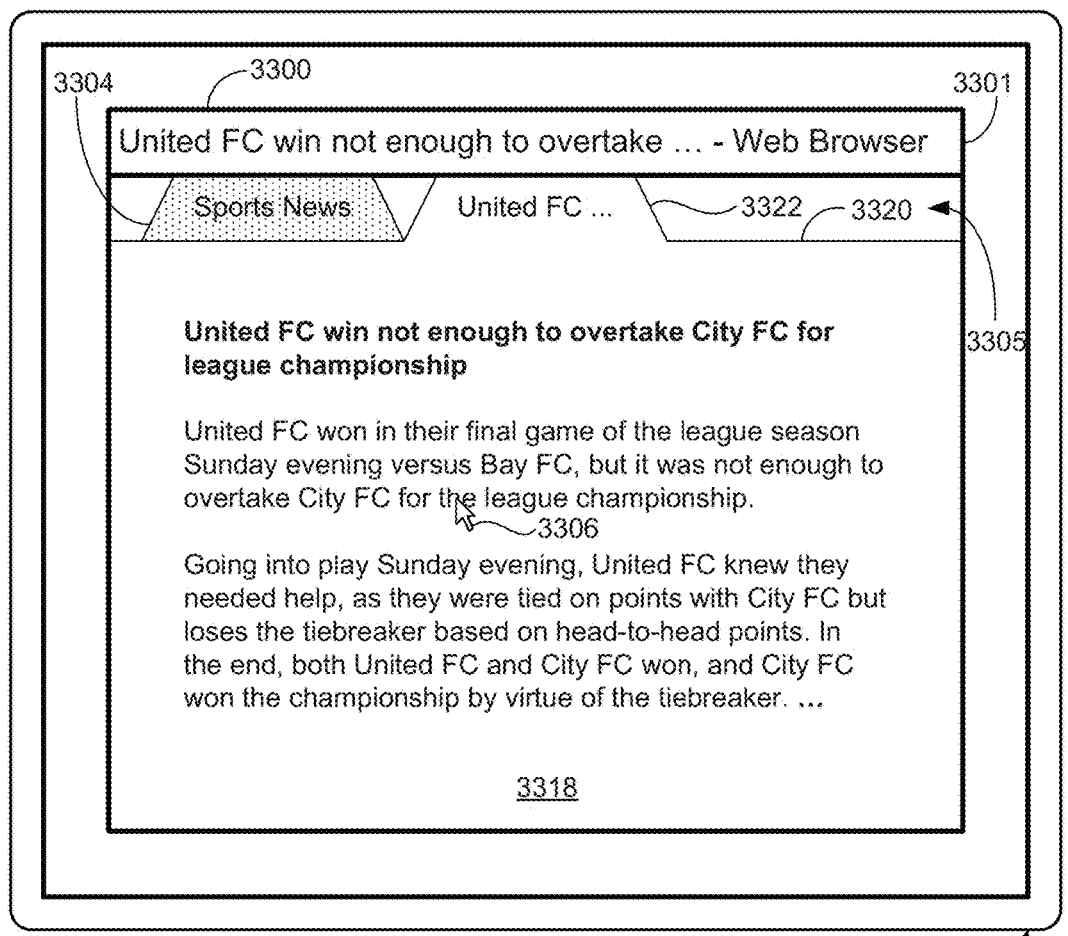
Figure 11L:
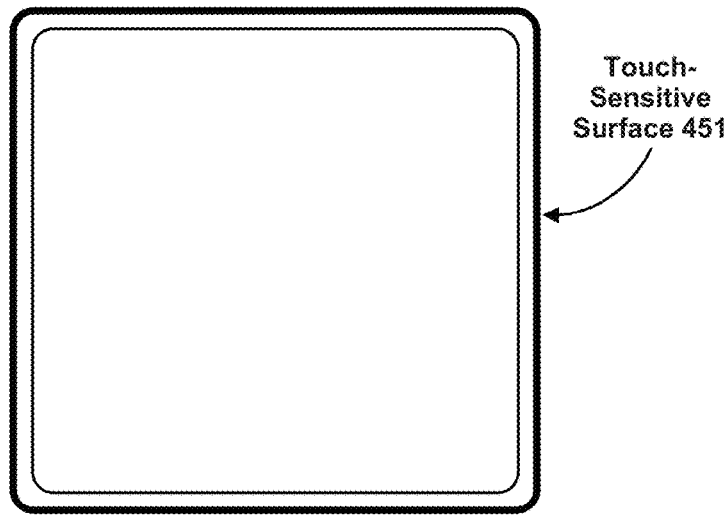

In some embodiments, a new tabbed window is created over tabbed window 3302, and electronic document 3318 is loaded in the new tabbed window. Further, in some embodiments, an animation of representation 3312 becoming the new tabbed window is, optionally, displayed. For example, FIGS. 11J-11K show instances of an animation in which representation 3312 from FIG. 11I expands, in response to detection of the liftoff of contact 3310 (e.g., in FIG. 11J) and in accordance with the liftoff of contact 3310 meeting the predefined intensity criteria, to become tabbed window 3320, as shown in FIG. 11L. Tabbed window 3320 includes tab 3322, which is displayed in tab bar 3305. Tabbed window 3320 is displayed over tabbed window 3302, hiding tabbed window 3302. Tab 3304 is, optionally, displayed as shaded to indicate that tabbed window 3302 is hidden behind tabbed window 3320 (e.g., to indicate that tabbed window 3302 is not the currently active tabbed window). Electronic document 3318 is loaded and displayed in tabbed window 3320, and title bar 3301 is updated with the title of electronic document 3318. Electronic document 3303 is maintained in tabbed window 3302.

Figure 11M:
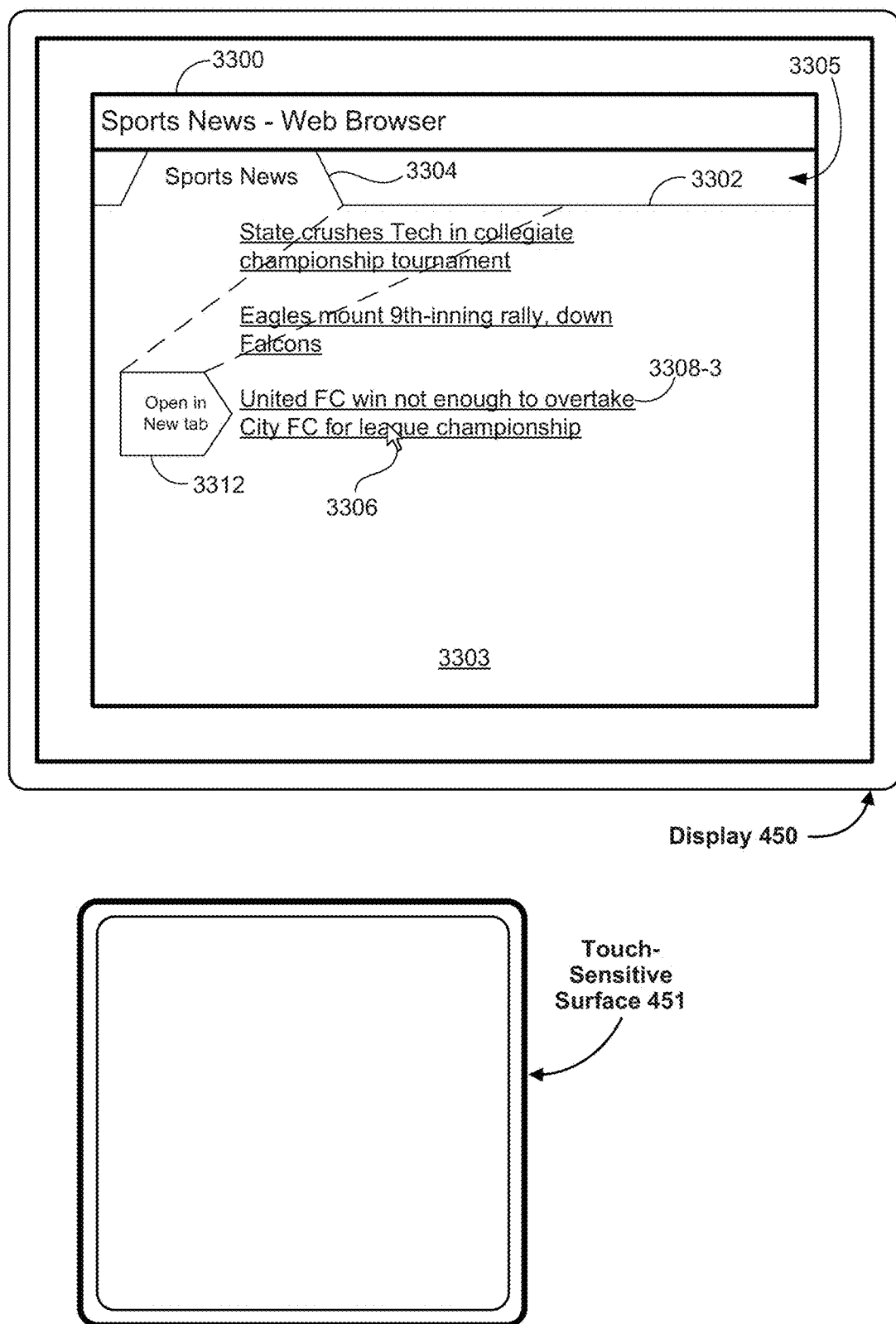
Figure 11N:
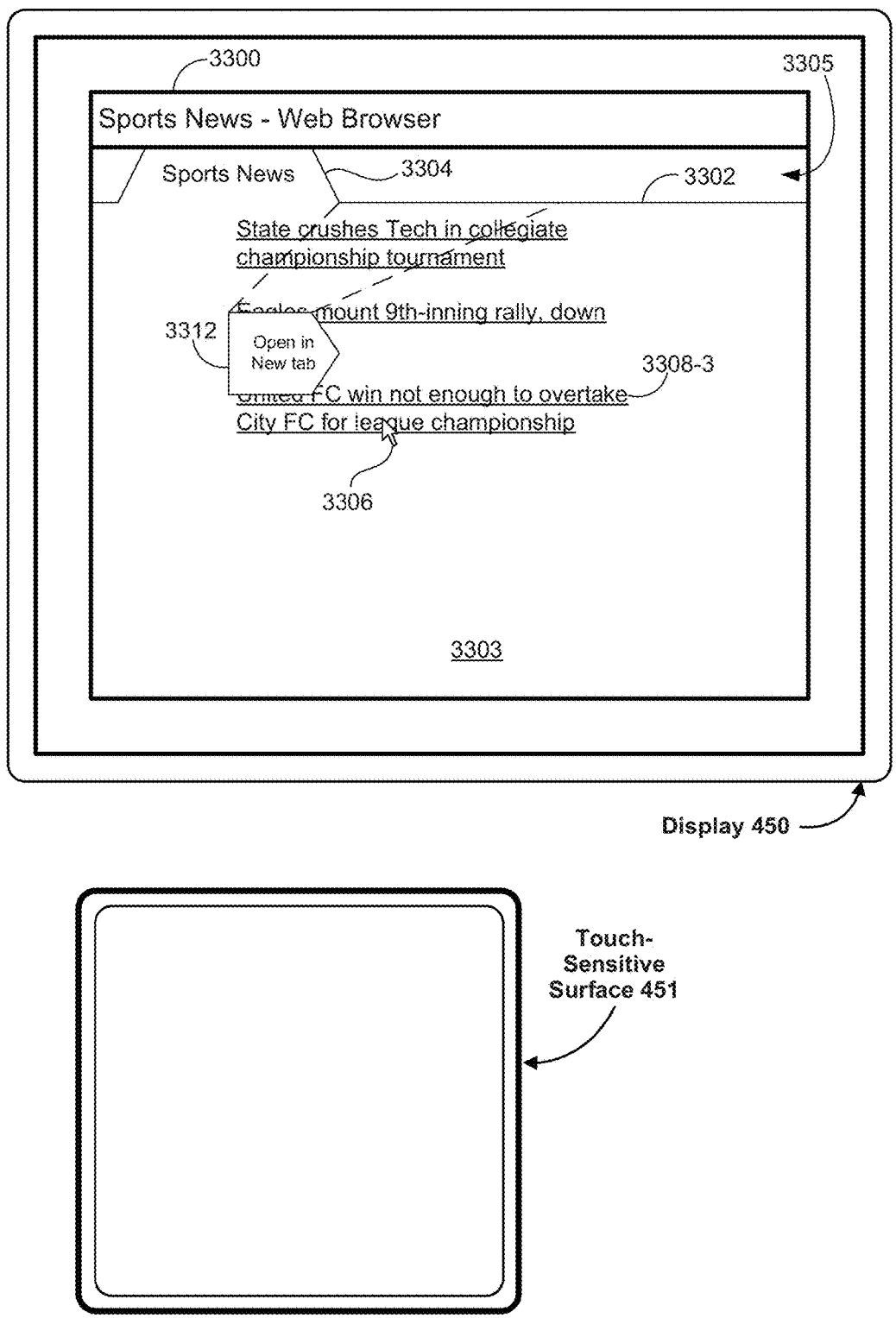
Figure 11O:
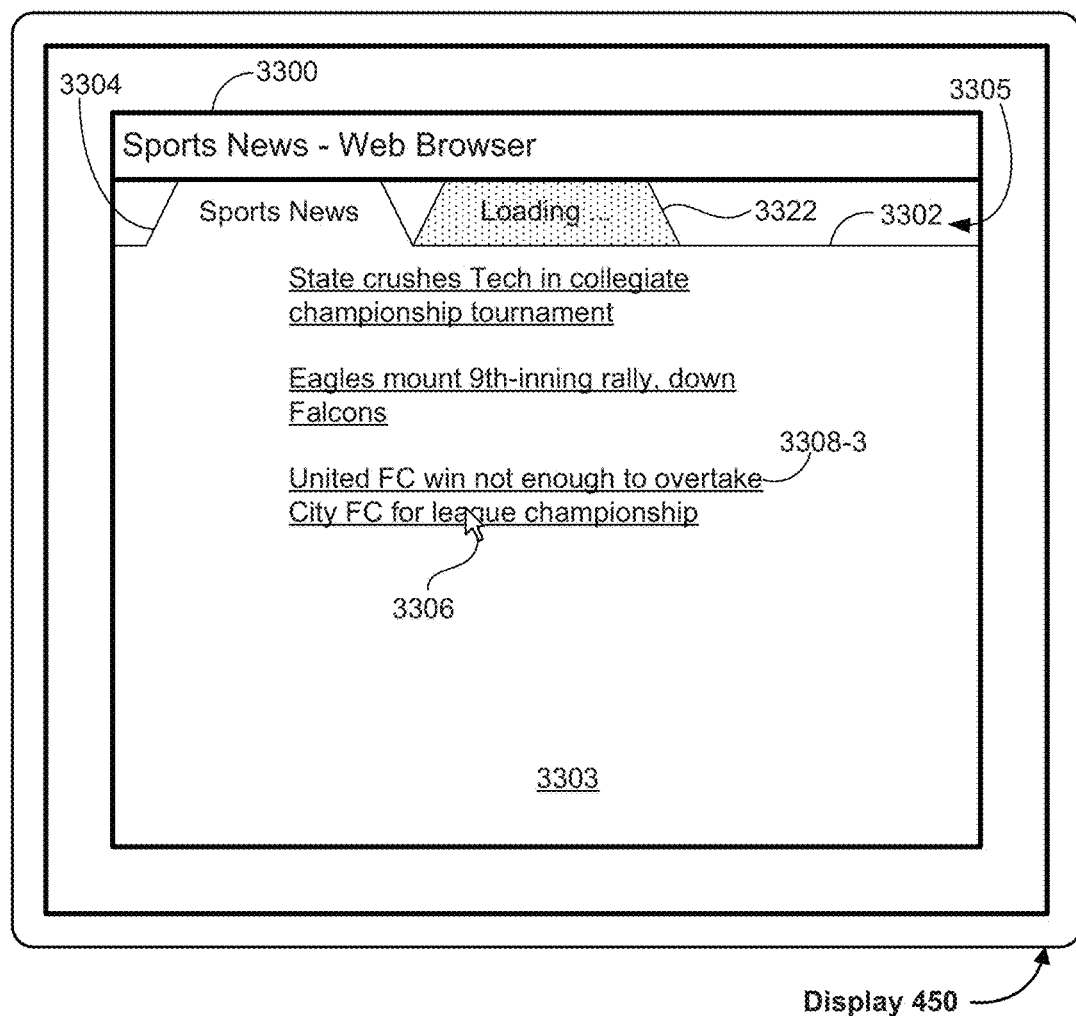
Figure 11P:
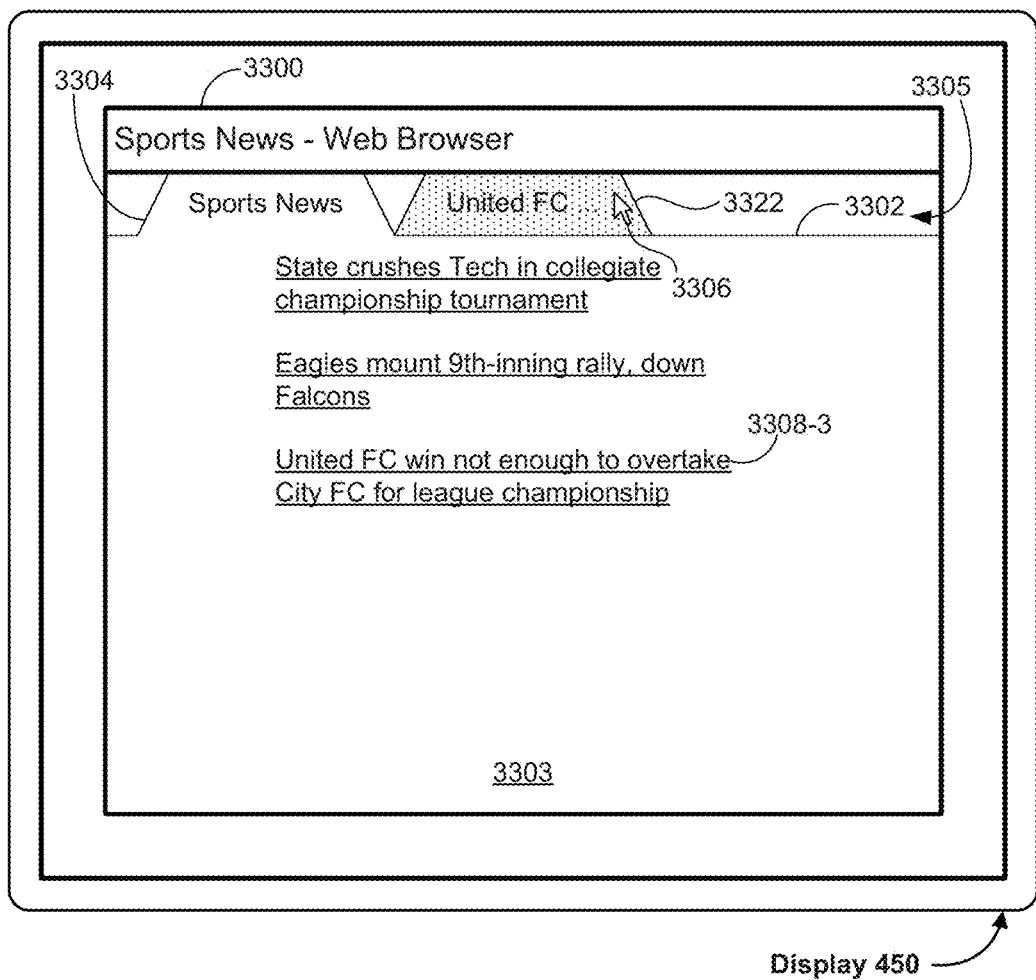
Figure 11P:
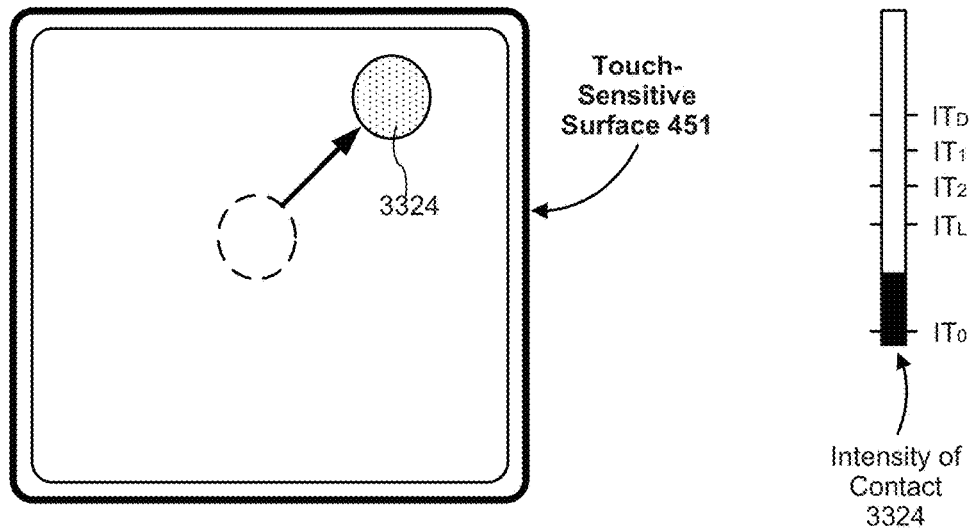

In some other embodiments, a new tabbed window is created behind tabbed window 3302, and electronic document 3318 is loaded in the new tabbed window. Further, in some embodiments, an animation of representation 3312 becoming the new tabbed window behind tabbed window 3302 is, optionally, displayed. For example, FIGS. 11M-11O show instances of an animation in which representation 3312 from FIG. 11I moves to tab bar 3305, in response to detection of the liftoff of contact 3310 (e.g., in FIG. 11M). When the animation of representation 3312 moving to tab bar 3305 is complete, tab 3322 is displayed in tab bar 3305, as shown in FIG. 11O. Tab 3322 is, optionally, displayed as shaded to indicate that tabbed window 3320 corresponding to tab 3322 is hidden in the background behind tabbed window 3302. While the loading of electronic document 3318 in hidden tabbed window 3320 is in progress, information or an indication to that effect (e.g., the text "Loading . . . ") is, optionally, displayed in tab 3322, as shown in FIG. 11O. When the loading is complete, the information in tab 3322 changes to the title of electronic document 3318, but tabbed window 3320 remains in the background, behind tabbed window 3302, as shown in FIG. 11P. Throughout, electronic document 3303 is maintained in tabbed window 3302.

Figure 11Q:
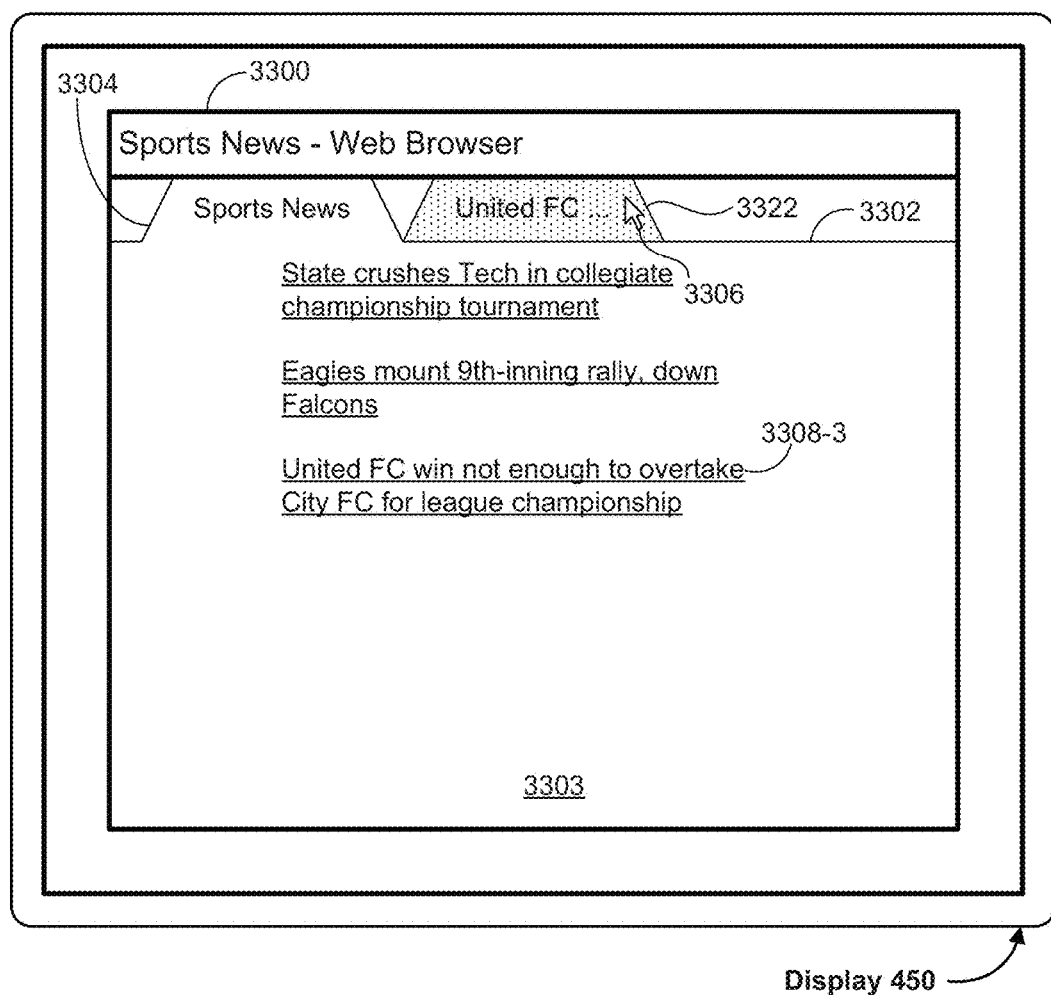
Figure 11Q:
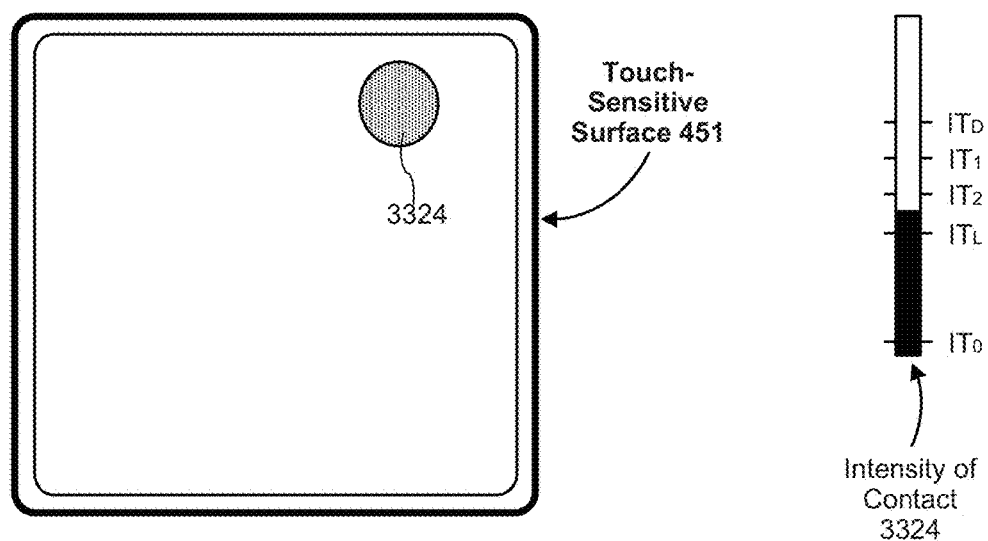
Figure 11R:
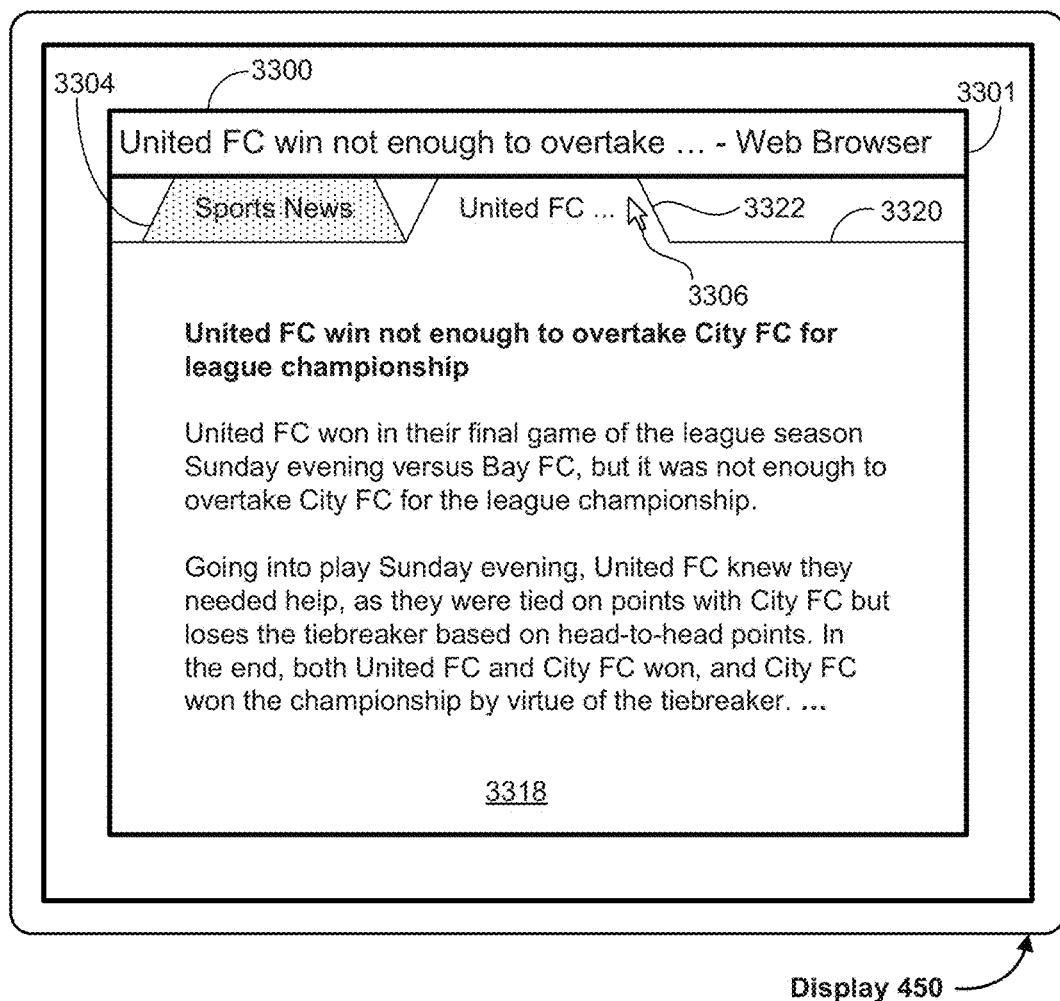
Figure 11R:
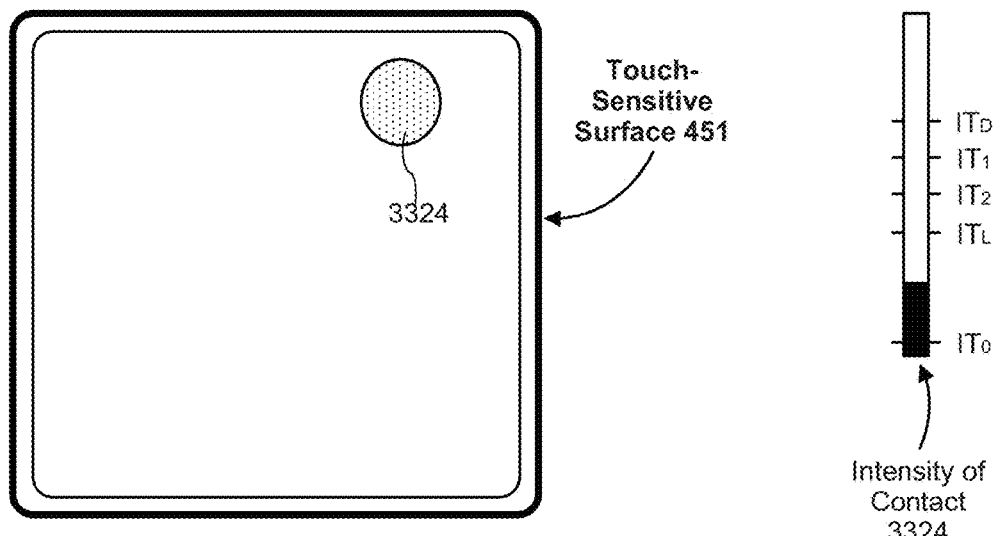

To bring tabbed window 3320 into the foreground, a user selects tab 3322. For example, the user optionally performs an input on touch-sensitive surface 451 to position cursor 3306 over tab 3322 (e.g., by moving contact 3324 across touch-sensitive surface 451, as shown in FIG. 11P), and then perform a gesture (e.g., a press input including an increase in intensity of contact 3324 from an intensity below $IT_L$ to an intensity above $IT_L$, as shown in FIG. 11Q and a subsequent decrease in intensity of contact 3324 below $IT_L$, as shown in FIG. 11R) while cursor 3306 is positioned over tab 3322, as shown in FIG. 11Q. In response to detection of the gesture performed with 3324 while cursor 3306 is positioned over tab 3322, tabbed window 3320 with electronic document 3318 is displayed in the foreground, and title bar 3301 is updated with the title of electronic document 3318, as shown in FIG. 11R. Tab 3304 is, optionally, shaded to indicate that tabbed window 3302 is in the background (e.g., that tabbed window 3302 is not the active window), hidden behind tabbed window 3320.

Figure 11S:
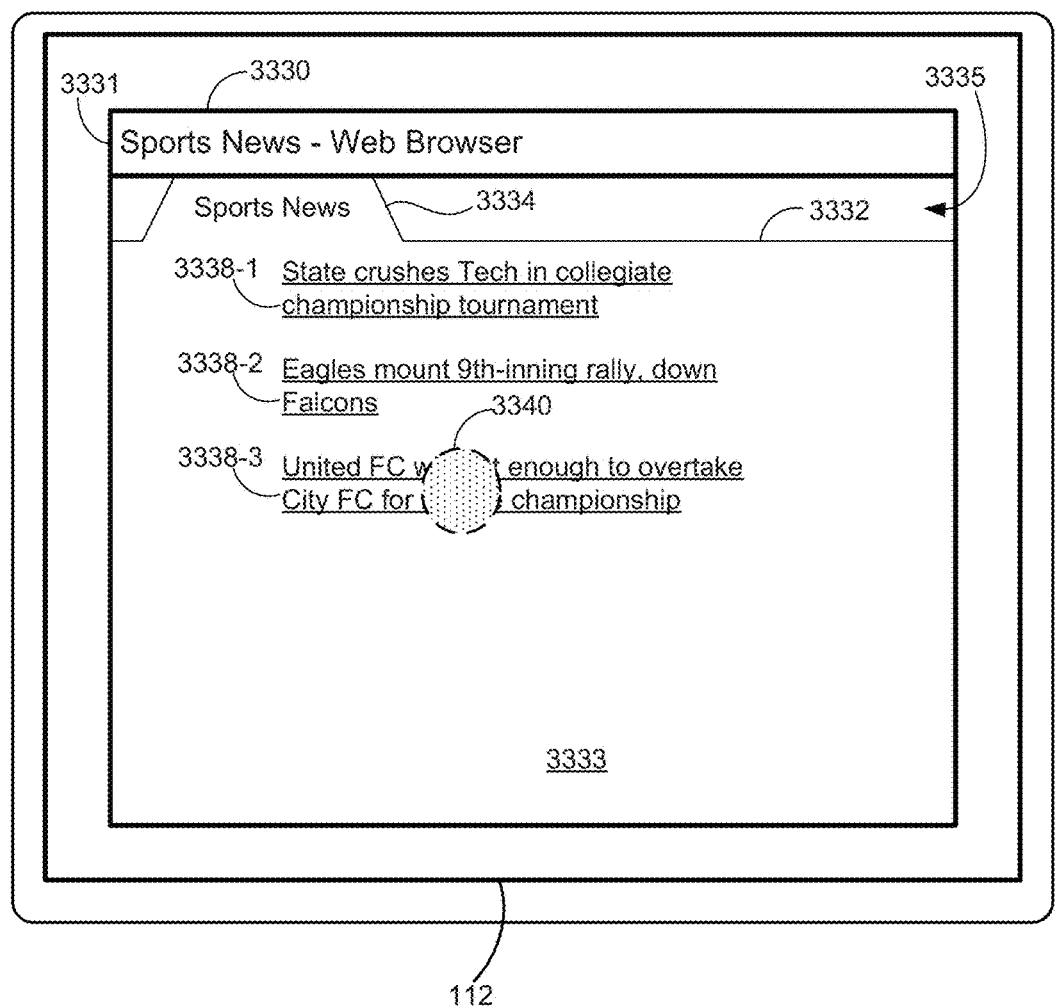
Figure 11S:
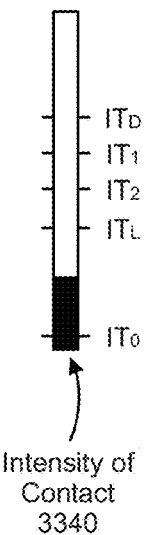
Figure 11T:
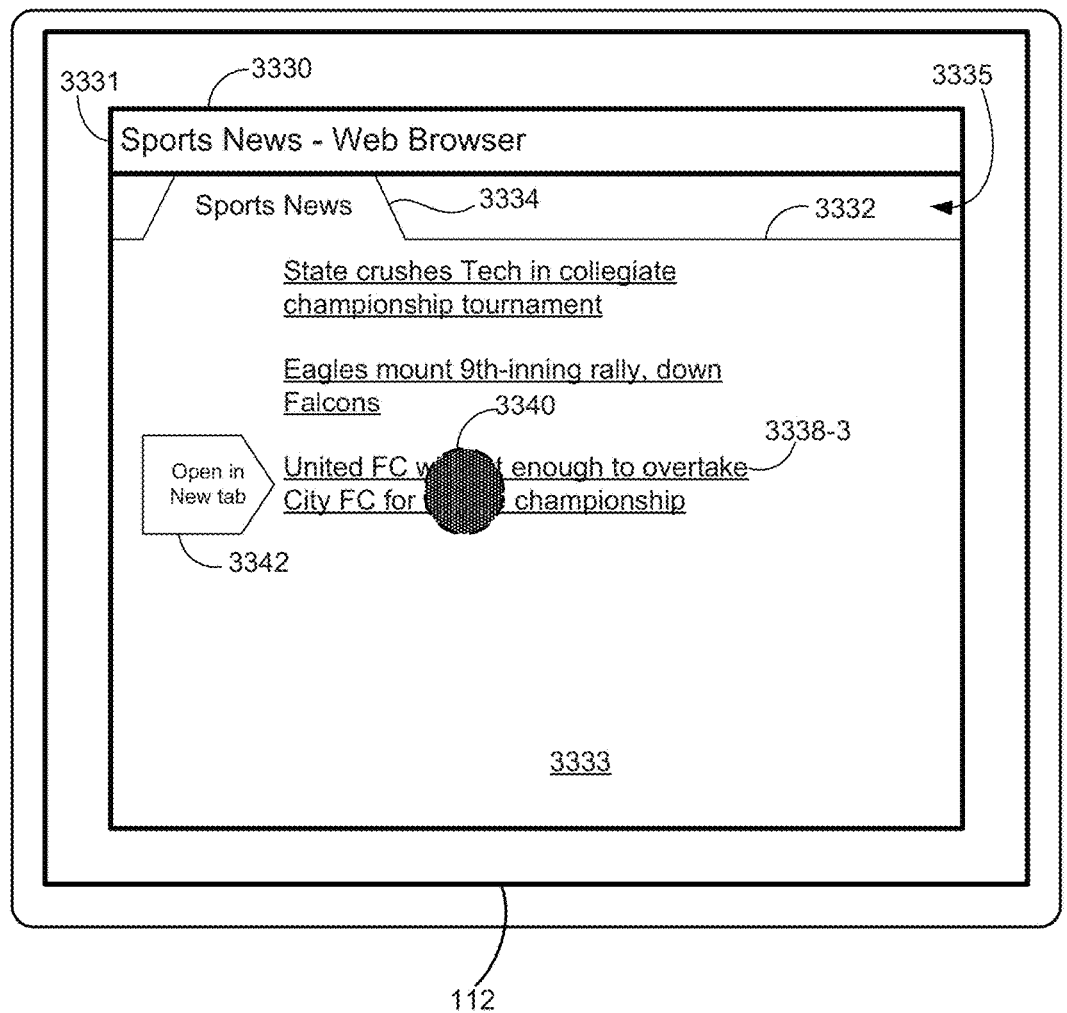
Figure 11T:
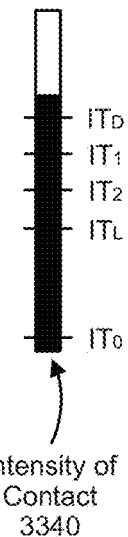
Figure 11U:
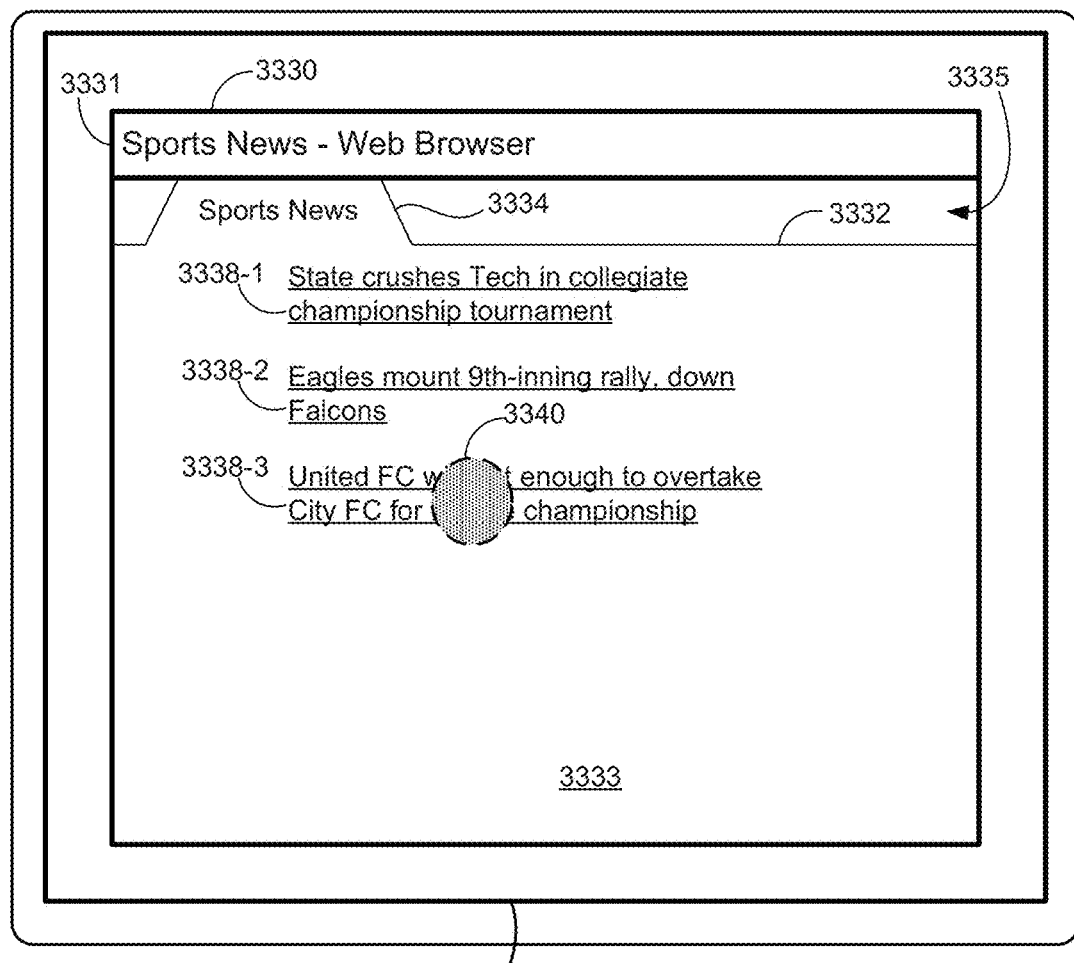
Figure 11U:
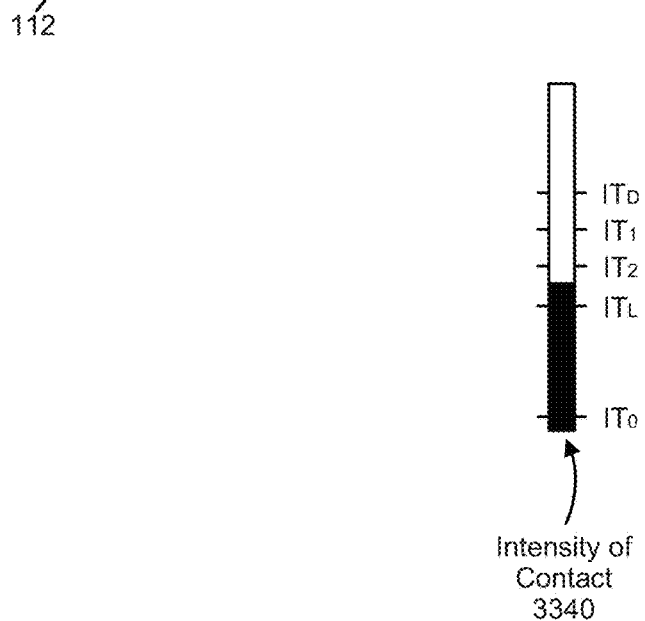
Figure 11V:
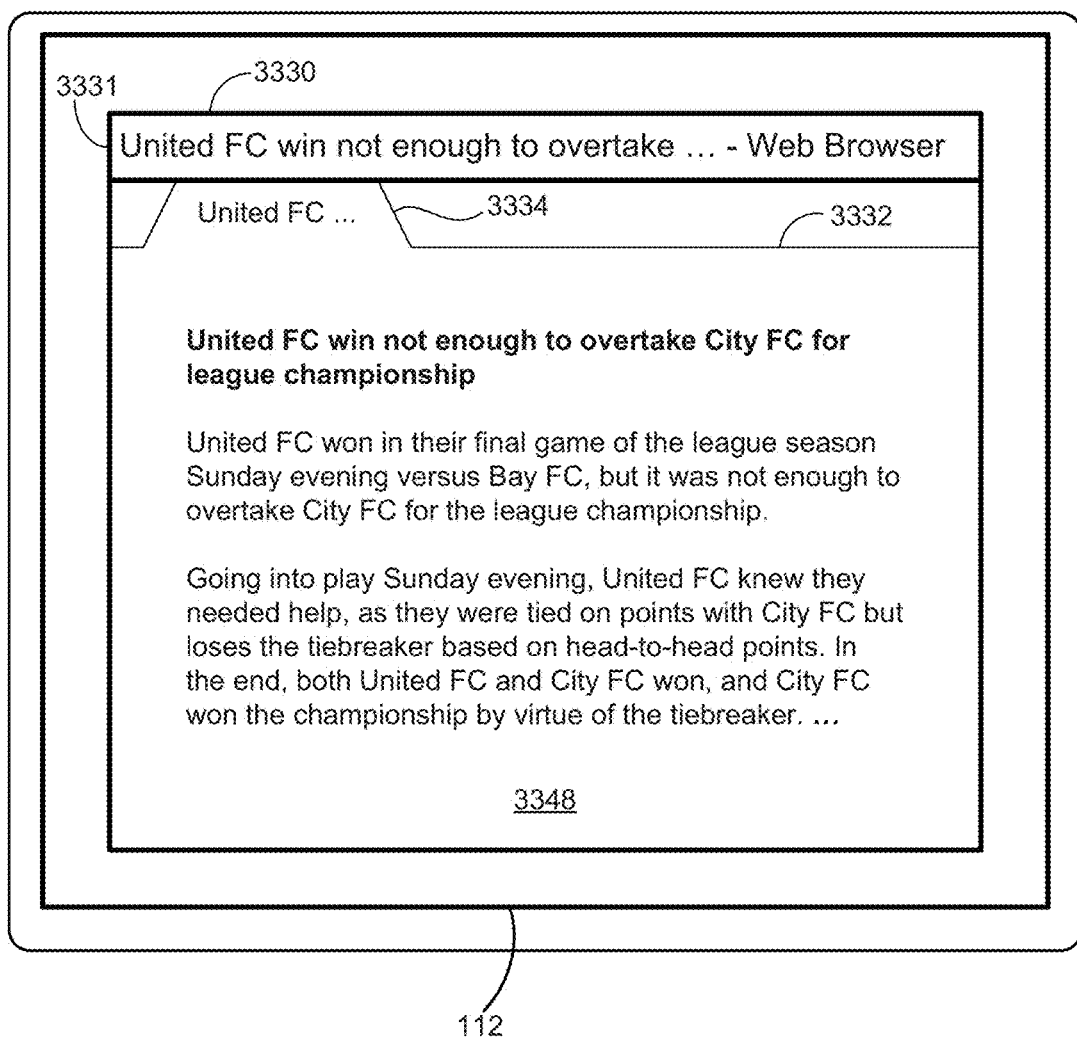
Figure 11W:
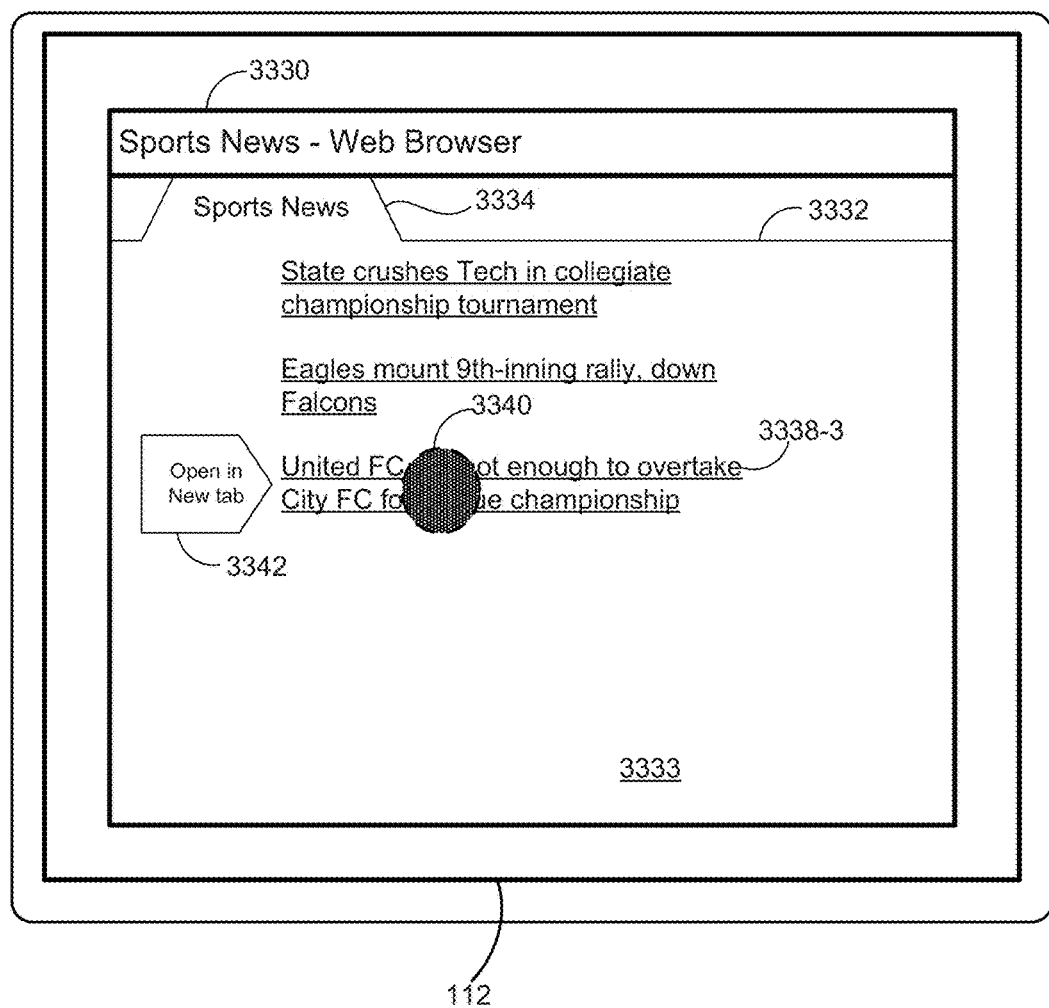
Figure 11W:
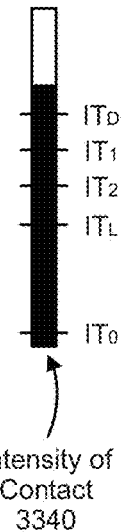
Figure 11X:
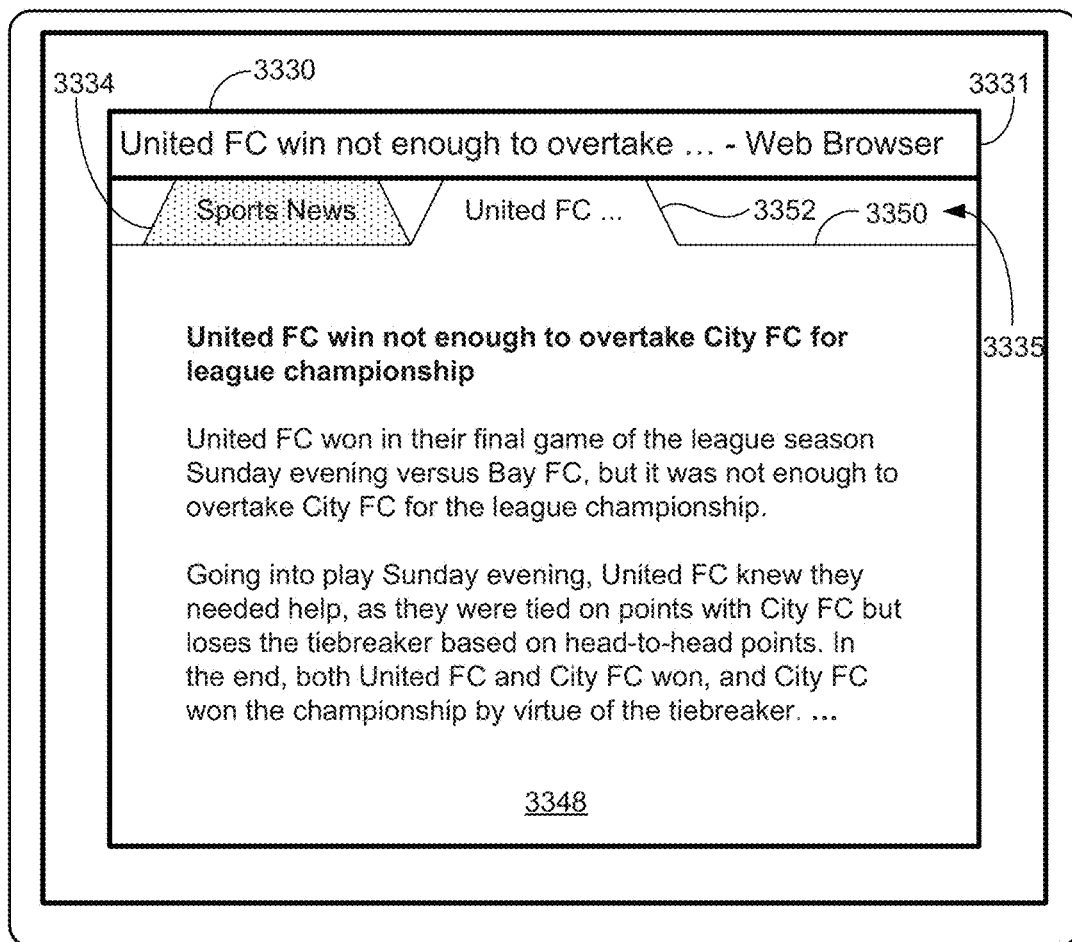
Figure 11Y:
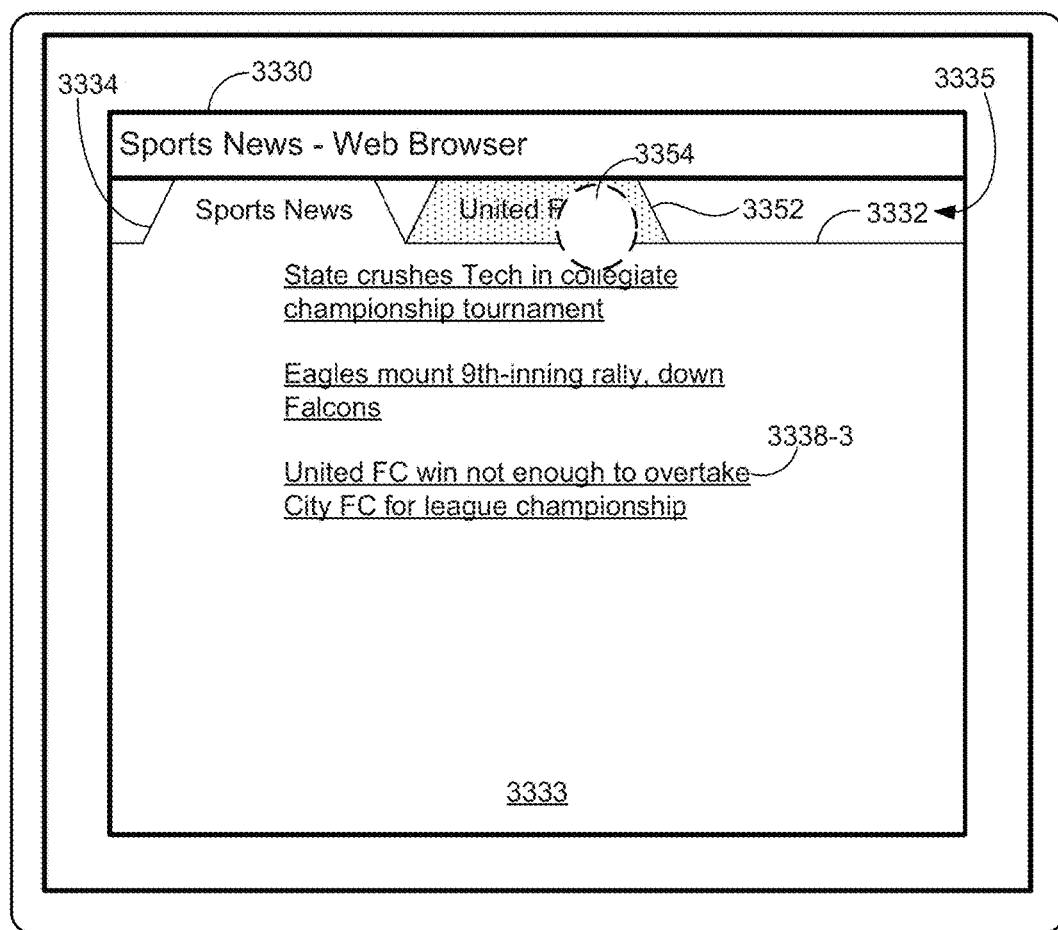
Figure 11Z:
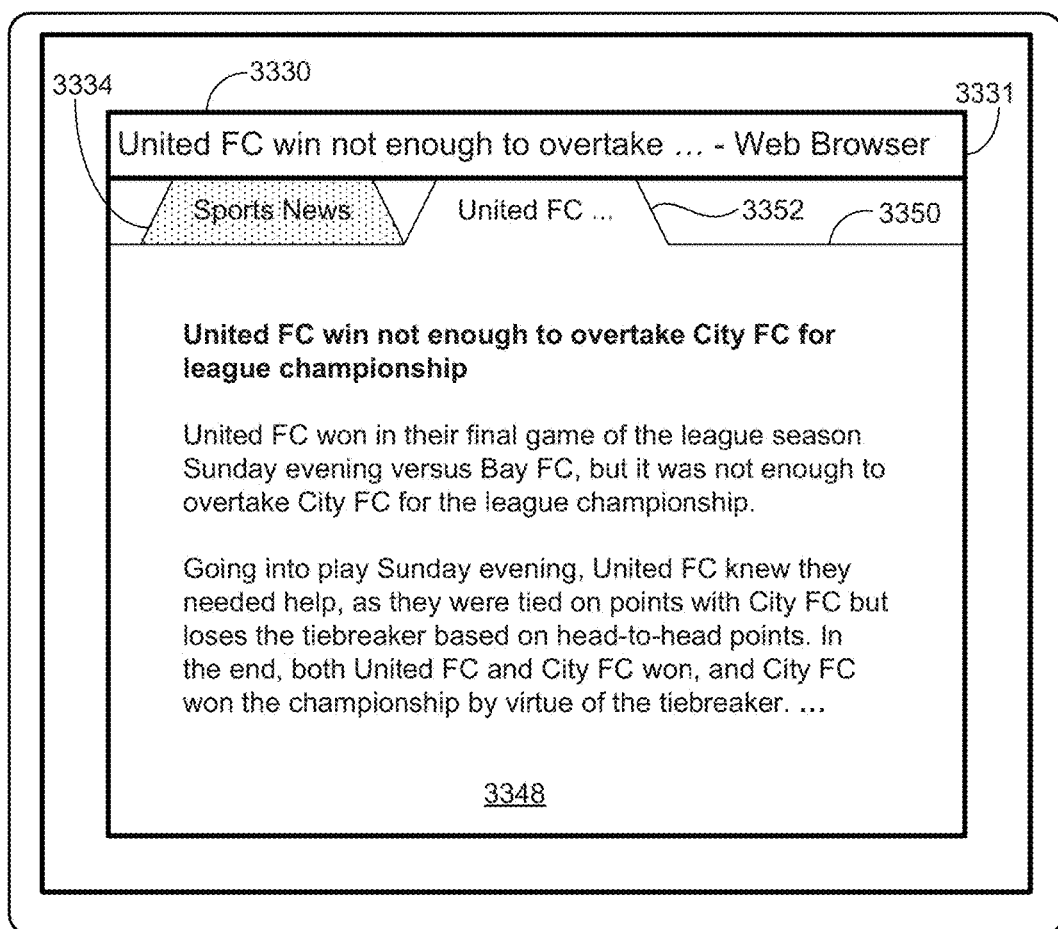
Figure 12A:
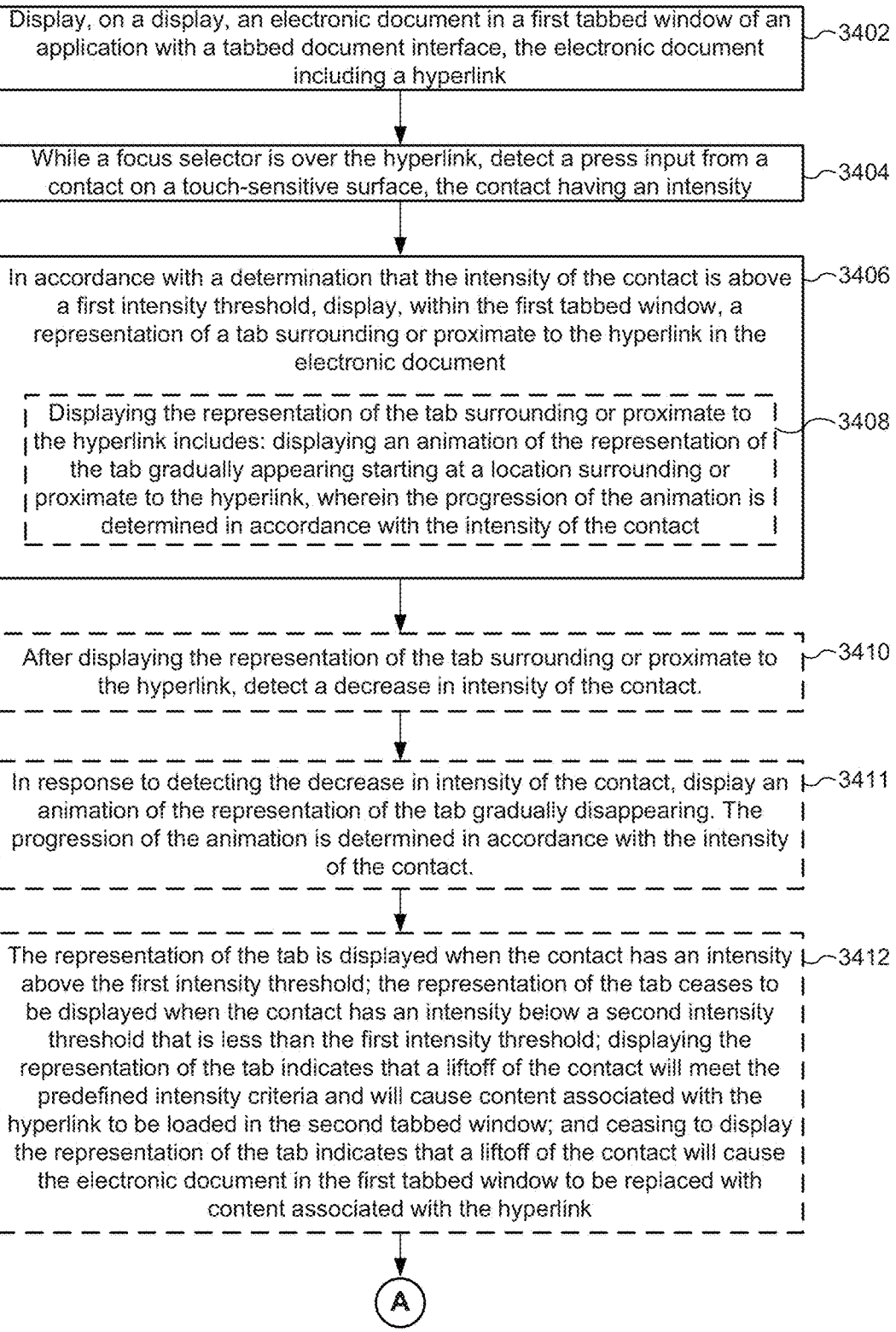
FIGS. 12A-12B are flow diagrams illustrating a method of displaying content associated with a hyperlink in accordance with some embodiments.
Figure 12B:
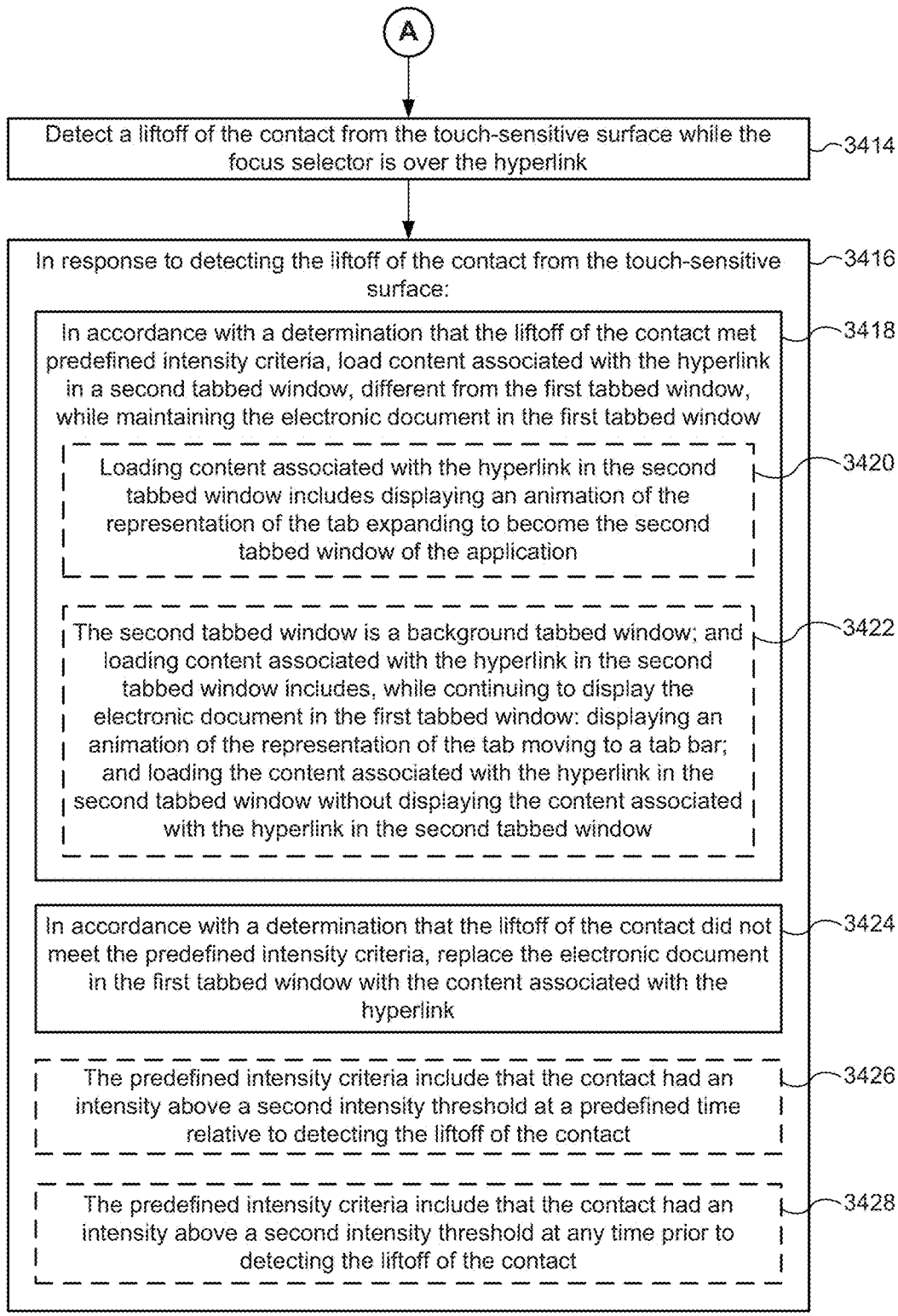

FIGS. 11S-11Z illustrate an example of the user interfaces described above with reference to FIGS. 11A-11R implemented on a device (e.g., device 100) with a touch-sensitive display (e.g., touch screen 112). FIG. 11S illustrates user interface 3330 displayed on touch screen 112 of a device (e.g., device 100). User interface 3330 corresponds to an application configured to display electronic documents or other content in a tabbed document interface. In a tabbed document interface, multiple items of content (e.g., electronic documents) is, optionally, displayed in respective tabbed windows or views within, for example, an application window. Each tabbed window or view (hereinafter "tabbed window" for convenience) has a corresponding tab that optionally displays information about the electronic document being displayed in the respective tabbed window. Also, a user optionally selects the tab for a corresponding tabbed window to cause the corresponding tabbed window to be displayed in the foreground. In FIG. 11S, user interface 3330 is an application window for a web browser application. Tabbed window 3332 is displayed within user interface 3330. Electronic document 3333 (in this case, a web page titled "Sports News") is displayed in tabbed window 3332.

Tab 3334, corresponding to tabbed window 3332, is, optionally, displayed in tab bar 3335 in user interface 3330. In FIG. 11S, tab bar 3335 is located between tabbed window 3332 and title bar 3331 of user interface 3330. Tab 3334 is, optionally, visually connected to tabbed window 3332 as shown in FIG. 11S; there is no clear boundary line between tab 3334 and tabbed window 3332. The title "Sports News" of electronic document 3333 is, optionally, displayed in tab 3334. The title of the electronic document displayed in the active tabbed window in user interface 3330 is, optionally, displayed in title bar 3331. For example, in FIG. 11S, the title "Sports News," corresponding to electronic document 3333 displayed in active tabbed window 3332, is displayed in title bar 3331.

User interface 3330 optionally includes other elements that are not shown, including, for example, an address bar, one or more buttons or icons for activating various operations or functions, and one or more menus. Electronic document 3333 includes one or more hyperlinks 3338 to other electronic documents (e.g., other web pages) or items of content. For example, electronic document 3333 includes hyperlinks 3338-1 thru 3338-3 to respective electronic documents.

FIG. 11S shows contact 3340 detected on touch-sensitive display 112 at a location corresponding to hyperlink 3338-3. Contact 3340 is, optionally, used to perform a gesture including a press input on touch-sensitive display 112 (e.g., a user pushing down on touch-sensitive display 112 with contact 3340 so as to increase the intensity of contact 3340). Contact 3340 has an intensity that is detected by the device. If the device determines that the intensity of contact 3340 is above the representation appearance intensity threshold (e.g., "$IT_1$"), a representation (e.g., representation 3342) of a tab is displayed, within tabbed window 3332, surrounding or near hyperlink 3338-3, as shown in FIG. 11T. In some embodiments, displaying representation 3342 includes displaying an animation (not shown) in which representation 3342 gradually appears. After displaying representation 3342, a decrease in the intensity of contact 3310, but without liftoff of contact 3340, is, optionally, detected. In response to detection of the decrease in intensity, an animation (not shown) of representation 3342 gradually disappearing (e.g., fade out) is, optionally, displayed.

When the intensity of contact 3340 decreases below the representation disappearance intensity threshold (e.g., "$IT_2$") that is below the representation appearance intensity threshold (e.g., "$IT_1$"), but still without liftoff of contact 3340, representation 3342 ceases to be displayed, as shown in FIG. 11U.

After representation 3342 ceases to be displayed, contact 3340 is, optionally, lifted off touch-sensitive display 112, as shown in FIG. 11V. In response to detection of the liftoff of contact 3340 from touch-sensitive display 112, if the liftoff of contact 3340 does not meet the predefined intensity criteria, electronic document 3348, associated with hyperlink 3338-3, is displayed in tabbed window 3332 in place of electronic document 3333, and title bar 3331 is updated with the title of electronic document 3348, as shown in FIG. 11V.

Returning to, and continuing from, FIG. 11T, FIG. 11W shows contact 3340 on touch-sensitive display 112 with an intensity that is above the new tab intensity threshold (e.g., "$IT_D$"). Also, representation 3342 is displayed. In response to detection of the liftoff of contact 3340 from touch-sensitive display 112, electronic document 3348 is loaded in a new tabbed window distinct from tabbed window 3332, and electronic document 3333 remains in tabbed window 3332; liftoff of contact 3340 meets the predefined intensity criteria.

In some embodiments, new tabbed window 3350 is created over tabbed window 3332, and electronic document 3348 is loaded in tabbed window 3350, as shown in FIG. 11X. Further, in some embodiments, an animation (similar to that shown in FIGS. 11J-11L) of representation 3342 becoming the new tabbed window is, optionally, displayed. Tabbed window 3350 includes tab 3352, which is displayed in tab bar 3335. In FIG. 11X, tabbed window 3350 is displayed over tabbed window 3332, hiding tabbed window 3332. Tab 3334 is, optionally, displayed as shaded to indicate that tabbed window 3332 is hidden behind tabbed window 3350. Electronic document 3348 is loaded and displayed in tabbed window 3350, and title bar 3331 is updated with the title of electronic document 3348. Electronic document 3333 is maintained in tabbed window 3302.

In some embodiments, a new tabbed window is created behind tabbed window 3332, and electronic document 3348 is loaded in the new tabbed window, as shown in FIG. 11Y. Further, in some embodiments, an animation (similar to that shown in FIGS. 11M-11O) of representation 3342 becoming the new tabbed window behind tabbed window 3332 is, optionally, displayed. Tab 3352 is displayed in tab bar 3335, as shown in FIG. 11Y. Tab 3352 is, optionally, displayed as shaded to indicate that tabbed window 3350 corresponding to tab 3352 is hidden in the background behind tabbed window 3332. When the loading is complete, the information in tab 3352 changes to the title of electronic document, but tabbed window 3350 remains in the background, behind tabbed window 3332, as shown in FIG. 11Y. Throughout, electronic document 3333 is maintained in tabbed window 3332.

In some embodiments, to bring tabbed window 3350 into the foreground, a user selects tab 3352. For example, the user optionally performs a gesture (e.g., a tap gesture including contact 3354) on touch-sensitive display 112 over tab 3352. In response to detection of the gesture over tab 3322, tabbed window 3350 with electronic document 3348 is displayed in the foreground, and title bar 3331 is updated with the title of electronic document 3348, as shown in FIG. 11Z. Tab 3334 is, optionally, shaded to indicate that tabbed window 3332 is in the background, hidden behind tabbed window 3350.

FIGS. 12A-12B are flow diagrams illustrating a method 3400 of displaying content associated with a hyperlink in accordance with some embodiments. The method 3400 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch screen display and the touch-sensitive surface is on the display. In some embodiments, the display is separate from the touch-sensitive surface. Some operations in method 3400 are, optionally, combined and/or the order of some operations is, optionally, changed.

As described below, the method 3400 provides an intuitive way to display content associated with a hyperlink. The method reduces the cognitive burden on a user when displaying content associated with a hyperlink, thereby creating a more efficient human-machine interface. For battery-operated electronic devices, enabling a user to display content associated with a hyperlink faster and more efficiently conserves power and increases the time between battery charges.

The device displays (3402), on the display, an electronic document in a first tabbed window of an application with a tabbed document interface, and the electronic document includes a hyperlink. FIG. 11A, for example, shows electronic document 3303 displayed in tabbed window 3302 within user interface 3300. Electronic document 3303 includes hyperlink 3308-3. FIG. 11S, for example, shows electronic document 3333 displayed in tabbed window 3332 within user interface 3330. Electronic document 3333 includes hyperlink 3338-3.

While a focus selector (e.g., cursor 3306 in FIG. 11A or contact 3340 in FIG. 11S) is over the hyperlink, the device detects (3404) a press input from a contact (e.g., a finger contact) on the touch-sensitive surface, and the contact has an intensity. For example, FIG. 11A also shows contact 3310 detected on touch-sensitive surface 451 while cursor 3306 is located over hyperlink 3308-3. Contact 3310 is, optionally, a part of a press input on touch-sensitive surface 451. Contact 3310 has an intensity that is, optionally, determined by the device. As another example, FIG. 11S also shows contact 3340 detected on touch-sensitive display 112 over hyperlink 3338-3. Contact 3340, which has an intensity, is, optionally, a part of a press input on touch-sensitive display 112.

In accordance with a determination that the intensity of the contact is above a first intensity threshold (e.g., the representation appearance intensity threshold), the device displays (3406), within the first tabbed window, a representation of a tab surrounding or proximate to the hyperlink in the electronic document. In some embodiments, the tab is displayed adjacent to or as part of a user interface element that surrounds the hyperlink. In some embodiments, in accordance with a determination that the maximum intensity of the contact is below the first intensity threshold (e.g., the representation appearance intensity threshold), the device continues to display the hyperlink without displaying, within the first tabbed window, the representation of the tab surrounding or proximate to the hyperlink in the electronic document.

FIGS. 11C-11E illustrate examples of a representation of a tab displayed in accordance with a determination that contact 3310 has an intensity above the representation appearance intensity threshold (e.g., "$IT_1$"). FIG. 11C shows representation 3312 displayed adjacent to hyperlink 3308-3 in accordance with a determination that contact 3310 has an intensity above the representation appearance intensity threshold (e.g., "$IT_1$"). FIGS. 11D and 11E show representation 3314 and 3316, respectively, displayed as surrounding hyperlink 3308-3 in accordance with a determination that contact 3310 has an intensity above the representation appearance intensity threshold (e.g., "$IT_1$"). FIG. 11T shows representation 3342 displayed adjacent to hyperlink 3338-3 in accordance with a determination that contact 3340 has an intensity above the representation appearance intensity threshold (e.g., "$IT_1$").

In some embodiments, displaying the representation of the tab surrounding or proximate to the hyperlink includes (3408) displaying an animation of the representation of the tab gradually appearing starting at a location surrounding or proximate to the hyperlink, where the progression of the animation is determined in accordance with the intensity of the contact. FIGS. 11B-11C, for example, show an animation of representation 3312 gradually appearing (e.g., fade-in) next to hyperlink 3308-3. In some embodiments, the progression of the animation of representation 3312 gradually appearing is, optionally, determined in accordance with the intensity of contact 3310.

In some embodiments, after displaying the representation of the tab surrounding or proximate to the hyperlink, the device detects (3410) a decrease in intensity of the contact, and in response to detecting the decrease in intensity of the contact, displays an animation of the representation of the tab gradually disappearing, where the progression of the animation is determined in accordance with the intensity of the contact. FIG. 11F, for example, shows the intensity of contact 3310 decreasing from the intensity of contact 3310 as in FIG. 11C (e.g., the intensity of contact decreases from an intensity above $IT_D$ in FIG. 11C to an intensity between $IT_1$ and $IT_2$ in FIG. 11F). In response to detection of the decrease in intensity of contact 3310, an animation of representation 3312 gradually disappearing (e.g., fade-out) is displayed. The progression of the animation of representation 3312 gradually disappearing is, optionally, determined in accordance with the intensity of contact 3310.

In some embodiments, the representation of the tab is (3412) displayed when the contact has an intensity above the first intensity threshold, the representation of the tab ceases to be displayed when the contact has an intensity below a second intensity threshold that is less than the first intensity threshold, displaying the representation of the tab indicates that a liftoff of the contact will meet the predefined intensity criteria and will cause content associated with the hyperlink to be loaded in the second tabbed window, and ceasing to display the representation of the tab indicates that a liftoff of the contact will cause the electronic document in the first tabbed window to be replaced with content associated with the hyperlink (e.g., in response to detecting liftoff of the contact, in accordance with a determination that the representation of the tab is displayed, the device loads the content associated with the hyperlink in the second tabbed window, and in accordance with a determination that the representation of the tab is not displayed, the device forgoes loading the content associated with the hyperlink in the second tabbed window and instead replaces the electronic document in the first tabbed window with the content associated with the hyperlink). For example, FIG. 11C shows representation 3312 displayed when contact 3310 has an intensity above the representation appearance intensity threshold (e.g., "$IT_1$"). Continuing from FIG. 11C, FIGS. 11F-11G show the intensity of contact 3310 decreasing below the representation disappearance intensity threshold (e.g., "$IT_2$"), which is less than the representation appearance intensity threshold, and representation 3312 ceasing to be displayed when the intensity of contact 3310 decreases below the representation disappearance intensity threshold (e.g., "$IT_2$"), as shown in FIG. 11F. The displaying of representation 3312 indicates that a liftoff of contact 3310 will meet the predefined intensity criteria and will cause electronic document 3318 to be loaded in tabbed window 3320. Cessation of display of representation 3312 indicates that a liftoff of contact 3310 will cause electronic document 3303 in tabbed window 3302 to be replaced with electronic document 3318 associated with hyperlink 3308-3.

As another example, FIG. 11T shows representation 3342 displayed when contact 3340 has an intensity above the representation appearance intensity threshold (e.g., "$IT_1$"). Continuing from FIG. 11T, FIG. 11U shows representation 3342 ceasing to be displayed when the intensity of contact 3340 decreases below the representation disappearance intensity threshold (e.g., "$IT_2$"). The displaying of representation 3342 indicates that a liftoff of contact 3340 will meet the predefined intensity criteria and will cause electronic document 3348 to be loaded in tabbed window 3350, as shown in FIG. 11X. Cessation of display of representation 3342 indicates that a liftoff of contact 3340 will cause electronic document 3333 in tabbed window 3332 to be replaced with electronic document 3348 associated with hyperlink 3338-3, as shown in FIG. 11V.

The device detects (3414) a liftoff of the contact from the touch-sensitive surface while the focus selector is over the hyperlink. FIGS. 11H and 11J-11P show detection of a liftoff of contact 3310 from touch-sensitive surface 451. FIG. 11H shows detection of a liftoff of contact 3310 that does not meet the predefined intensity criteria. FIGS. 11J-11P show detection of a liftoff of contact 3310 that meets the predefined intensity criteria. FIGS. 11V and 11W-11Z show detection of a liftoff of contact 3340 from touch-sensitive display 112. FIG. 11V shows detection of a liftoff of contact 3340 that does not meet the predefined intensity criteria. FIGS. 11W-11Z show detection of a liftoff of contact 3340 that meets the predefined intensity criteria.

In response (3416) to detecting the liftoff of the contact from the touch-sensitive surface, in accordance with a determination that the liftoff of the contact met predefined intensity criteria, the device loads (3424) content associated with the hyperlink (e.g., a web page that corresponds to the hyperlink) in a second tabbed window, different from the first tabbed window, while maintaining the electronic document in the first tabbed window (3418); and in accordance with a determination that the liftoff of the contact did not meet the predefined intensity criteria, the device replaces the electronic document in the first tabbed window with the content associated with the hyperlink. In FIG. 11H, in response to a liftoff of contact 3310 that does not meet the predefined intensity criteria, electronic document 3303 in tabbed window 3302 is replaced with electronic document 3318. In FIGS. 11L and 11O, in response to a liftoff of contact 3310 that meets the predefined intensity criteria, electronic document 3318 is loaded in tabbed window 3320, and electronic document 3303 is maintained in tabbed window 3302.

In FIG. 11V, in response to a liftoff of contact 3340 that does not meet the predefined intensity criteria, electronic document 3333 in tabbed window 3332 is replaced with electronic document 3348. In FIGS. 11X and 11Y, in response to a liftoff of contact 3340 that meets the predefined intensity criteria, electronic document 3348 is loaded in tabbed window 3350, and electronic document 3333 is maintained in tabbed window 3332.

In some embodiments, loading content associated with the hyperlink in the second tabbed window includes displaying (3420) an animation of the representation of the tab expanding to become the second tabbed window of the application. FIGS. 11J-11L, for example, illustrate an animation of representation 3312 expanding to become tabbed window 3320.

In some embodiments, the second tabbed window is a background tabbed window, loading content associated with the hyperlink in the second tabbed window includes, while continuing to display the electronic document in the first tabbed window: displaying (3422) an animation of the representation of the tab moving to a tab bar, and loading the content associated with the hyperlink in the second tabbed window without displaying the content associated with the hyperlink in the second tabbed window. In some embodiments, an indication of the content associated with the hyperlink is displayed in the tab (e.g., a title of the webpage or a favicon associated with the webpage) but the body of the webpage is not displayed within in the second tabbed window because the second tabbed window is a background window and is thus "behind" the first tabbed window. FIGS. 11M-11P, for example, illustrate representation 3312 moving into tab bar 3305 to become tab 3322 for tabbed window 3320, which remains in the background behind tabbed window 3302 while electronic document 3318 is loaded in tabbed window 3320.

In some embodiments, the predefined intensity criteria include (3426) that the contact had an intensity above a second intensity threshold at a predefined time relative to detecting the liftoff of the contact (e.g., the force of the contact 10 ms prior to liftoff). In some embodiments, the first intensity threshold is the same as the second intensity threshold. In some embodiments, the first intensity threshold is different from the second intensity threshold. For example, the predefined intensity criteria include that contact 3310 have an intensity above the new tab intensity threshold (e.g., "$IT_D$") at a predefined time (e.g., 10 ms) prior to liftoff of contact 3310. Depending on the embodiment, the new tab intensity threshold is, optionally, the same as or different from the representation appearance intensity threshold. In some embodiments, the predefined intensity criteria include (3428) that the contact had an intensity above a second intensity threshold at any time prior to detecting the liftoff of the contact (e.g., the criteria is based on the maximum force of contact prior to detecting liftoff). For example, the predefined intensity criteria include that contact 3310 have an intensity above the new tab intensity threshold (e.g., "$IT_D$") at any time prior to liftoff of contact 3310.

In some embodiments, the predefined intensity criteria are met for a respective gesture performed with a respective contact when (or, optionally, only when) the respective contact has a maximum intensity above $IT_D$ and the device detects liftoff of the respective contact while the respective contact has an intensity above $IT_D$. In some embodiments, the predefined intensity criteria are met for a respective gesture performed with a respective contact when (or, optionally, only when) the respective contact has a maximum intensity above $IT_D$ and the device detects liftoff of the respective contact while the respective contact has an intensity above $IT_1$. In some embodiments, the predefined intensity criteria are met for a respective gesture performed with a respective contact when (or, optionally, only when) the respective contact has a maximum intensity above $IT_D$ and the device detects liftoff of the respective contact while the respective contact has an intensity above $IT_2$. In some embodiments, the predefined intensity criteria are met for a respective gesture performed with a respective contact when (or, optionally, only when) the respective contact has a maximum intensity above $IT_D$ and the device detects liftoff of the respective contact while the respective contact has an intensity above $IT_L$.

It should be understood that the particular order in which the operations in FIGS. 12A-12B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 3400 described above with respect to FIGS. 12A-12B. For example, the contacts, gestures, intensity thresholds, focus selectors, animations, and content described above with reference to method 3400 optionally has one or more of the characteristics of the contacts, gestures, intensity thresholds, focus selectors, animations, and content described herein with reference to other methods described herein (e.g., those listed in the fifth paragraph of the Description of Embodiments). For brevity, these details are not repeated here.

Figure 13:
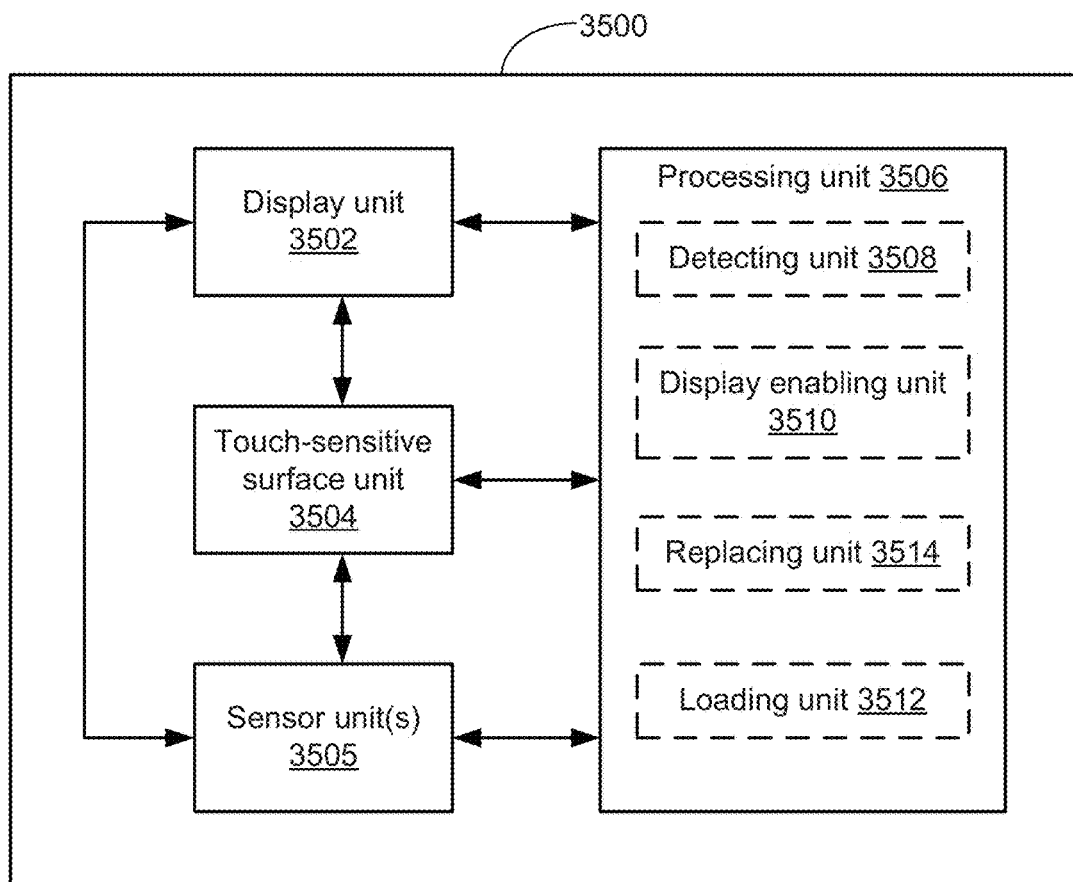
FIG. 13 is a functional block diagram of an electronic device in accordance with some embodiments.

In accordance with some embodiments, FIG. 13 shows a functional block diagram of an electronic device 3500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 3500 includes a display unit 3502 configured to display an electronic document in a first tabbed window of an application with a tabbed document interface, the electronic document including a hyperlink; a touch-sensitive surface unit 3504 configured to receive contacts; one or more sensor unit 3505 configured to detect intensity of contacts with the touch-sensitive surface unit 3504; and a processing unit 3506 coupled to the display unit 3502, the touch-sensitive surface unit 3504, and the sensor unit 3505. In some embodiments, the processing unit 3506 includes a detecting unit 3508, a display enabling unit 3510, a loading unit 3512, and a replacing unit 3514.

The processing unit 3506 is configured to: while a focus selector is over the hyperlink, detect a press input from a contact on the touch-sensitive surface unit 3504, the contact having an intensity (e.g., with the detecting unit 3508); in accordance with a determination that the intensity of the contact is above a first intensity threshold, enable display of, within the first tabbed window, a representation of a tab surrounding or proximate to the hyperlink in the electronic document (e.g., with the display enabling unit 3510); detect a liftoff of the contact from the touch-sensitive surface unit 3504 while the focus selector is over the hyperlink (e.g., with the detecting unit 3508); and in response to detecting the liftoff of the contact from the touch-sensitive surface unit 3504: in accordance with a determination that the liftoff of the contact met predefined intensity criteria, load content associated with the hyperlink in a second tabbed window, different from the first tabbed window, while maintaining the electronic document in the first tabbed window (e.g., with the loading unit 3512); and in accordance with a determination that the liftoff of the contact did not meet the predefined intensity criteria, replace the electronic document in the first tabbed window with the content associated with the hyperlink (e.g., with the replacing unit 3514).

In some embodiments, the predefined intensity criteria include that the contact had an intensity above a second intensity threshold at a predefined time relative to detecting the liftoff of the contact.

In some embodiments, the predefined intensity criteria include that the contact had an intensity above a second intensity threshold at any time prior to detecting the liftoff of the contact.

In some embodiments, loading content associated with the hyperlink in the second tabbed window includes enabling display of an animation of the representation of the tab expanding to become the second tabbed window of the application.

In some embodiments, the second tabbed window is a background tabbed window; and loading content associated with the hyperlink in the second tabbed window includes, while continuing to display the electronic document in the first tabbed window: enabling display of an animation of the representation of the tab moving to a tab bar (e.g., with the display enabling unit 3510); and loading the content associated with the hyperlink in the second tabbed window without displaying the content associated with the hyperlink in the second tabbed window (e.g., with the loading unit 3512).

In some embodiments, enabling display of the representation of the tab surrounding or proximate to the hyperlink includes: enabling display of an animation of the representation of the tab gradually appearing starting at a location surrounding or proximate to the hyperlink, wherein the progression of the animation is determined in accordance with the intensity of the contact (e.g., with the display enabling unit 3510).

In some embodiments, the processing unit 3506 is configured to, after enabling display of the representation of the tab surrounding or proximate to the hyperlink: detect a decrease in intensity of the contact (e.g., with the detecting unit 3508); and in response to detecting the decrease in intensity of the contact, enable display of an animation of the representation of the tab gradually disappearing, wherein the progression of the animation is determined in accordance with the intensity of the contact (e.g., with the display enabling unit 3510).

In some embodiments, the representation of the tab is displayed when the contact has an intensity above the first intensity threshold; the representation of the tab ceases to be displayed when the contact has an intensity below a second intensity threshold that is less than the first intensity threshold; displaying the representation of the tab indicates that a liftoff of the contact will meet the predefined intensity criteria and will cause content associated with the hyperlink to be loaded in the second tabbed window; and ceasing to display the representation of the tab indicates that a liftoff of the contact will cause the electronic document in the first tabbed window to be replaced with content associated with the hyperlink.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 12A-12B are, optionally, implemented by components depicted in FIGS. 1A-1B or FIG. 13. For example, detection operations 3404, 3414, displaying operation 3406, loading operation 3418, and replacing operation 3424 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Enlarging Content in a Document

Some electronic documents have multiple content elements. For example, a document optionally has images, a main article or body text, and advertisements. A user may be interested in a particular content element and want to focus on that element by, e.g., enlarging that element. In some methods, the user would have to zoom in on the entire document in order to enlarge a particular element, which frustrates the intentions of user because the other elements that present a distraction to the user are enlarged also. The embodiments described below improve on these methods. The user performs a zooming gesture (e.g., depinch gesture) on a document, over a particular element in the document. Depending on whether the contacts in the gesture meet respective contact intensity criteria, the entire document is zoomed, or the particular element is enlarged relative to the rest of the document. Thus, the user can choose to enlarge a particular element in a document, in order to focus on it, or to zoom the entire document.

FIGS. 14A-14O illustrate exemplary user interfaces for enlarging content in a document in accordance with some embodiments. The user interfaces in these figures are used to illustrate the processes described below, including the processes in FIGS. 15A-15C. FIGS. 14A-14O include intensity diagrams that show the current intensity of the contact or average intensity of a plurality of contacts in a gesture performed on the touch-sensitive surface relative to a plurality of intensity thresholds including a deep press intensity threshold (e.g., "$IT_D$") and a light press intensity threshold (e.g., "$IT_L$").

FIG. 14A illustrates document 4204 displayed on display 450 (e.g., display 340, touch screen 112) of a device (e.g., device 300, device 100). Document 4204 is, optionally, a word processing document, spreadsheet document, presentation document, webpage, Portable Document Format document (sometimes referred to as a PDF), or an electronic book or magazine, to name a few examples. Document 4204 is displayed at a first magnification level 4204-a.

Document 4204 includes multiple content elements, including, for example, body text 4206, advertisements 4208, images 4210, and hyperlinks 4222. It should be appreciated that advertisements 4208 and images 4210 are, optionally, hyperlinks as well, and body text 4206 optionally includes one or more hyperlinks within the text. In accordance with magnification level 4204-a of document 4204, body text 4206, advertisements 4208, images 4210, and hyperlinks 4222 are displayed at sizes 4206-a, 4208-a, 4210-a, and 4222-a, respectively. Other examples of content elements in a document include, for example, an embedded media player (e.g., embedded video or audio). In some elements, the content elements are content blocks of a webpage. For example, if document 4204 is a webpage, then body text 4206, advertisements 4208, images 4210, and hyperlinks 4222 are respective content blocks of the webpage.

A focus selector (e.g., cursor 4212) is also displayed on display 450. Cursor 4212 is, optionally, moved across display 450 by a user (e.g., a mouse input, or a moving contact on touch-sensitive surface 451 as shown in FIG. 14H). In FIG. 14A, cursor 4212 is displayed over body text 4206.

A first gesture, which includes contacts 4214-1 and 4214-2, is detected on touch-sensitive surface 451 of the device. Contacts 4214-1 and 4214-2 are detected at locations 4214-1-a and 4214-2-a, respectively, on touch-sensitive surface 451. The first gesture also includes movement 4216-1 of contact 4214-1, from location 4214-1-a to location 4214-1-b (FIG. 14B), and movement 4216-2 of contact 4214-2, in a direction that is substantially opposite of direction of the movement 4216-1 of contact 4216-1, from location 4214-2-a to location 4214-2-b (FIG. 14B); the gesture shown in FIGS. 14A-14B is an example of a depinch gesture. Movements of contacts 4214-1 and 4214-2 are detected on touch-sensitive surface 451. The first gesture is detected on touch-sensitive surface 451 while cursor 4212 is located over body text 4206.

The device includes a set of one or more contact intensity criteria. In some embodiments, the contact intensity criteria are met if one or more of these measures exceeds a threshold (e.g., threshold $IT_D$ in the intensity diagrams shown in the figures): an average intensity of the contacts, a sum of intensity of the contacts, a maximum intensity of the contacts, a minimum intensity of the contacts, or a difference in intensity between the contacts. For a particular embodiment, one or more of these measures are, optionally, considered when evaluating whether the contact intensity criteria are met. For ease of explanation FIGS. 14A-14O use average intensity of the contacts performing pinch and depinch gestures to determine whether the gestures have met contact intensity criteria. In FIG. 14A, contacts 4214-1 and 4214-2 have an average intensity that does not exceed threshold $IT_D$, and thus the first gesture does not meet the contact intensity criteria in the example shown in FIGS. 14A-14B.

In response to the detection of the first gesture, document 4204 is zoomed to magnification level 4204-b, as shown in FIG. 14B. In accordance with the zooming of document 4204, the visible content elements in document 4204 are resized (e.g., enlarged) by the same amount. Thus, body text 4206, advertisements 4208, images 4210, and hyperlinks 4222 are resized by the same amount as the zooming of document 4204 to sizes 4206-b, 4208-b, 4210-b, and 4222-b, respectively. For example, if document 4204 is zoomed in from 100% to 200% (i.e., doubled in size) in response to the detection of the first gesture, body text 4206, advertisements 4208, images 4210, and hyperlinks 4222 are all doubled in size as well.

Figure 14C:
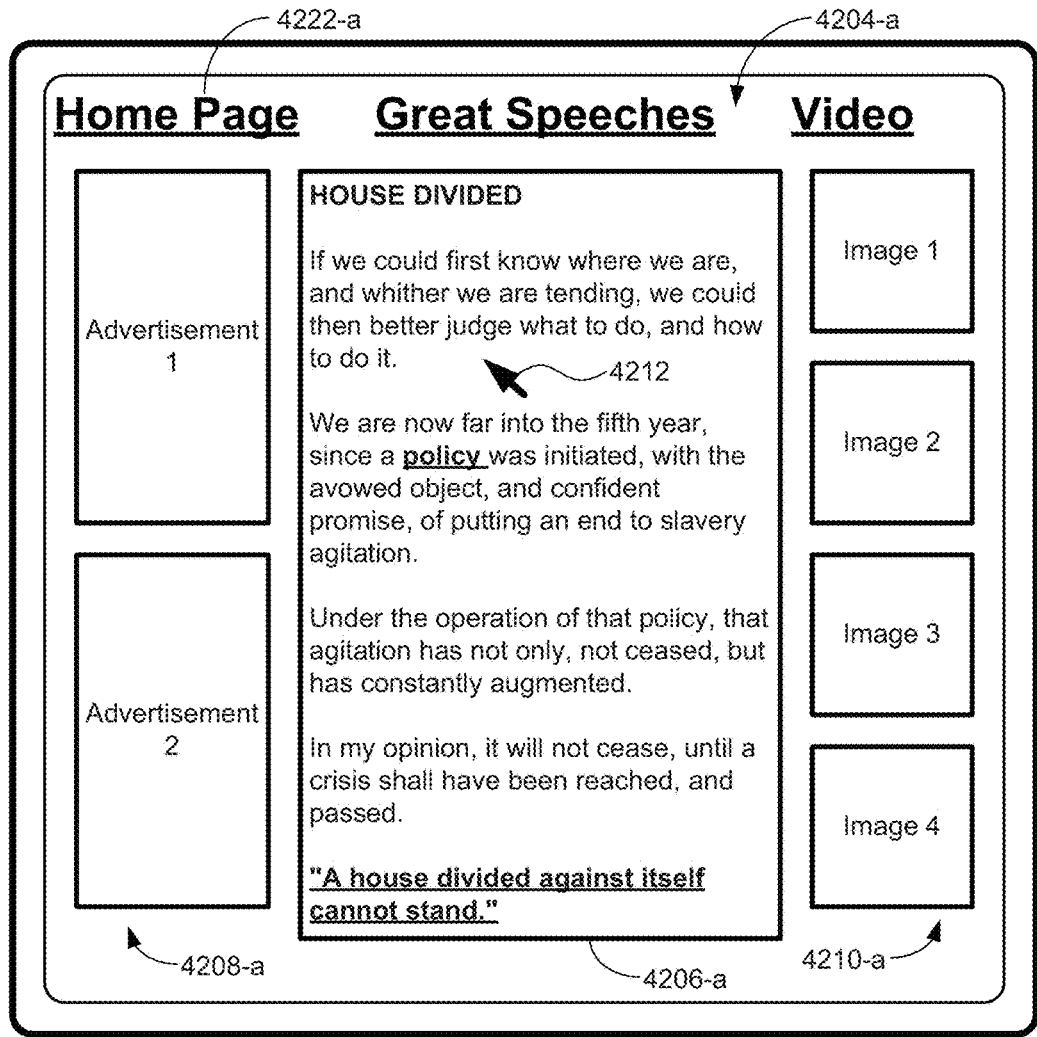
Figure 14C:
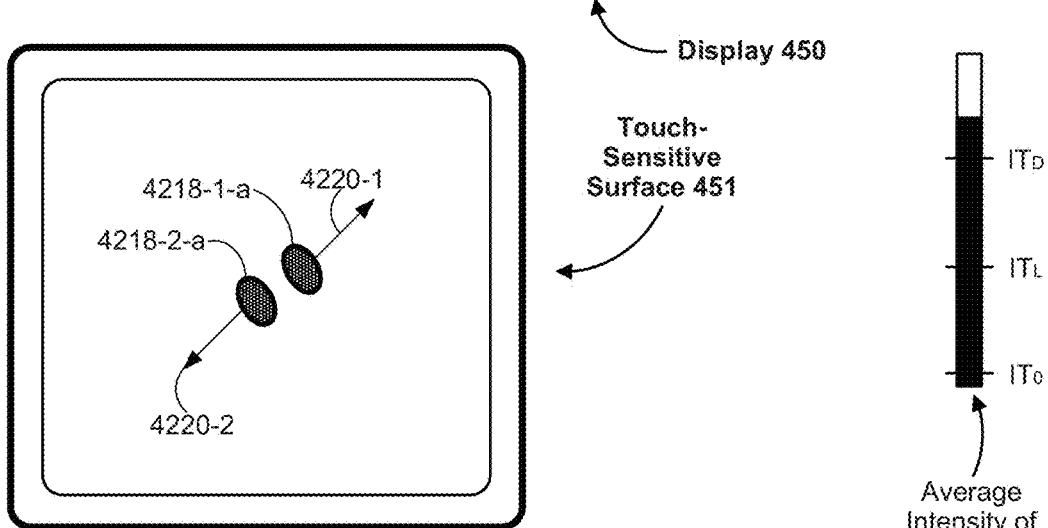

FIG. 14C shows document 4204 displayed on display 450 at magnification level 4204-a, as in FIG. 14A. Body text 4206, advertisements 4208, images 4210, and hyperlinks 4222 are displayed as well, at sizes 4206-*a*, 4208-*a*, 4210-*a*, and 4222-*a*, respectively. Cursor 4212 displayed over body text 4206.

Figure 14D:
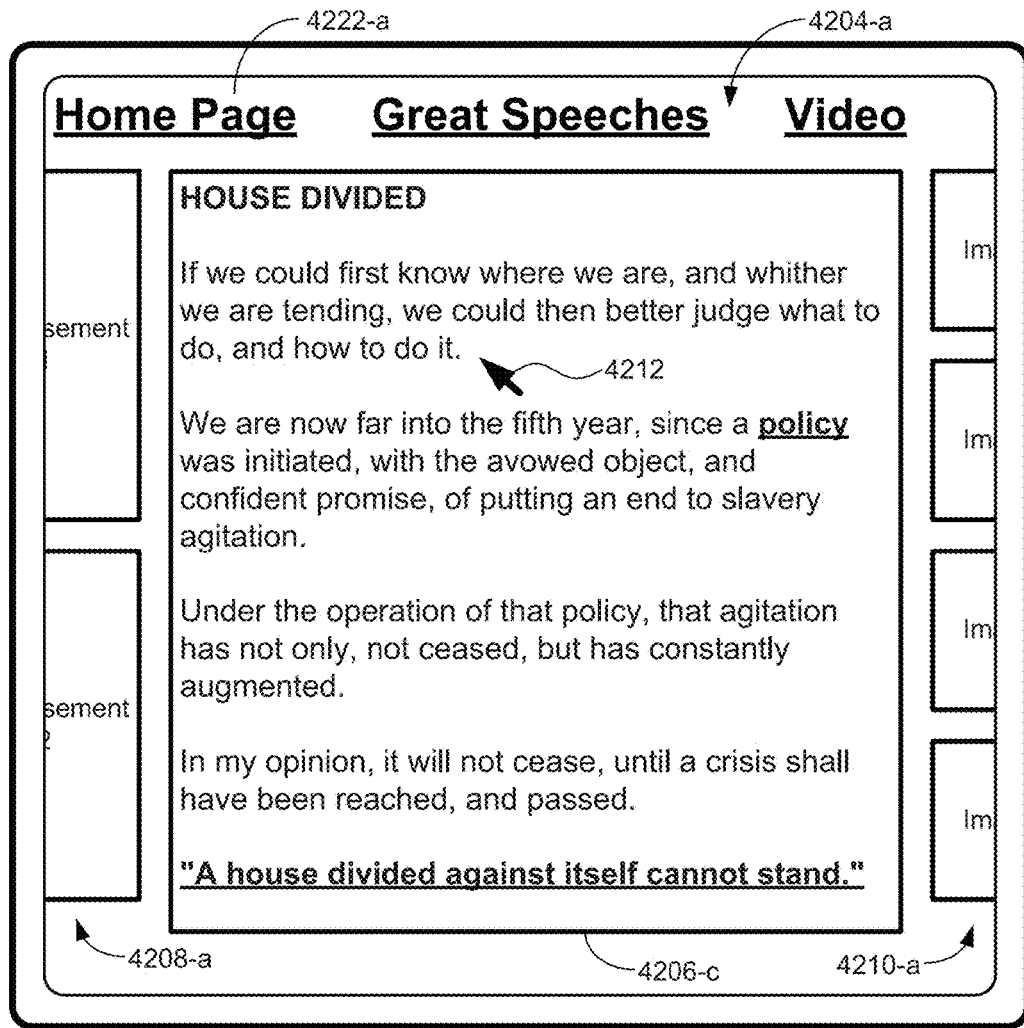
Figure 14D:
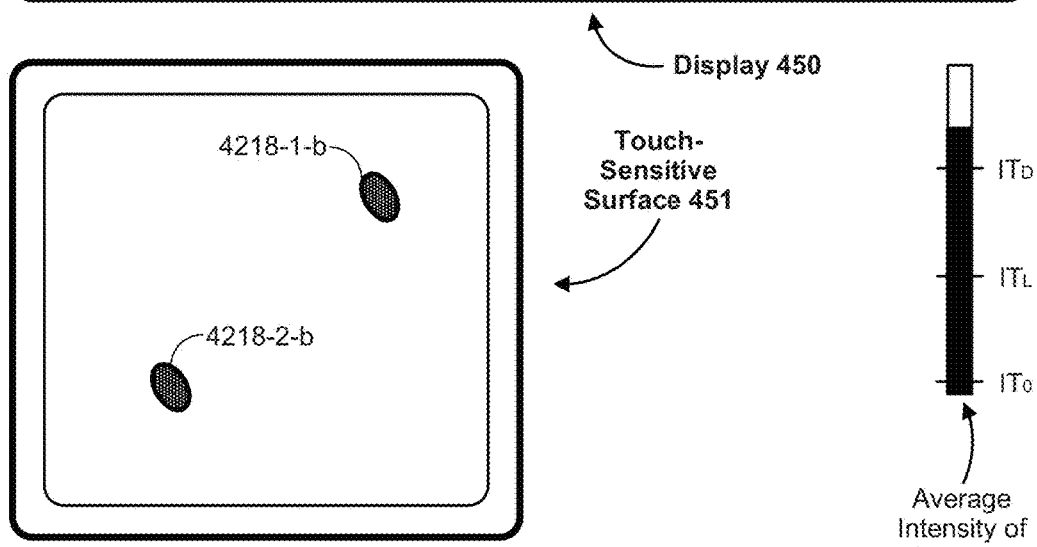

A second gesture, which includes contacts 4218-1 and 4218-2, is detected on touch-sensitive surface 451 of the device. Contacts 4218-1 and 4218-2 are detected at locations 4218-1-*a* and 4218-2-*a*, respectively, on touch-sensitive surface 451. The second gesture also includes movement 4220-1 of contact 4218-1, from location 4218-1-*a* to location 4218-1-*b* (FIG. 14D), and movement of contact 4218-2, in direction that is substantially opposite of the direction of movement 4220-1 of contact 4218-1, from location 4218-2-*a* to location 4218-2-*b* (FIG. 14D). Movements of contacts 4218-1 and 4218-2 are detected on touch-sensitive surface 451. The second gesture is detected on touch-sensitive surface 451 while cursor 4212 is located over body text 4206. Contacts 4218-1 and 4218-2 have an average intensity that exceeds threshold $IT_D$, and thus the second gesture meets the contact intensity criteria in the example shown in FIG. 14C-14D.

In some embodiments, in response to the detection of the second gesture, body text 4206 is resized (e.g., enlarged) to size 4206-*c*, but document 4204 remains at magnification level 4204-*a*, as shown in FIG. 14D (e.g., body text 4206 is enlarged "in line"). In accordance with document 4204 remaining at the same magnification level as prior to the detection of the second gesture, the content elements in document 4204 other than body text 4206, such as advertisements 4208, images 4210, and hyperlinks 4222, remain at the same sizes as prior to the detection of the second gesture (i.e., remain at sizes 4208-*a*, 4210-*a*, and 4222-*a*, respectively). In accordance with the enlarging of body text 4206, the other content elements in document 4204 (e.g., advertisements 4208, images 4210, and hyperlinks 4222) are, optionally, re-positioned within document 4204 to accommodate the resized body text 4206.

Figure 14E:
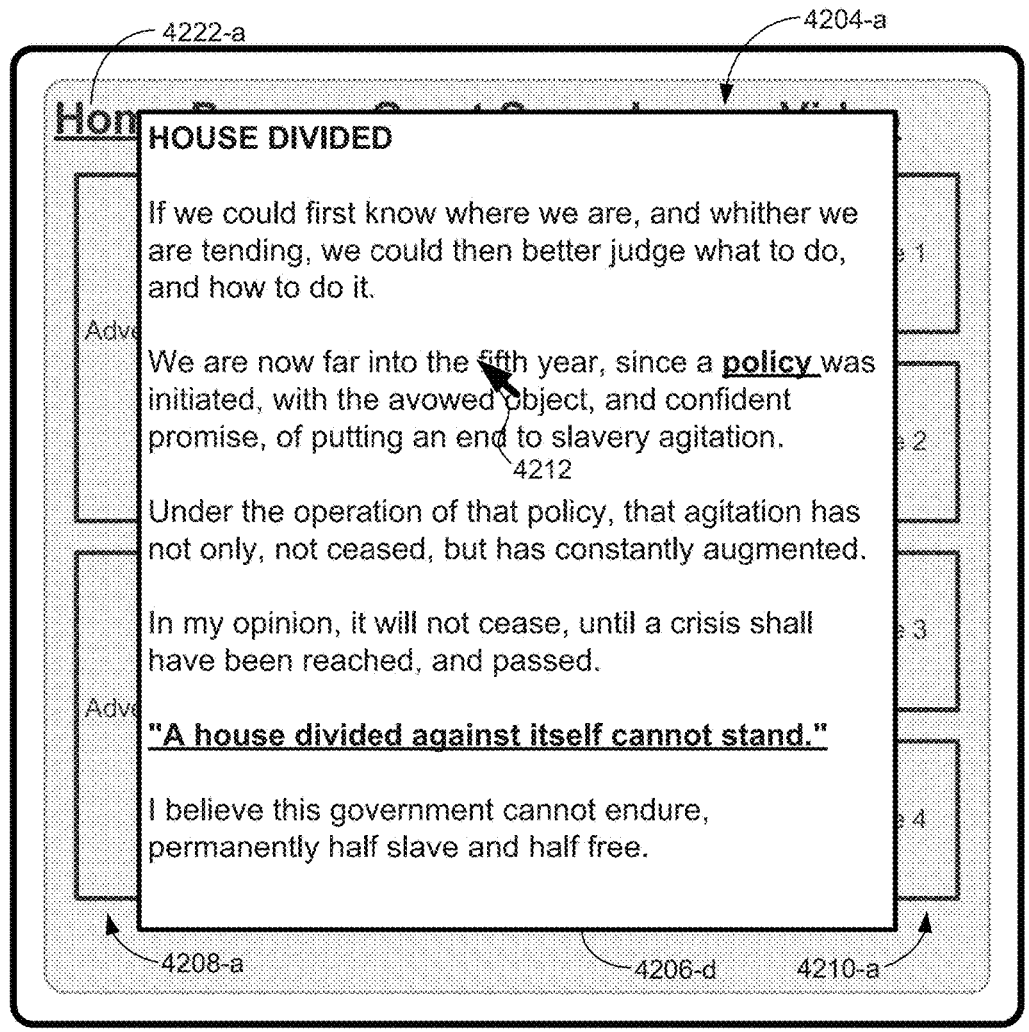
Figure 14E:
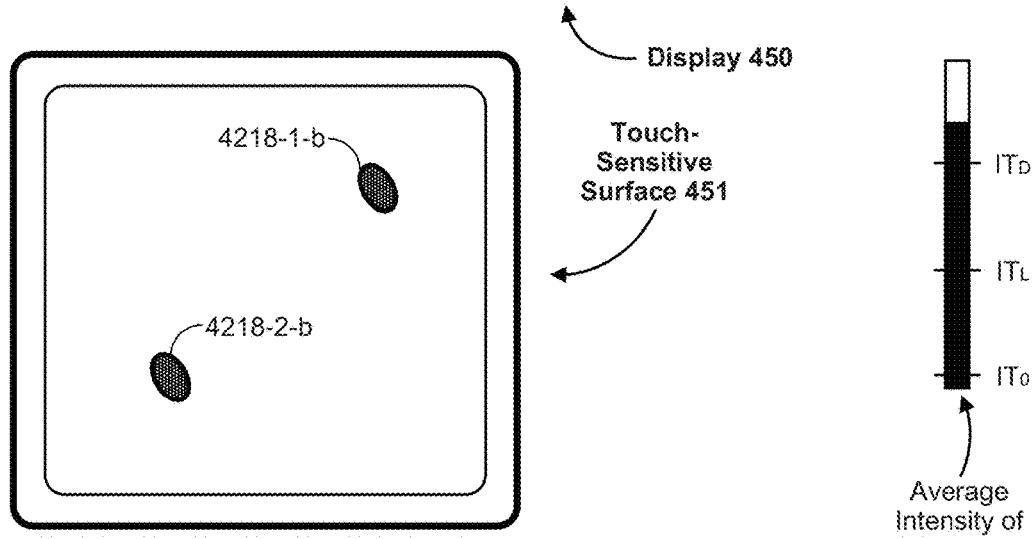

In some embodiments, in response to the detection of the second gesture, body text 4206 is enlarged and displayed as pop-up 4206-*d*, as shown in FIG. 14E. Document 4204 and the other content elements in document 4204 remain at the same size or magnification level as prior to the detection of the second gesture (e.g. magnification level 4204-*a* for document 4204). Pop-up 4206-*d* is, optionally, displayed over document 4204 (e.g., hovering over document 4204), thus deemphasizing document 4204. While pop-up 4206-*d* is displayed, interactions with the other content elements in document 4204, such as advertisements 4208, images 4210, and hyperlinks 4222, are, optionally, disabled (e.g., clicks on hyperlinks 4222 are not selectable or activatable). In some embodiments, the portions of document 4204 that are outside of the document are visually deemphasized by darkening or partially obscuring these portions of document 4204, as shown in FIG. 14E.

Thus, in response to detection of a gesture that does not meet the contact intensity criteria, document 4204 is zoomed and the content elements in document 4204, including body text 4206, are resized in accordance with the zooming of document 4204 (e.g., as shown in FIGS. 14A-14B). In response to detection of a gesture that meets the contact intensity criteria, document body text 4206 is resized but document 4204 and the content elements in document 4204 other than body text 4206 remain at the same sizes as prior to detection of the gesture that meets the contact intensity criteria (e.g., as shown in FIGS. 14C-14E).

While the respective gestures with contacts 4214 and 4218, respectively, are gestures in which the contacts are moving away from each other (with the result being document 4204 as a whole being zoomed in or body text 4206 enlarged relative to the rest of document 4204, depending on whether the gesture meets the contact intensity criteria), similar multi-contact gestures in which the contacts are moving toward each other (e.g., a pinch or a finger grasp gesture) are, optionally, performed on touch-sensitive surface 451 over a content element (e.g., body text 4206) and be detected. For example, if such a gesture, detected over body text 4206, does not meet the contact intensity criteria, then document 4204 as a whole is zoomed out (and the content elements within document 4204 are reduced in size in unison). If such a gesture, detected over body text 4206, meets the contact intensity criteria, then body text 4206 is reduced in size relative to the rest of document 4204 and the other content elements in document 4204 (e.g., body text 4206 is displayed as a smaller content block within document 4204 or as a pop-up in which body text 4206 is displayed in smaller font).

Figure 14F:
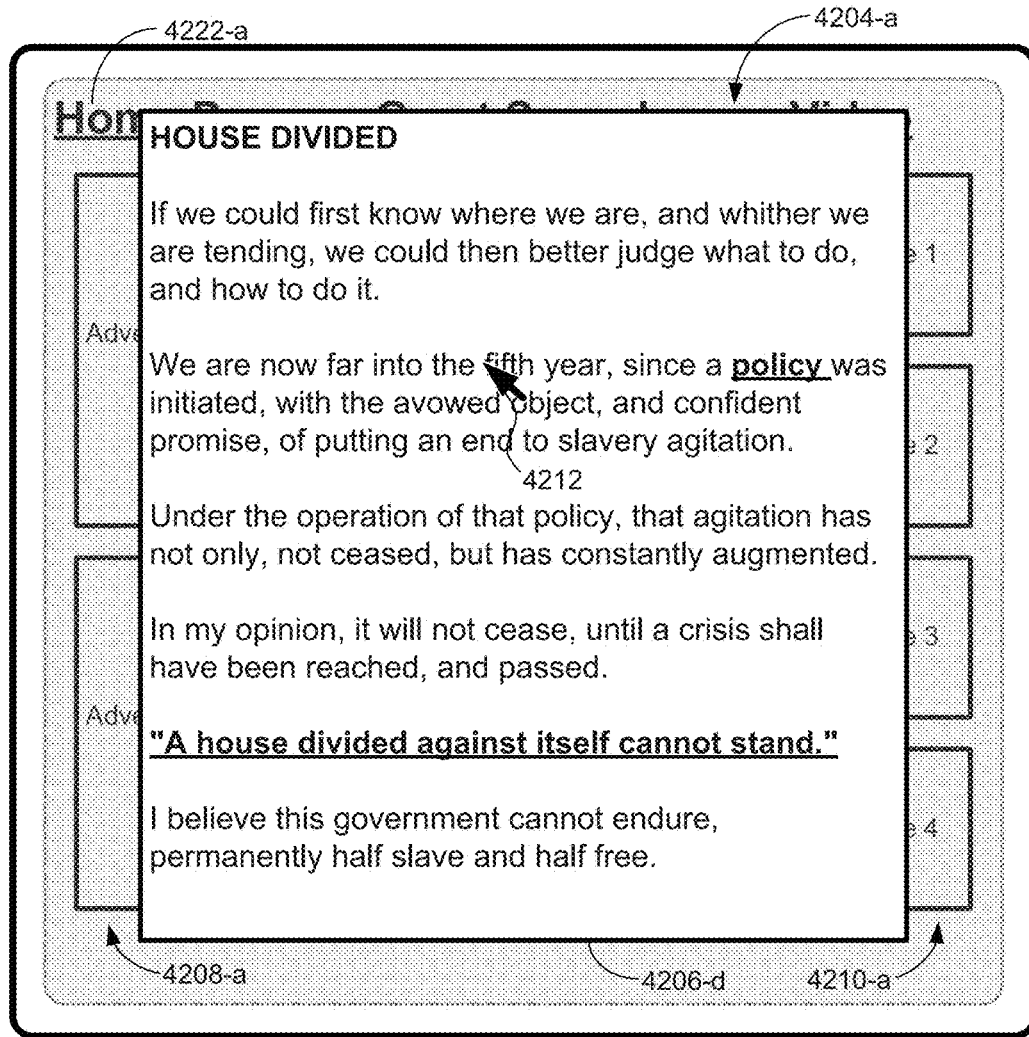
Figure 14F:
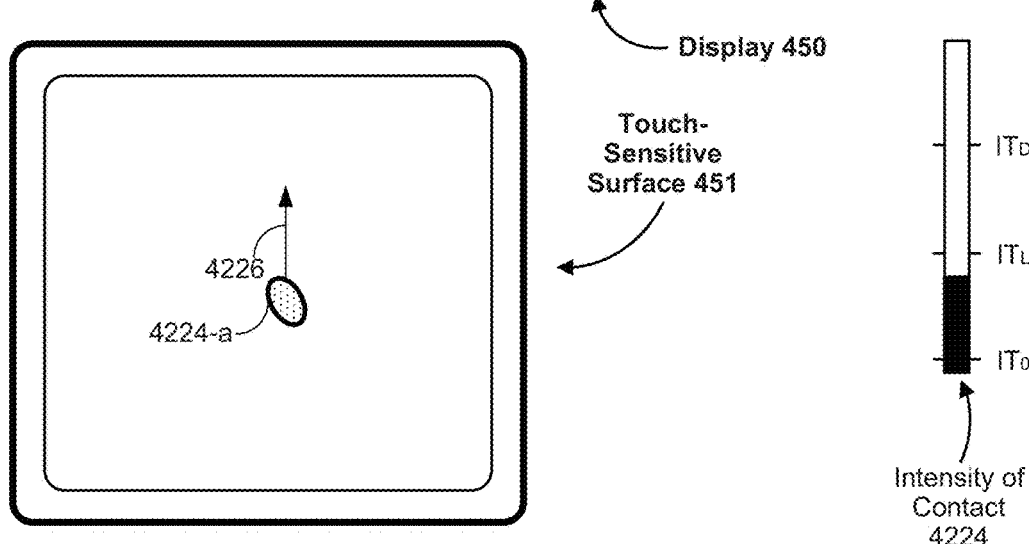
Figure 14G:
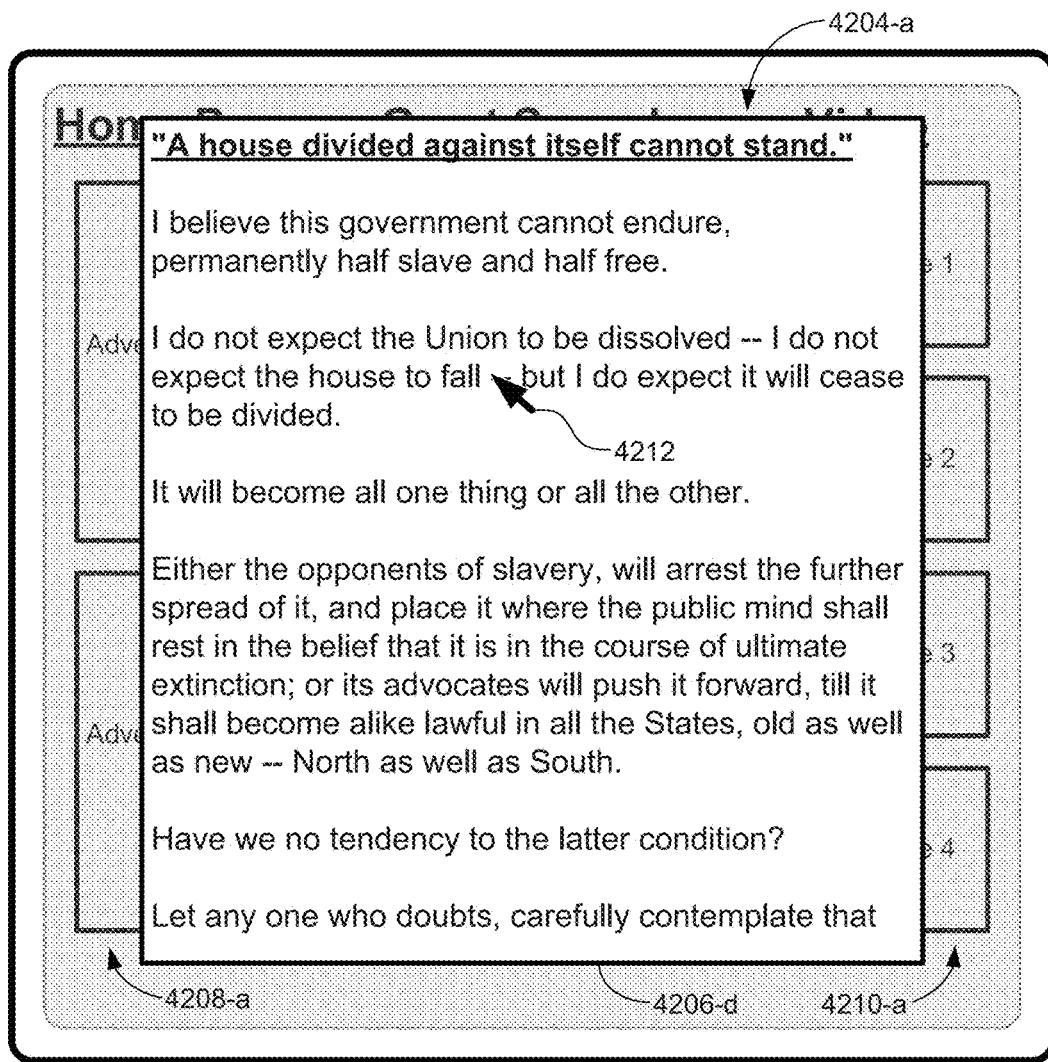
Figure 14G:
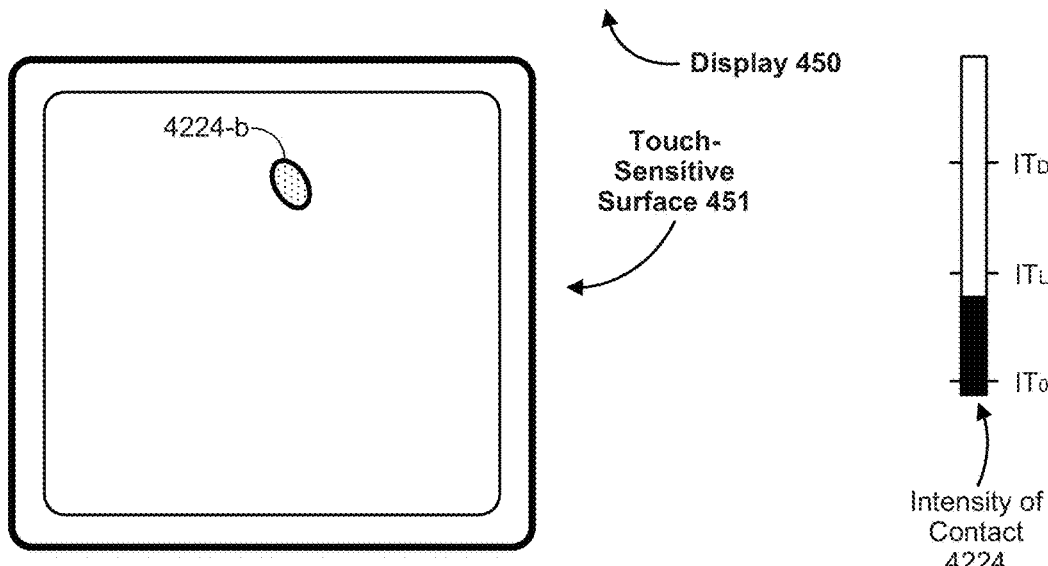
Figure 14H:
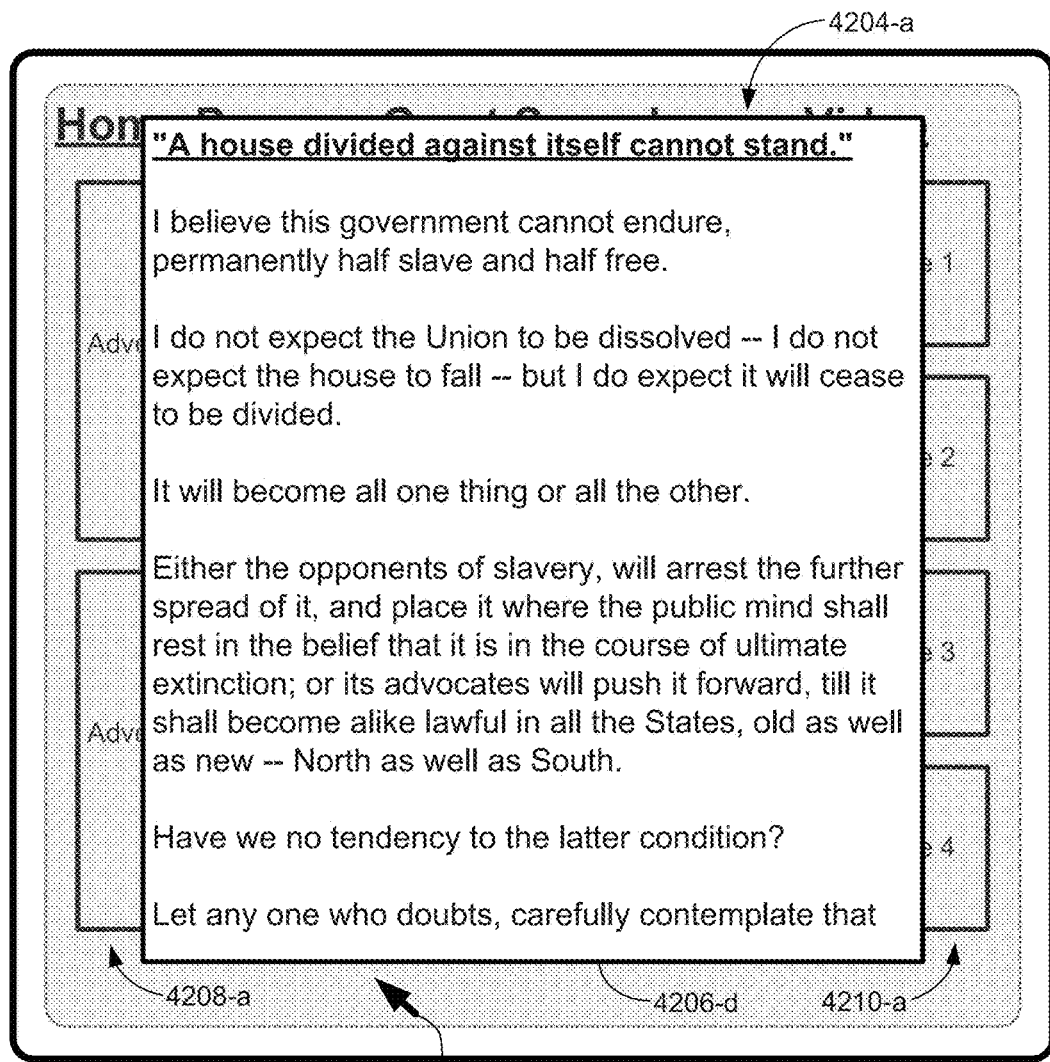
Figure 14H:
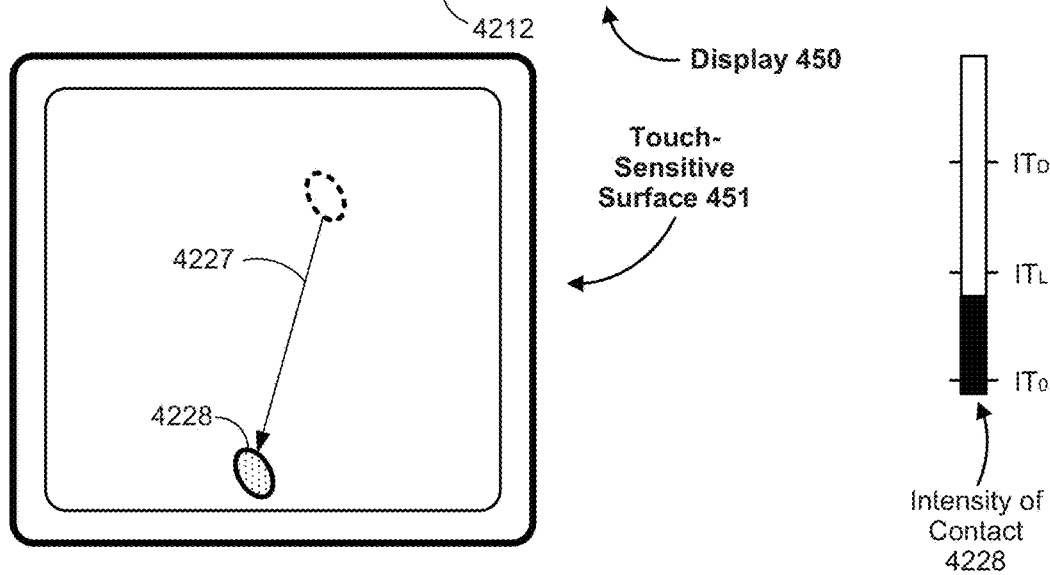

While body text 4206 is enlarged (e.g., as enlarged body text 4206-*c* or pop-up 4206-*d*) relative to the rest of the content elements in document 4204 (e.g., document 4204 remains at the same size as prior to detection of the gesture), a drag gesture (e.g., contact 4224 moving in direction 4226 from location 4224-*a* to location 4224-*b* (FIG. 14G)) is, optionally, detected at a on touch-sensitive surface 451 corresponding to enlarged body text 4206, as shown on FIG. 14F. In response to detection of the drag gesture, the enlarged body text 4206 is scrolled relative to the rest of document 4204. For example, FIG. 14G illustrates, in response to detection of the movement of contact 4224 in direction 4226, body text 4206-*d* scrolling and without scrolling the rest of document 4204 (e.g., advertisements 4208-*a*, images 4210-*a*). In FIGS. 14F-14G, body text 4206 is scrolled in response to movement of a contact with intensity between $IT_0$ and $IT_L$. In some embodiments, body text is scrolled in response to detecting movement of a contact with intensity between $IT_L$ and $IT_D$ (optionally, without moving the focus selector), and the focus selector is moved (optionally, without scrolling the body text) in response to detecting movement of a contact with an intensity between $IT_0$ and $IT_L$. In some embodiments, body text is scrolled in response to detecting movement of a contact while the contact is over body text 4206 without regard to the intensity of the contact. In some embodiments, body text is scrolled in response to detecting movement of a plurality of contacts (e.g., a two or three finger swipe gesture) while the focus selector is over body text 4206 without regard to the intensity of the contacts.

Figure 14I:
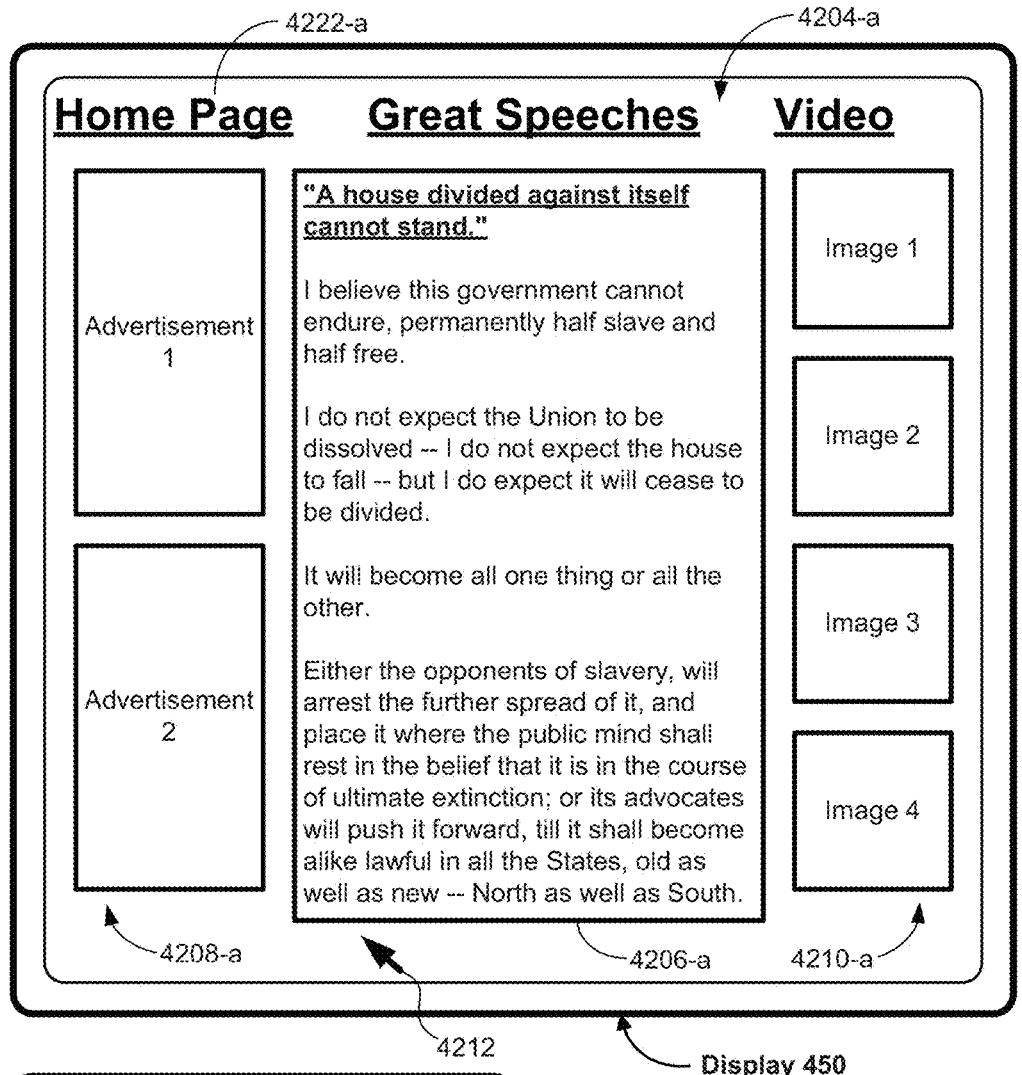
Figure 14I:
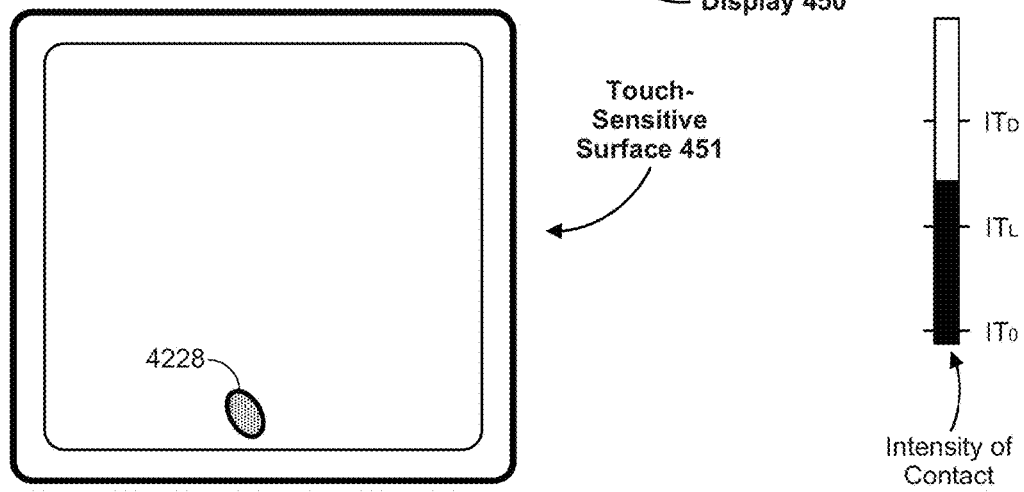

FIG. 14H illustrates a gesture being detected on touch-sensitive surface 451 while pop-up 4206-*d* is displayed (or while body text 4206 is enlarged relative to the rest of document 4204, as in FIG. 14D) and cursor 4212 is located away from pop-up 4206-*d* (e.g., the gesture is detected after the device moves cursor 4212 away from body text 4206 in response to detecting movement 4227 of contact 4228 while contact 4228 has an intensity between $IT_0$ and $IT_L$). In some embodiments, the detected gesture is a tap gesture. In some embodiments, the detected gesture includes a press input (e.g., an increase in intensity of contact 4228 from an intensity below $IT_L$ in FIG. 14H to an intensity above $IT_L$ in FIG. 14I) In response to the detection of the gesture in FIGS. 14H-14I, the device ceases to display body text 4206 as a pop-up 4206-*d* and displays a content block in document 4204 that includes body text 4206 at its original size 4206-*a*, as shown in FIG. 14I.

Figure 14J:
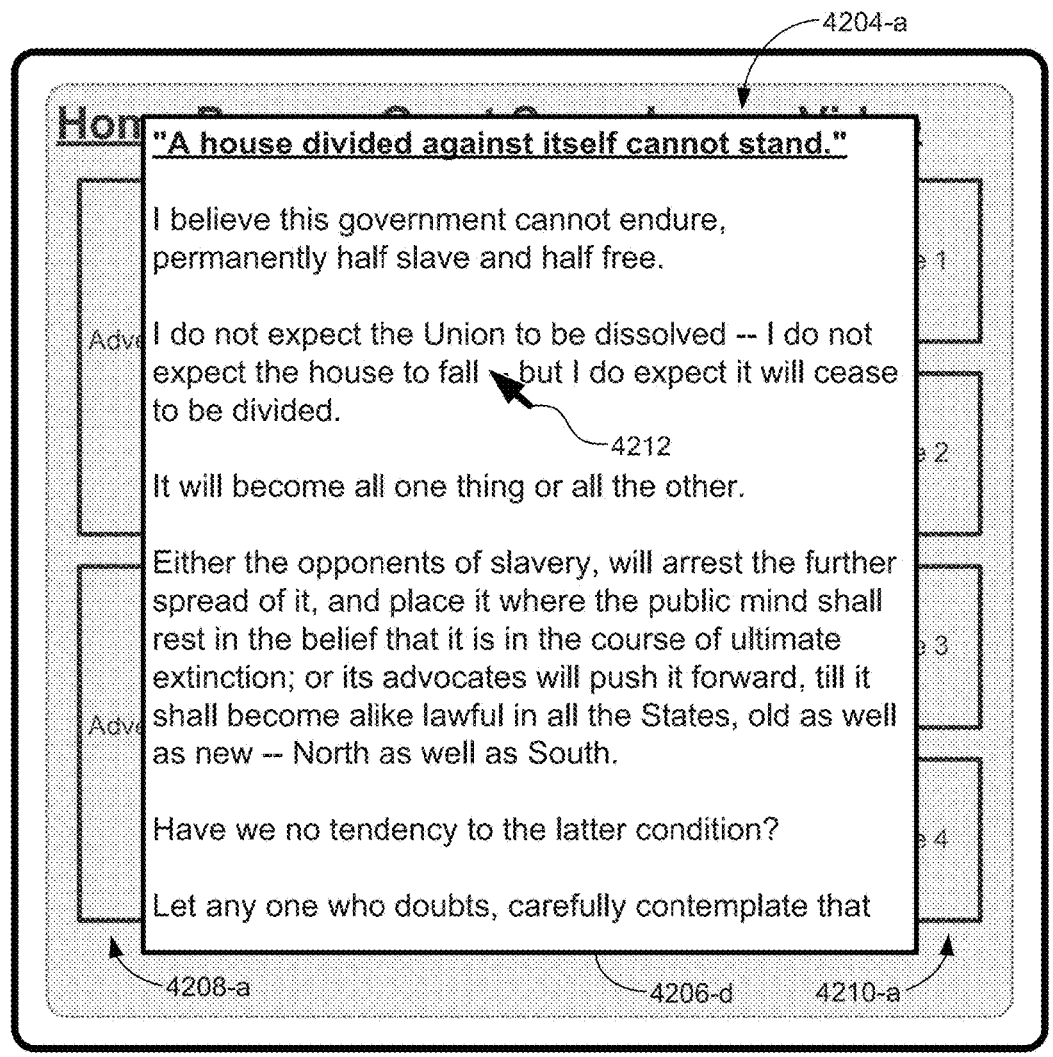
Figure 14J:
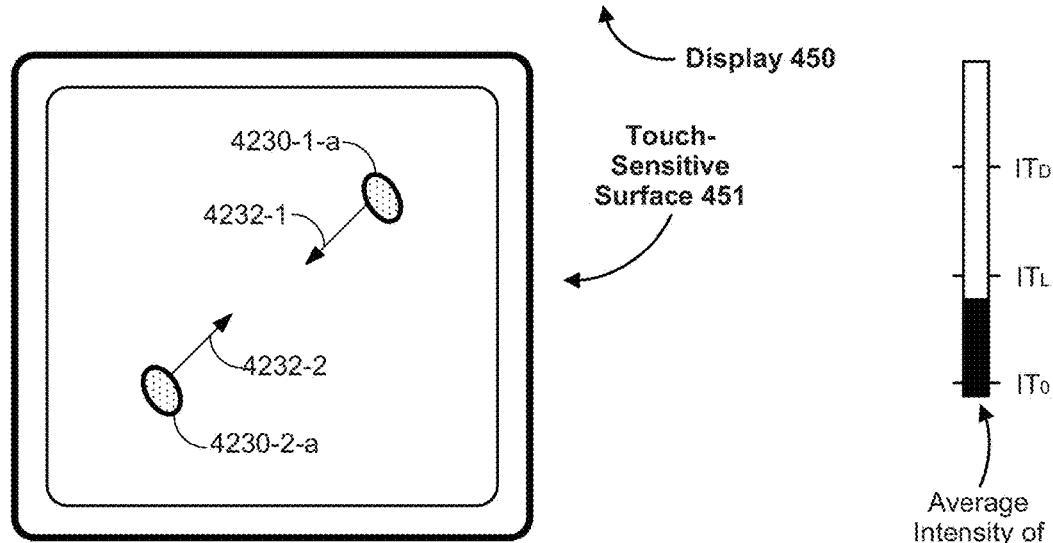
Figure 14K:
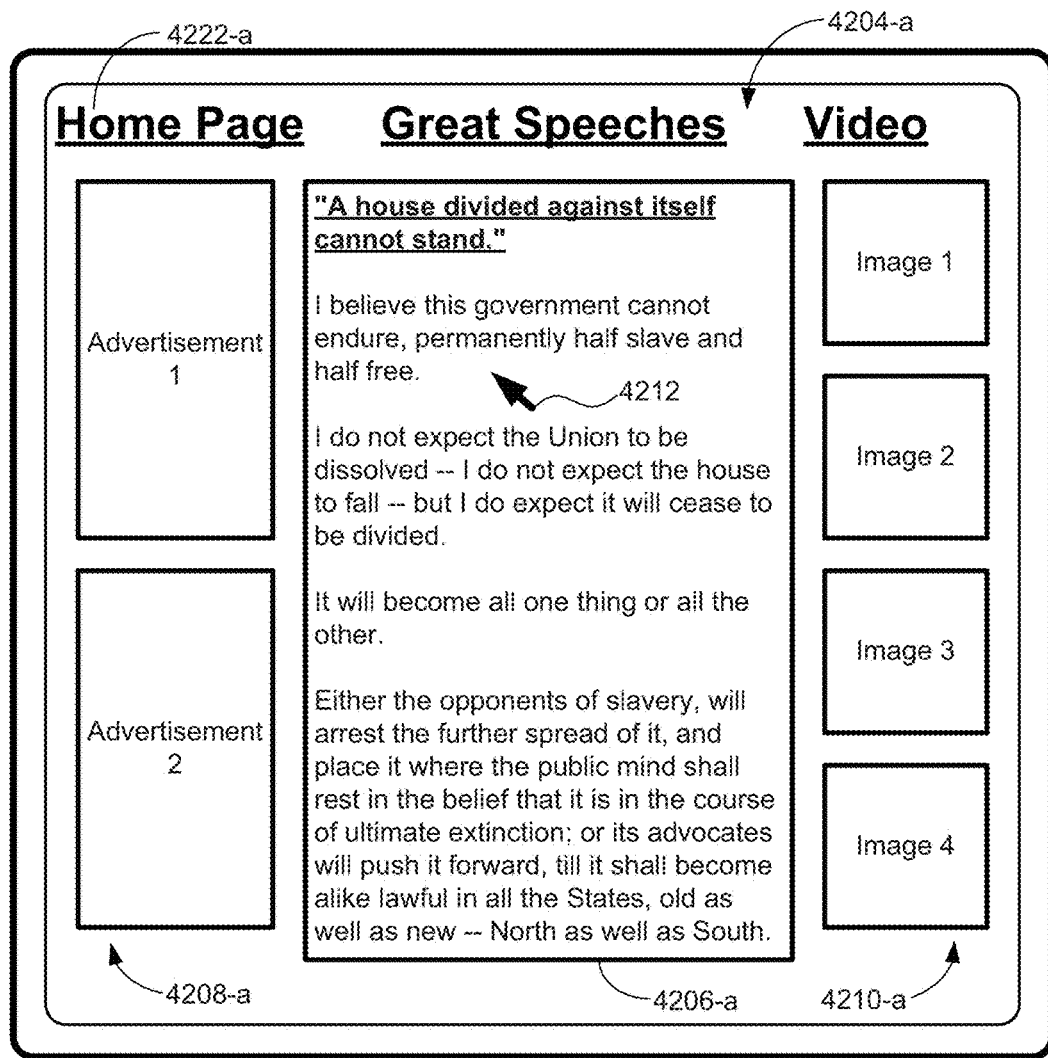
Figure 14K:
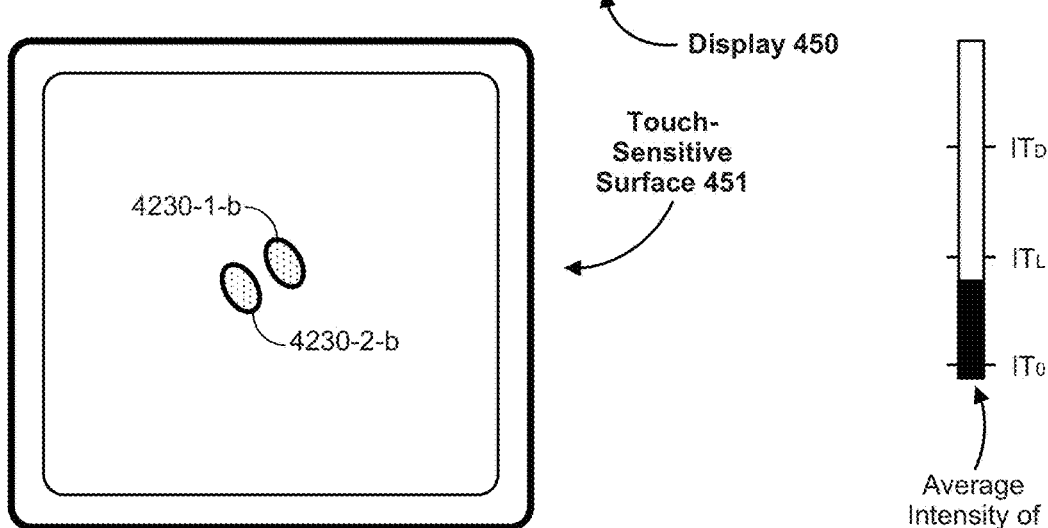

FIG. 14J illustrates a gesture being detected on touch-sensitive surface 451 while pop-up 4206-*d* is displayed (or while body text 4206 is enlarged relative to the rest of document 4204, as in FIG. 14D) and cursor 4212 is located over pop-up 4206-*d*. The gesture includes contacts 4230-1 and 4230-2. Contact 4230-1 is moving 4232-1 from location 4230-1-*a* to location 4230-1-*b* (FIG. 14K), toward contact 4230-2. Contact 4230-2 is moving 4232-2 from location 4230-2-*a* to location 4230-2-*b* (FIG. 14K), toward contact 4230-1 (e.g., the gesture shown in FIGS. 14J-14K is a pinch gesture). The average intensity of contacts 4230 is between threshold $IT_0$ and threshold $IT_L$. In response to the detection of the gesture in FIGS. 14J-14K, the device ceases to display body text 4206 as a pop-up 4206-*d* and displays a content block in document 4204 that includes body text 4206 at its original size 4206-*a*, as shown in FIG. 14K.

Figure 14L:
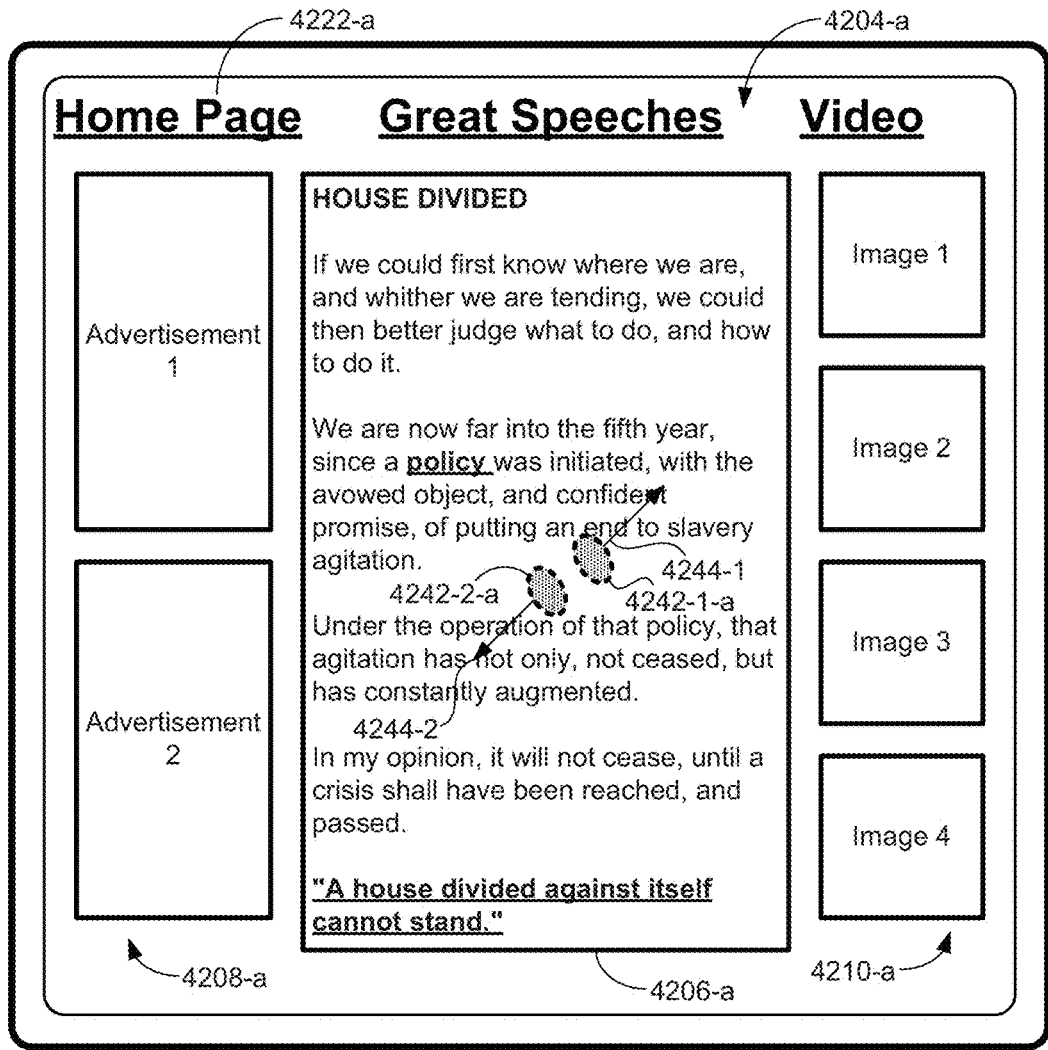
Figure 14L:
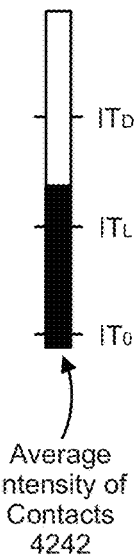
Figure 14M:
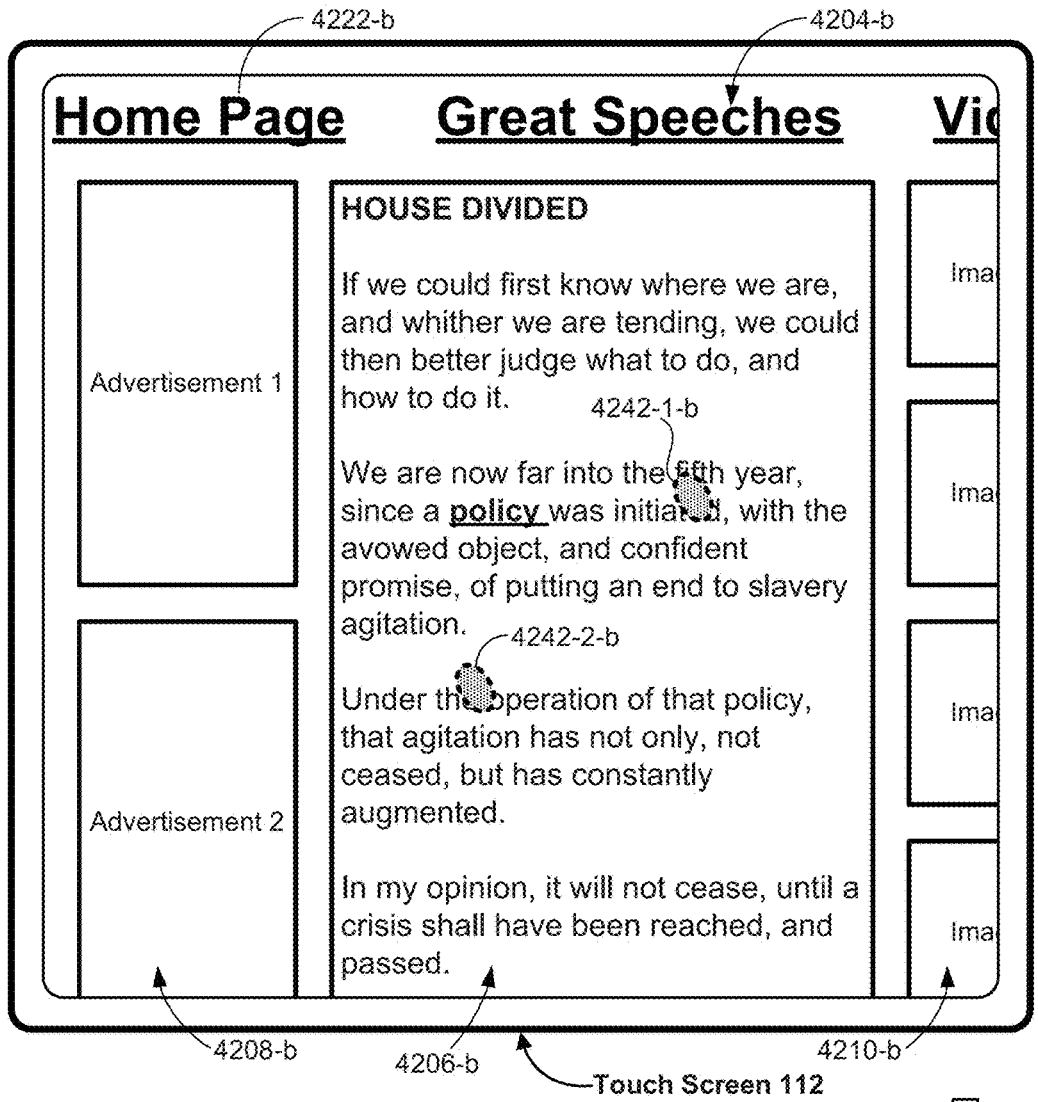
Figure 14M:
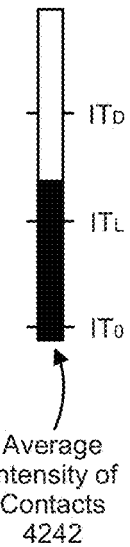
Figure 14N:
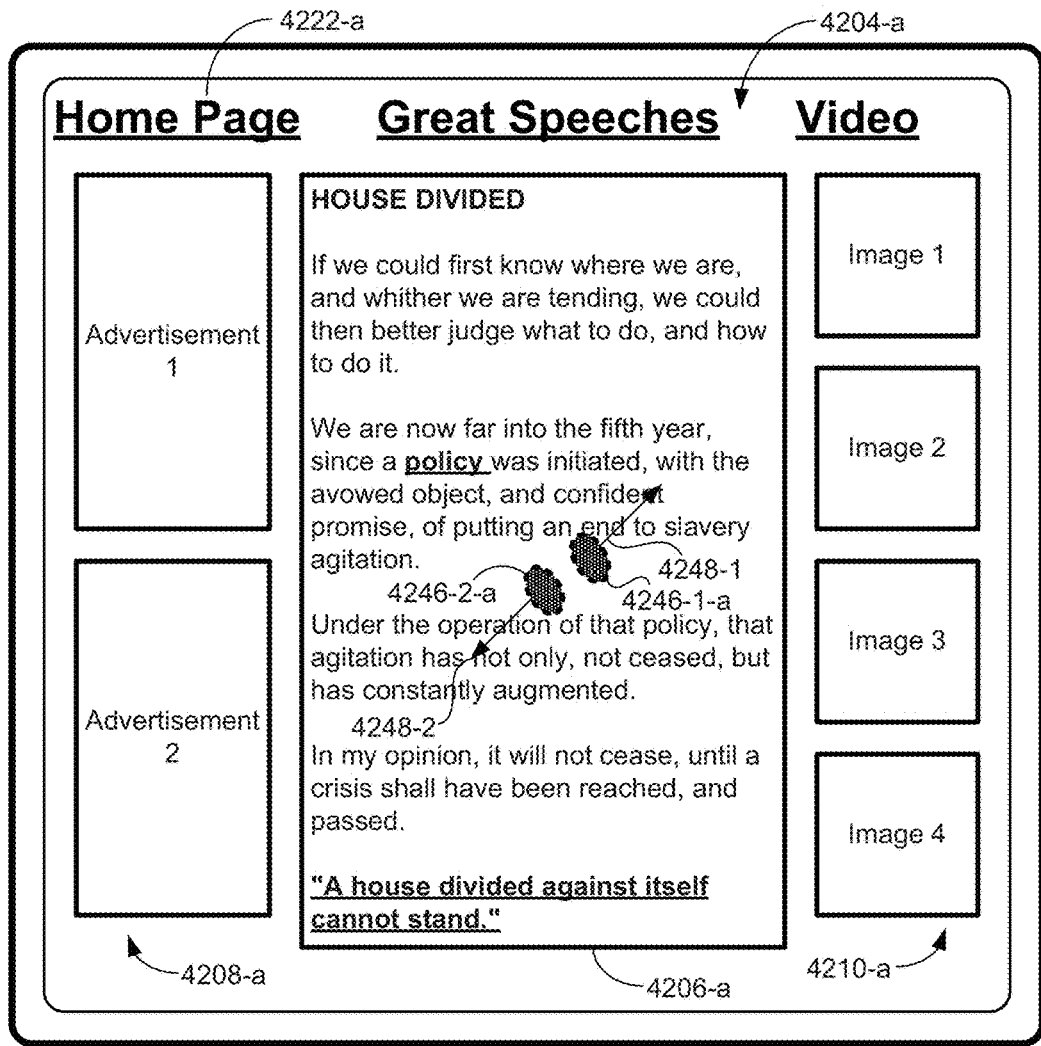
Figure 14N:
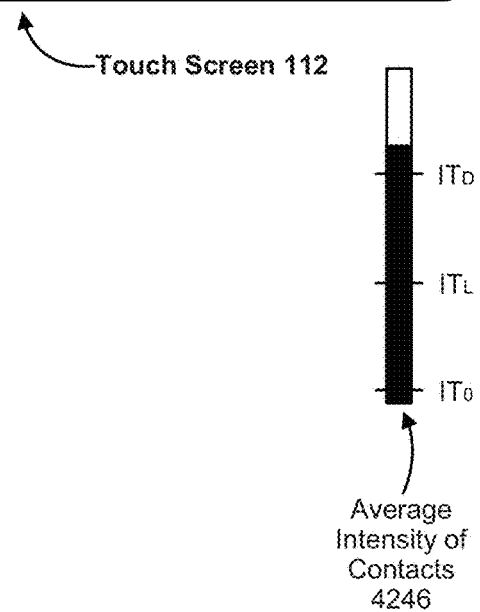
Figure 14O:
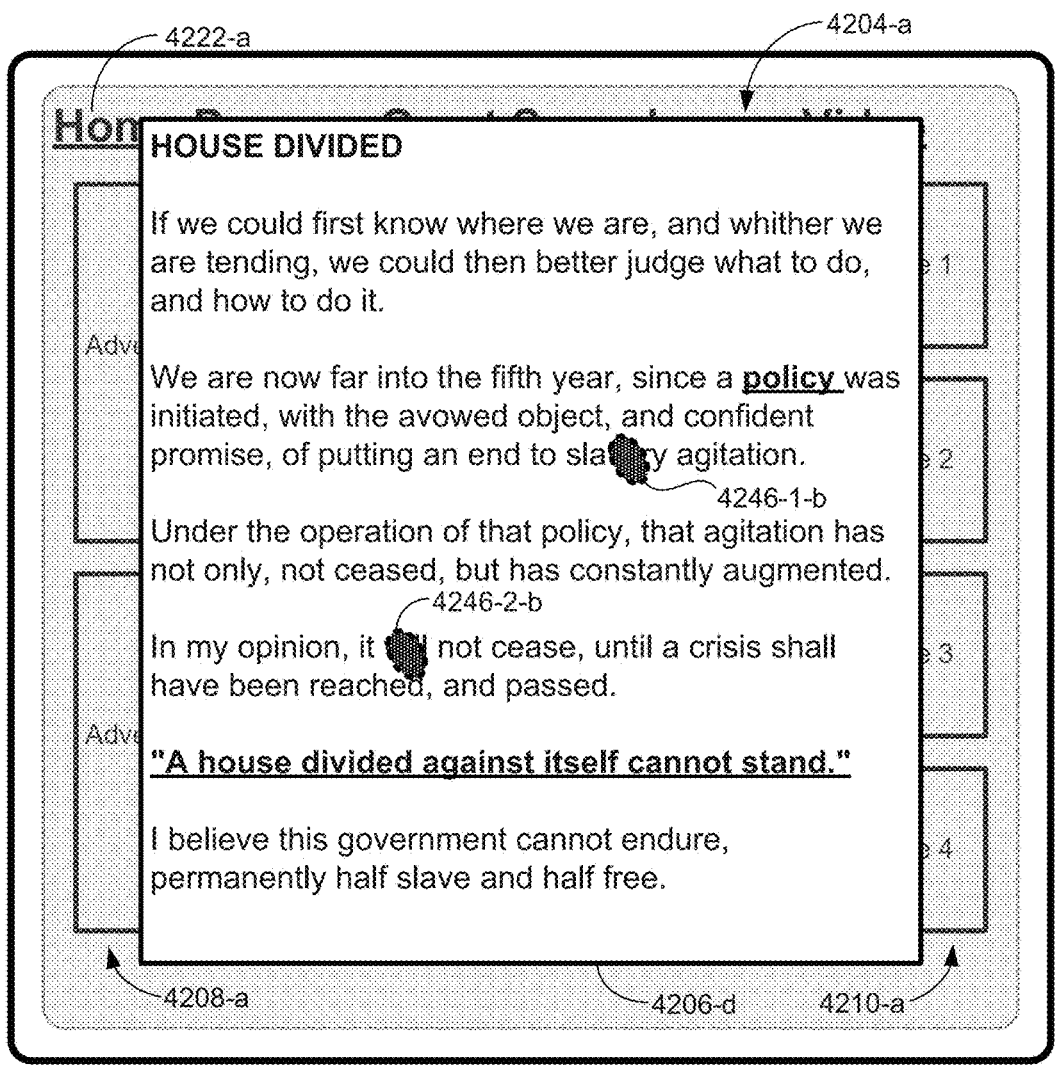
Figure 14O:
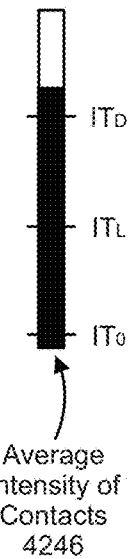
Figure 15A:
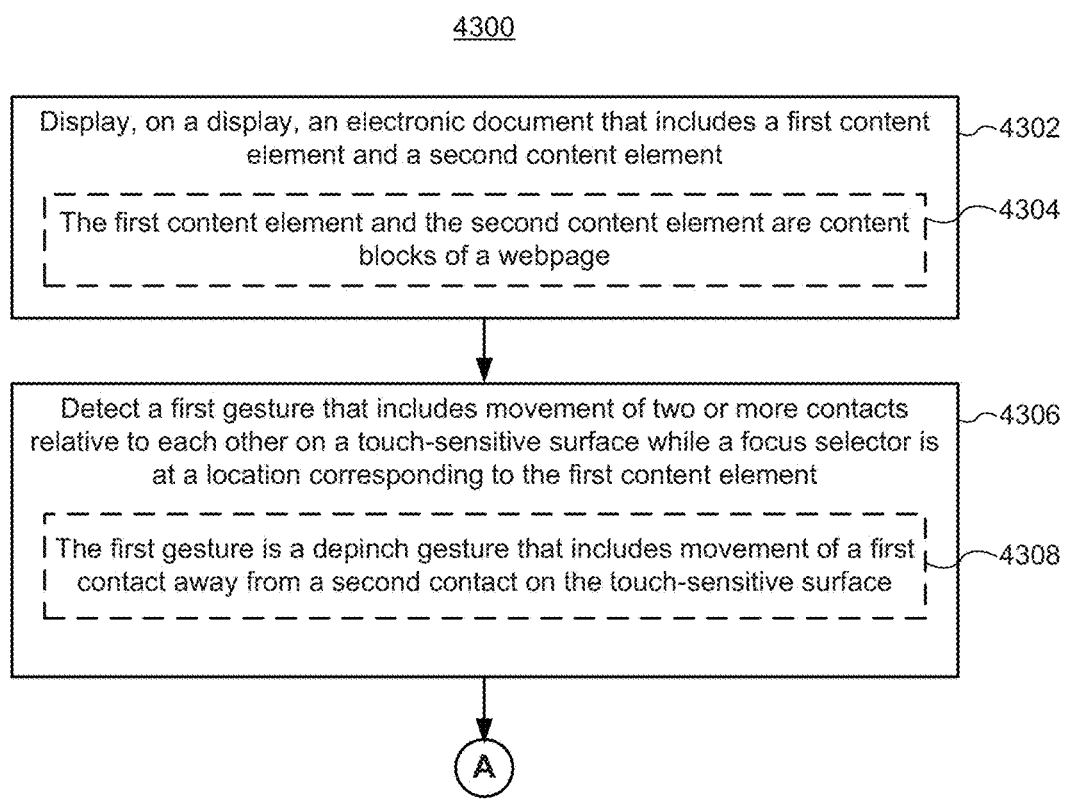
FIGS. 15A-15C are flow diagrams illustrating a method of enlarging content in a document in accordance with some embodiments.
Figure 15B:
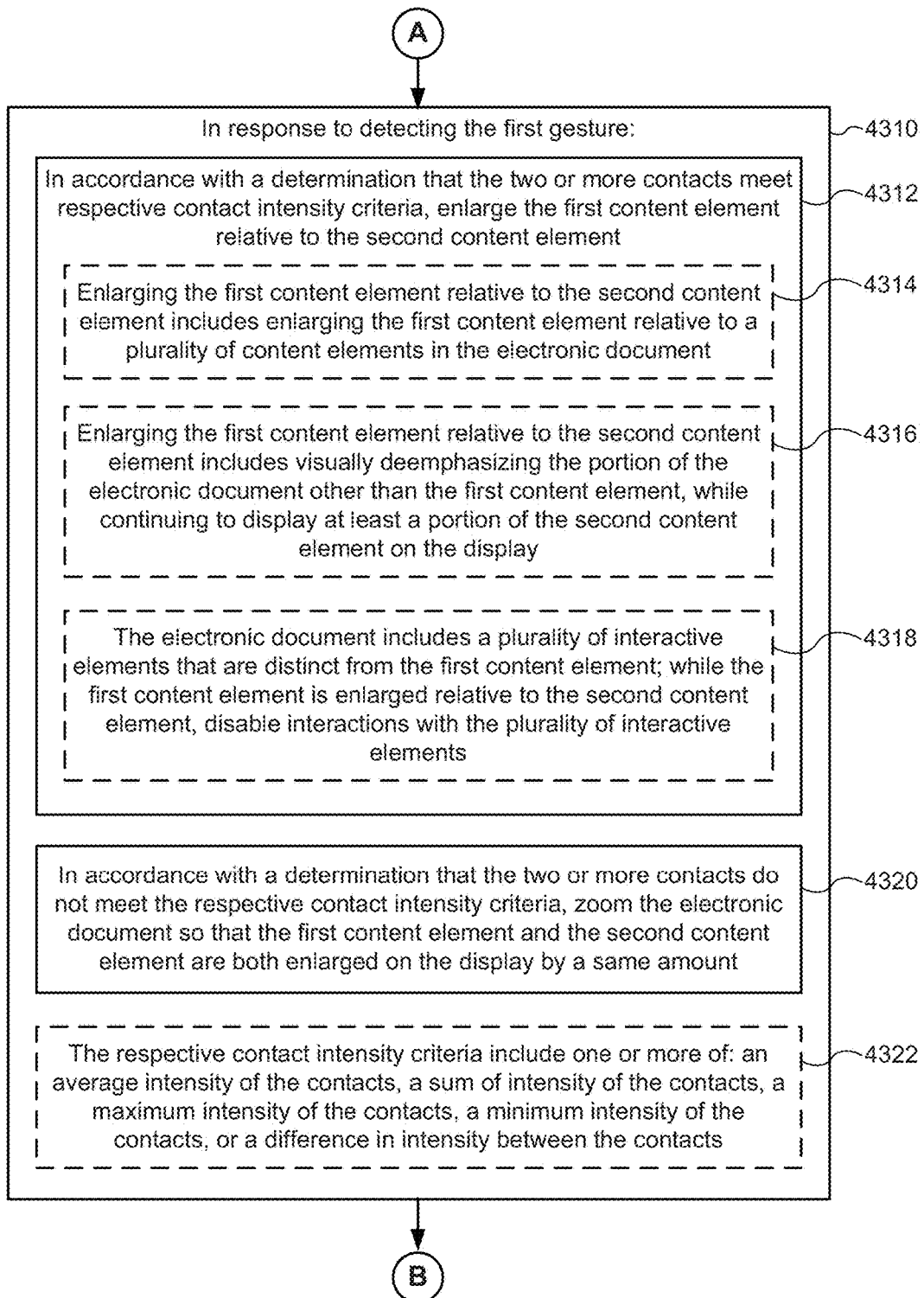
Figure 15C:
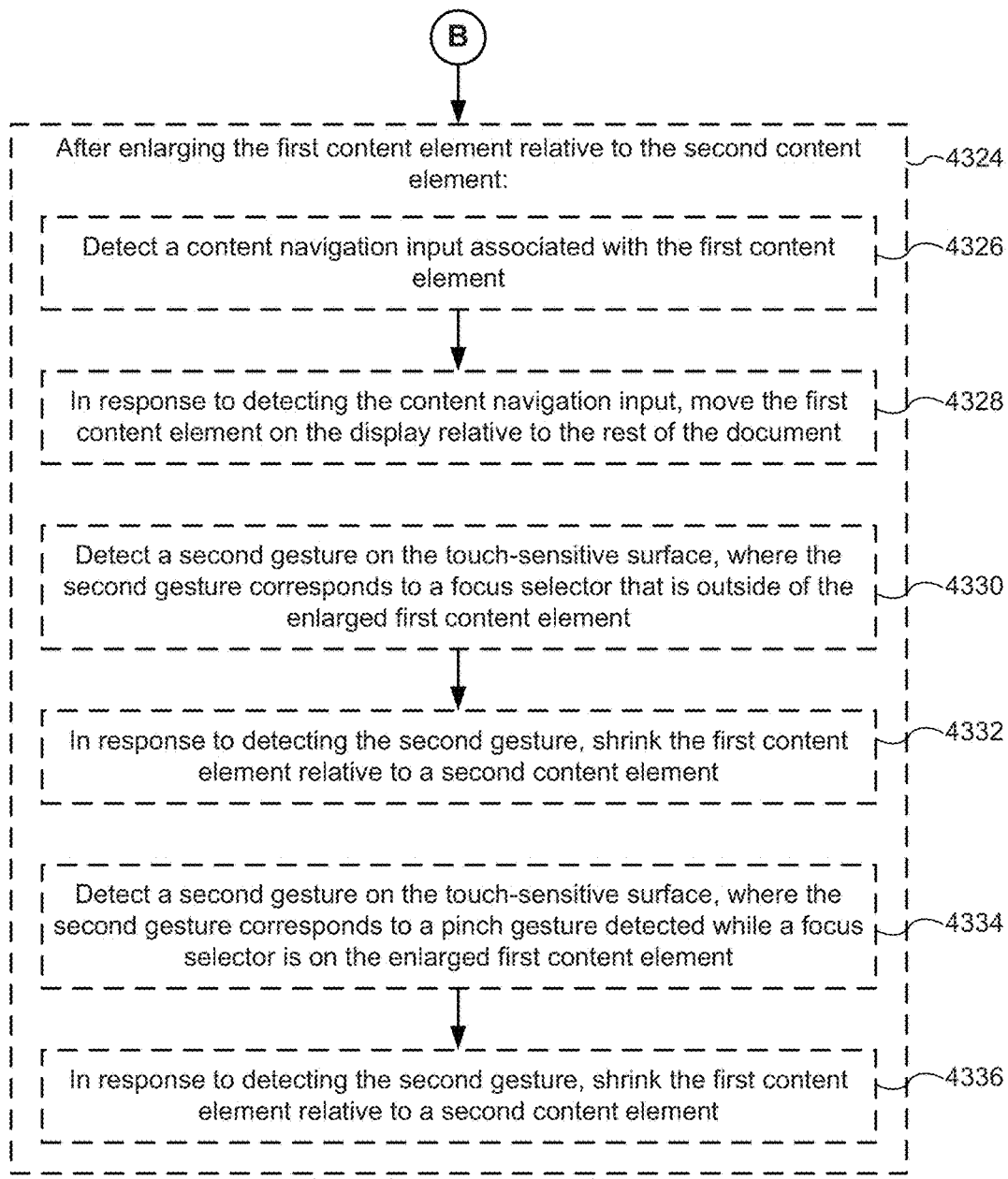

FIGS. 14L-14O illustrate an example of the user interfaces described above with reference to FIGS. 14A-14K implemented on a device with a touch-sensitive display (e.g., device 100 with touch screen 112), where a centroid of contacts 4242 is a focus selector in FIGS. 14L-14M and a centroid of contacts 4246 is a focus selector in FIGS. 14N-14O. FIG. 14L illustrates document 4204 displayed on touch screen 112 at size 4204-*a*. Document 4204 includes body text 4206, advertisements 4208, images 4210, and hyperlinks 4222, displayed at sizes 4206-*a*, 4208-*a*, 4210-*a*, and 4222-*a*, respectively.

In FIG. 14L, a gesture is detected on touch screen 112 over body text 4206. The gesture includes contacts 4242-1 and 4242-2. Movement 4244-1 of contact 4242-1 away from contact 4242-2, from location 4242-1-*a* to location 4242-1-*b* (FIG. 14M), is detected. Movement 4244-2 of contact 4242-2 away from contact 4242-1, from location 4242-2-*a* to location 4242-2-*b* (FIG. 14M), is detected (e.g., the gesture shown in FIGS. 14L-14M is a depinch gesture). Contacts 4242 have an average intensity level that is between $IT_L$ and $IT_D$, and thus do not meet the contact intensity criteria.

In response to detection of the gesture with contacts 4242 in FIG. 14L, document 4204 is zoomed to magnification level 4204-*b*, as shown in FIG. 14M. In accordance with the zooming of document 4204, the visible content elements in document 4204 are resized (e.g., enlarged) by the same amount. Thus, body text 4206, advertisements 4208, images 4210, and hyperlinks 4222 are resized by the same amount as the zooming of document 4204 to sizes 4206-*b*, 4208-*b*, 4210-*b*, and 4222-*b*, respectively.

FIG. 14N also illustrates document 4204 displayed on touch screen 112 at size 4204-*a*, and body text 4206, advertisements 4208, images 4210, and hyperlinks 4222 displayed at sizes 4206-*a*, 4208-*a*, 4210-*a*, and 4222-*a*, respectively.

In FIG. 14N, a gesture is detected on touch screen 112 over body text 4206. The gesture includes contacts 4246-1 and 4246-2. Movement 4248-1 of contact 4246-1 away from contact 4246-2, from location 4246-1-*a* to location 4246-1-*b* (FIG. 14O), is detected. Movement 4248-2 of contact 4246-2 away from contact 4246-1, from location 4246-2-*a* to location 4246-2-*b* (FIG. 14O), is detected (e.g., the gesture shown in FIGS. 14N-14O is a depinch gesture). Contacts 4246 have an average intensity level that is above $IT_D$, and thus meet the contact intensity criteria.

In response to detection of the gesture with contacts 4246 in FIG. 14N, body text 4206 is enlarged and displayed as pop-up 4206-*d*, as shown in FIG. 14O. Document 4204 and the other content elements in document 4204 remain at the same size or magnification level as prior to the detection of the gesture. Alternatively, body text 1126 is, optionally, enlarged relative to the other content elements in document 4204 but still displayed within document 4204, as in FIG. 14D.

While the respective gestures with contacts 4242 and 4246, respectively, are gestures in which the contacts are moving away from each other (with the result being document 4204 as a whole being zoomed in or body text 4206 enlarged relative to the rest of document 4204, depending on whether the gesture meets the contact intensity criteria), similar multi-contact gestures in which the contacts are moving toward each other (e.g., a pinch or a finger grasp gesture) are, optionally, performed on touch screen 112 over a content element (e.g., body text 4206) and be detected. For example, if such a gesture, detected over body text 4206, does not meet the contact intensity criteria, then document 4204 as a whole is zoomed out (and the content elements within document 4204 are reduced in size in unison). If such a gesture, detected over body text 4206, meets the contact intensity criteria, then body text 4206 is reduced in size relative to the rest of document 4204 and the other content elements in document 4204 (e.g., body text 4206 is displayed as a smaller content block within document 4204 or as a pop-up in which body text 4206 is displayed in smaller font).

FIGS. 15A-15C are flow diagrams illustrating a method 4300 of enlarging content in a document in accordance with some embodiments. The method 4300 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch screen display and the touch-sensitive surface is on the display. In some embodiments, the display is separate from the touch-sensitive surface. Some operations in method 4300 are, optionally, combined and/or the order of some operations is, optionally, changed.

As described below, the method 4300 provides an intuitive way to enlarge content in a document. The method reduces the cognitive burden on a user when enlarging content in a document, thereby creating a more efficient human-machine interface. For battery-operated electronic devices, enabling a user to enlarge content in a document faster and more efficiently conserves power and increases the time between battery charges.

The device displays (4302), on the display, an electronic document (e.g., word processing document, spreadsheet document, presentation document, webpage, PDF) that includes a first content element and a second content element. For example, FIGS. 14A-14O show document 4204 displayed on a display (e.g., display 450, touch screen 112). Document 4204 includes multiple content elements, such as body text 4206, advertisements 4208, images 4210, and hyperlinks 4222.

In some embodiments, the first content element and the second content element are (4304) content blocks (e.g., images, text blocks, content divs or other units of content such as a news article) of a webpage. For example, a user can expand a particular article on a news website and read the article without the distraction of other content proximate to the article, such as other news articles and advertisements, that are not part of the article. Document 4204, for example, is, optionally, a webpage, and the content elements (e.g., body text 4206, advertisements 4208, images 4210, and hyperlinks 4222) in document 4204 are content blocks.

The device detects (4306) a first gesture that includes movement of two or more contacts relative to each other on the touch-sensitive surface (e.g., a pinch gesture or a depinch gesture) while a focus selector is at a location corresponding to the first content element. For example, FIG. 14A shows, while cursor 4212 is located over body text 4206, detection of a gesture that includes contacts 4214-1 and 4214-2 moving away from each other on touch-sensitive surface 451. FIG. 14C shows, while cursor 4212 is located over body text 4206, detection of a gesture that includes contacts 4218-1 and 4218-2 moving away from each other on touch-sensitive surface 451. FIG. 14L shows detection of a gesture that includes contacts 4242-1 and 4242-2 moving away from each other on touch screen 112 over body text 4206. FIG. 14L shows detection of a gesture that includes contacts 4246-1 and 4246-2 moving away from each other on touch screen 112 over body text 4206.

In some embodiments, the first gesture is (4308) a depinch gesture that includes movement of a first contact away from a second contact on the touch-sensitive surface. In some embodiments, the depinch gesture includes two contacts and one contact moves and the other contact is stationary. In some embodiments, the depinch gesture includes two contacts and both contacts move. In some embodiments, the depinch gesture includes movement of three or more contacts on the touch-sensitive surface (e.g., a three, four, or five finger pinch/depinch gesture). For example, the gestures that include contacts 4214, 4218, 4242, and 4246, depicted in FIGS. 14A, 14C, 14L, and 14N, respectively, are depinch gestures in which both contacts in the respective gesture move. However, in some circumstances, a depinch gesture is performed with a first contact moving away from a second stationary contact.

In response (4310) to detecting the first gesture, in accordance with a determination that the two or more contacts meet respective contact intensity criteria, the device enlarges (4312) the first content element relative to the second content element. For example, in response to detection of the gesture with contacts 4218, body text 4206 is enlarged relative to the other content elements (e.g., advertisements 4208) in document 4204, as shown in FIG. 14D or 14E. In response to detection of the gesture with contacts 4246, body text 4206 is enlarged relative to the other content elements (e.g., advertisements 4208) in document 4204, as shown in FIG. 14O.

In some embodiments, enlarging the first content element relative to the second content element includes (4314) enlarging the first content element relative to a plurality of content elements in the electronic document (e.g., the first content element is enlarged relative to the remainder of the document). For example, FIGS. 14D, 14E, and 14O show body text 4206 enlarged relative to the other content elements of document 4204 (e.g., advertisements 4208, images 4210, hyperlinks 4222) in response to detection of a respective gesture that meets the content intensity criteria.

In some embodiments, enlarging the first content element relative to the second content element includes (4316) visually deemphasizing the portion of the electronic document other than the first content element, while continuing to display at least a portion of the second content element on the display (e.g., display drop shadow/fade out rest of document). In some embodiments, some or all of the other content elements are maintained at the same size that they were displayed at prior to detecting the first gesture. In some embodiments, one or more of the other content elements are reduced in size in response to detecting the first gesture. For example, in FIGS. 14E and 14O, body text 4206 is displayed as pop-up 4206-d off document 4204, which remains at the same magnification level as prior to detection of the gesture. Document 4204 is visually deemphasized be being displayed as under pop-up 4206-d. Additionally, in FIGS. 14E and 14O, one or more respective portions of document 4204 other than the pop-up are faded out or darkened to deemphasize those respective portions of document 4204.

In some embodiments, the electronic document includes (4318) a plurality of interactive elements that are distinct from the first content element, and while the first content element is enlarged relative to the second content element, the device disables interactions with the plurality of interactive elements. For example, after "popping" the first content element "off of the page," interactions with the rest of the electronic document are disabled. In particular, links or other selectable elements of the second content element that are still displayed after the first content element is enlarged are not selectable/activatable while the first content element is enlarged. Additionally, in some implementations, certain application/system-level functions for interacting with content (e.g., cut/copy/paste) are disabled for content other than the first content element. For example, while pop-up 4206-d is displayed, interaction with advertisements 4208, images 4210, and hyperlinks 4222 are, optionally, disabled (e.g., tapping, "clicking" or otherwise attempting to activate a respective hyperlink does not activate the hyperlink).

In response (4310) to detecting the first gesture, in accordance with a determination that the two or more contacts do not meet the respective contact intensity criteria, the device zooms (4320) the electronic document so that the first content element and the second content element are both enlarged on the display by a same amount. For example, in response to detection of the depinch gesture with contacts 4214 in FIG. 14A, document 4204 is zoomed to magnification level 4204-b, and the content elements in document 4204 are zoomed in by the same amount, as shown in FIG. 14B. In response to detection of the depinch gesture with contacts 4242 in FIG. 14L, document 4204 is zoomed to magnification level 4204-b, and the content elements in document 4204 are zoomed in by the same amount, as shown in FIG. 14M.

In some embodiments, the respective contact intensity criteria include (4322) one or more of: an average intensity of the contacts, a sum of intensity of the contacts, a maximum intensity of the contacts, a minimum intensity of the contacts, or a difference in intensity between the contacts (e.g., the respective contact intensity criteria are met when one of these measures of contact intensity is above a respective intensity threshold). For example, with respect to the respective gestures that include contacts 4214, 4218, 4242, and 4246, respectively, the contact intensity criteria include a measure of the average intensity of the contacts in the gesture and the contact intensity criteria are not met unless that average intensity exceeds threshold $IT_D$.

In some embodiments, after (4324) enlarging the first content element relative to the second content element, the device detects (4326) a content navigation input associated with the first content element (e.g., a drag gesture on a trackpad or a drag gesture on a touch-screen display at a location corresponding to the enlarged first content element). In response to detecting the content navigation input, the device moves (4328) the first content element on the display relative to the rest of the document. For example, after "popping" the first content element "off of the page," the first content element can be moved (e.g., scrolled or translated) separately from a portion of the electronic document that is still displayed on the display. For example, FIG. 14F shows, after body text 4206 is enlarged into pop-up

4206-*d*, the device detecting a drag gesture with contact 4224 detected on touch-sensitive surface 451. In response to detection of the drag gesture, body text 4206 in pop-up 4206-*d* is scrolled, without scrolling the rest of document 4204, as shown in FIG. 14G.

In some embodiments, after (4324) enlarging the first content element relative to the second content element, the device detects (4330) a second gesture on the touch-sensitive surface, where the second gesture corresponds to a focus selector that is outside of the enlarged first content element (e.g., the second gesture is a tap gesture on a touch-screen display outside of a region where the enlarged first content element is displayed or the second gesture is a tap gesture on a touch-sensitive surface while a cursor on the display is outside of a region where the enlarged first content element is displayed). In response to detecting the second gesture, the device shrinks (4332) the first content element relative to a second content element (e.g., exiting the first content element display mode and returning to a normal display mode for the electronic document). For example, in FIG. 14H, after body text 4206 is enlarged into pop-up 4206-*d* and while cursor 4212 is located away from pop-up 4206-*d*, a press input (e.g., an increase in intensity of contact 4228 from an intensity below $IT_L$ in FIG. 14H to an intensity above $IT_L$ in FIG. 14I) is detected on touch-sensitive surface 451. In response to detection of the gesture, pop-up 4206-*d* ceases to be displayed, and body text 4206 is reduced back to original size 4206-*a* and displayed within document 4204, as shown in FIG. 14I.

In some embodiments, after (4324) enlarging the first content element relative to the second content element, the device detects (4334) a second gesture on the touch-sensitive surface, where the second gesture corresponds to a pinch gesture detected while a focus selector is on the enlarged first content element (e.g., the second gesture is a two-finger pinch gesture on a touch-screen display within a region where the enlarged first content element is displayed or the second gesture is a two-finger pinch gesture on a touch-sensitive surface while a cursor on the display is within a region where the enlarged first content element is displayed). In response to detecting the second gesture, the device shrinks (4336) the first content element relative to a second content element (e.g., exiting the first content element display mode and returning to a normal display mode for the electronic document). For example, in FIG. 14J, after body text 4206 is enlarged into pop-up 4206-*d* and while cursor 4212 is located over pop-up 4206-*d*, a pinch gesture that includes movement of contacts 4230-1 and 4230-2 toward each other is detected on touch-sensitive surface 451. In response to detection of the gesture in FIG. 14J, pop-up 4206-*d* ceases to be displayed, and body text 4206 is reduced back to original size 4206-*a* and displayed within document 4204, as shown in FIG. 14K.

It should be understood that the particular order in which the operations in FIGS. 15A-15C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 4300 described above with respect to FIGS. 15A-15C. For example, the contacts, gestures, content elements, intensity thresholds, and focus selectors described above with reference to method 4300 optionally have one or more of the characteristics of the contacts, gestures, content elements, intensity thresholds, and focus selectors described herein with reference to other methods described herein (e.g., those listed in the fifth paragraph of the Description of Embodiments). For brevity, these details are not repeated here.

Figure 16:
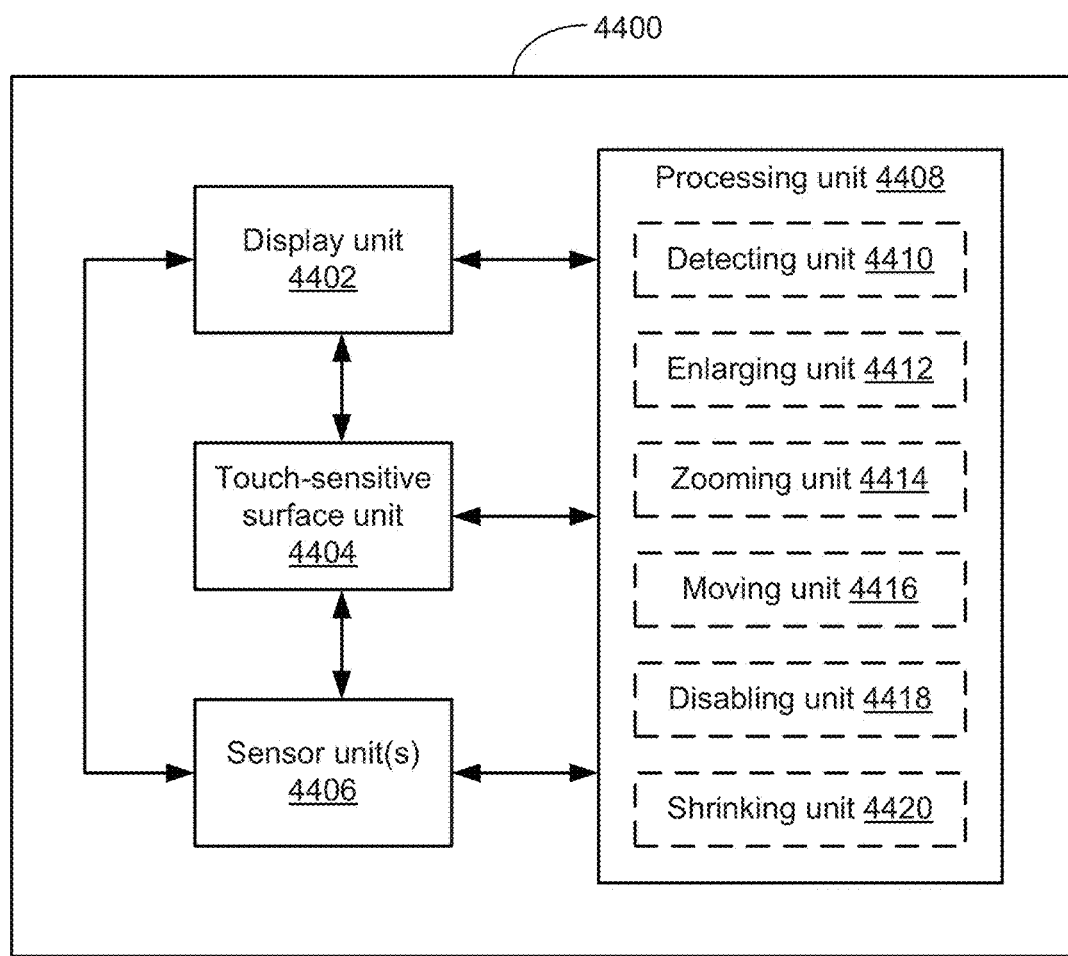
FIG. 16 is a functional block diagram of an electronic device in accordance with some embodiments.

In accordance with some embodiments, FIG. 16 shows a functional block diagram of an electronic device 4400 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, an electronic device 4400 includes a display unit 4402 configured to display an electronic document that includes a first content element and a second content element; a touch-sensitive surface unit 4404 configured to receive gestures that include contacts; one or more sensors 4406 configured to detect intensity of contacts with the touch-sensitive surface unit 4404; and a processing unit 4408 coupled to the display unit 4402, the touch-sensitive surface unit 4404, and the sensors 4406. In some embodiments, the processing unit 4408 includes a detecting unit 4410, an enlarging unit 4412, a zooming unit 4414, a moving unit 4416, a disabling unit 4418, and a shrinking unit 4420.

The processing unit 4408 is configured to: detect a first gesture that includes movement of two or more contacts relative to each other on the touch-sensitive surface unit 4404 while a focus selector is at a location corresponding to the first content element (e.g., with the detecting unit 4410); and in response to detecting the first gesture: in accordance with a determination that the two or more contacts meet respective contact intensity criteria, enlarge the first content element relative to the second content element (e.g., with the enlarging unit 4412), and in accordance with a determination that the two or more contacts do not meet the respective contact intensity criteria, zoom the electronic document so that the first content element and the second content element are both enlarged on the display unit 4402 by a same amount (e.g., with the zooming unit 4414).

In some embodiments, the first gesture is a depinch gesture that includes movement of a first contact away from a second contact on the touch-sensitive surface unit 4404.

In some embodiments, the first content element and the second content element are content blocks of a webpage.

In some embodiments, enlarging the first content element relative to the second content element includes enlarging the first content element relative to a plurality of content elements in the electronic document.

In some embodiments, enlarging the first content element relative to the second content element includes visually deemphasizing the portion of the electronic document other than the first content element, while continuing to display at least a portion of the second content element on the display unit 4402.

In some embodiments, the processing unit 4408 is configured to, after enlarging the first content element relative to the second content element: detect a content navigation input associated with the first content element (e.g., with the detecting unit 4410); and in response to detecting the content navigation input, move the first content element on the display unit 4402 relative to the rest of the document (e.g., with the moving unit 4416).

In some embodiments, the electronic document includes a plurality of interactive elements that are distinct from the first content element; and the processing unit 4408 is configured to, while the first content element is enlarged relative to the second content element, disable interactions with the plurality of interactive elements (e.g., with the disabling unit 4418).

In some embodiments, the processing unit 4408 is configured to, after enlarging the first content element relative to the second content element: detect a second gesture on the touch-sensitive surface unit 4404, wherein the second gesture corresponds to a focus selector that is outside of the enlarged first content element (e.g., with the detecting unit 4410); and in response to detecting the second gesture, shrink the first content element relative to a second content element (e.g., with the shrinking unit 4420).

In some embodiments, the processing unit 4408 is configured to, after enlarging the first content element relative to the second content element: detect a second gesture on the touch-sensitive surface unit 4404, wherein the second gesture corresponds to a pinch gesture detected while a focus selector is on the enlarged first content element (e.g., with the detecting unit 4410); and in response to detecting the second gesture, shrink the first content element relative to a second content element (e.g., with the shrinking unit 4420).

In some embodiments, the respective contact intensity criteria include one or more of: an average intensity of the contacts, a sum of intensity of the contacts, a maximum intensity of the contacts, a minimum intensity of the contacts, or a difference in intensity between the contacts.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 15A-15C are, optionally, implemented by components depicted in FIGS. 1A-1B or FIG. 16. For example, detection operation 4306, enlarging operation 4312, and zooming operation 4320 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations have been described above is merely exemplary and is not intended to indicate that the described order is the only order in which the operations could be performed. One of ordinary skill in the art would recognize various ways to reorder the operations described herein. Additionally, it should be noted that the various processes separately described herein (e.g., those listed in the fifth paragraph of the Description of Embodiments) can be combined with each other in different arrangements. For example, the contacts, user interface objects, tactile sensations, intensity thresholds, and/or focus selectors described above with reference to any one of the various processes separately described herein (e.g., those listed in the fifth paragraph of the Description of Embodiment) optionally have one or more of the characteristics of the contacts, gestures, user interface objects, tactile sensations, intensity thresholds, and focus selectors described herein with reference to one or more of the other methods described herein (e.g., those listed in the fifth paragraph of the Description of Embodiments). For brevity, all of the various possible combinations are not specifically enumerated here, but it should be understood that the claims described above may be combined in any way that is not precluded by mutually exclusive claim features.

The foregoing description, for purpose of explanation, has been described with reference to specific embodiments. However, the illustrative discussions above are not intended to be exhaustive or to limit the various described embodiments to the precise forms disclosed. Many modifications and variations are possible in view of the above teachings. The embodiments were chosen and described in order to best explain the principles of the various described embodiments and their practical applications, to thereby enable others skilled in the art to best utilize the various described embodiments with various modifications as are suited to the particular use contemplated.

What is claimed is:

1. A non-transitory computer readable storage medium storing one or more programs, the one or more programs comprising instructions which, when executed by an electronic device with a display, a touch-sensitive surface and one or more sensors to detect intensities of contacts with the touch-sensitive surface, cause the electronic device to:

display a user interface, wherein:
  the user interface includes a first region and a second region;
  the second region is embedded in the first region so that when content in the first region is moved, the second region moves together with the content in the first region; and
  content in the second region is scrollable independently of other content in the first region;
detect, on the touch-sensitive surface, a contact that corresponds to a focus selector on the display at a location within the second region;
detect first movement of the contact across the touch-sensitive surface that corresponds to movement of the focus selector that starts while the focus selector is within the second region; and
in response to detecting the first movement of the contact that corresponds to movement of the focus selector that starts while the focus selector is within the second region:
  in accordance with a determination that the contact has a maximum intensity that is below a respective intensity threshold, translate content in the first region on the display; and in accordance with a determination that the contact has a maximum intensity that is above the respective intensity threshold, translate content in the second region on the display without translating other content in the first region on the display.

2. The non-transitory computer readable storage medium of claim 1, including instructions which cause the device to, prior to detecting the first movement of the contact across the touch-sensitive surface:

detect an increase in intensity of the contact above the respective intensity threshold; and in response to detecting the increase in intensity of the contact above the respective intensity threshold, modify the display of the first region or the second region to indicate that movement of the contact on the touch-sensitive surface will cause content in the second region to be translated on the display without translating other content in the first region on the display.

3. The non-transitory computer readable storage medium of claim 1, including instructions which cause the device to, in response to detecting movement of a second contact when the focus selector is at a location on the display within the first region that does not include the second region, translate, on the display, all content in the first region, including content not in the second region, without regard to whether the second contact is above or below the respective intensity threshold.

4. The non-transitory computer readable storage medium of claim 1, wherein:

translating content in the first region on the display includes translating content in the first region in two dimensions; and translating content in the second region on the display includes translating content in the second region in one dimension.

5. The non-transitory computer readable storage medium of claim 1, wherein:

translating content in the first region on the display includes translating content in the first region in one dimension; and translating content in the second region on the display includes translating content in the second region in two dimensions.

6. The non-transitory computer readable storage medium of claim 1, wherein:

content in the first region includes a displayed webpage; and content in the second region includes a map embedded in the webpage.

7. The non-transitory computer readable storage medium of claim 1, including instructions which cause the device to, after translating content in the second region on the display in accordance with the first movement of the contact without translating other content in the first region on the display:

detect a decrease in intensity of the contact below the respective intensity threshold;

after detecting the decrease in intensity of the contact, detect second movement of the contact on the touch-sensitive surface; and in response to detecting the second movement of the contact, continue to translate the content in second region on the display without translating other content in the first region on the display.

8. The non-transitory computer readable storage medium of claim 1, including instructions which cause the device to, after translating content in the second region on the display in accordance with the first movement of the contact without translating other content in the first region on the display:

detect a decrease in intensity of the contact below the respective intensity threshold;

after detecting the decrease in intensity of the contact, detect second movement of the contact on the touch-sensitive surface; and in response to detecting the second movement of the contact, translate content in the first region on the display in conjunction with translating the second region on the display.

9. An electronic device, comprising:

a display;

a touch-sensitive surface;

one or more sensors to detect intensities of contacts with the touch-sensitive surface;

one or more processors;

memory; and one or more programs, wherein the one or more programs are stored in the memory and configured to be executed by the one or more processors, the one or more programs including instructions for:

displaying a user interface, wherein:

the user interface includes a first region and a second region;

the second region is embedded in the first region so that when content in the first region is moved, the second region moves together with the content in the first region; and content in the second region is scrollable independently of other content in the first region;

detecting, on the touch-sensitive surface, a contact that corresponds to a focus selector on the display at a location within the second region;

detecting first movement of the contact across the touch-sensitive surface that corresponds to movement of the focus selector that starts while the focus selector is within the second region; and in response to detecting the first movement of the contact that corresponds to movement of the focus selector that starts while the focus selector is within the second region:

in accordance with a determination that the contact has a maximum intensity that is below a respective intensity threshold, translating content in the first region on the display; and in accordance with a determination that the contact has a maximum intensity that is above the respective intensity threshold, translating content in the second region on the display without translating other content in the first region on the display.

10. The device of claim 9, including instructions for, prior to detecting the first movement of the contact across the touch-sensitive surface:

detecting an increase in intensity of the contact above the respective intensity threshold; and in response to detecting the increase in intensity of the contact above the respective intensity threshold, modifying the display of the first region or the second region to indicate that movement of the contact on the touch-sensitive surface will cause content in the second region to be translated on the display without translating other content in the first region on the display.

11. The device of claim 9, including instructions for, in response to detecting movement of a second contact when the focus selector is at a location on the display within the first region that does not include the second region, translating, on the display, all content in the first region, including content not in the second region, without regard to whether the second contact is above or below the respective intensity threshold.

12. The device of claim 9, wherein:
translating content in the first region on the display includes translating content in the first region in two dimensions; and
translating content in the second region on the display includes translating content in the second region in one dimension.

13. The device of claim 9, wherein:
translating content in the first region on the display includes translating content in the first region in one dimension; and
translating content in the second region on the display includes translating content in the second region in two dimensions.

14. The device of claim 9, wherein:
content in the first region includes a displayed webpage; and
content in the second region includes a map embedded in the webpage.

15. The device of claim 9, including instructions for, after translating content in the second region on the display in accordance with the first movement of the contact without translating other content in the first region on the display:
detecting a decrease in intensity of the contact below the respective intensity threshold;
after detecting the decrease in intensity of the contact, detecting second movement of the contact on the touch-sensitive surface; and
in response to detecting the second movement of the contact, continuing to translate the content in second region on the display without translating other content in the first region on the display.

16. The device of claim 9, including instructions for, after translating content in the second region on the display in accordance with the first movement of the contact without translating other content in the first region on the display:
detecting a decrease in intensity of the contact below the respective intensity threshold;
after detecting the decrease in intensity of the contact, detecting second movement of the contact on the touch-sensitive surface; and
in response to detecting the second movement of the contact, translating content in the first region on the display in conjunction with translating the second region on the display.

17. A method, comprising:
at an electronic device with a touch-sensitive surface and a display, wherein the device includes one or more sensors to detect intensities of contacts with the touch-sensitive surface:
displaying a user interface, wherein:
the user interface includes a first region and a second region;
the second region is embedded in the first region so that when content in the first region is moved, the second region moves together with the content in the first region; and
content in the second region is scrollable independently of other content in the first region;
detecting, on the touch-sensitive surface, a contact that corresponds to a focus selector on the display at a location within the second region;
detecting first movement of the contact across the touch-sensitive surface that corresponds to movement of the focus selector that starts while the focus selector is within the second region; and
in response to detecting the first movement of the contact that corresponds to movement of the focus selector that starts while the focus selector is within the second region:
in accordance with a determination that the contact has a maximum intensity that is below a respective intensity threshold, translating content in the first region on the display; and
in accordance with a determination that the contact has a maximum intensity that is above the respective intensity threshold, translating content in the second region on the display without translating other content in the first region on the display.

18. The method of claim 17, including, prior to detecting the first movement of the contact across the touch-sensitive surface:
detecting an increase in intensity of the contact above the respective intensity threshold; and in response to detecting the increase in intensity of the contact above the respective intensity threshold, modifying the display of the first region or the second region to indicate that movement of the contact on the touch-sensitive surface will cause content in the second region to be translated on the display without translating other content in the first region on the display.

19. The method of claim 17, including, in response to detecting movement of a second contact when the focus selector is at a location on the display within the first region that does not include the second region, translating, on the display, all content in the first region, including content not in the second region, without regard to whether the second contact is above or below the respective intensity threshold.

20. The method of claim 17, wherein:
translating content in the first region on the display includes translating content in the first region in two dimensions; and
translating content in the second region on the display includes translating content in the second region in one dimension.

21. The method of claim 17, wherein:
translating content in the first region on the display includes translating content in the first region in one dimension; and
translating content in the second region on the display includes translating content in the second region in two dimensions.

22. The method of claim 17, wherein:
content in the first region includes a displayed webpage; and content in the second region includes a map embedded in the webpage.

23. The method of claim 17, including, after translating content in the second region on the display in accordance with the first movement of the contact without translating other content in the first region on the display:
detecting a decrease in intensity of the contact below the respective intensity threshold;
after detecting the decrease in intensity of the contact, detecting second movement of the contact on the touch-sensitive surface; and
in response to detecting the second movement of the contact, continuing to translate the content in second region on the display without translating other content in the first region on the display.

24. The method of claim 17, including, after translating content in the second region on the display in accordance with the first movement of the contact without translating other content in the first region on the display:
- detecting a decrease in intensity of the contact below the respective intensity threshold;
- after detecting the decrease in intensity of the contact, detecting second movement of the contact on the touch-sensitive surface; and
- in response to detecting the second movement of the contact, translating content in the first region on the display in conjunction with translating the second region on the display.

* * * * *